US008891871B2

(12) United States Patent
Eguchi et al.

(10) Patent No.: US 8,891,871 B2
(45) Date of Patent: Nov. 18, 2014

(54) FORM RECOGNITION APPARATUS, METHOD, DATABASE GENERATION APPARATUS, METHOD, AND STORAGE MEDIUM

(75) Inventors: Shinichi Eguchi, Inagi (JP); Hajime Kawashima, Inagi (JP); Kouichi Kanamoto, Inagi (JP); Shohei Hasegawa, Inagi (JP); Katsutoshi Kobara, Inagi (JP); Maki Yabuki, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 1310 days.

(21) Appl. No.: 12/488,279

(22) Filed: Jun. 19, 2009

(65) Prior Publication Data

US 2010/0008578 A1 Jan. 14, 2010

(30) Foreign Application Priority Data

Jun. 20, 2008 (JP) ................................ 2008-162110

(51) Int. Cl.
*G06K 9/34* (2006.01)
*G06K 9/20* (2006.01)
*G06K 9/00* (2006.01)

(52) U.S. Cl.
CPC .......... *G06K 9/2054* (2013.01); *G06K 9/00449* (2013.01)
USPC .......................................... 382/177; 382/173

(58) Field of Classification Search
None
See application file for complete search history.

(56) References Cited

U.S. PATENT DOCUMENTS 5,737,442 A * 4/1998 Alam ............................ 382/181
5,956,422 A * 9/1999 Alam ............................ 382/181
6,360,011 B1 * 3/2002 Katsumata et al. ........... 382/181
6,501,864 B1 * 12/2002 Eguchi et al. ................. 382/306
6,567,545 B1 * 5/2003 Kobara et al. ................ 382/175
6,567,546 B1 * 5/2003 Eguchi et al. ................ 382/181
8,131,087 B2 * 3/2012 Takebe et al. ................ 382/229
2003/0042319 A1 3/2003 Moore
2003/0076994 A1 * 4/2003 Morita et al. ................ 382/181
2008/0273802 A1 * 11/2008 Takebe et al. ................ 382/229
2009/0110288 A1 * 4/2009 Fujiwara ....................... 382/190
2010/0008578 A1 * 1/2010 Eguchi et al. ................ 382/175

FOREIGN PATENT DOCUMENTS

JP 61-59568 3/1986
JP 6-89365 3/1994
JP A 9-274634 10/1997
JP A 10-116314 5/1998

(Continued)

OTHER PUBLICATIONS

Notice of Grounds for Rejection issued in Japanese App. No. 2008-162110, dated Dec. 28, 2010.

(Continued)

*Primary Examiner* — Sean Motsinger
(74) *Attorney, Agent, or Firm* — Greer Burns & Crain Ltd.

(57) ABSTRACT

One system to which the present invention is applied obtains the digitized form image of a form, recognizes a character string existing in the obtained form image, extracts a headline wording being a predetermined character string from the recognized character strings, determines a table structure existing in the form image, on the basis of the extracted headline wording and the arrangement of headline wordings in the form image and specifies a correspondence relationship between a headline wording and a character string other than the headline wording that is recognized, using the determination result.

27 Claims, 131 Drawing Sheets

(56) References Cited

FOREIGN PATENT DOCUMENTS

| | | |
|---|---|---|
| JP | A 11-110479 | 4/1999 |
| JP | B2 3088019 | 7/2000 |
| JP | A 2000-339406 | 12/2000 |
| JP | B2 3465667 | 8/2003 |
| JP | A 2004-164674 | 6/2004 |
| JP | A 2004-334913 | 11/2004 |
| JP | A 2006-134106 | 5/2006 |

OTHER PUBLICATIONS

Extended European Search Report for corresponding European Application No. 09163284.4, issued Sep. 20, 2013.

Green, Edward, et al. "Model-Based Analysis of Printed Tables", Graphics Recognition Methods and Applications: Aug. 10, 1995, pp. 80-91.

Klein, Bertin, et al. "Three Approaches to "Industrial" Table Spotting", Document Analysis and Recognition, 2001: Sep. 10, 2001, pp. 513-517.

Watanabe, Toyohide et al. "Layout Recognition of Multi-Kinds of Table-Form Documents", Transactions on Pattern Analysis and Machine Intelligence, vol. 17, No. 4, Apr. 4, 1995, pp. 432-445.

Wenzel, Claudia et al. "Precise Table Recognition by Making Use of Reference Tables", Field Programmable Logic and Application, vol. 1655, 1999, pp. 283-294.

* cited by examiner

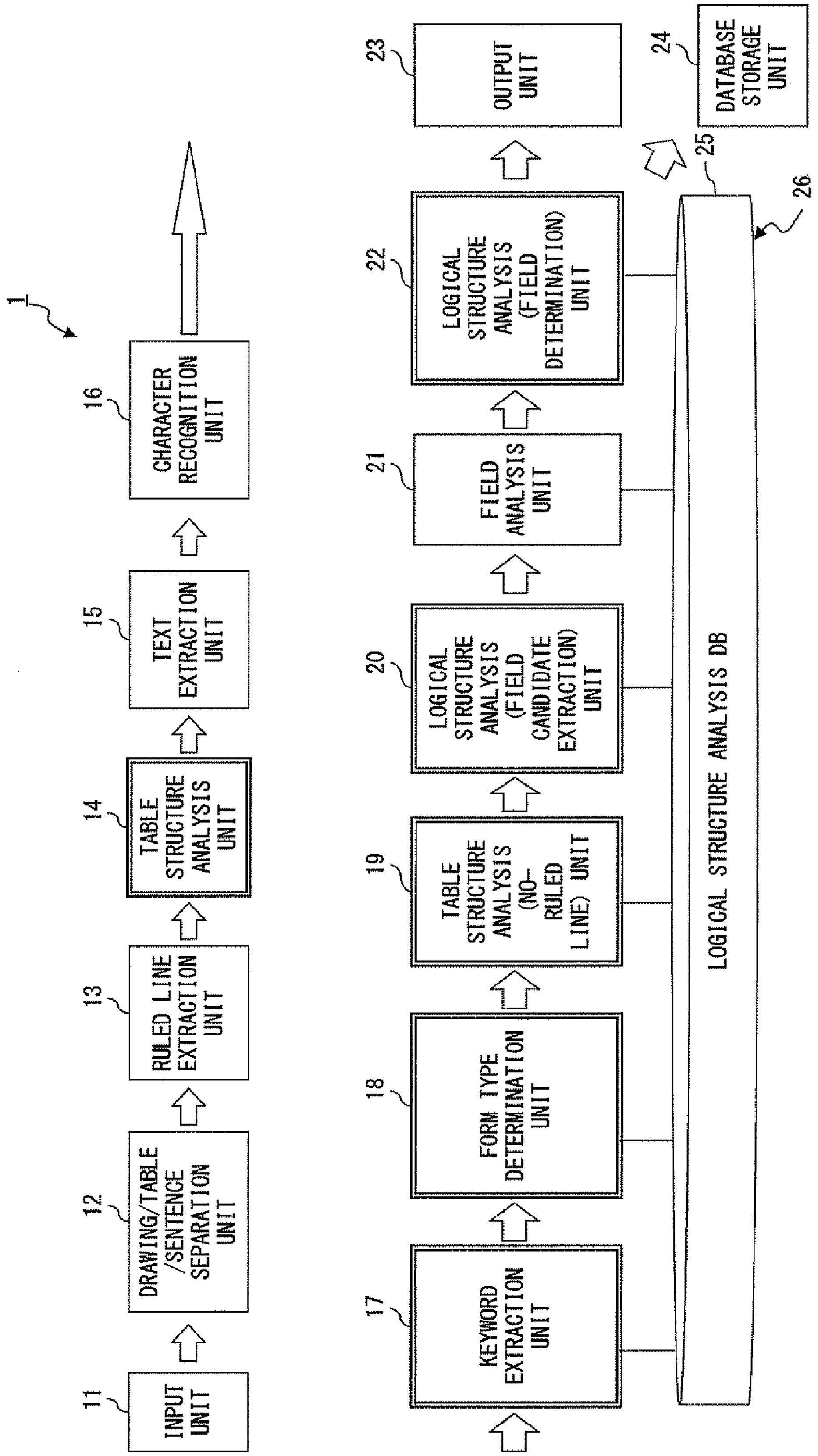
F I G. 1

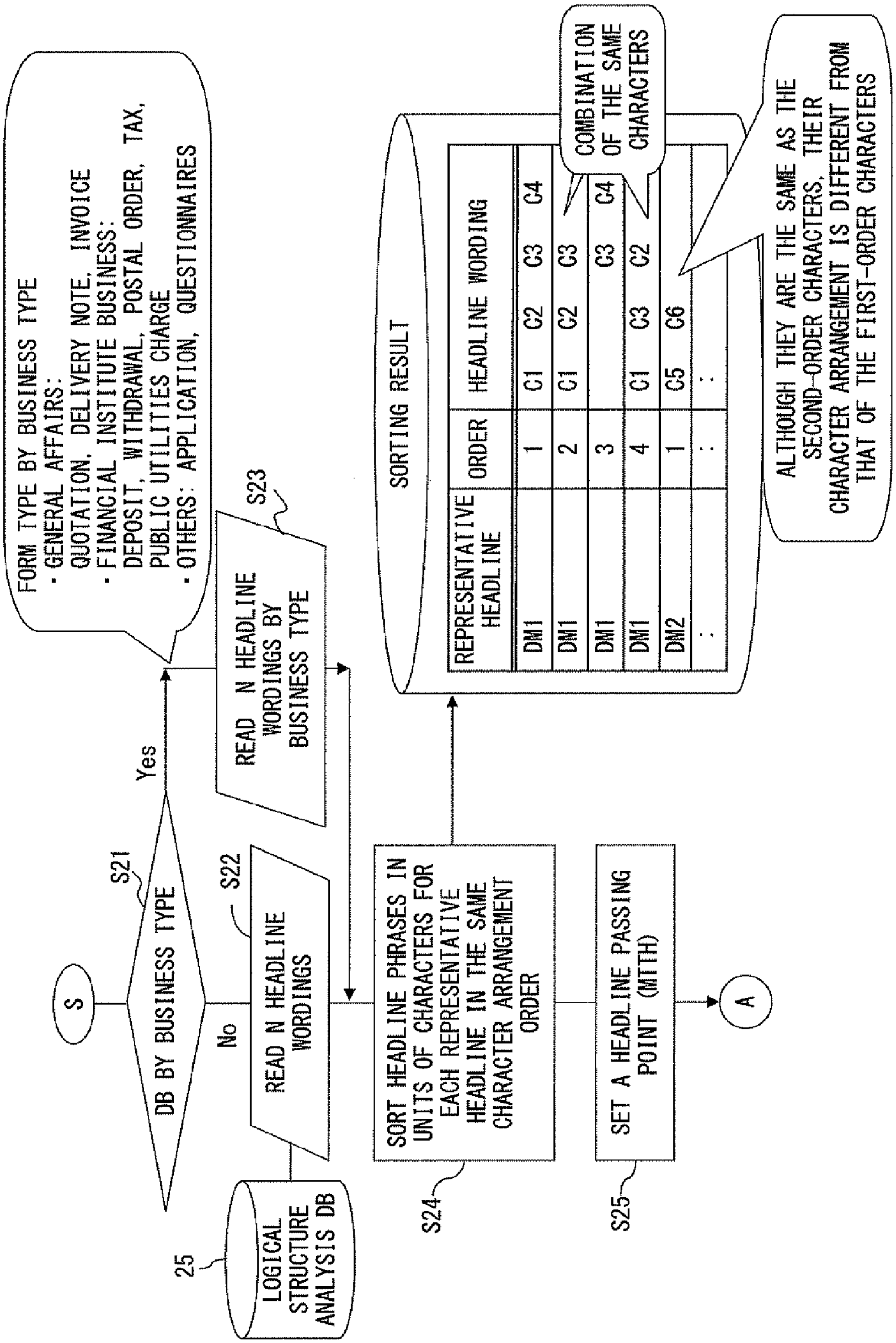
F I G. 3 A

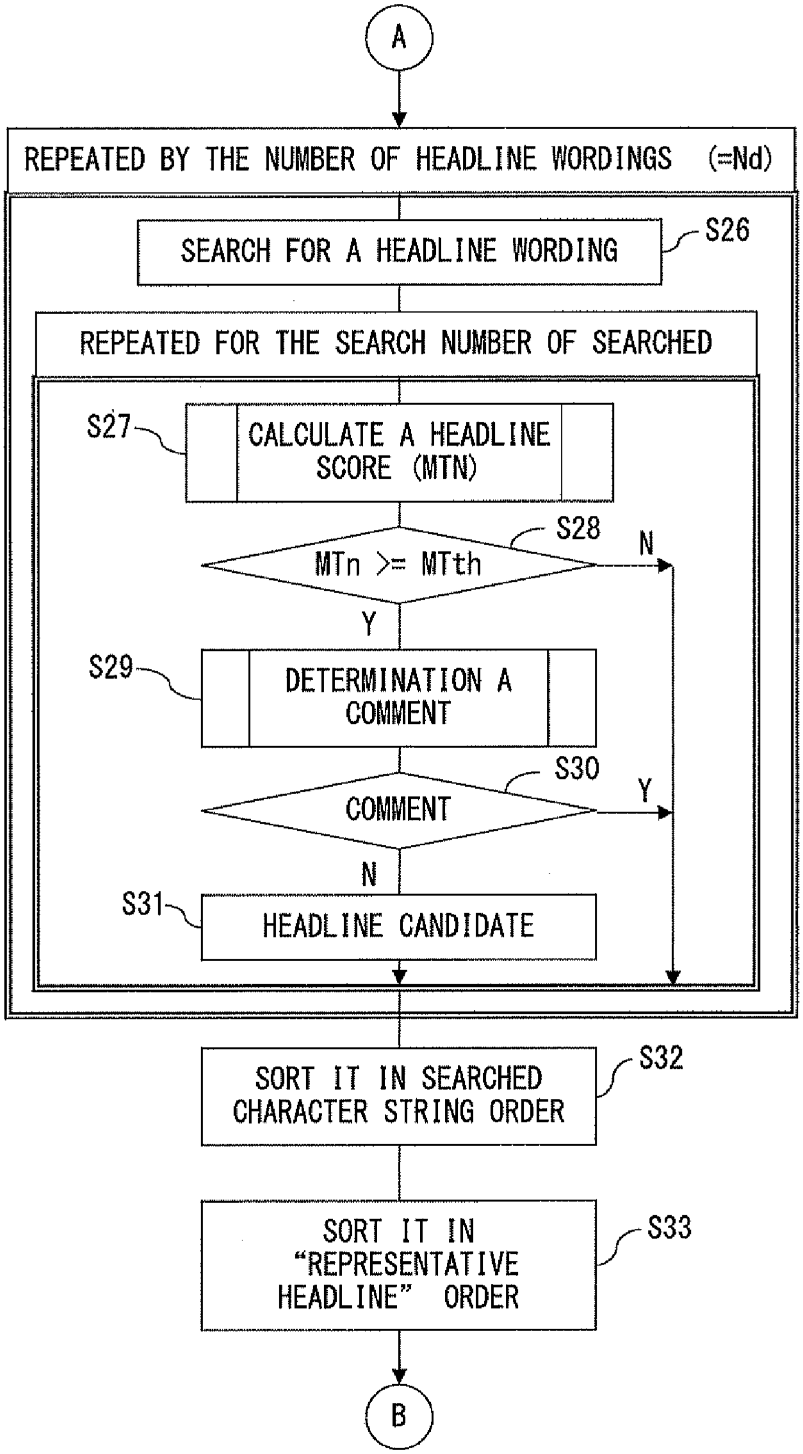
F I G. 3B

MLO : NUMBER OF HEADLINE WORDINGS WHOSE CHARACTER RECOGNITION RESULTS ARE THE SAME
ML : NUMBER OF CHARACTERS OF HEADLINE WORDING
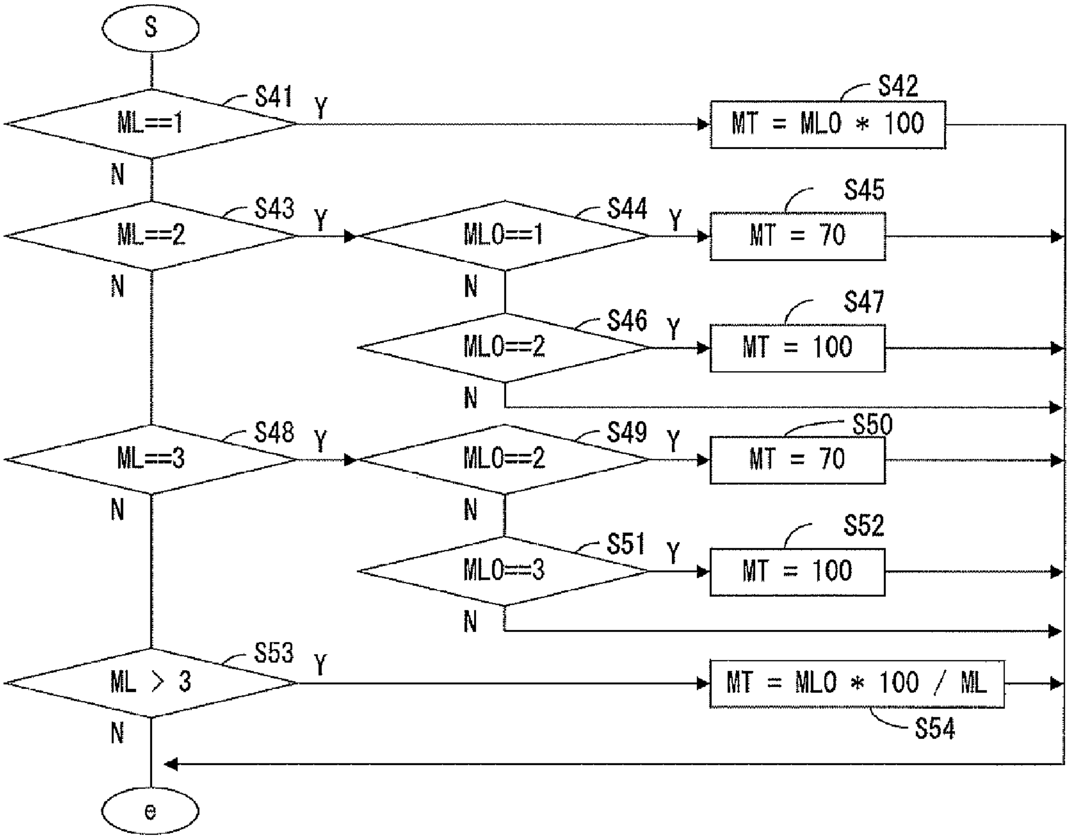
F I G. 4

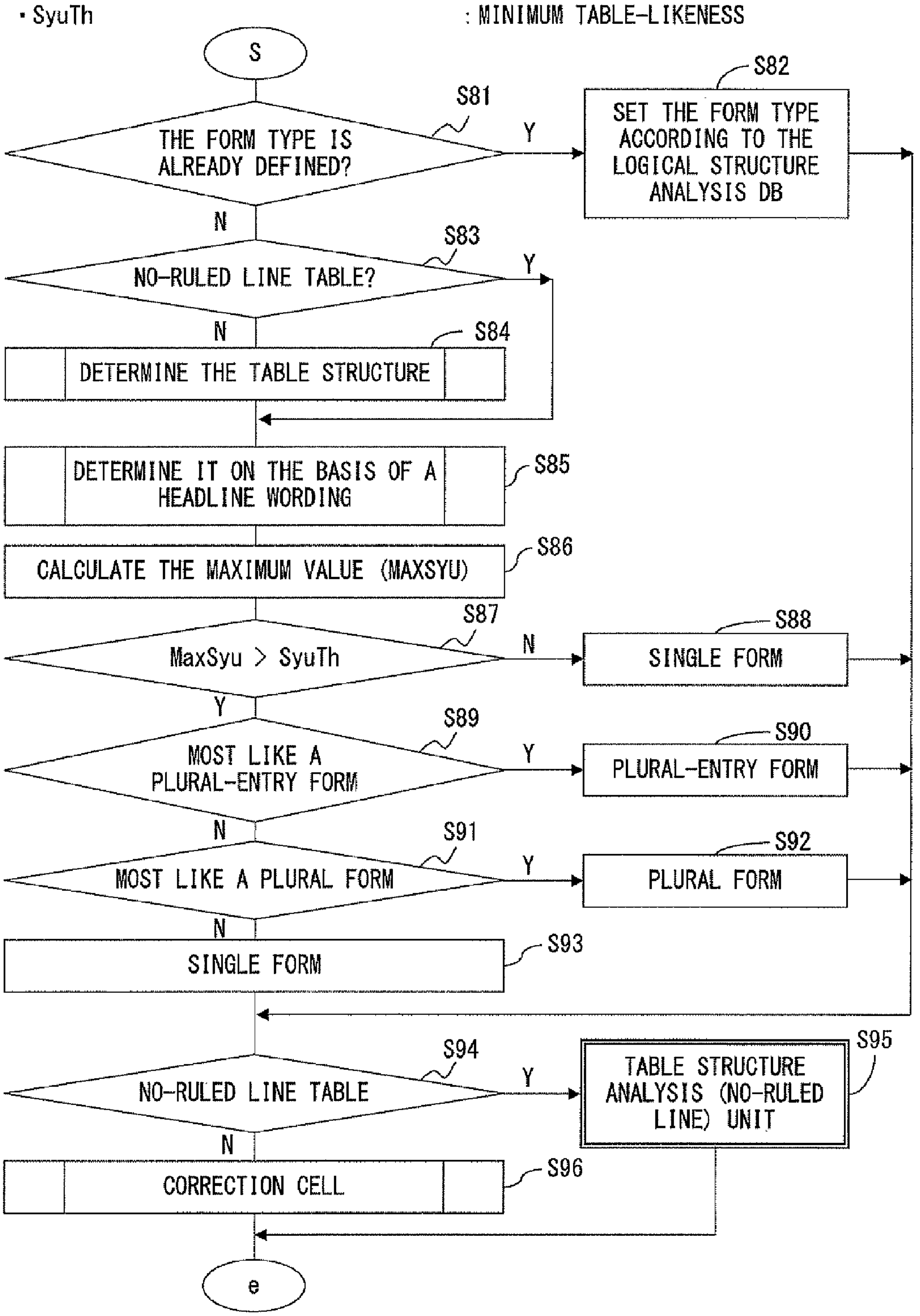
F I G. 6

FRT : SCORE OF PLURAL FORM LIKENESS
TRT : SCORE OF SINGLE FORM LIKENESS
RRT : SCORE OF PLURAL-ENTRY FORM LIKENESS
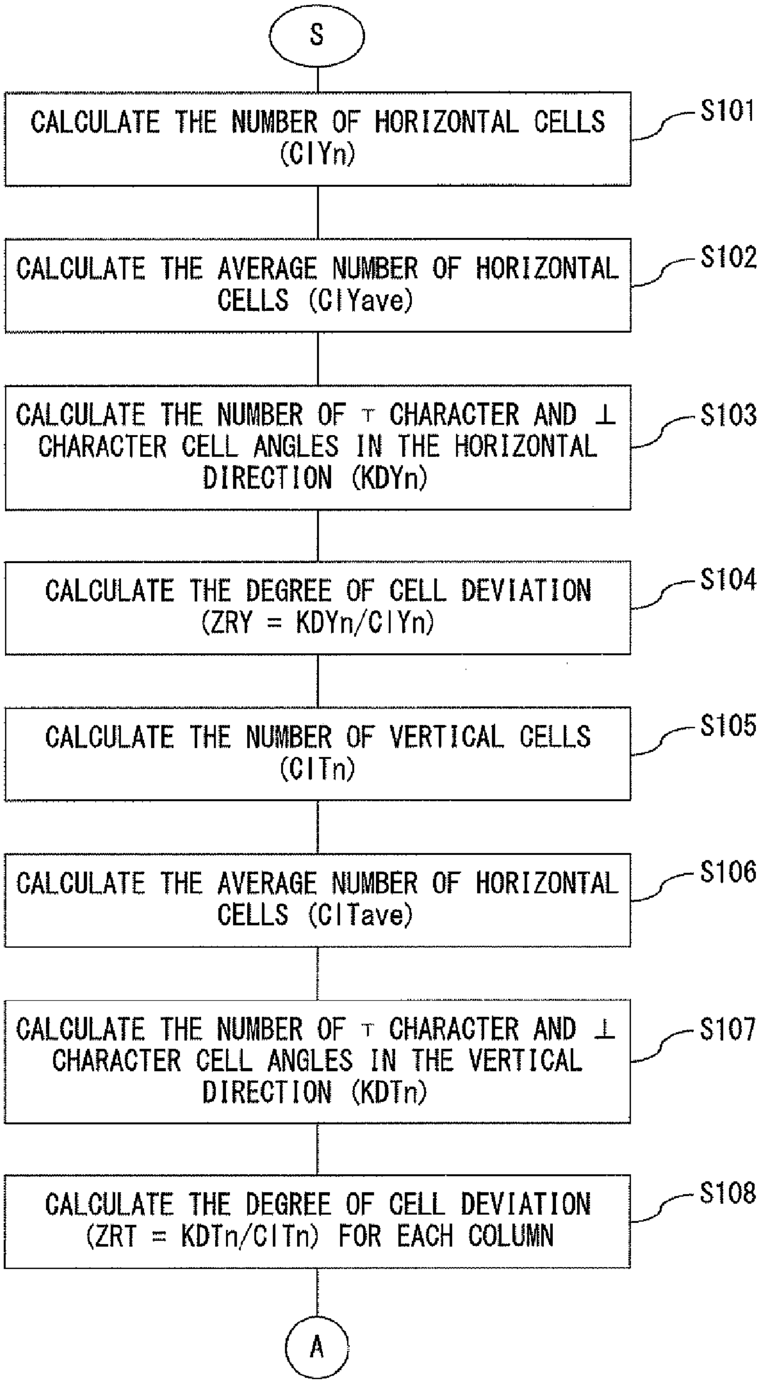
F I G. 7A

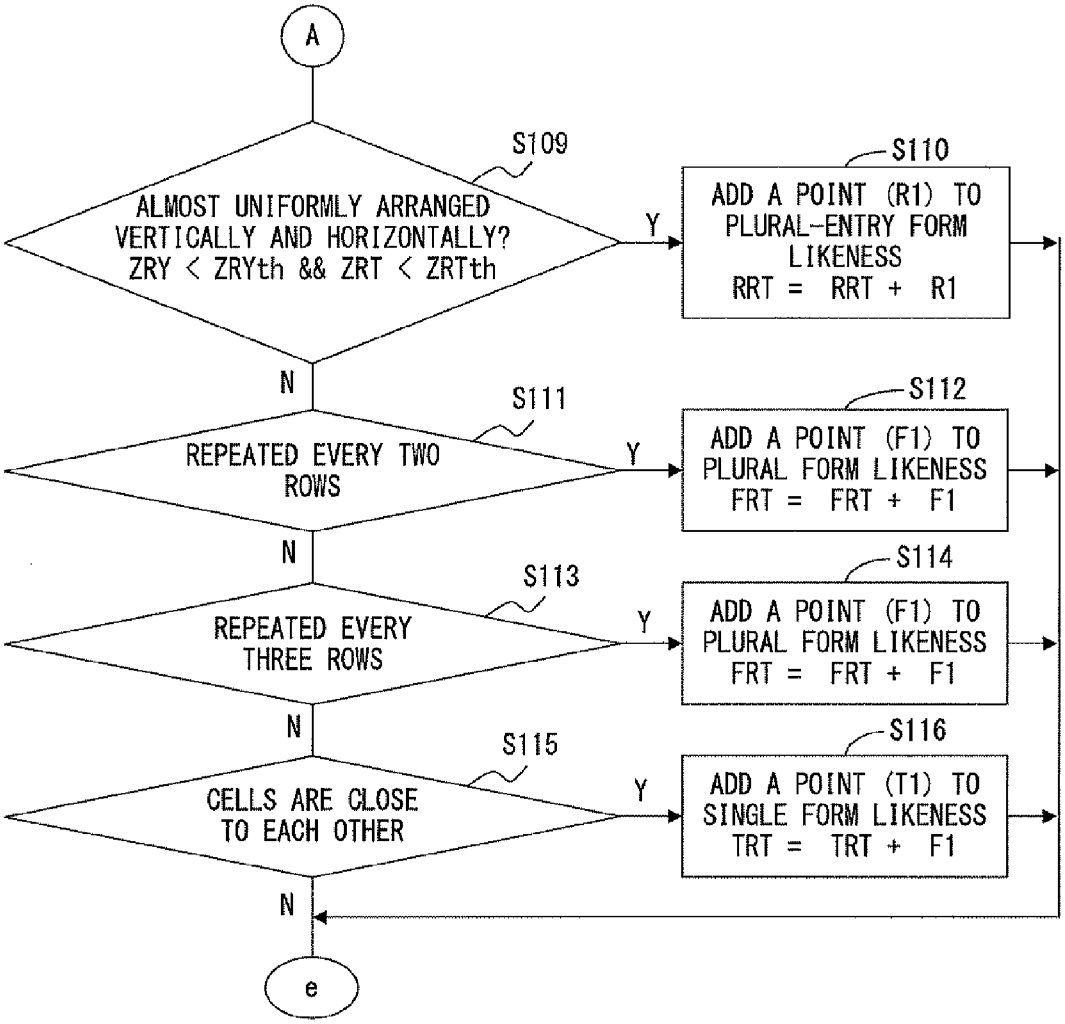
F I G. 7 B

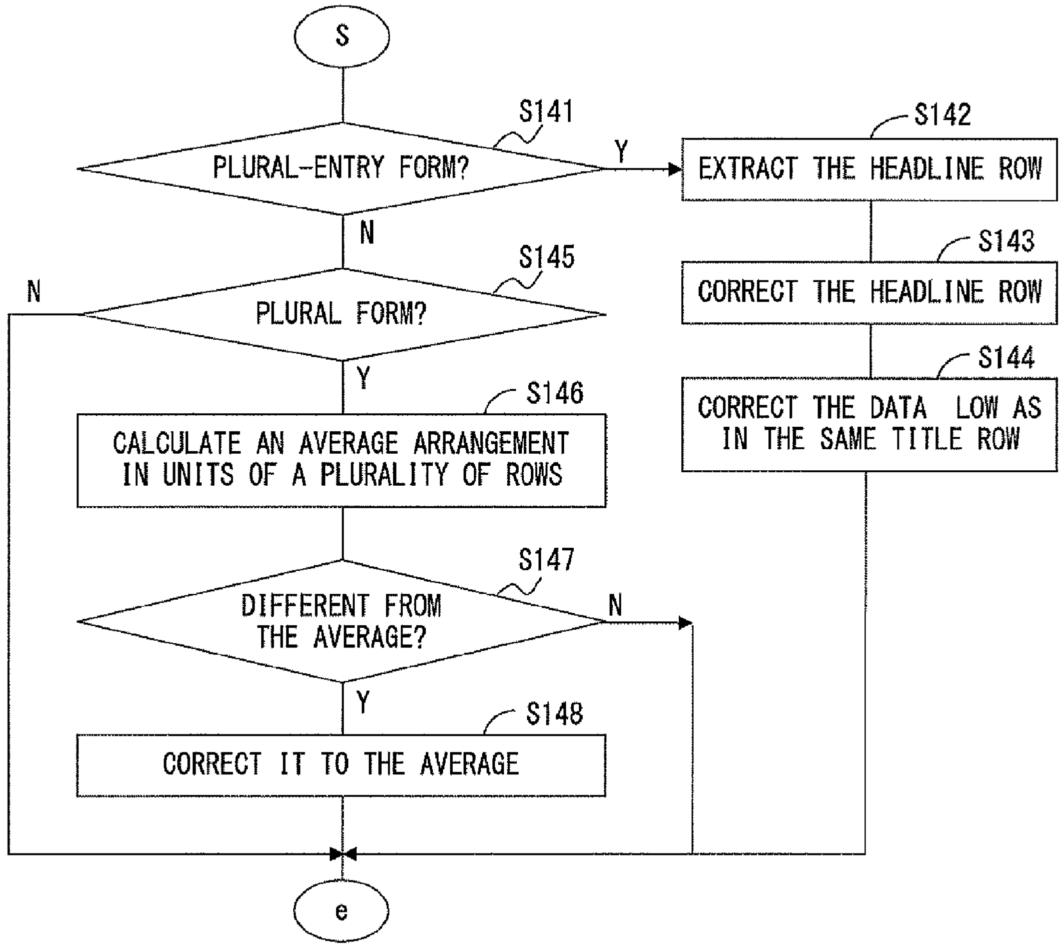
F I G. 9

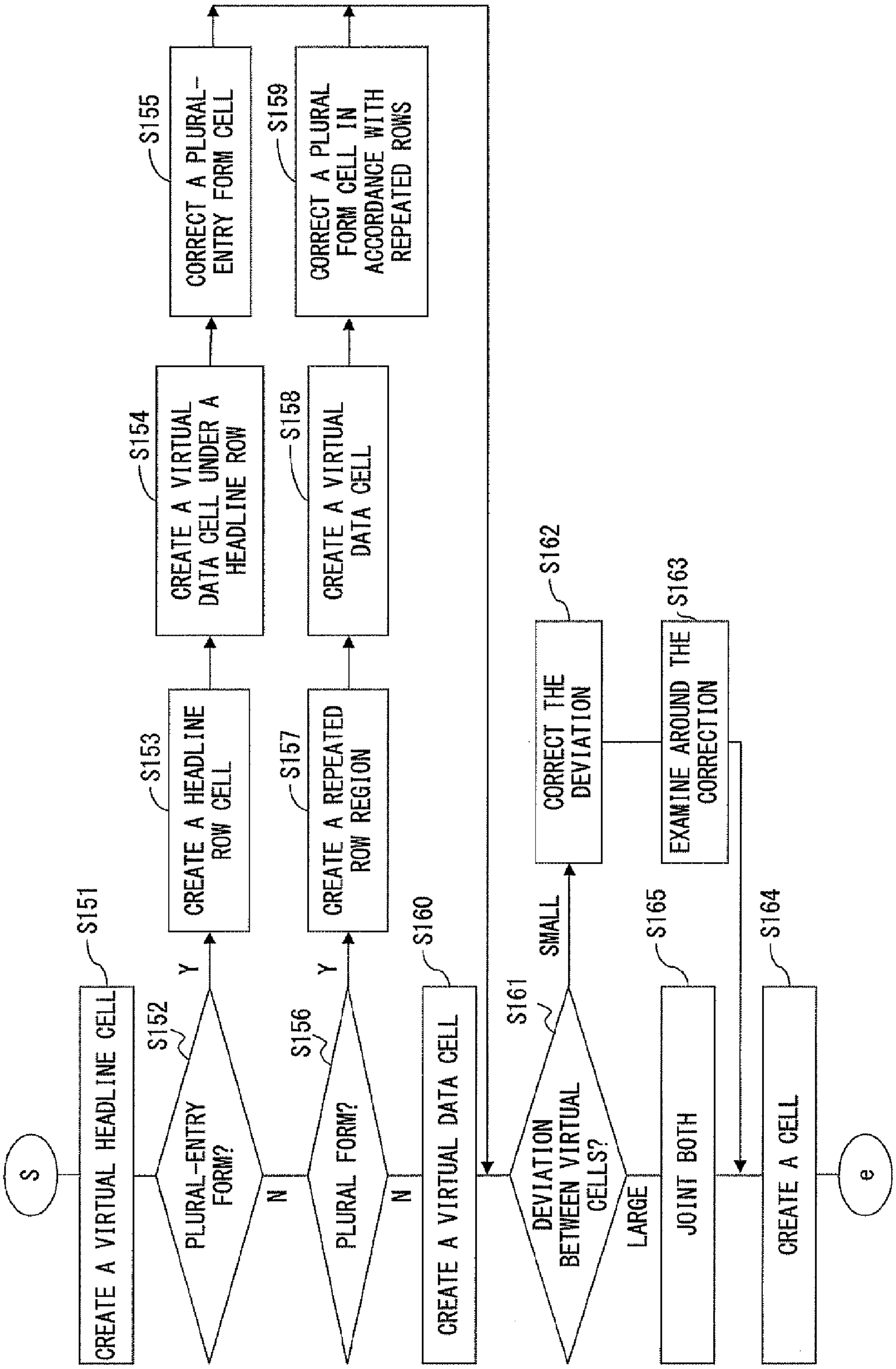
F I G. 1 0

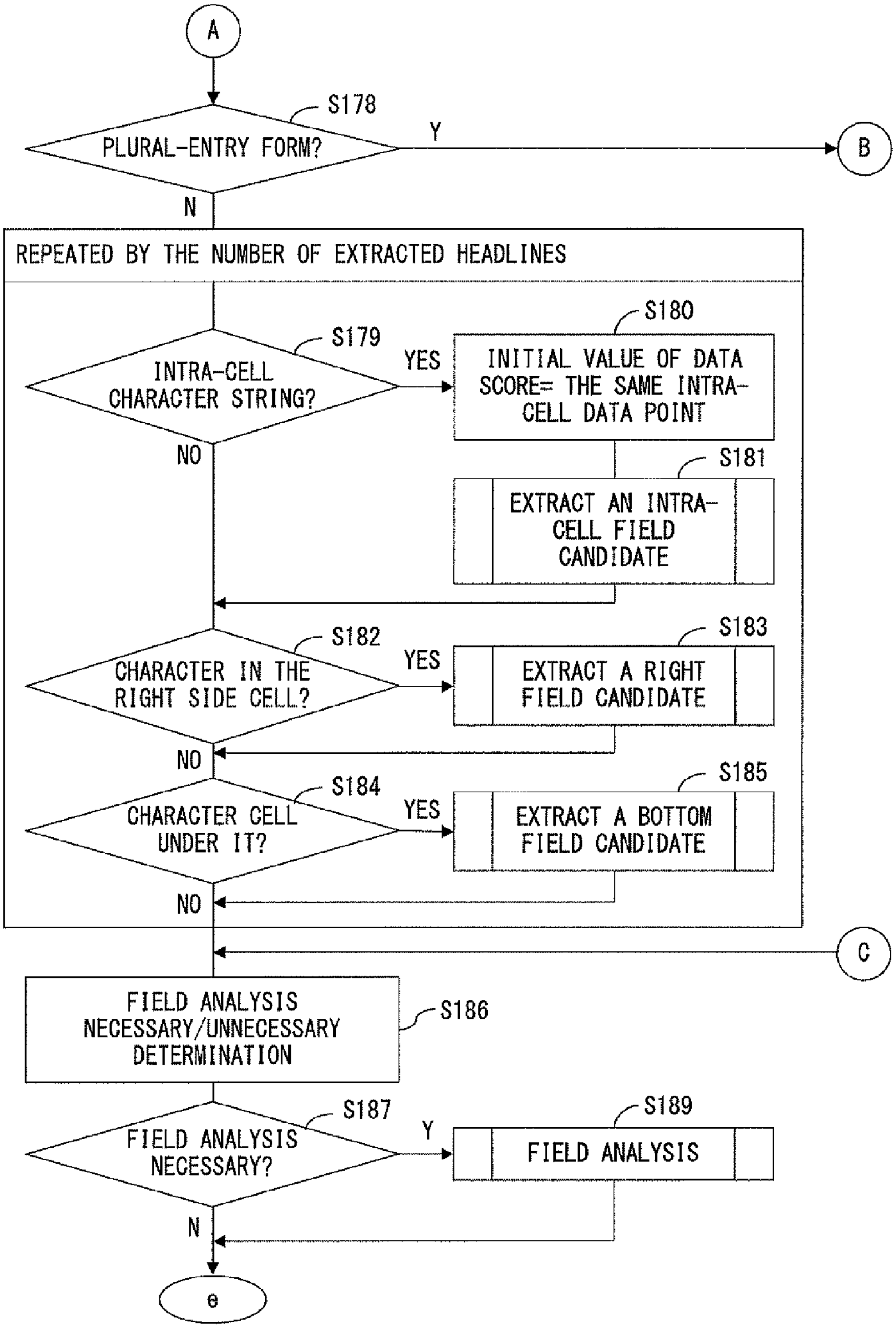
F I G. 1 1 B

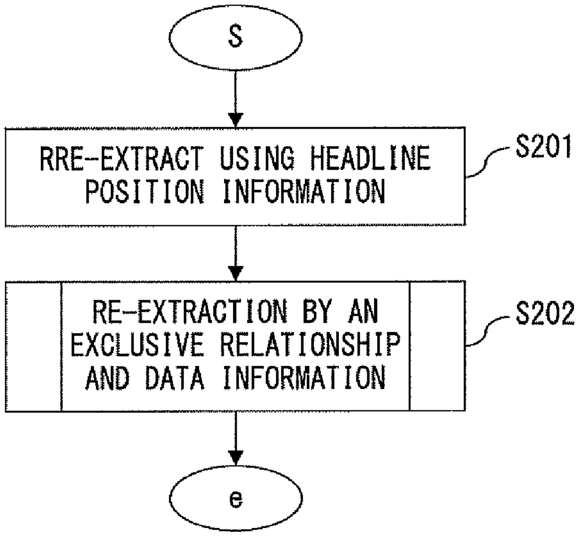
F I G. 1 2

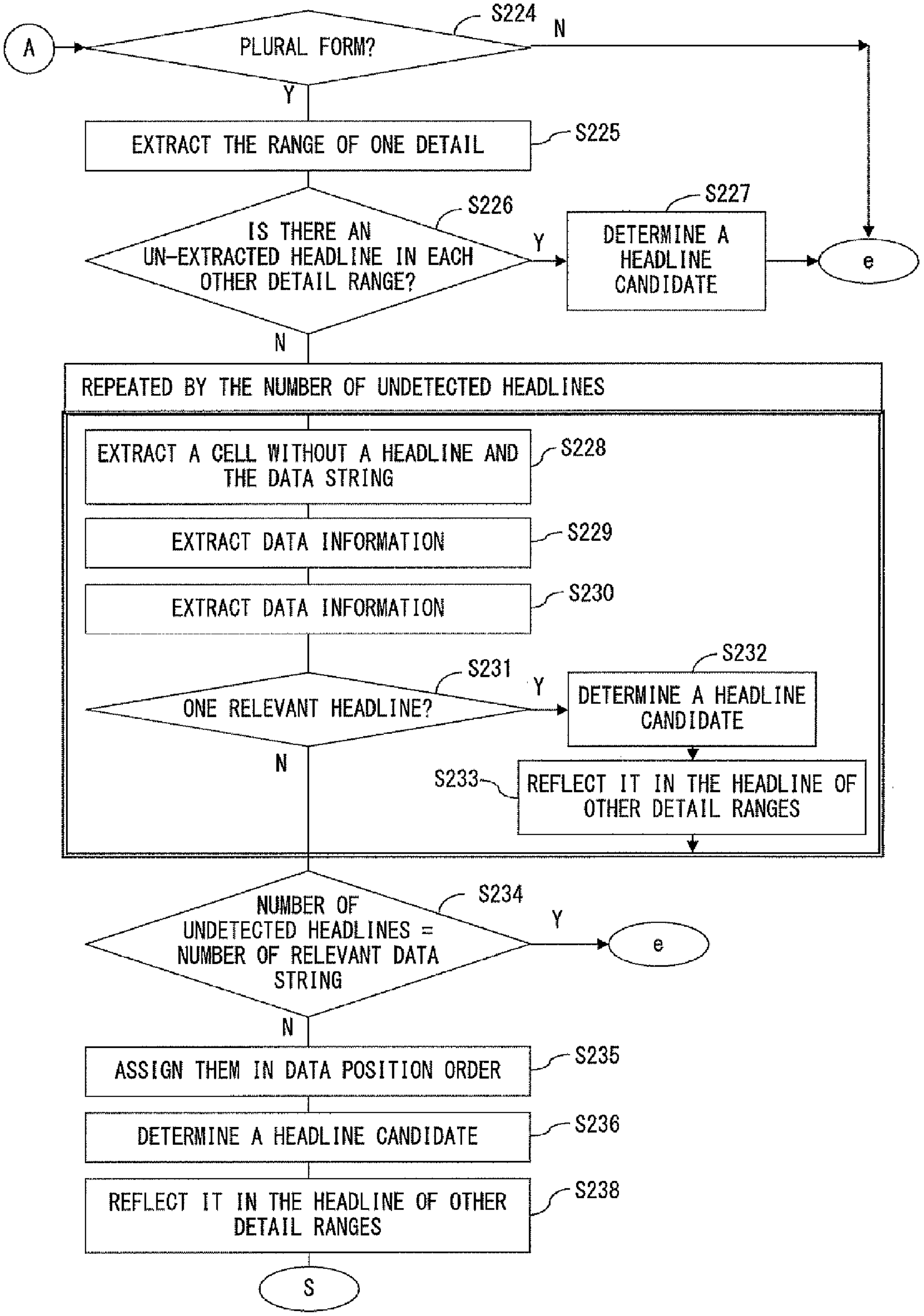
F I G. 13B

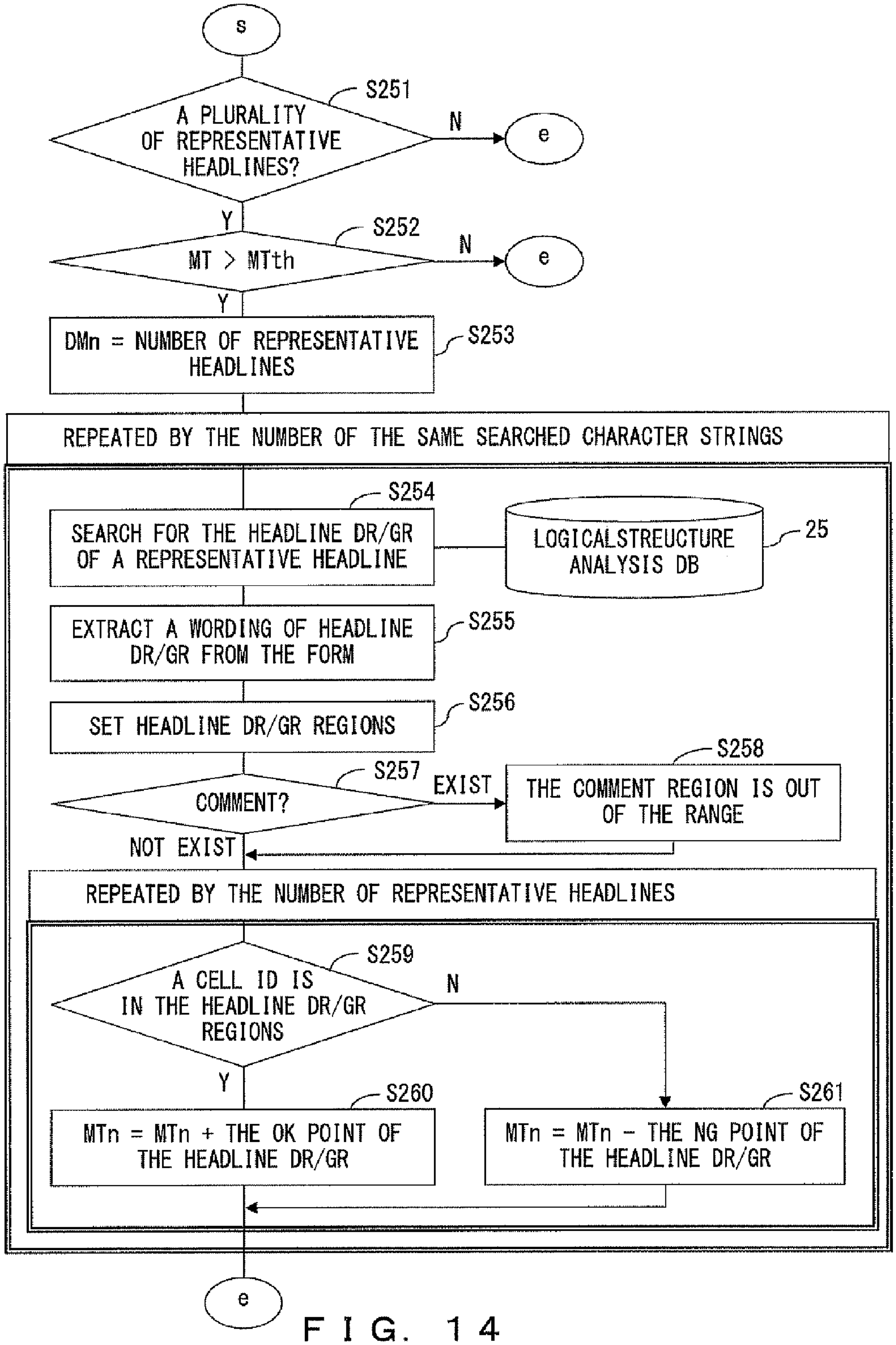
F I G. 1 4

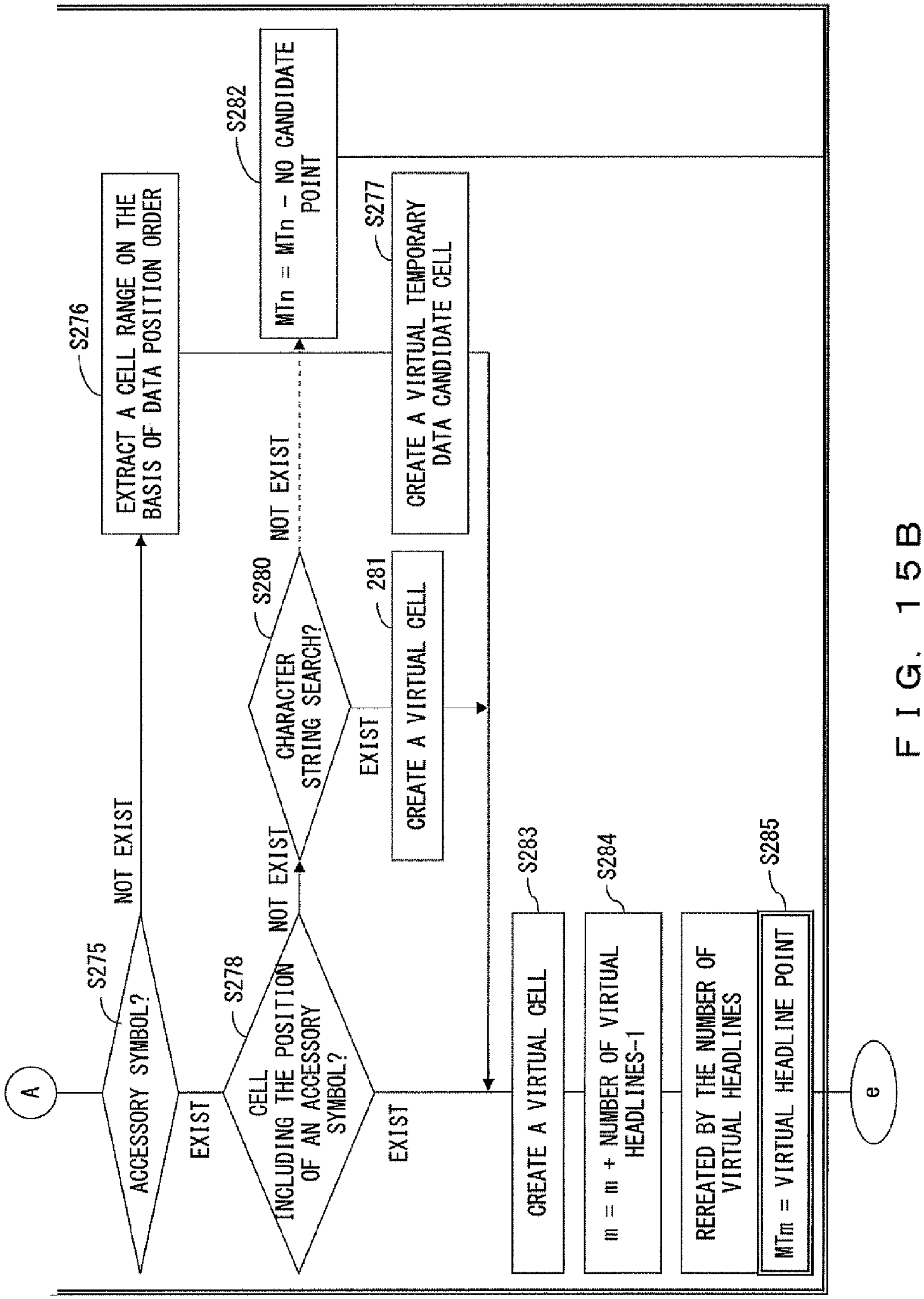
F I G. 1 5 B

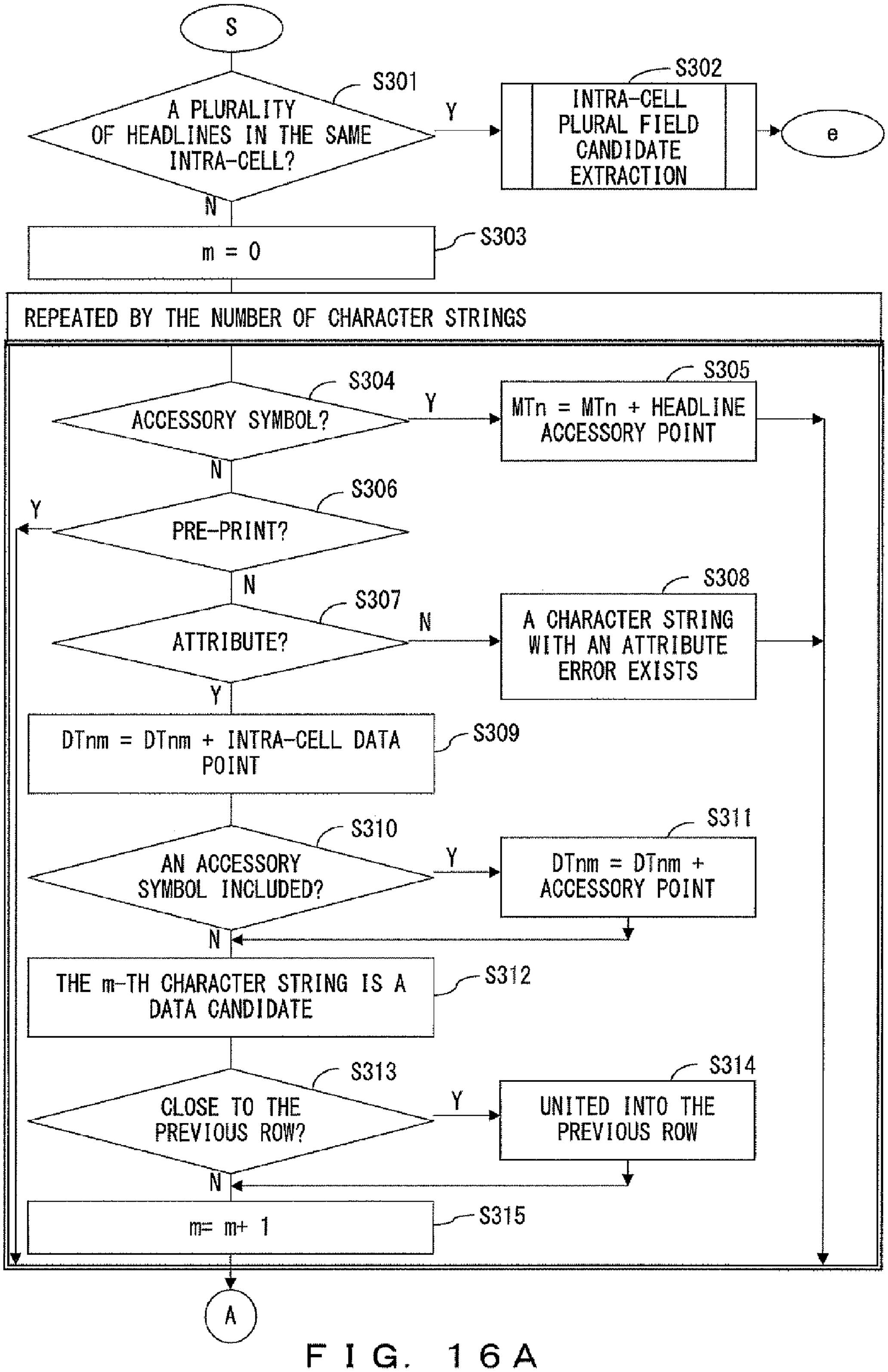
F I G. 1 6 A

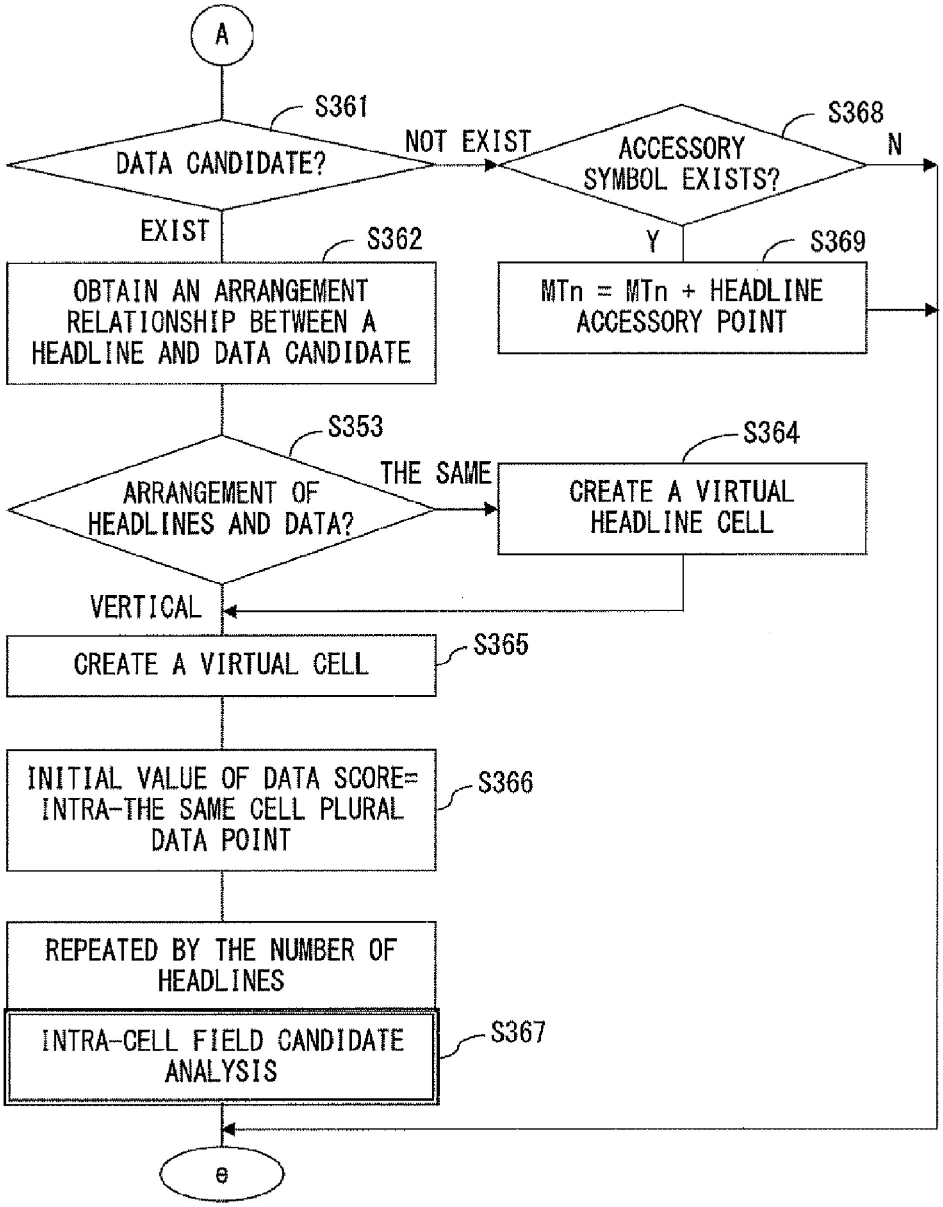
F I G. 1 7 B

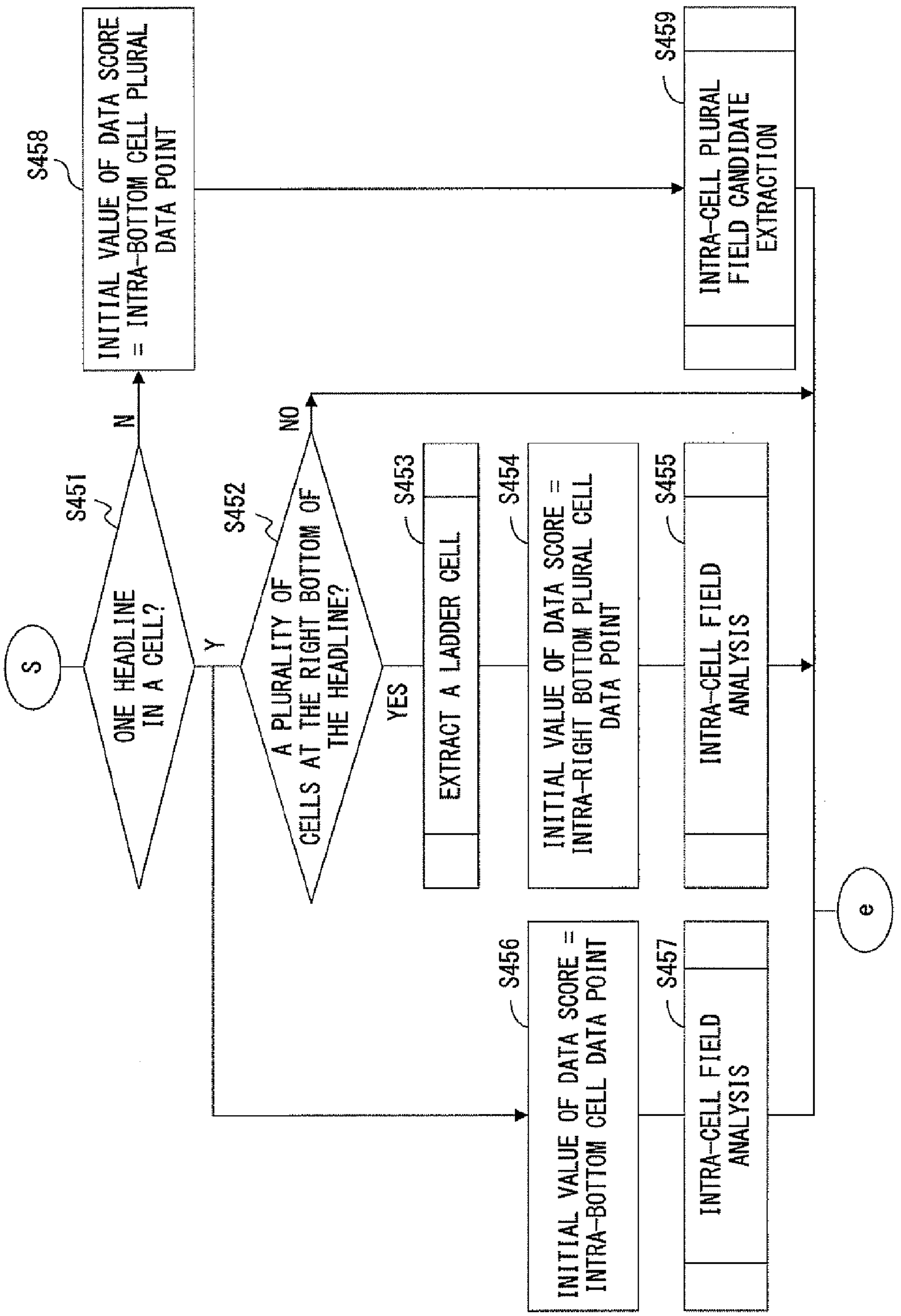
F I G. 1 9

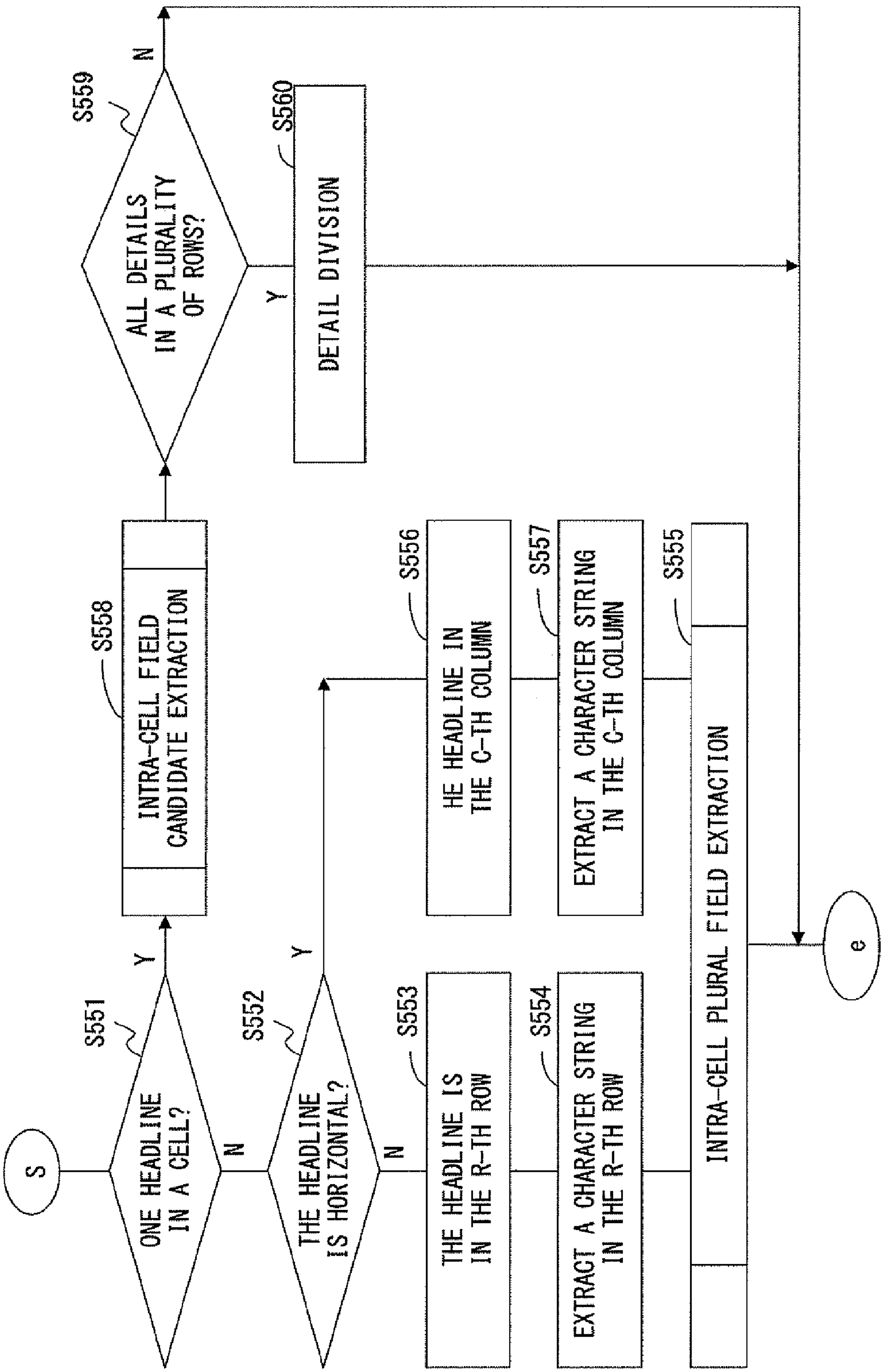
F I G. 2 1

MJth : THRESHOLD VALUE OF CHARACTER CONVICTION DEGREE
TK : HAND-WRITTEN/PRINTED CHARACTER DETERMINATION RATE= abs (HAND-WRITTEN CHARACTER CONVICTION DEGREE-PRINTED CHARACTER CONVICTION DEGREE)/(HAND-WRITTEN CHARACTER CONVICTION DEGREE + PRINTED CHARACTER CONVICTION DEGREE
TKth : THRESHOLD VALUE OF HAND-WRITTEN/PRINTED CHARACTER
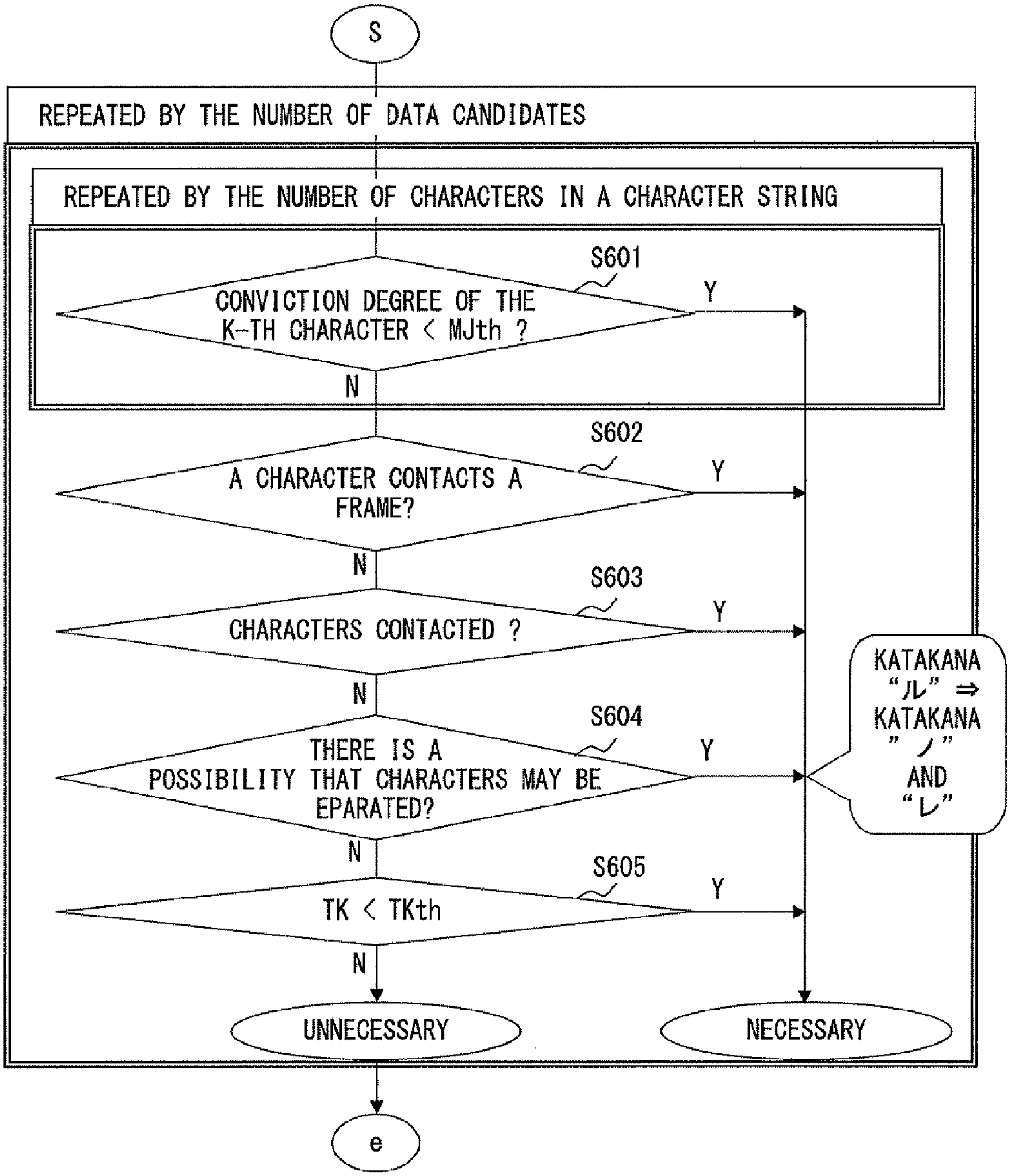
F I G. 2 2

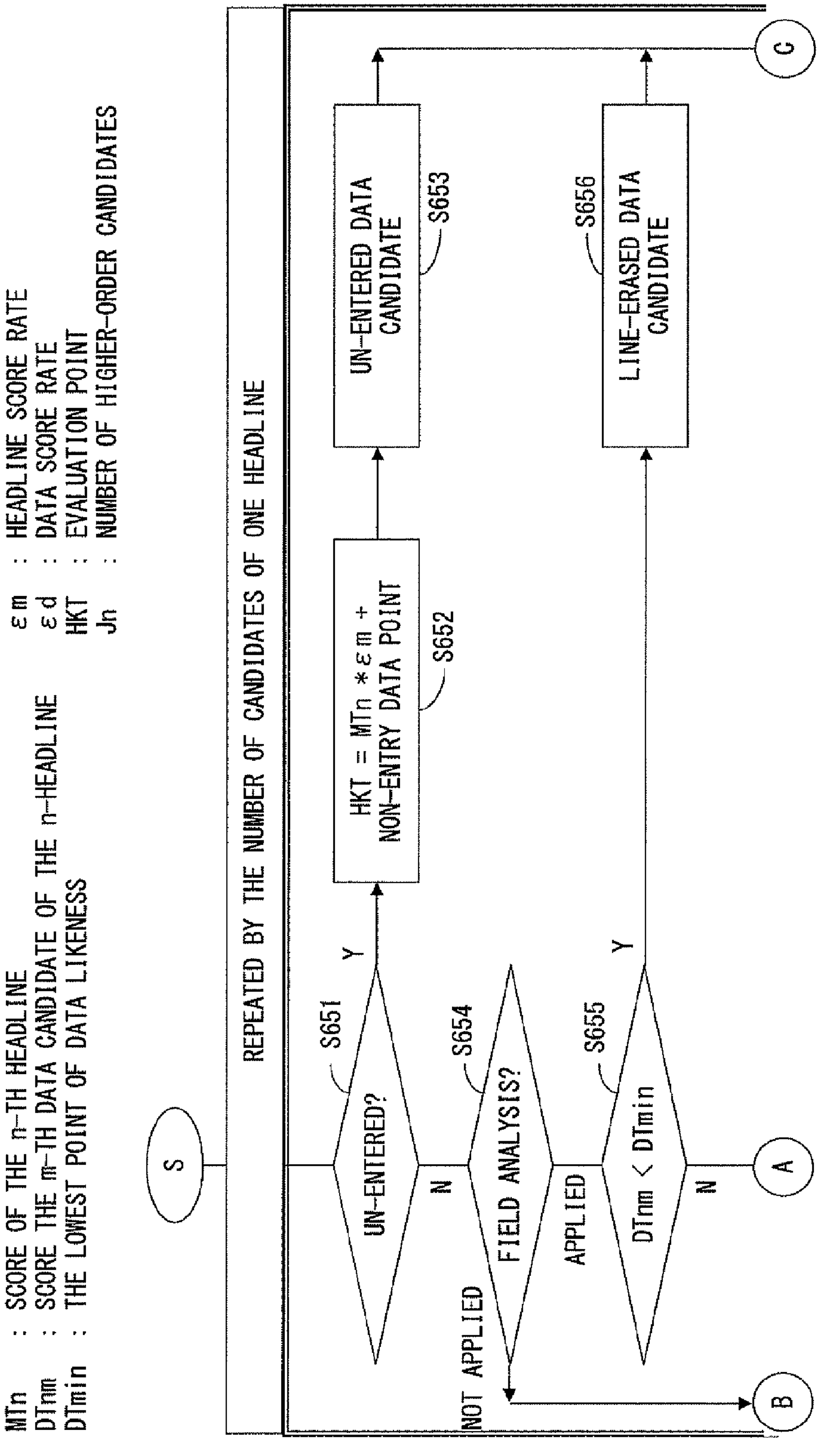
F I G. 2 3 A

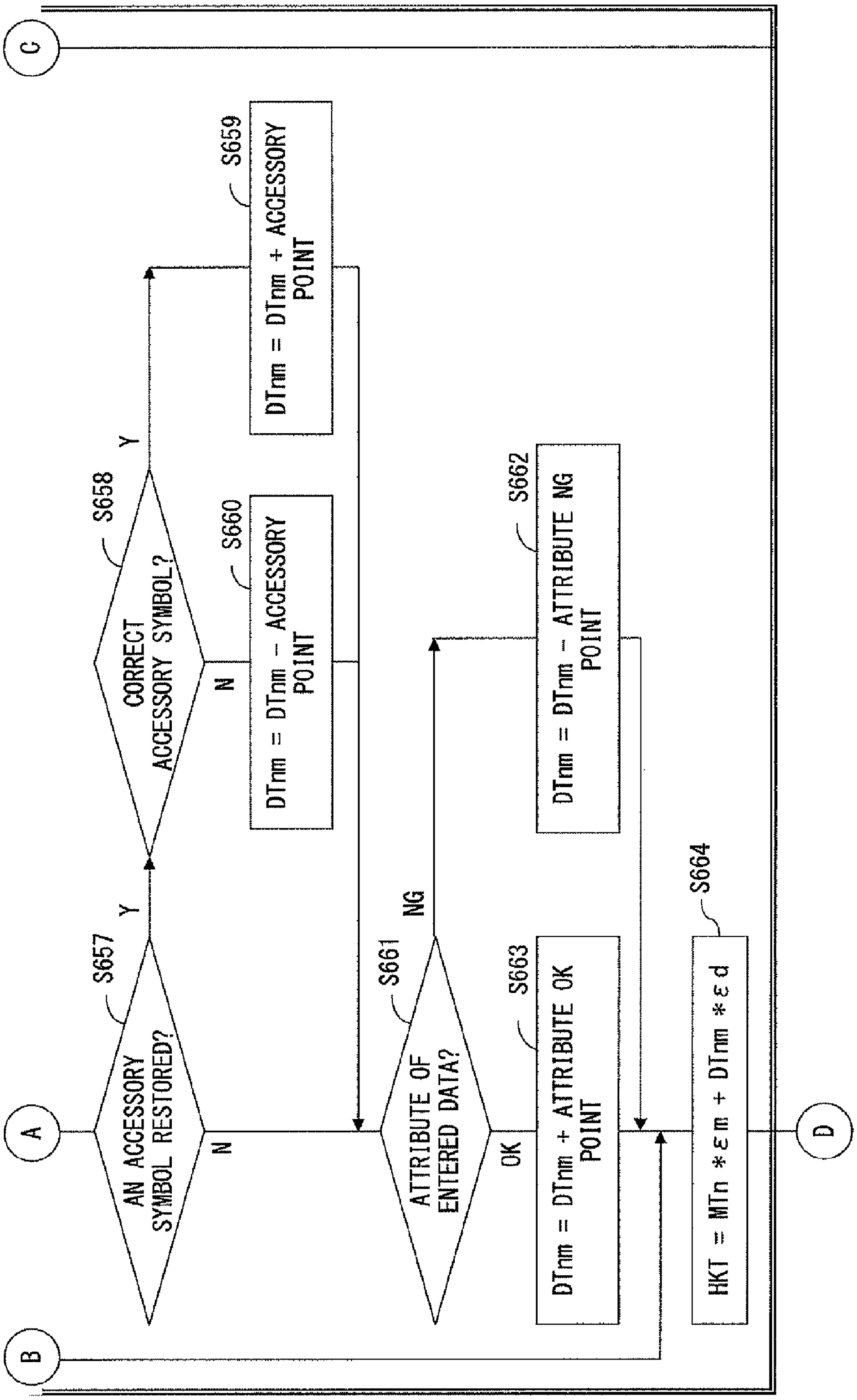
F I G. 2 3 B

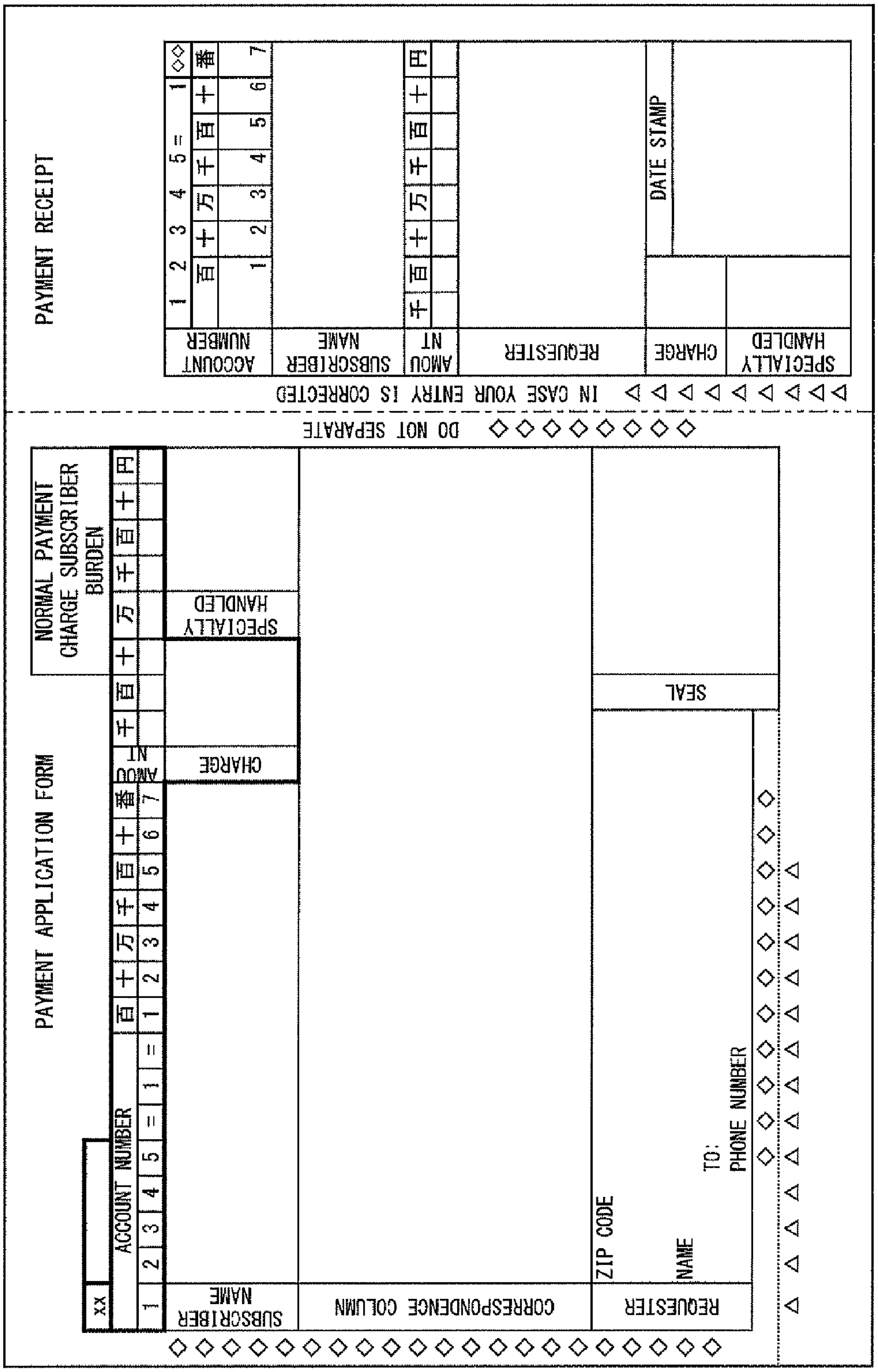
F I G. 24

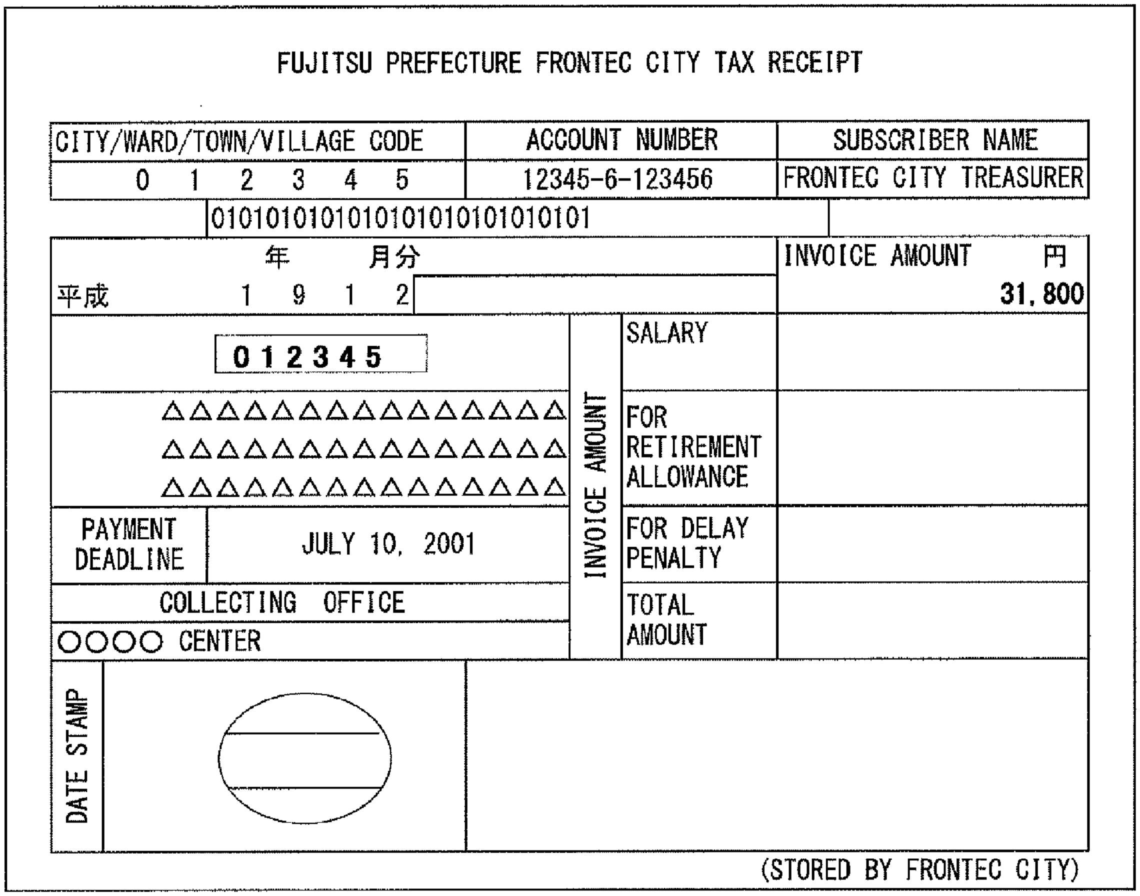

FUJITSU PREFECTURE FRONTEC CITY TAX RECEIPT

| CITY/WARD/TOWN/VILLAGE CODE | ACCOUNT NUMBER | SUBSCRIBER NAME |
|---|---|---|
| 0 1 2 3 4 5 | 12345-6-123456 | FRONTEC CITY TREASURER |

01010101010101010101010101

| | | | |
|---|---|---|---|
| 年 月分<br>平成 1 9 1 2 | | INVOICE AMOUNT 円<br>31,800 | |
| 012345 | INVOICE AMOUNT | SALARY | |
| △△△△△△△△△△△△△△△△<br>△△△△△△△△△△△△△△△△<br>△△△△△△△△△△△△△△△△ | | FOR RETIREMENT ALLOWANCE | |
| PAYMENT DEADLINE: JULY 10, 2001 | | FOR DELAY PENALTY | |
| COLLECTING OFFICE<br>○○○○ CENTER | | TOTAL AMOUNT | |
| DATE STAMP | | | |

(STORED BY FRONTEC CITY)

F I G. 2 5

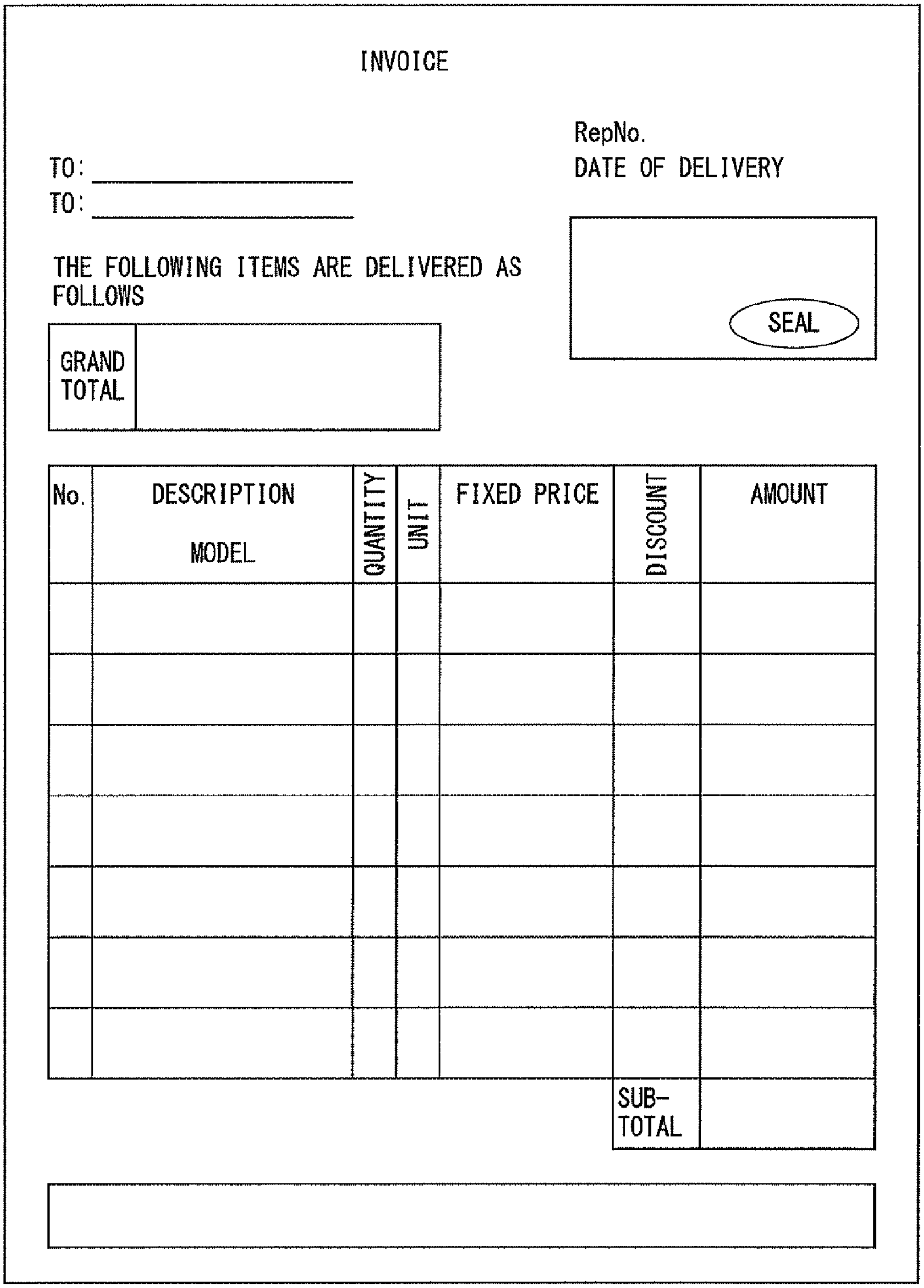
INVOICE
RepNo.
DATE OF DELIVERY
TO: ____________________
TO: ____________________
SEAL
THE FOLLOWING ITEMS ARE DELIVERED AS FOLLOWS
| GRAND TOTAL | |
|---|---|
| No. | DESCRIPTION MODEL | QUANTITY | UNIT | FIXED PRICE | DISCOUNT | AMOUNT |
|---|---|---|---|---|---|---|
| | | | | | | |
| | | | | | | |
| | | | | | | |
| | | | | | | |
| | | | | | | |
| | | | | | | |
| | | | | | | |
| | | | | | SUB-TOTAL | |
F I G. 26

INVOICE

RepNo.
DATE OF DELIVERY

TO: ______________________
TO: ______________________

SEAL

THE FOLLOWING ITEMS ARE DELIVERED AS FOLLOWS

GRAND TOTAL

| No. | DESCRIPTION | MODEL | QUANTITY | UNIT | FIXED PRICE | DISCOUNT | AMOUNT |
|---|---|---|---|---|---|---|---|
| 1 | PEN | A-1 | 10 | DOZEN | ¥1,000 | ¥-100 | ¥900 |
| 2 | RUBBER ERASER | B-2 | 1 | BOX | ¥500 | ¥-50 | ¥450 |
| | | | | | | | |
| | | | | | | | |
| | | | | | | | |
| | | | | | | | |
| | | | | | | | |

SUB-TOTAL ¥1,350

FIG. 27

INVOICE
TO: _____
TO: _____
RepNo.
DATE OF DELIVERY
SEAL
THE FOLLOWING ITEMS ARE DELIVERED AS FOLLOWS
GRAND TOTAL
| No. | DESCRIPTION | MODEL | QUANTITY | UNIT | FIXED PRICE | DISCOUNT | AMOUNT |
|---|---|---|---|---|---|---|---|
| 1 | PEN | A-1 | 10 | DOZEN | ¥1,000 | ¥-100 | ¥900 |
| 2 | RUBBER ERASE | B-2 | 1 | BOX | ¥500 | ¥-50 | ¥450 |
|   |   |   |   |   | SUB-TOTAL |   | ¥1,350 |
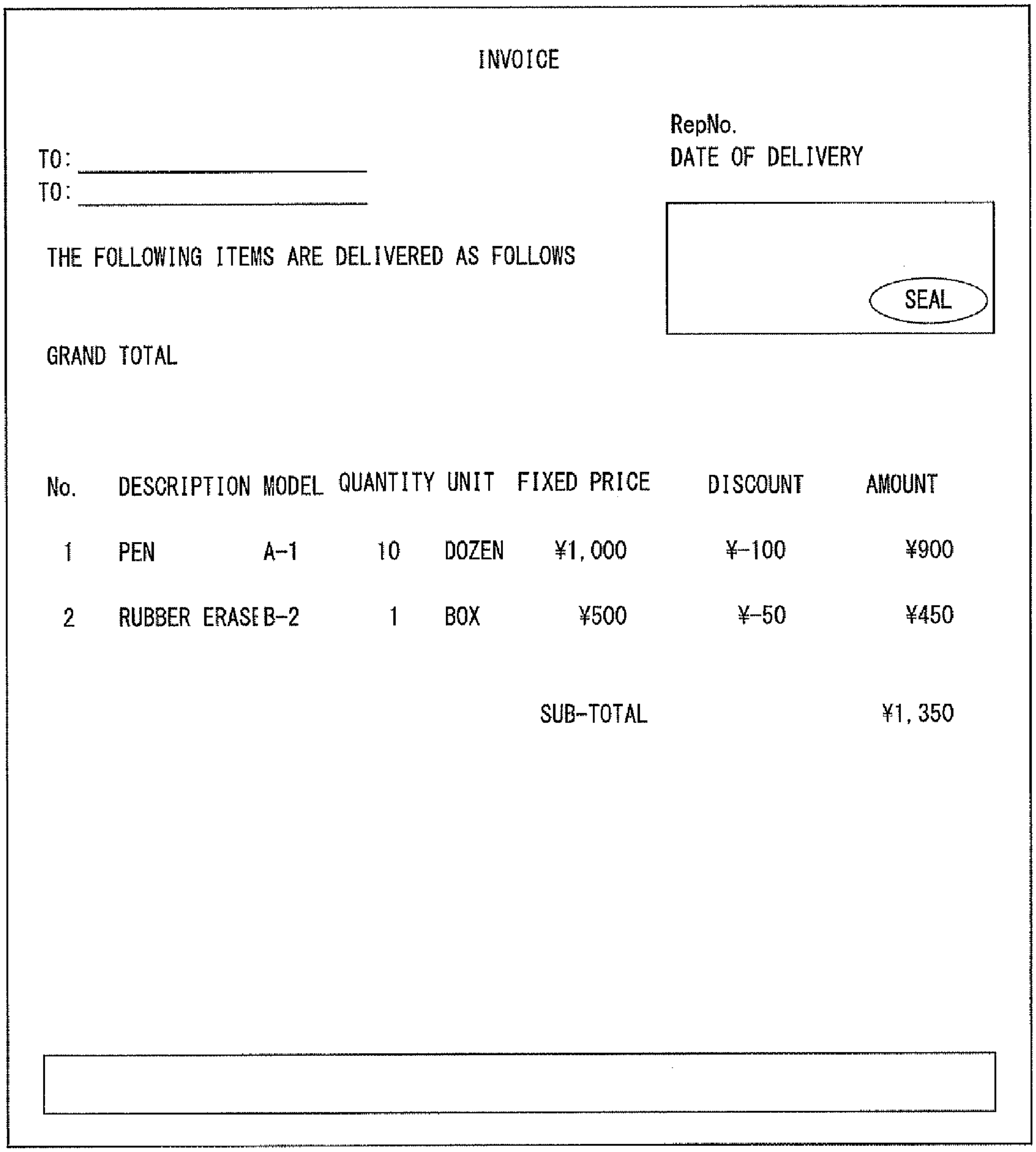
F I G. 2 8

| GENERAL/SALARY PAYMENT APPLICATION FORM | | | | | | | |
|---|---|---|---|---|---|---|---|
| DATE OF PAYMENT | 年月日 | GRAND TOTAL | NUMBER OF PAYMENT | PAYMENT AMOUNT | | | |
| KANA ATTACHED TO A CHINESE CHARACTER | | | | | | | |
| REQUESTER NAME | TO: | | | | | | |
| PHONE NUMBER | | | | | | | |

| NUMBER OF ROWS | BANK NAME / BRANCH NAME | ACCOUNT TYPE | ACCOUNT NUMBER | KANA ATTACHED TO A CHINESE CHARACTER / RECEIVER NAME | AMOUNT | HANDLING CHARGE |
|---|---|---|---|---|---|---|
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |
| | SUB-TOTAL | NUMBER OF PAYMENT | | SUB-TOTAL | | TOTAL OF HANDLING CHARGE |

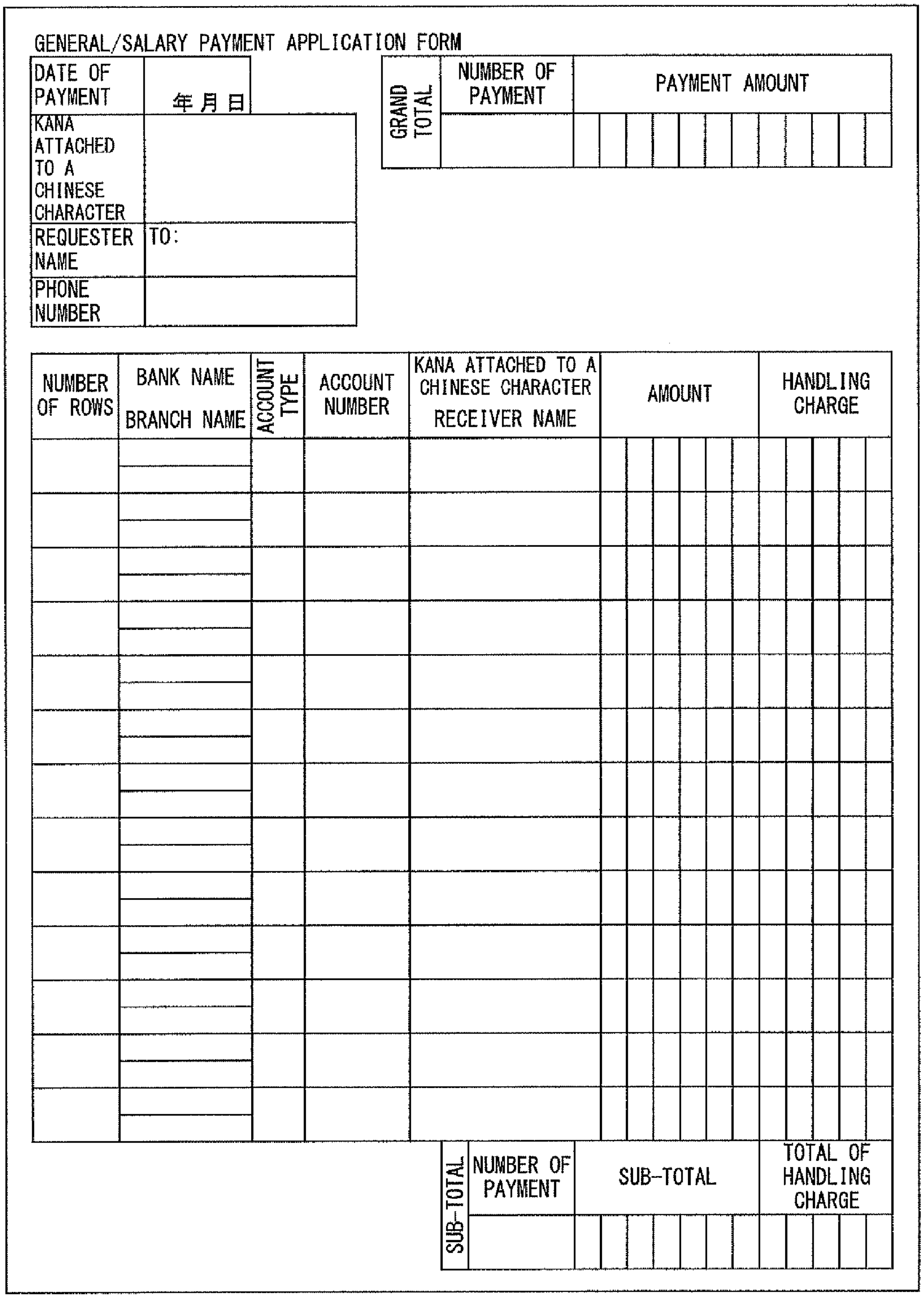

FIG. 29

PAYMENT

PAYMENT APPLICATION FORM

| DATE OF APPLICATION | (PAYMENT FORM) | PAYMENT METHOD | | |
|---|---|---|---|---|
| PAYMENT DESTINATION | KANA ATTACHED TO A CHINESE CHARACTER | KANA ATTACHED TO A CHINESE CHARACTER | ACCOUNT TYPE | |
| | BANK | BRANCH NAME | ACCOUNT NUMBER | |
| RECEIVER | KANA ATTACHED TO A CHINESE CHARACTER | AMOUNT | 百 十 億 千 百 十 万 千 百 十 円 | |
| | TO: | | | |
| PAYMENT DESTINATION | KANA ATTACHED TO A CHINESE CHARACTER | KANA ATTACHED TO A CHINESE CHARACTER | ACCOUNT TYPE | |
| | BANK | BRANCH NAME | ACCOUNT NUMBER | |
| RECEIVER | KANA ATTACHED TO A CHINESE CHARACTER | AMOUNT | 百 十 億 千 百 十 万 千 百 十 円 | |
| | TO: | | | |
| PAYMENT DESTINATION | KANA ATTACHED TO A CHINESE CHARACTER | KANA ATTACHED TO A CHINESE CHARACTER | ACCOUNT TYPE | |
| | BANK | BRANCH NAME | ACCOUNT NUMBER | |
| RECEIVER | KANA ATTACHED TO A CHINESE CHARACTER | AMOUNT | 百 十 億 千 百 十 万 千 百 十 円 | |
| | TO: | | | |
| PAYMENT DESTINATION | KANA ATTACHED TO A CHINESE CHARACTER | KANA ATTACHED TO A CHINESE CHARACTER | ACCOUNT TYPE | |
| | BANK | BRANCH NAME | ACCOUNT NUMBER | |
| RECEIVER | KANA ATTACHED TO A CHINESE CHARACTER | AMOUNT | 百 十 億 千 百 十 万 千 百 十 円 | |
| | TO: | | | |

| REQUESTER | NAME | KANA ATTACHED TO A CHINESE CHARACTER | GRAND TOTAL | 千 百 十 億 千 百 十 万 千 百 十 円 |
| | | TO: | | |
| | ADDRESS | | REQUESTER'S ACCOUNT NUMBER | ACCOUNT TYPE | ACCOUNT NUMBER |

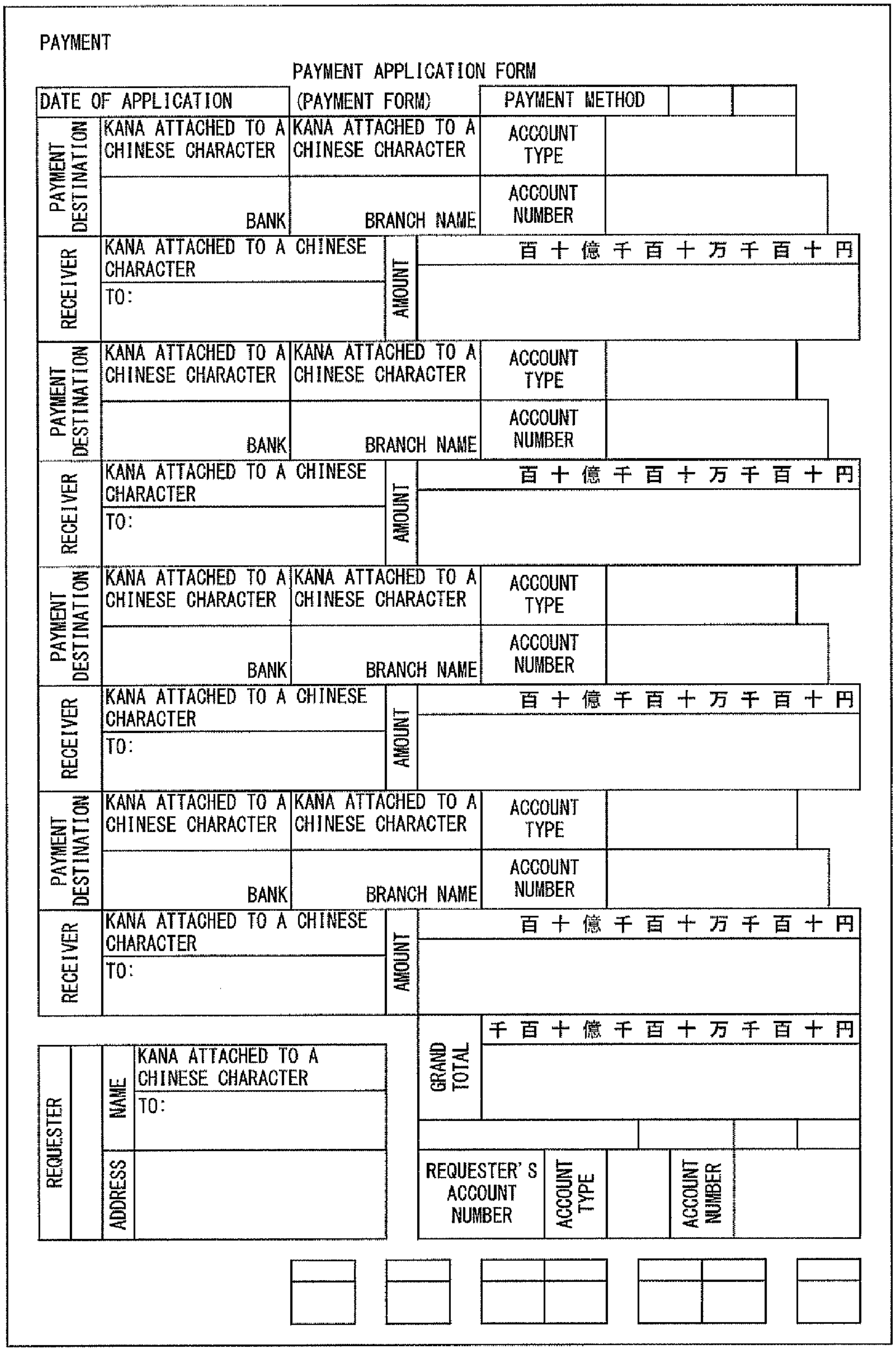

FIG. 30

*THE ENTRY METHOD OF 金額 ××××
No. 0123
| 金額 | 123 |

F I G. 3 1 A

* THE ENTRY METHOD OF 納付金額 ××××
No. 0123
| 納付金額 | 456 |

F I G. 3 1 B

* THE ENTRY METHOD OF 給与分 ××××
No. 0123
| 給与分 | 789 |

F I G. 3 1 C

* THE ENTRY METHOD OF 小計金額 ××××
No. 0123
| 小計金額 | 123 |

F I G. 3 1 D

* THE ENTRY METHOD OF 合計金額 ××××
No. 0123
| 合計金額 | 123 |

F I G. 3 1 E

THE RIGHT NEIGHBORING OF A HEADLINE 「合計」 IS 合計金額
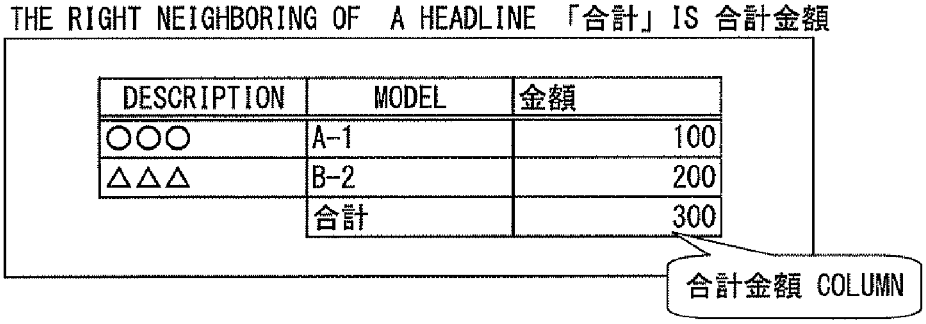
F I G. 3 2 A
THE RIGHT NEIGHBORING OF A HEADLINE 「合計」 IS THE NUMBER OF ITEMS AND THE FURTHER RIGHT NEIGHBORING IS 合計金額
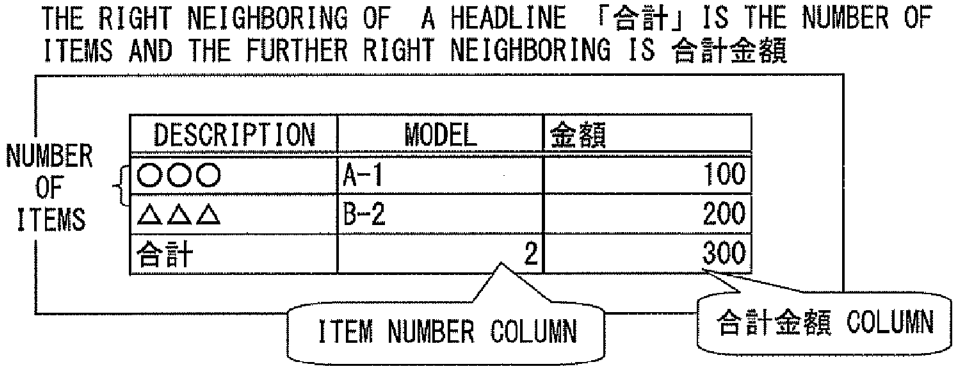
F I G. 3 2 B
A HEADLINE 「合計」 IS 合計金額 MEANING THE 合計 WITH ANOTHER FORM
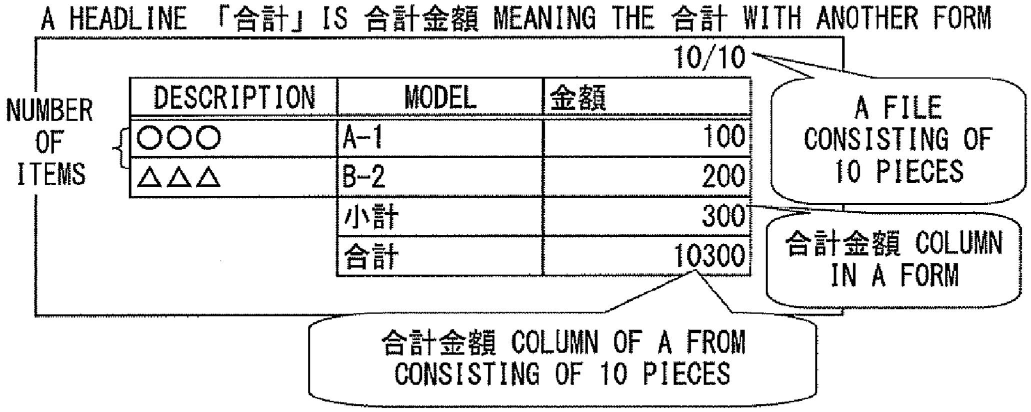
F I G. 3 2 C

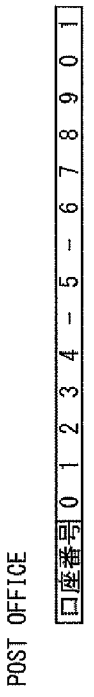
FIG. 33A1
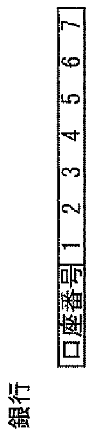
FIG. 33A2
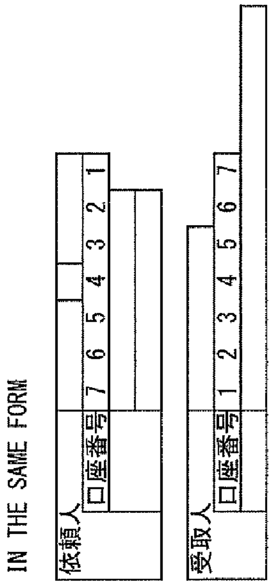
FIG. 33B
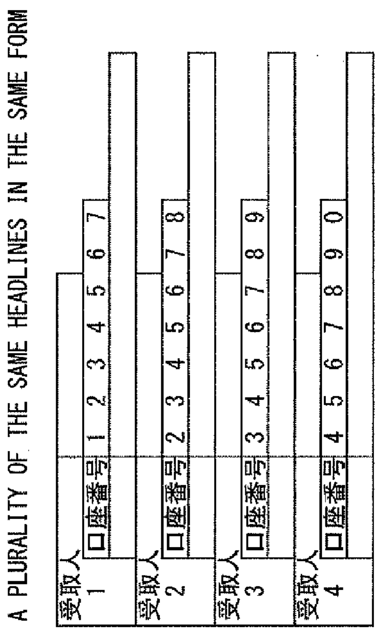
FIG. 33C
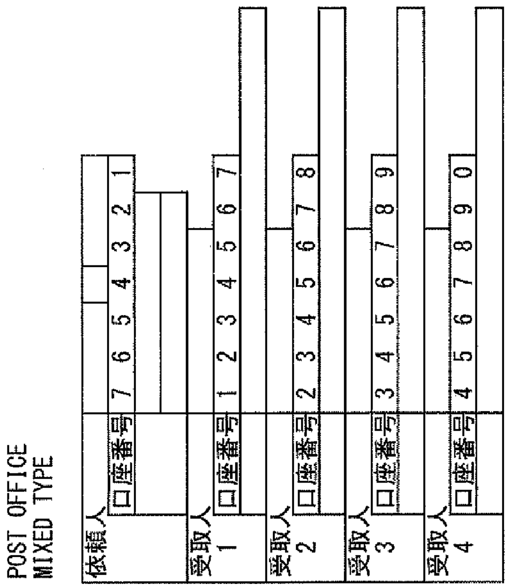
FIG. 33D

| No. | STATE | SAMPLE FIGURE | HEADLINE/DATA RELATIONSHIP TYPICAL FIGURE | DATA DIRECTION VIEWED FROM A HEADLINE | FEATURE |
|---|---|---|---|---|---|
| (1) | DATA LOCATED ON THE RIGHT OF A HEADLINE | 口 座 番 号 \| 1 \| 2 \| 3 \| 4 \| 5 \| 6 \| 7 | 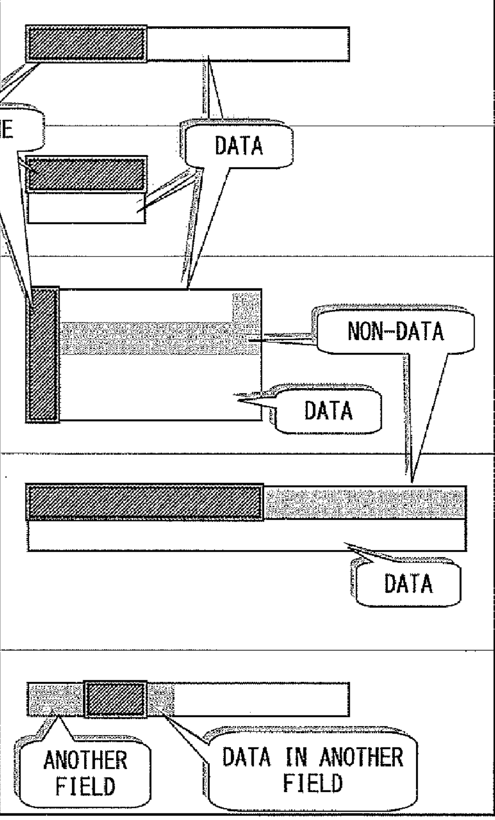  | RIGHT | |
| (2) | DATA LOCATED UNDER A HEADLINE | 口 座 番 号<br>1 2 3 4 5 6 7 | | BOTTOM | |
| (3) | DATA LOCATED ON THE RIGHT OF A HEADLINE (INCLUDING A NON-DATA CHARACTER) | 口 \| 1 2 3 4 5 = 1<br>座 \| 百 十 万 千 百 十 番<br>番<br>号 \| 1 2 3 4 5 6 7 | | RIGHT | NON-DATA EXISTS |
| (4) | DATA LOCATED UNDER AND ON THE RIGHT OF A HEADLINE (INCLUDING A NON-DATA CHARACTER) | 口 座 番 号 \| 百 \| 十 \| 万 \| 千 \| 百 \| 十 \| 番<br>1 \| 2 \| 3 \| 4 \| 5 \| = \| 1 \| = \| 1 \| 2 \| 3 \| 4 \| 5 \| 6 \| 7 | | RIGHT<br>BOTTOM | ONLY NON-DATA |
| (5) | A PLURALITY OF HEADLINES AND THEIR RESPECTIVE DATA | 種目 ・ 口座番号 \| ァ・ 1 2 3 4 5 6 7 | | RIGHT | ANOTHER PIECE OF DATA BETWEEN THEM |

FIG. 34A

Figure 3:
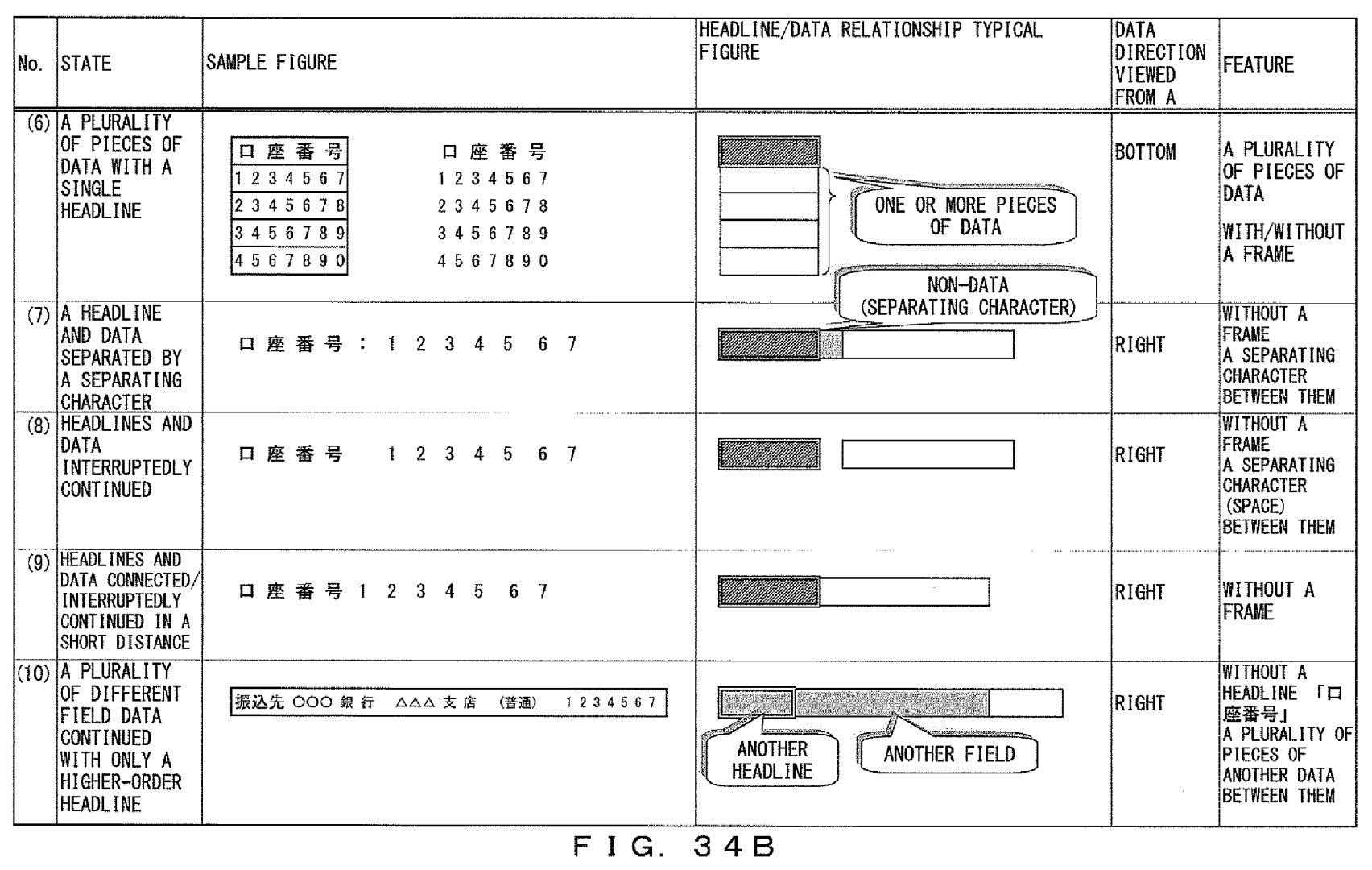

| No. | STATE | SAMPLE FIGURE | HEADLINE/DATA RELATIONSHIP TYPICAL FIGURE | DATA DIRECTION VIEWED FROM A | FEATURE |
|---|---|---|---|---|---|
| (6) | A PLURALITY OF PIECES OF DATA WITH A SINGLE HEADLINE | 口座番号<br>1 2 3 4 5 6 7<br>2 3 4 5 6 7 8<br>3 4 5 6 7 8 9<br>4 5 6 7 8 9 0 | ONE OR MORE PIECES OF DATA / NON-DATA (SEPARATING CHARACTER) | BOTTOM | A PLURALITY OF PIECES OF DATA WITH/WITHOUT A FRAME |
| (7) | A HEADLINE AND DATA SEPARATED BY A SEPARATING CHARACTER | 口座番号 : 1 2 3 4 5 6 7 | | RIGHT | WITHOUT A FRAME A SEPARATING CHARACTER BETWEEN THEM |
| (8) | HEADLINES AND DATA INTERRUPTEDLY CONTINUED | 口座番号  1 2 3 4 5 6 7 | | RIGHT | WITHOUT A FRAME A SEPARATING CHARACTER (SPACE) BETWEEN THEM |
| (9) | HEADLINES AND DATA CONNECTED/INTERRUPTEDLY CONTINUED IN A SHORT DISTANCE | 口座番号 1 2 3 4 5 6 7 | | RIGHT | WITHOUT A FRAME |
| (10) | A PLURALITY OF DIFFERENT FIELD DATA CONTINUED WITH ONLY A HIGHER-ORDER HEADLINE | 振込先 ○○○銀行 △△△支店 (普通) 1 2 3 4 5 6 7 | ANOTHER HEADLINE / ANOTHER FIELD | RIGHT | WITHOUT A HEADLINE 「口座番号」 A PLURALITY OF PIECES OF ANOTHER DATA BETWEEN THEM |

A HEADLINE GR CONTAINS ANOTHER FIELD (1)

| 振込先 | 銀行名 | 支店名 |
|---|---|---|
| | | |

FIG. 35B

A HEADLINE GR CONTAINS ANOTHER FIELD (2)

| 振込先 | 銀行名 | 支店名 |
|---|---|---|
| | | |
| | 種目 | 口座番号 |
| | | |

FIG. 35C

A HEADLINE GR INCLUDES ANOTHER FIELD (1)

| 振込先 | 銀行 支店 |
|---|---|

FIG. 35D

A HEADLINE GR INCLUDES ANOTHER FIELD (2)

| 振込先 | 銀行 | 支店 |
|---|---|---|
| | フ | 1234567 |

FIG. 35E

A HEADLINE INCLUDES A HEADLINE GR (1)

| 振込先銀行名 | 振込先支店名 |
|---|---|
| | |

FIG. 35F

A HEADLINE INCLUDES A HEADLINE GR (2)

| 振込先銀行名 | 銀行 支店 |
|---|---|

FIG. 35G

NO HEADLINE GR EXISTS

| 銀行名 | 支店名 |
|---|---|
| | |

FIG. 36A

<table>
<tr><td rowspan="4">受取人</td><td rowspan="2">振込先</td><td>銀行名</td><td>支店名</td></tr>
<tr><td></td><td></td></tr>
<tr><td>種目</td><td></td><td>口座番号</td><td></td></tr>
<tr><td>受取人名</td><td colspan="3"></td></tr>
</table>

FIG. 36B

<table>
<tr><td rowspan="5">受取人</td><td rowspan="4">振込先</td><td>銀行名</td><td>支店名</td></tr>
<tr><td></td><td></td></tr>
<tr><td>種目</td><td>口座番号</td></tr>
<tr><td></td><td></td></tr>
<tr><td>受取人名</td><td colspan="2"></td></tr>
</table>

FIG. 36C

<table>
<tr><td rowspan="3">受取人</td><td rowspan="2">振込先</td><td>銀行名</td><td>支店名</td></tr>
<tr><td></td><td></td></tr>
<tr><td>種目</td><td></td><td>口座番号</td><td></td></tr>
<tr><td>受取人名</td><td colspan="4"></td></tr>
</table>

NO RULED LINE

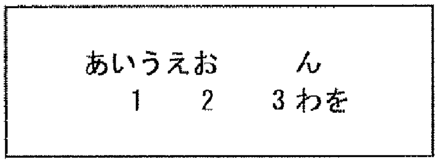

FIG. 37A1

NO VERTICAL LINE=ONLY HORIZONTAL LINES

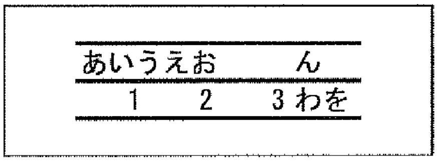

FIG. 37A3

NO HORIZONTAL LINE=ONLY VERTICAL LINES

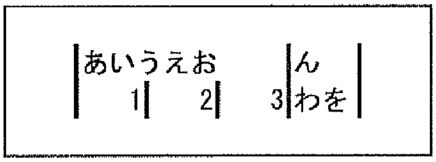

FIG. 37A2

BOTH VERTICAL AND HORIZONTAL LINES EXIST

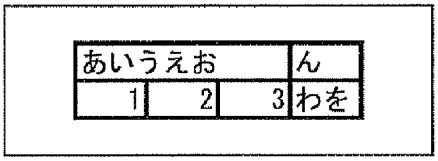

FIG. 37A4

NARROW SPACE BETWEEN CHARACTER STRINGS

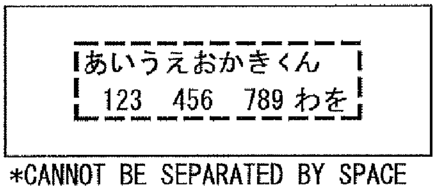

*CANNOT BE SEPARATED BY SPACE

FIG. 37B1

WIDE SPACE BETWEEN CHARACTER STRINGS

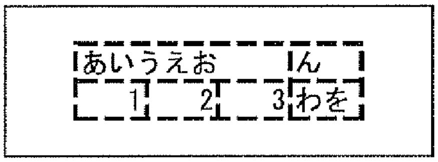

FIG. 37B2

FEW INTERSECTION POINTS CONSTITUTING A TABLE

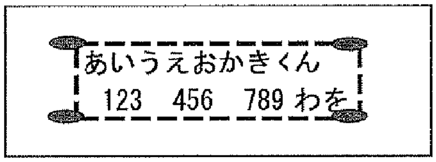

FIG. 37C1

MANY INTERSECTION POINTS CONSTITUTING A TABLE

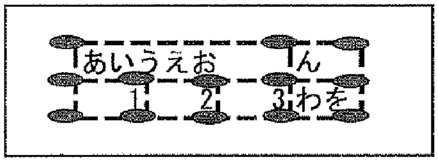

FIG. 37C2

HEADLINE WORDING SORTED IN FIG 39

| ORDER | HEADLINE WORDING | REPRESENTATIVE HEADLINE |
|---|---|---|
| 1 | 納付額 | 金額 |
| 2 | 納付金額 | 金額 |
| 3 | 金額 | 金額 |

| ORDER | HEADLINE WORDING | REPRESENTATIVE HEADLINE |
|---|---|---|
| 1 | 納期限 | 期限 |
| 2 | 納付期限 | 期限 |
| 3 | 期限 | 期限 |

(?: CHARACTER NOT RECOGNIZED, ∗: CHARACTER WHOSE CONTENTS/NUMBER OF CHARACTERS ARE UNKNOWN)

FIG. 40A

FORM DESIGN

UNIQUE REPRESENTATIVE HEADLINE

納 付 ? 額 ⇒

HEADLINE AND HEADLINE SCORE

| HEADLINE WORDING | ML | MLO | EQUATION IN FIG 4 | SCORE (MT) |
|---|---|---|---|---|
| 納付金額 | 4 | 3 | S54 | 75 |

FIG. 40B1

A PLURALITY OF REPRESENTATIVE HEADLINES

納 付 ∗ ⇒

| HEADLINE WORDING | ML | MLO | EQUATION IN FIG 4 | SCORE (MT) | REPRESENTATIVE HEADLINE |
|---|---|---|---|---|---|
| 納付金額 | 4 | 2 | S54 | 50 | 金額 |
| 納付額 | 3 | | S50 | 70 | 金額 |
| 納付期限 | 4 | | S54 | 50 | 期限 |

FIG. 40B2

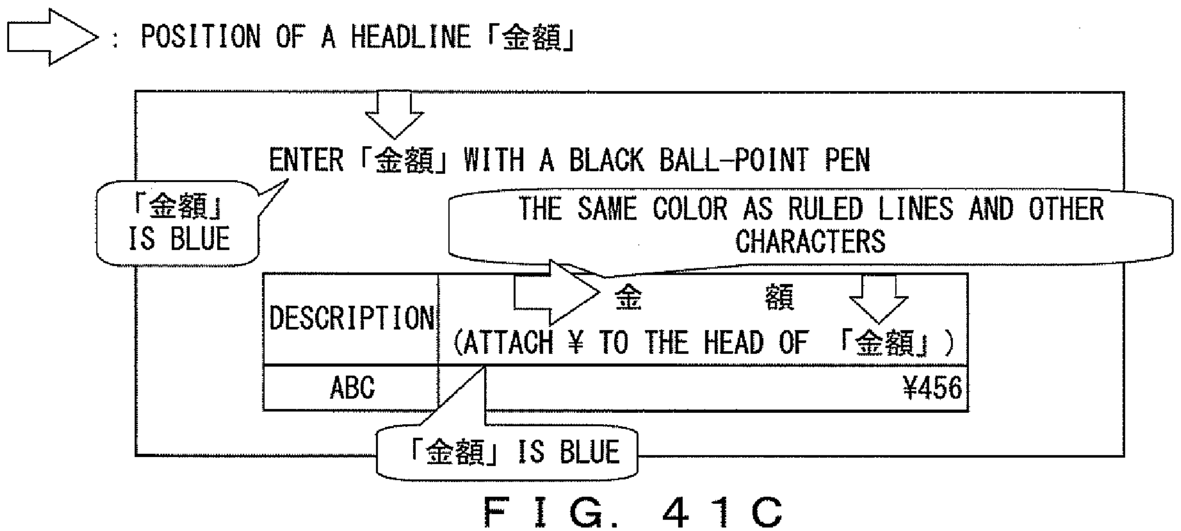
F I G. 4 1 C
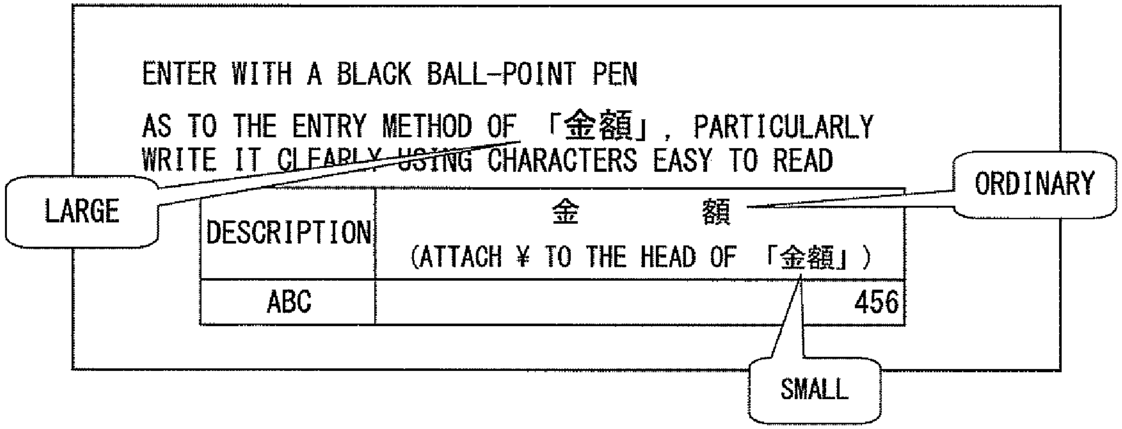
F I G. 4 1 D

| SEARCHED CHARACTER STRING | CELL ID | REPRESENTATIVE HEADLINE | SCORE (MT) | HEADLINE WORDING |
|---|---|---|---|---|
| M1 | CI1 | DM1 | 50 | MG1 |
| | | DM2 | 70 | MG4 |
| | | | 60 | MG5 |
| M2 | CI2 | DM2 | 80 | MG2 |
| M3 | CI3 | DM3 | 100 | MG3 |
| | | | 100 | MG6 |
| | | | 70 | MG7 |

THE SAME REPRESENTATIVE HEADLINE

WHEN THEY ARE THE SAME SCORE, BOTH ARE STORED
IF THERE IS ONE REPRESENTATIVE HEADLINE, THERE IS LOGICALLY NO PROBLEM

F I G. 4 2

DEFINED HEADLINE WORDING AND REPRESENTATIVE HEADLINE IN CASE THE FORM IN FIG 31A IS TARGETED

| REPRESENTATIVE HEADLINE | HEADLINE WORDING |
|---|---|
| 金額 | 納付金額 |
| | 小計金額 |
| | 小計 |
| | 合計金額 |
| | 合計 |
| | 金額 |
| | 給与分 |

FIG. 43A

DEFINED HEADLINE WORDING AND REPRESENTATIVE HEADLINE IN CASE THE FORMS IN FIGS 31A AND 31B ARE MIXED AND TARGETED

| REPRESENTATIVE HEADLINE | HEADLINE WORDING | REPRESENTATIVE HEADLINE | HEADLINE WORDING |
|---|---|---|---|
| 金額 | 納付金額 | 単価 | 金額 |
| | 小計金額 | 金額計 | 合計 |
| | 小計 | | 小計 |
| | 合計金額 | 全数合計 | 合計 |
| | 合計 | | |
| | 金額 | | |
| | 給与分 | | |

FIG. 43C

DEFINED HEADLINE WORDING AND REPRESENTATIVE HEADLINE IN CASE THE FORM IN FIG 31B IS TARGETED

| REPRESENTATIVE HEADLINE | HEADLINE WORDING |
|---|---|
| 金額 | 金額 |
| 金額計 | 合計 |
| | 小計 |
| 全数合計 | 合計 |

THE SAME REPRESENTATIVE HEADLINES DO NOT OVERLAP

FIG. 43B

IN CASE 「金額」IS RECOGNIZED

| SEARCHED CHARACTER STRING | CELL ID | REPRESENTATIVE HEADLINE | SCORE (MT) | HEADLINE WORDING |
|---|---|---|---|---|
| 金額 | 2 | 金額 | 100 | 金額 |
| | | 単価 | 100 | 金額 |

FIG. 44A

IN CASE 「金額」IS RECOGNIZED AS 「金？」

| SEARCHED CHARACTER STRING | CELL ID | REPRESENTATIVE HEADLINE | SCORE (MT) | HEADLINE WORDING |
|---|---|---|---|---|
| 金? | 2 | 金額 | 70 | 金額 |
| | | 単価 | 70 | 金額 |

FIG. 44B

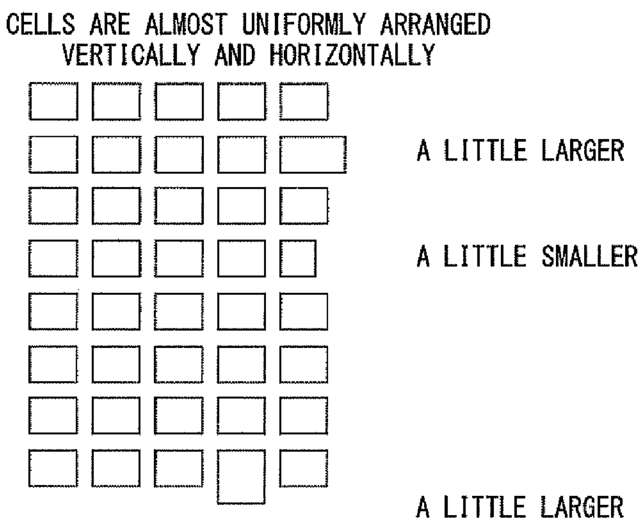
FIG. 45A1
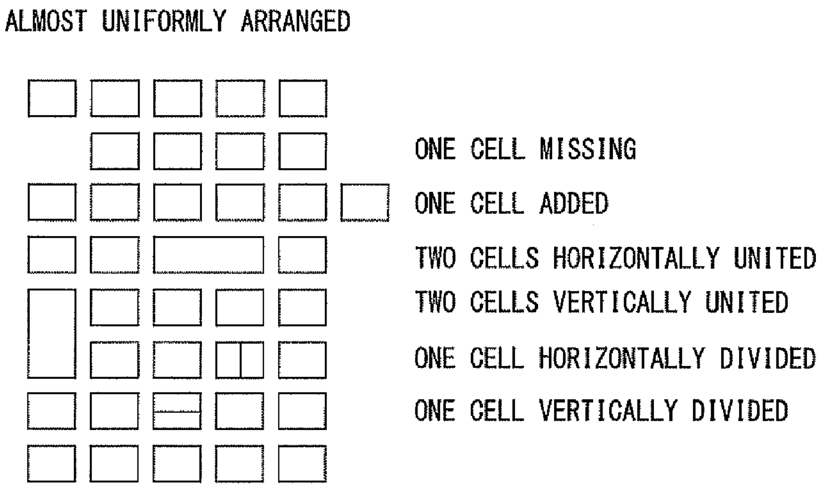
FIG. 45A2

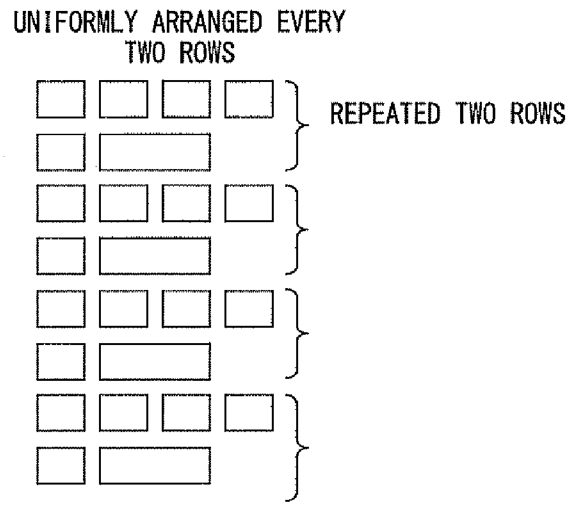
F I G. 45B1
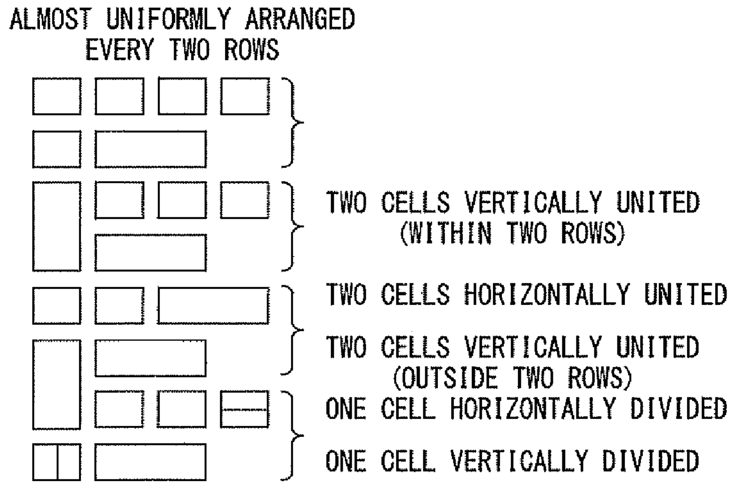
F I G. 45B2

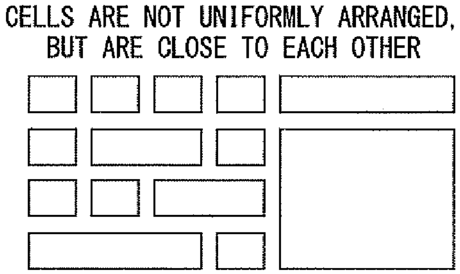
FIG. 45C1
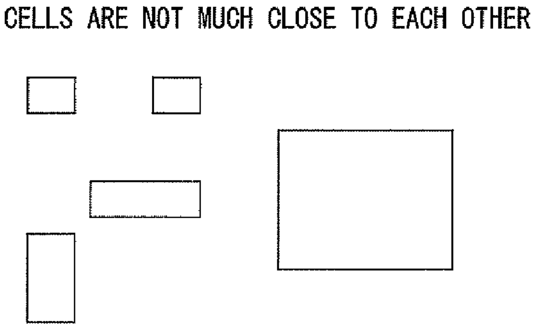
FIG. 45C2

FIG. 46A1

A PLURALITY OF THE SAME HEADLINE WORDING ⇒PLURAL FORM

| SEARCHED CHARACTER STRING | CELL ID | REPRESENTATIVE HEADLINE | SCORE | HEADLINE WORDING |
|---|---|---|---|---|
| 口座番号 | 3 | 口座番号 | 100 | 口座番号 |
| 金額 | 5 | 金額 | 100 | 金額 |
| | | 単価 | 100 | 金額 |
| ?座番号 | 33 | 口座番号 | 75 | 口座番号 |
| 金額 | 35 | 金額 | 100 | 金額 |
| | | 単価 | 100 | 金額 |
| 口座番号 | 23 | 口座番号 | 100 | 口座番号 |
| 金? | 25 | 金額 | 70 | 金額 |
| | | 単価 | 70 | 金額 |

FIG. 46A2

ONLY ONE OF THE SAME HEADLINE WORDING ⇒PLURAL-ENTRY/SINGLE FORM +50 POINTS

| SEARCHED CHARACTER STRING | CELL ID | REPRESENTATIVE HEADLINE | SCORE | HEADLINE WORDING |
|---|---|---|---|---|
| 振込先 | 3 | 振込先 | 100 | 振込先 |
| 種目 | 4 | 種目 | 100 | 種目 |
| 口座番号 | 5 | 口座番号 | 100 | 口座番号 |
| NAME | 6 | 受取人名 | 100 | おなまえ |
| | | 依頼人名 | 100 | おなまえ |
| 金額 | 7 | 金額 | 100 | 金額 |
| | | 単価 | 100 | 金額 |
| 合計 | 50 | 金額 | 100 | 合計 |
| | | 金額計 | 100 | 合計 |
| | | 全数合計 | 100 | 合計 |

THE SAME HEADLINE WORDING ARE ARRANGED IN THE SAME WAY
⇒PLURAL FORM +100 POINTS

CELL WHOSE SEARCHED CHARACTER STRING IS 「金額」
CELL WHOSE SEARCHED CHARACTER STRING IS 「口座番号」

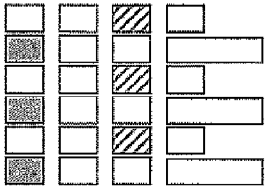

FIG. 46B1

NO RELATIONSHIP AMONG THE POSITIONS OF HEADLINE WORDING ⇒SINGLE FORM +50 POINTS

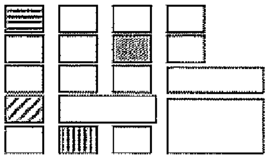

FIG. 46B3

DIFFERENT HEADLINE WORDING ARE ARRANGED IN ONE ROW
⇒PLURAL-ENTRY FORM +70 POINTS
⇒SINGLE FORM +30 POINTS

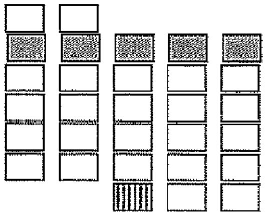

FIG. 46B2

ONLY ONE HEADLINE WORDING
⇒PLURAL-ENTRY FORM +20 POINTS
⇒SINGLE FORM +20 POINTS

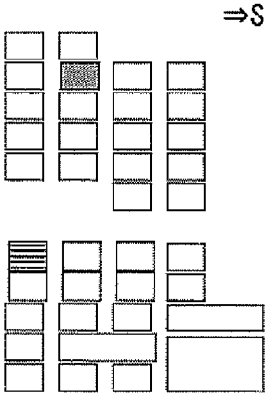

FIG. 46B4

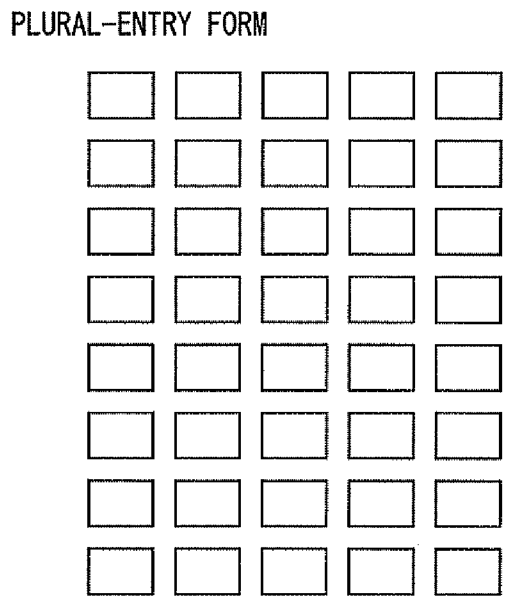
F I G. 4 7 A
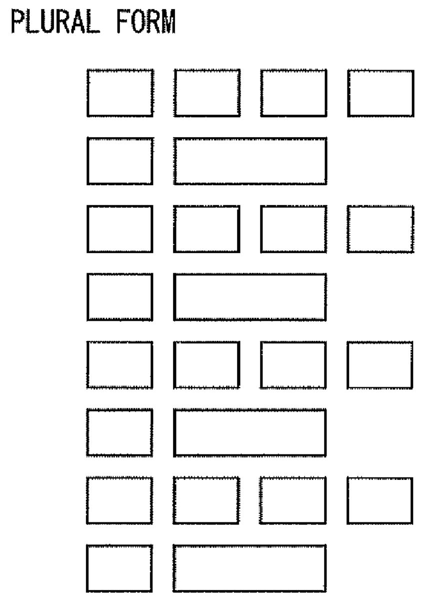
F I G. 4 7 B

LOGICAL STRUCTURE ANALYSIS DB

| REPRESENTATIVE HEADLINE | HEADLINE POSITION | DATA | | | | PHRASE VARIATIONS |
|---|---|---|---|---|---|---|
| | | ATTRIBUTE | FORMAT (NUMBER OF DIGITS, ETC) | ACCESSORY SYMBOL | | |
| | | | | WORDING | POSITION | |
| 税名 | 上部 | CHINESE CHARACTER | | | | *税<br>-市、-県 |
| 年 | 上部 | NUMERIC FIGURE | | 平成 | 前 | *年<br>*年度 |

— IS A WORDING NOT INCLUDED

F I G. 4 9 A

FORM DESIGN
IN CASE A HEADLINE WORDING 「税」 CANNOT BE READ DUE TO NOISE
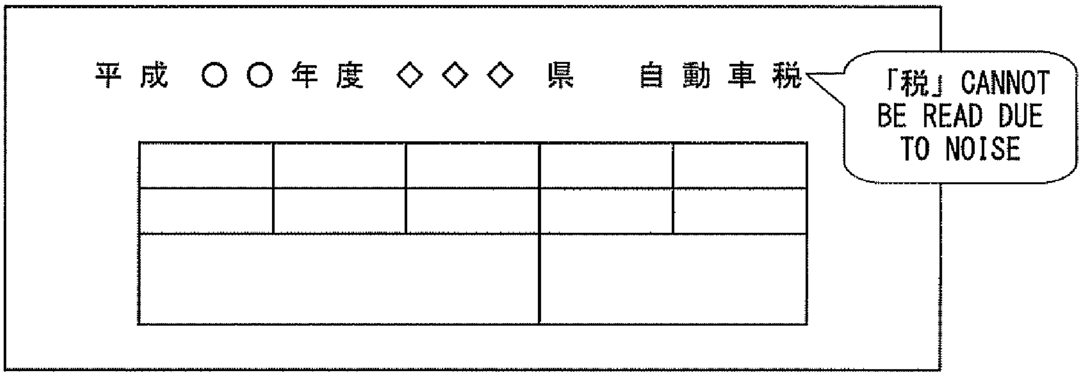
F I G. 4 9 B

WORDING NOT INCLUDED AND OTHER HEADLINE WORDING ARE ELIMINATED

RECOGNITION RESULT

| | | |
|---|---|---|
| 税名 | ⇒ | 自動車 |
| 年 | ⇒ | 平成○○年 |

F I G. 4 9 E

LOGICAL STRUCTURE ANALYSIS DB

| REPRESENTATIVE HEADLINE | HEADLINE POSITION | PHRASE |
|---|---|---|
| CITY/TOWN/VILLAGE NAME | 上部　　下部 | *市 |

FIG. 50A

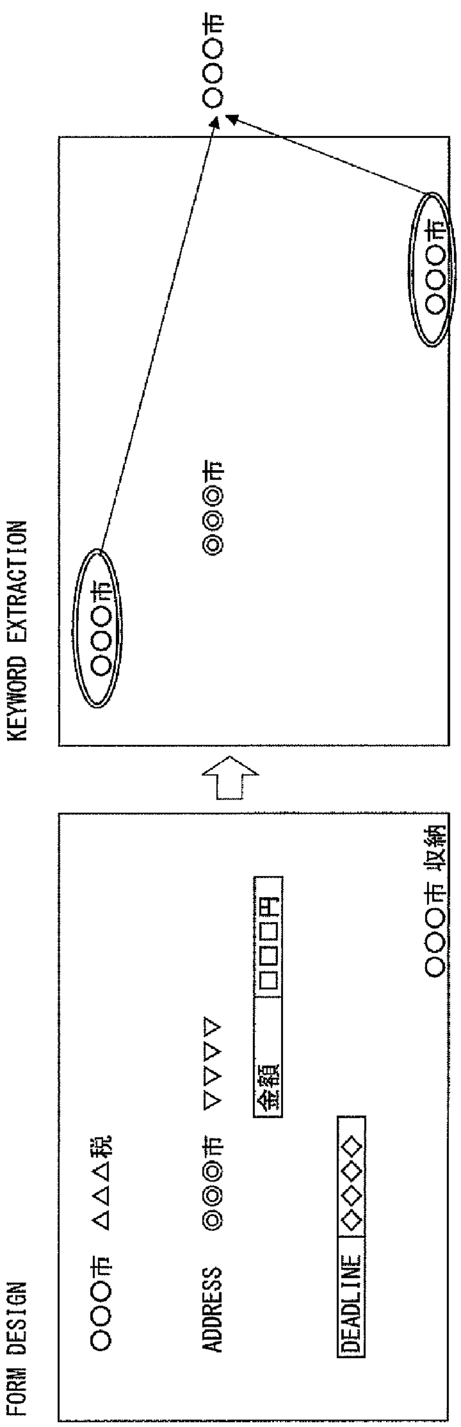
FIG. 50B1
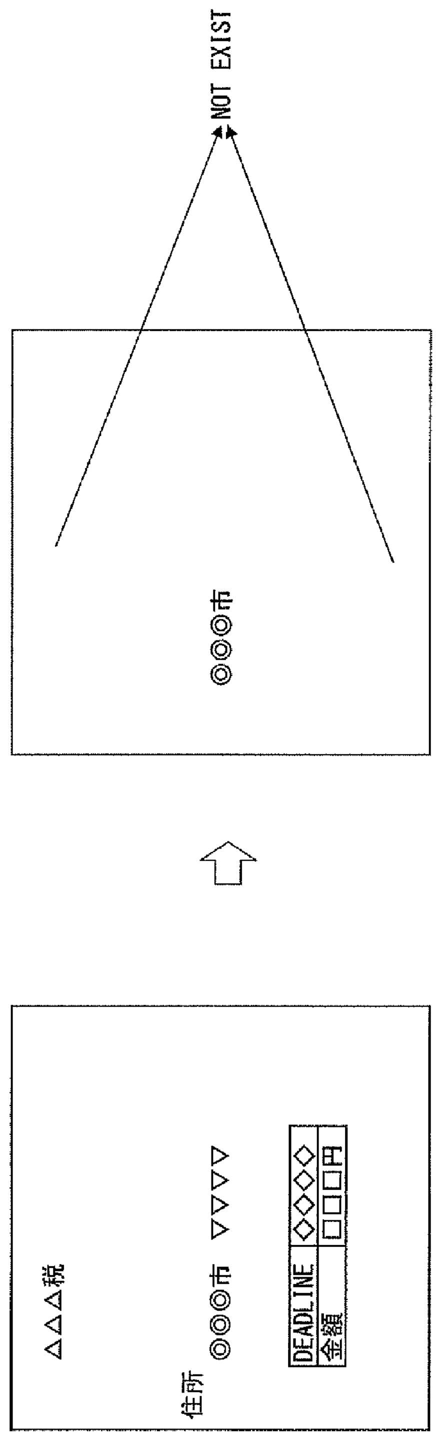
FIG. 50B2

(a) LOGICAL STRUCTURE ANALYSIS DB

| REPRESENTATIVE HEADLINE | HEADLINE POSITION | DATA | | | | WORDING VARIATIONS |
|---|---|---|---|---|---|---|
| | | ATTRIBUTE | FORMAT (NUMBER OF DIGITS, ETC) | ACCESSORY SYMBOL | | |
| | | | | PHRASE | POSITION | |
| 銀行名 | 上部 | CHINESE CHARACTER<br>ALPHABET | | 銀行<br>: | TAIL<br>: | 銀行名<br>: |
| 支店名 | 上部 | CHINESE CHARACTER<br>ALPHABET | | 支店<br>: | TAIL<br>: | 支店名<br>: |
| 口座番号 | 上部 | NUMERICAL FIGURE | 7 | : | : | 口座番号<br>: |
| 金額 | 上部 | NUMERICAL FIGURE | | ¥ | HEAD | 金額<br>振込金額<br>: |
| | | | | 円 | TAIL | |
| | | | | , | BETWEEN NUMERICAL FIGURES | |
| 小計 | 上部 | NUMERICAL FIGURE | | ¥ | HEAD | 小計<br>小計金額<br>: |
| | | | | 円 | TAIL | |
| | | | | , | BETWEEN NUMERICAL FIGURES | |
| 合計 | 上部 | NUMERICAL FIGURE | | ¥ | HEAD | 合計<br>合計金額<br>: |
| | | | | 円 | TAIL | |
| | | | | , | BETWEEN NUMERICAL FIGURES | |

FIG. 51A

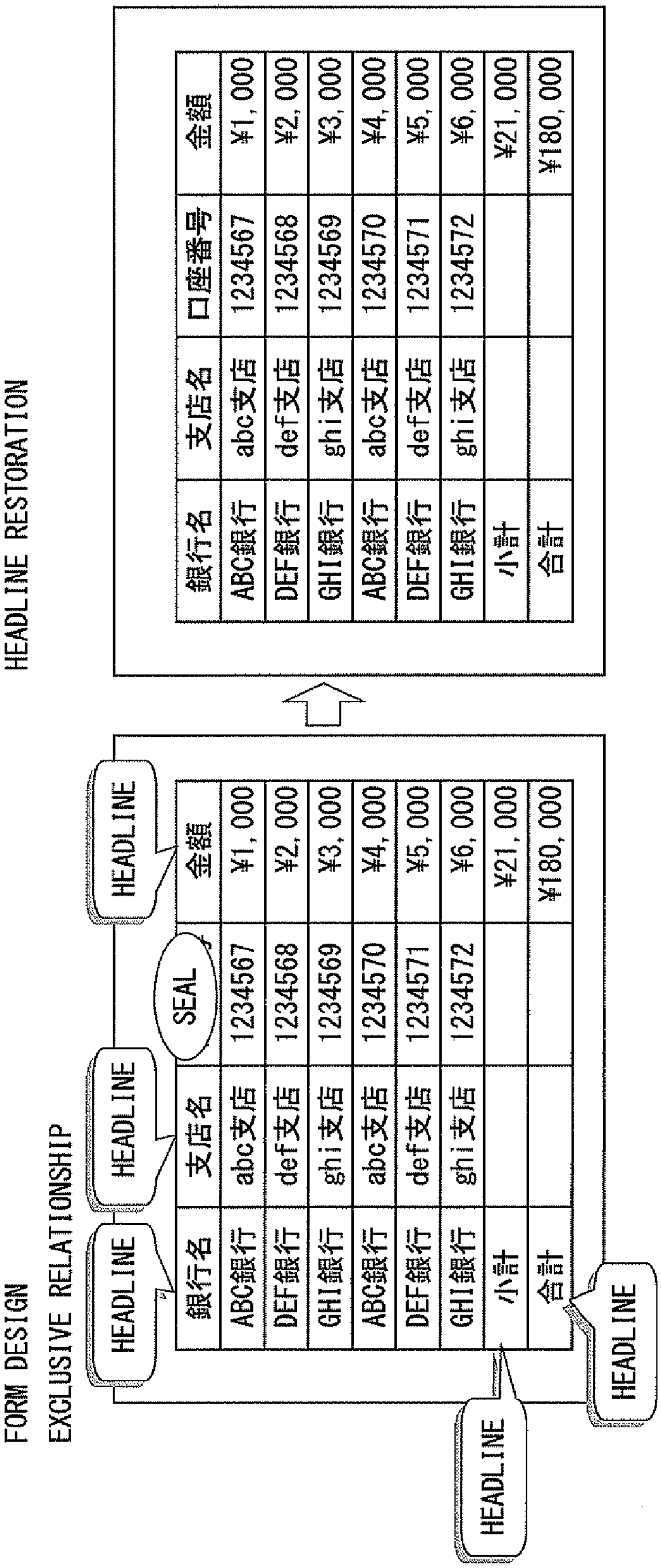
| 銀行名 | 支店名 | SEAL | 金額 |
|---|---|---|---|
| ABC銀行 | abc支店 | 1234567 | ¥1,000 |
| DEF銀行 | def支店 | 1234568 | ¥2,000 |
| GHI銀行 | ghi支店 | 1234569 | ¥3,000 |
| ABC銀行 | abc支店 | 1234570 | ¥4,000 |
| DEF銀行 | def支店 | 1234571 | ¥5,000 |
| GHI銀行 | ghi支店 | 1234572 | ¥6,000 |
| 小計 | | | ¥21,000 |
| 合計 | | | ¥180,000 |
| 銀行名 | 支店名 | 口座番号 | 金額 |
|---|---|---|---|
| ABC銀行 | abc支店 | 1234567 | ¥1,000 |
| DEF銀行 | def支店 | 1234568 | ¥2,000 |
| GHI銀行 | ghi支店 | 1234569 | ¥3,000 |
| ABC銀行 | abc支店 | 1234570 | ¥4,000 |
| DEF銀行 | def支店 | 1234571 | ¥5,000 |
| GHI銀行 | ghi支店 | 1234572 | ¥6,000 |
| 小計 | | | ¥21,000 |
| 合計 | | | ¥180,000 |
F I G. 5 1 B 1

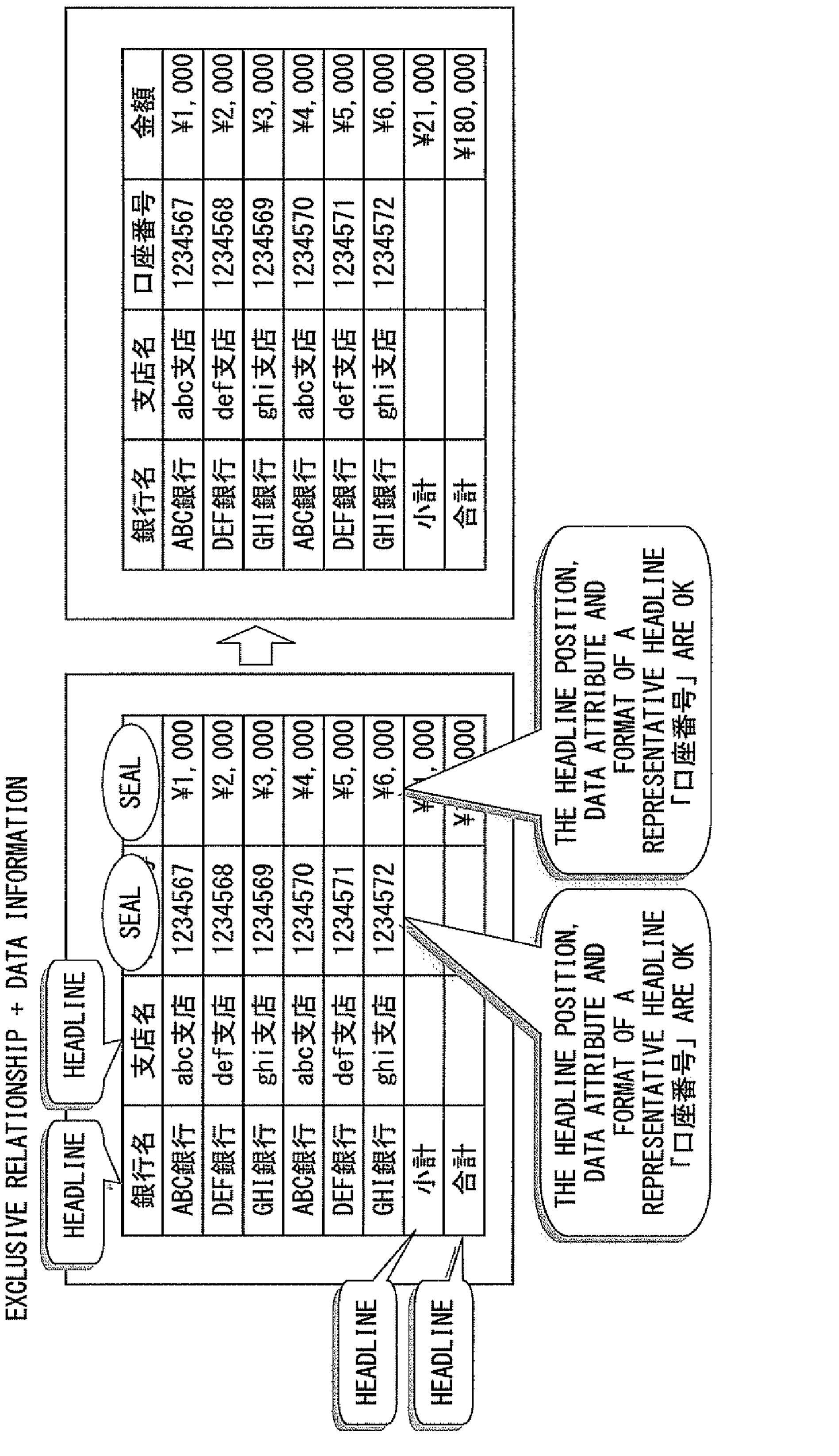
FIG. 51B2

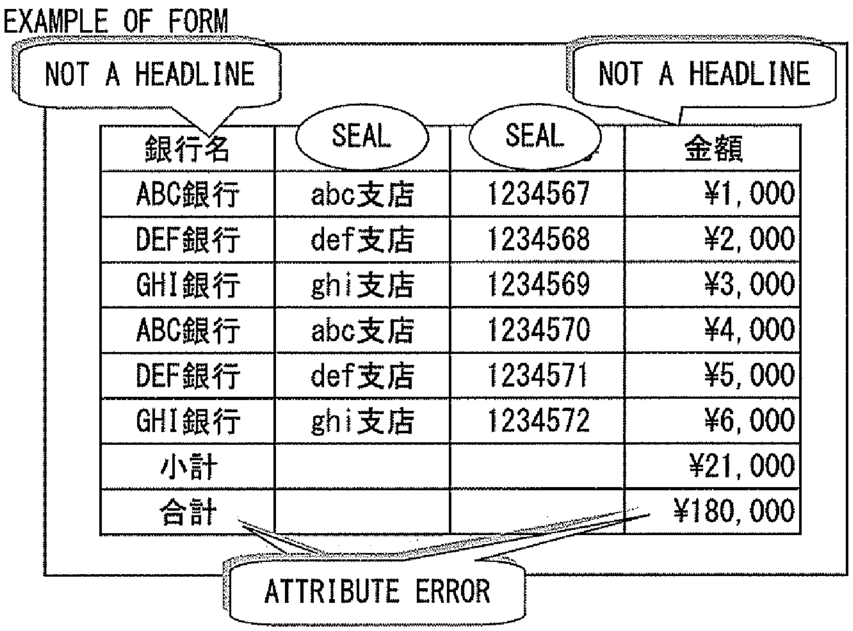
F I G. 5 2 A

EXAMPLE OF LOGICAL STRUCTURE ANALYSIS DB

ONLY TWO FIELDS ARE DEFINED

LOGICAL STRUCTURE ANALYSIS DB

| REPRESENTATIVE HEADLINE | HEADLINE POSITION | DATA | | | | PHRASE VARIATIONS |
|---|---|---|---|---|---|---|
| | | ATTRIBUTE | FORMAT (NUMBER OF DIGITS, ETC) | ACCESSORY SYMBOL | | |
| | | | | PHRASE | POSITION | |
| 支店名 | 上部 | Chinese-Character Alphabet | | 支店 : | 最後 : | 支店名 : |
| 口座番号 | 上部 | Numerical Figure | 7 | : | : | 口座番号 : |

F I G. 5 2 B

| SEAL | SEAL | 口座番号 | 金額 |
|---|---|---|---|
| ABC | abc | 1234567 | ¥1,000 |
| DEF | def | 1234568 | ¥2,000 |
| GHI | ghi | 1234569 | ¥3,000 |
| ABC | abc | 1234573 | ¥4,000 |
| DEF | def | 1234574 | ¥5,000 |
| GHI | ghi | 1234575 | ¥6,000 |
| 小計 | | | ¥21,000 |
| 合計 | | | ¥180,000 |

EXAMPLE OF LOGICAL STRUCTURE ANALYSIS DB

LOGICAL STRUCTURE ANALYSIS DB

ONLY TWO FIELDS ARE DEFINED

| REPRESENTATIVE HEADLINE | HEADLINE POSITION | DATA | | | | PHRASE VARIATIONS |
|---|---|---|---|---|---|---|
| | | ATTRIBUTE | FORMAT (NUMBER OF DIGITS, ETC) | ACCESSORY SYMBOL | | |
| | | | | PHRASE | POSITION | |
| 銀行名 | 上部 | CHinese-Character<br>Alphabet | | 銀行<br>:<br>: | 最後<br>:<br>: | 銀行名<br>振込先銀行名<br>振込先 |
| 支店名 | 上部 | CHinese-Character<br>Alphabet | | 支店<br>:<br>: | 最後<br>:<br>: | 支店名<br>振込先支店名 |

THE SAME ATTRIBUTE

FIG. 53B

CREATION OF DATA POSITION ORDER

| HEADLINE GR | REPRESENTATIVE HEADLINE | DATA POSITION ORDER |
|---|---|---|
| 振込先 | 銀行名 | 1 |
| | 支店名 | 2 |

FORM DESIGN

| | 銀行名 | 支店名 | 金額 | |
|---|---|---|---|---|
| 1 | ABC銀行 | abc支店 | ¥1,000 | ⎫ DETAIL RANGE |
| | 口座番号 | 1234567 | | ⎭ |
| | (NOISE) | 支店名 | 金額 | ⎫ |
| 2 | DEF銀行 | def支店 | ¥2,000 | ⎬ |
| | 口座番号 | 1234568 | | ⎭ |
| | 銀行名 | (NOISE) | 金額 | ⎫ |
| 3 | GHI銀行 | ghi支店 | ¥3,000 | ⎬ |
| | 口座番号 | 1234569 | 預金種目 | ⎭ |
| | 銀行名 | 支店名 | (NOISE) | ⎫ |
| 4 | ABC銀行 | abc支店 | ¥4,000 | ⎬ |
| | 口座番号 | 1234570 | | ⎭ |
| | 銀行名 | 支店名 | 金額 | ⎫ |
| 5 | DEF銀行 | def支店 | ¥5,000 | ⎬ |
| | (NOISE) | 1234571 | | ⎭ |
| 依 | 口座番号 | 金額 | | |
| 頼 | 1234571 | | ¥15,000 | ← NOT A DETAIL |
| 人 | 種目 フツウ | | | |

HEADLINES ARE REFLECTED IN OTHER DETAIL RANGES

| | 銀行名 | 支店名 | 金額 |
|---|---|---|---|
| 1 | ABC銀行 | abc支店 | ¥1,000 |
| | 口座番号 | 1234567 | |
| | NOISE | 支店名 | 金額 |
| 2 | DEF銀行 | def支店 | ¥2,000 |
| | 口座番号 | 1234568 | |
| | 銀行名 | NOISE | 金額 |
| 3 | GHI銀行 | ghi支店 | ¥3,000 |
| | 口座番号 | 1234569 | 預金種目 |
| | 銀行名 | 支店名 | NOISE |
| 4 | ABC銀行 | abc支店 | ¥4,000 |
| | 口座番号 | 1234570 | |
| | 銀行名 | 支店名 | 金額 |
| 5 | DEF銀行 | def支店 | ¥5,000 |
| | NOISE | 1234571 | |
| 依頼人 | 口座番号 | 金額 | |
| | 1234571 | ¥15,000 | |
| | 種目 フツウ | | |

REFLECTION RESULT

| | | | |
|---|---|---|---|
| | 銀行名 | 支店名 | 金額 |
| 1 | ABC銀行 | abc支店 | ¥1,000 |
| | 口座番号 | 1234567 | |
| | 銀行名 | 支店名 | 金額 |
| 2 | DEF銀行 | def支店 | ¥2,000 |
| | 口座番号 | 1234568 | |
| | 銀行名 | 支店名 | 金額 |
| 3 | GHI銀行 | ghi支店 | ¥3,000 |
| | 口座番号 | 1234569 | 預金種目 |
| | 銀行名 | 支店名 | 金額 |
| 4 | ABC銀行 | abc支店 | ¥4,000 |
| | 口座番号 | 1234570 | |
| | 銀行名 | 支店名 | 金額 |
| 5 | DEF銀行 | def支店 | ¥5,000 |
| | 口座番号 | 1234571 | |
| 依 | 口座番号 | 金額 | |
| 頼 | 1234571 | ¥15,000 | |
| 人 | 種目 ﾌﾂｳ | | |

F I G. 5 4 C

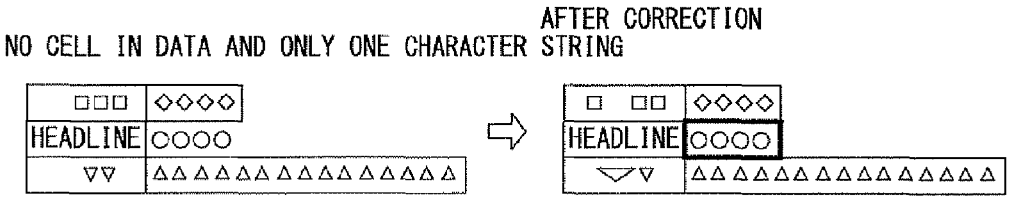
FIG. 55A1
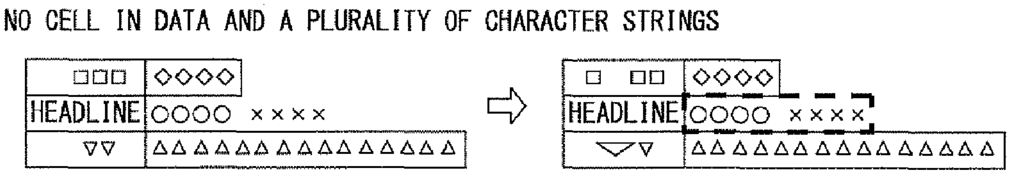
FIG. 55A2
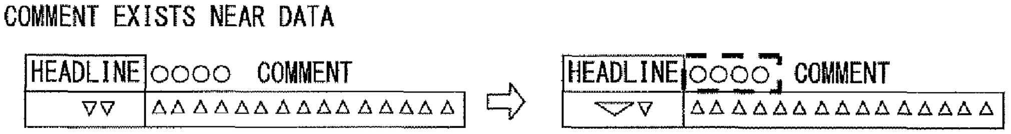
FIG. 55A3
FIG. 55B1
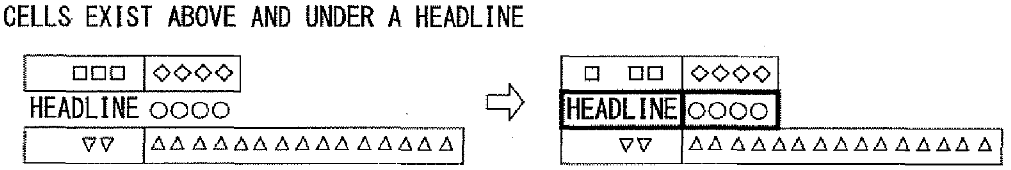
FIG. 55B2
FIG. 55B3
FIG. 55B4

LOGICAL STRUCTURE ANALYSIS DB

| HEADLINE DR | PHRASE VARIATIONS | REPRESENTATIVE HEADLINE | PHRASE VARIATIONS |
|---|---|---|---|
| 受取人 | お受取人<br>受取人 | 受口座番号 | 口座番号<br>口番 |
| | | 受取人名 | おなまえ<br>お受取人名 |
| 依頼人 | ご依頼人<br>依頼人 | 依口座番号 | 口座番号<br>依頼人番号 |
| | | 依頼人名 | おなまえ<br>ご依頼人名 |

F I G. 5 6 B

KEYWORD EXTRACTION RESULT + HEADLINE DR/GR CONNECTION

| SEARCHED CHARACTER STRING | CELL ID | REPRESENTATIVE HEADLINE | HEADLINE DR/GR | SCORE (MT) | HEADLINE WORDING |
|---|---|---|---|---|---|
| 口座番号 | 5 | 受口座番号 | 受取人 | 100 | 口座番号 |
| | | 依口座番号 | 依頼人 | 100 | 口座番号 |
| 口座番号 | 15 | 受口座番号 | 受取人 | 100 | 口座番号 |
| | | 依口座番号 | 依頼人 | 100 | 口座番号 |

FIG. 56C

KEYWORD EXTRACTION RESULT AFTER EXAMINATION

| SEARCHED CHARACTER STRING | CELL ID | REPRESENTATIVE HEADLINE | HEADLINE DR/GR | SCORE (MT) | HEADLINE WORDING |
|---|---|---|---|---|---|
| 口座番号 | 5 | 受口座番号 | 受取人 | -100 | 口座番号 |
| | | 依口座番号 | 依頼人 | 200 | 口座番号 |
| 口座番号 | 15 | 受口座番号 | 受取人 | 200 | 口座番号 |
| | | 依口座番号 | 依頼人 | -100 | 口座番号 |

HEADLINE DR/GR OK/NG POINTS ARE ADDED/SUBTRACTED, RESPECTIVELY

F I G. 5 6 E

[銀行名欄] AND 「支店名欄」 ARE EXTRACTED FROM THE 「振込先欄」 OF SINGLE/PLURAL FORMS
FORM DESIGN
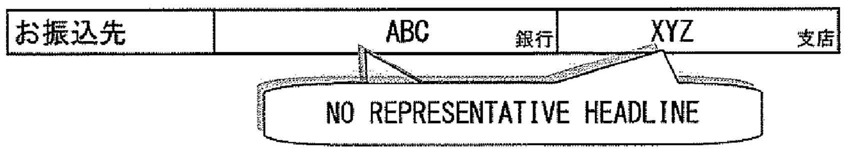
F I G. 5 7 A 1
LOGICAL STRUCTURE ANALYSIS DB
| HEADLINE GR | REPRESENTATIVE HEADLINE | ～ | ACCESSORY SYMBOL | |
|---|---|---|---|---|
| | | ～ | PHRASE | POSITION |
| 振込先 | 銀行名 | ～ | 銀行 | 最後 |
| | 支店名 | ～ | 支店 | 最後 |
| | | ～ | 本店 | 最後 |
F I G. 5 7 A 2
CREATION OF VIRTUAL HEADLINE (TOP CONNECTION RELATIONSHIP IN A DIMENSION DIFFERENT FROM A CELL IN A TABLE STRUCTURE)
F I G. 5 7 A 3

「口数」AND 「合計金額」ARE EXTRACTED FROM THE 「合計欄」OF A PLURAL-ENTRY FORM

FORM DESIGN

| 銀行名 | 支店名 | 種目 | 口座番号 | 受取人名 | 金 額 | | | | | | | |
|---|---|---|---|---|---|---|---|---|---|---|---|---|
| (略) | | | | | | | | | | | | |
| | | | | | | | | | | | | |
| | 合計 | | 15 | | | 1 | 2 | 5 | 8 | 0 | 0 | 0 |

F I G. 5 7 B 1

LOGICAL STRUCTURE ANALYSIS DB

| HEADLINE GR | REPRESENTATIVE HEADLINE | DATA POSITION ORDER | ACCESSORY SYMBOL | |
|---|---|---|---|---|
| | | | PHRASE | POSITION |
| 合計 | 口数 | 1 | 口 | 最後 |
| | 合計金額 | 2 | ¥ | 最初 |
| | | | 円 | 最後 |

F I G. 5 7 B 2

CREATION OF VIRTUAL HEADLINE (TOP CONNECTION RELATIONSHIP IN A DIMENSION DIFFERENT FROM A CELL IN A TABLE STRUCTURE)

| | | 口数 | | 合計金額 | | | | | | |
|---|---|---|---|---|---|---|---|---|---|---|
| 合計 | | 15 | | 1 | 2 | 5 | 8 | 0 | 0 | 0 |

F I G. 5 7 B 3

FORM DESIGN
AN ACCESSORY SYMBOL AND A PRE-PRINT EXIST
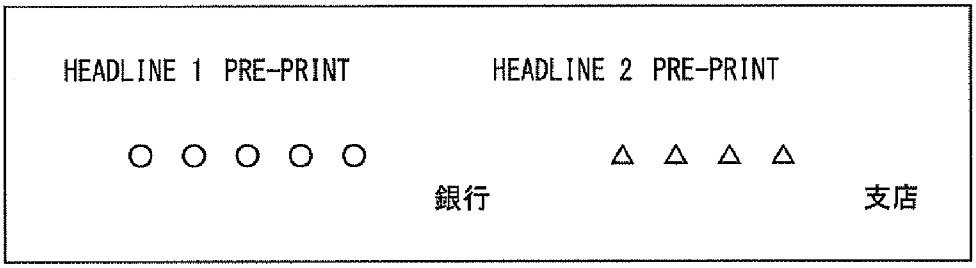
F I G. 5 9 A
A PLURALITY OF ROWS
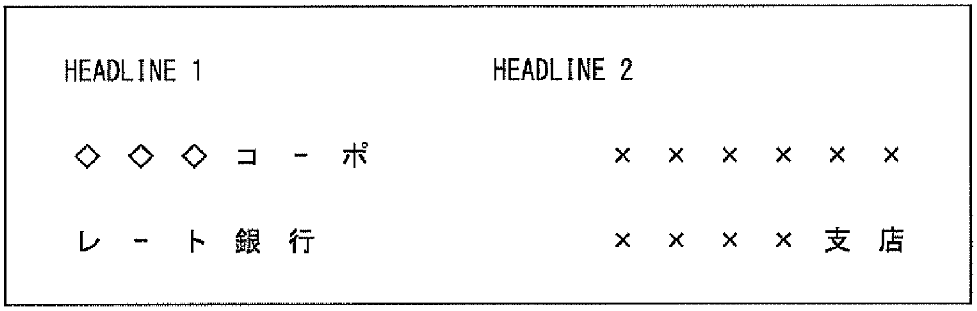
F I G. 5 9 B
A PLURALITY OF CHARACTER STRINGS
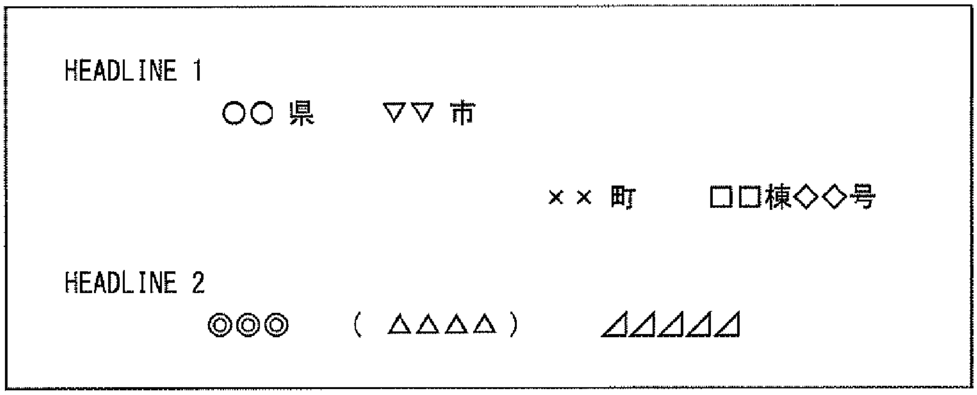
F I G. 5 9 C
HEADLINES AND DATA ARE ARRANGED IN THE SAME ROW (ON THE RIGHT)
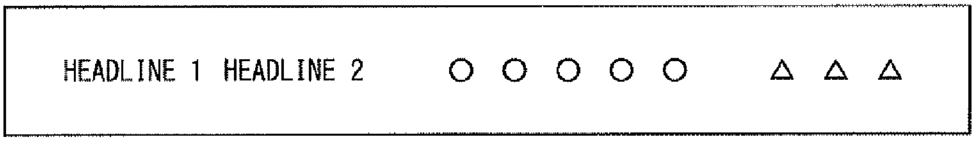
F I G. 5 9 D

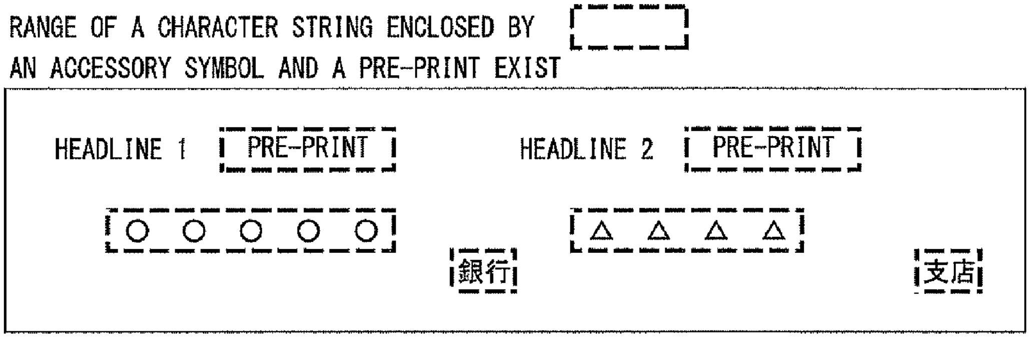
F I G. 60A
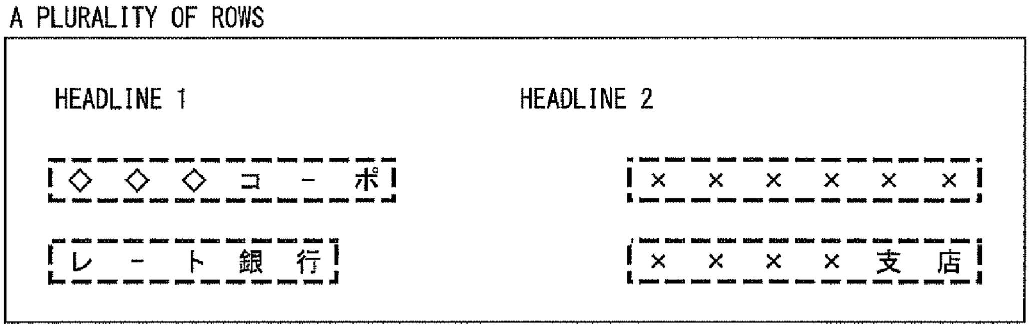
F I G. 60B
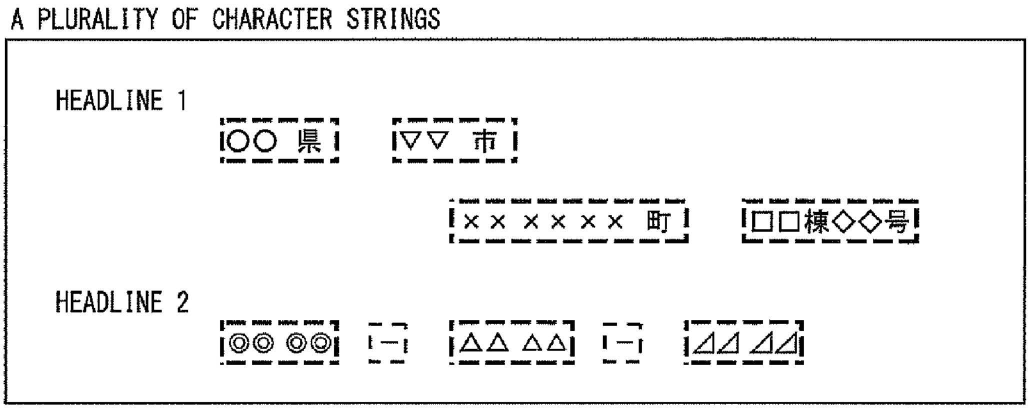
F I G. 60C
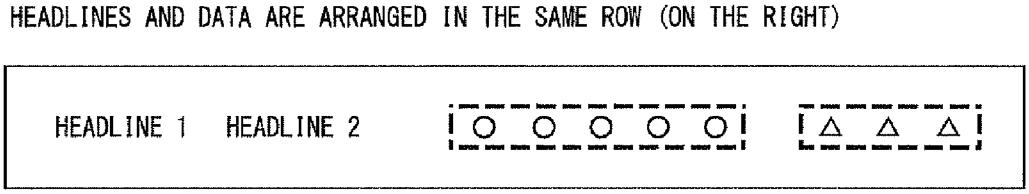
F I G. 60D

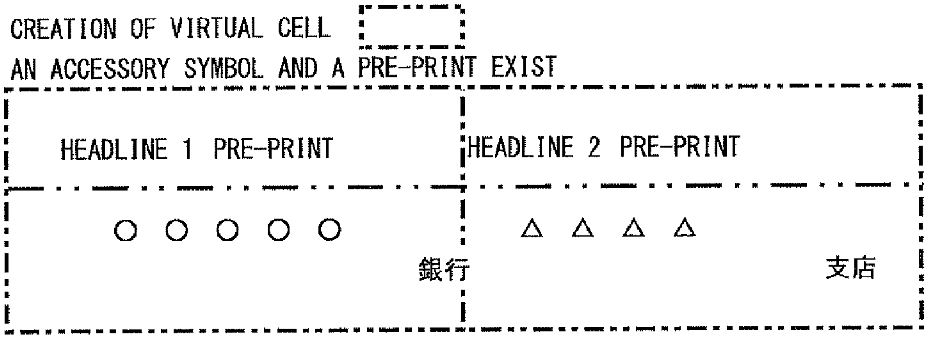
F I G. 6 1 A
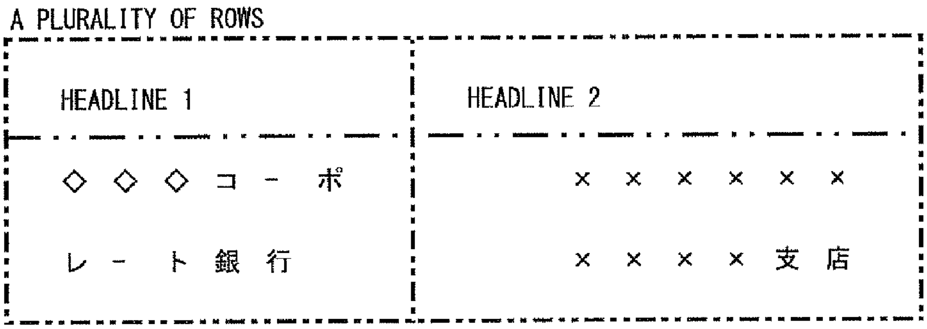
F I G. 6 1 B
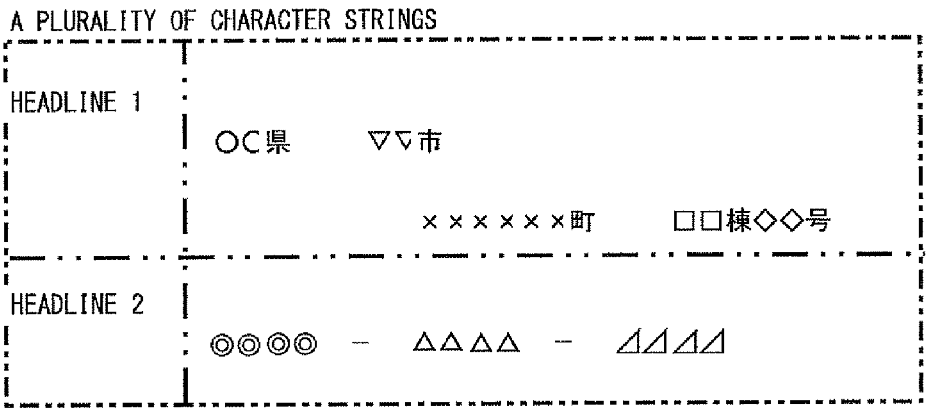
F I G. 6 1 C
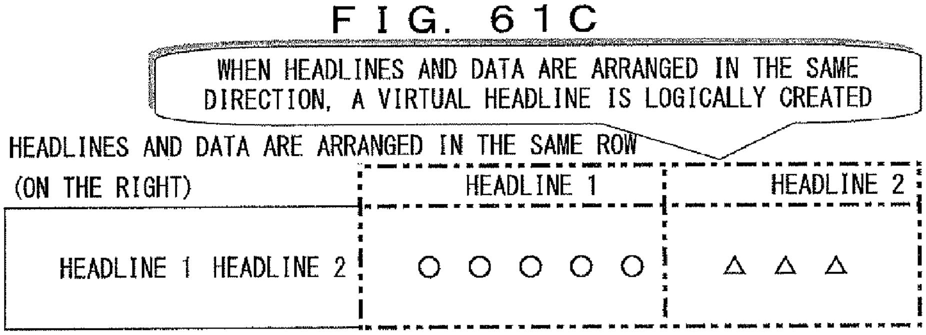
F I G. 6 1 D

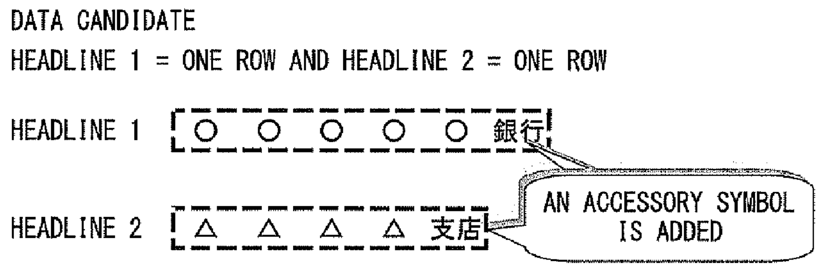

FIG. 62A

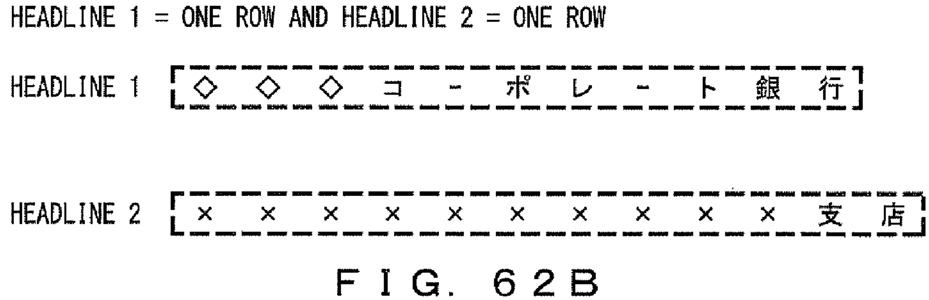

FIG. 62B

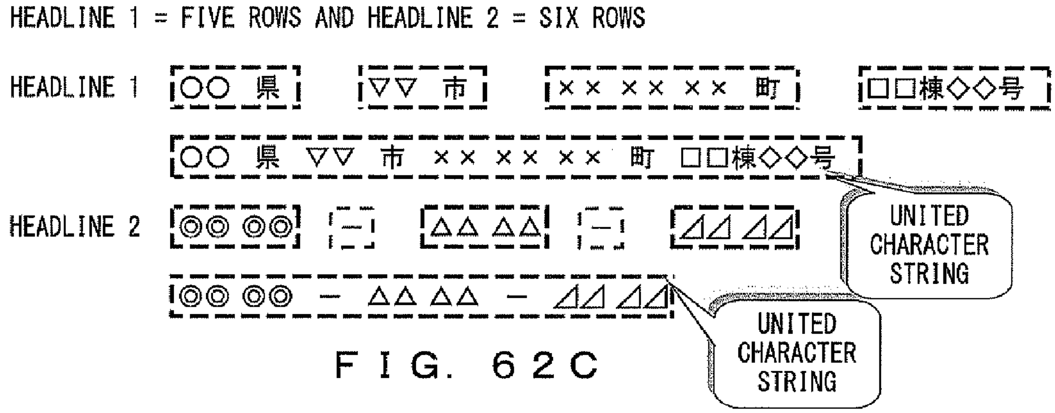

FIG. 62C

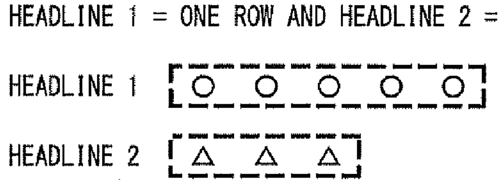

FIG. 62D

DATA CANDIDATE
HEADLINE 1 = ONE ROW AND HEADLINE 2 = ONE ROW

HEADLINE 1 [ ○ ○ ○ ○ ○ 銀行 ]

HEADLINE 2 [ △ △ △ △ 支店 ]

AN ACCESSORY SYMBOL IS ADDED

F I G. 6 2 A

HEADLINE 1 = ONE ROW AND HEADLINE 2 = ONE ROW

HEADLINE 1 [ ◇ ◇ ◇ コ ー ポ レ ー ト 銀 行 ]

HEADLINE 2 [ × × × × × × × × × × 支 店 ]

F I G. 6 2 B

HEADLINE 1 = FIVE ROWS AND HEADLINE 2 = SIX ROWS

HEADLINE 1 [○○ 県] [▽▽ 市] [× × × × × 町] [□□棟◇◇号]

[○○ 県 ▽▽ 市 × × × × × 町 □□棟◇◇号]

HEADLINE 2 [◎◎ ◎◎] [－] [△△ △△] [－] [⊿⊿ ⊿⊿]

[◎◎ ◎◎ － △△ △△ － ⊿⊿ ⊿⊿]

UNITED CHARACTER STRING

UNITED CHARACTER STRING

F I G. 6 2 C

HEADLINE 1 = ONE ROW AND HEADLINE 2 = ONE ROW

HEADLINE 1 [ ○ ○ ○ ○ ○ ]

HEADLINE 2 [ △ △ △ ]

F I G. 6 2 D

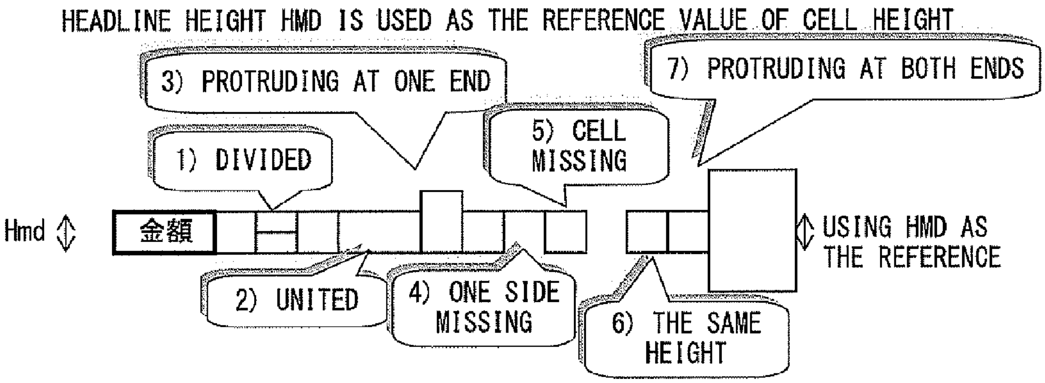
F I G. 64A
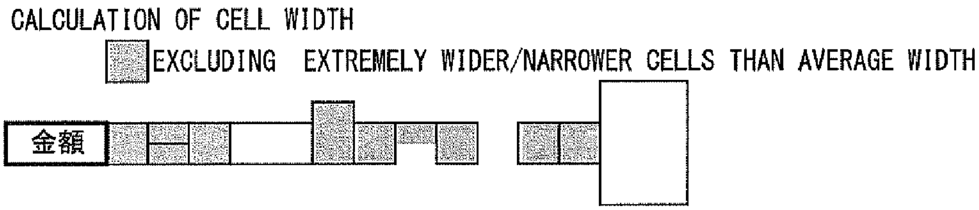
F I G. 64B
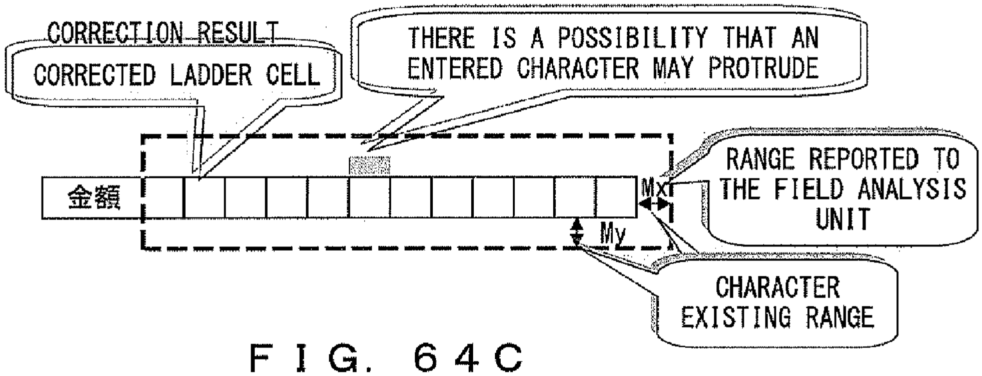
F I G. 64C

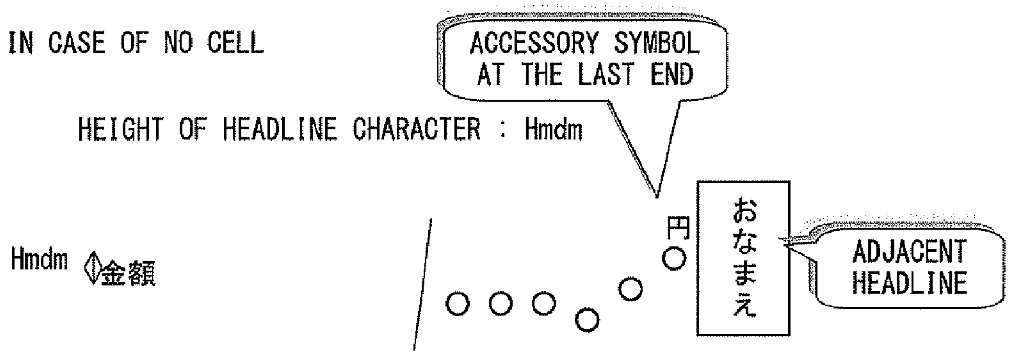
F I G. 66A
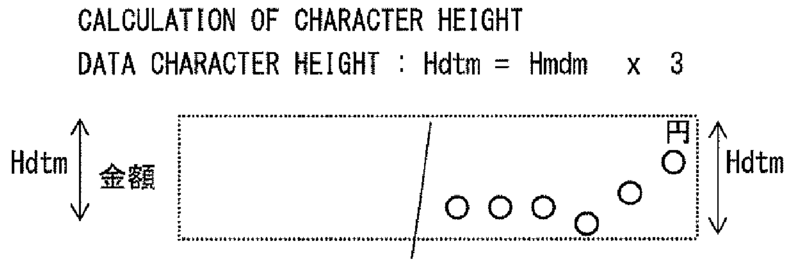
F I G. 66B
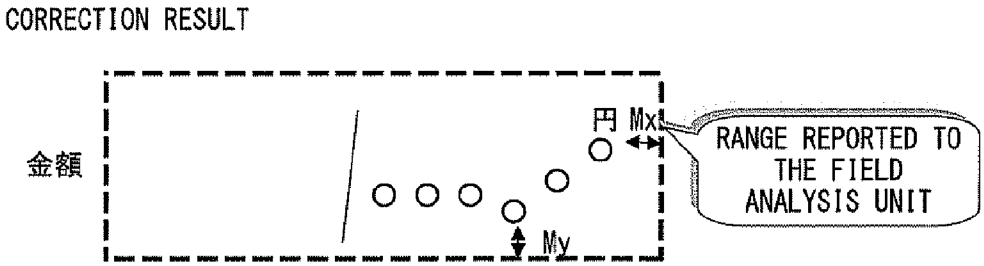
F I G. 66C
IN CASE OF NO CELL
HEIGHT OF HEADLINE CHARACTER : Hmdm
F I G. 6 6 A
CALCULATION OF CHARACTER HEIGHT
DATA CHARACTER HEIGHT : Hdtm = Hmdm × 3
F I G. 6 6 B
CORRECTION RESULT
F I G. 6 6 C FORM DESIGN
ONLY ONE HEADLINE
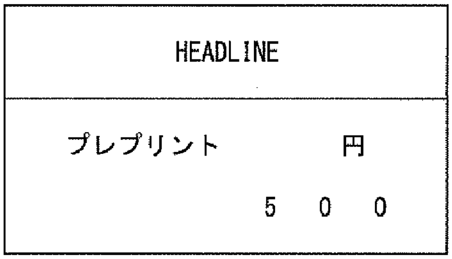
F I G. 6 7 A
ONE HEADLINE AND TWO VIRTUAL HEADLINES
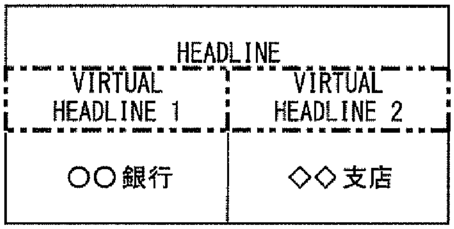
F I G. 6 7 B
ONE HEADLINE AND TWO DATA CANDIDATES (1)
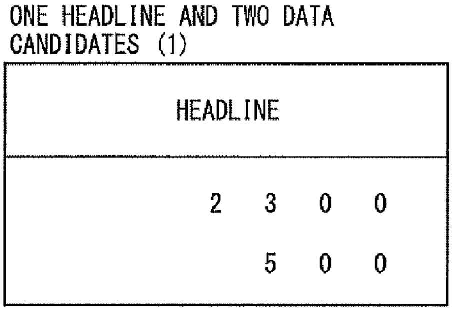
F I G. 6 7 C
ONE HEADLINE AND TWO DATA CANDIDATES (2)
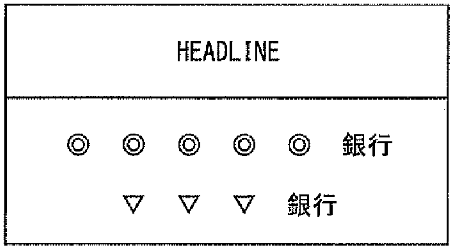
F I G. 6 7 D
TWO HEADLINES IN THE HORIZONTAL DIRECTION
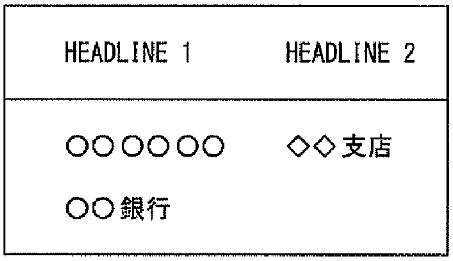
F I G. 6 7 E
TWO HEADLINES IN THE VERTICAL DIRECTION
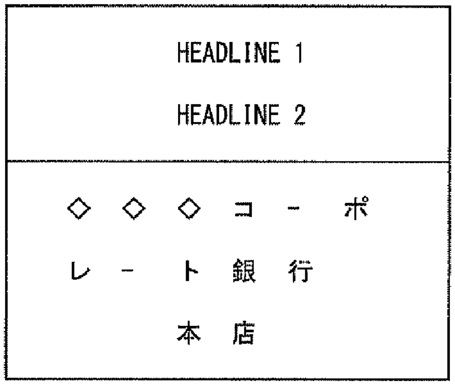
F I G. 6 7 F

DATA CANDIDATE
ONE ROW

[5 0 0 円] ← ACCESSORY SYMBOL IS ADDED

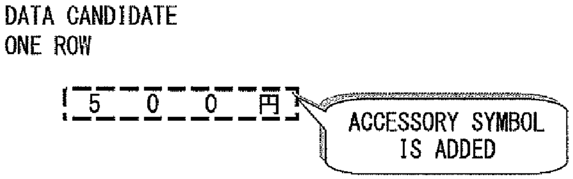

FIG. 69A

ONE ROW
VIRTUAL HEADLINE 1 [○○銀行]
VIRTUAL HEADLINE 2 [◇◇支店]

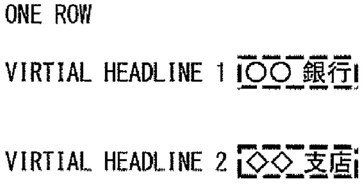

FIG. 69B

TWO ROWS
[2 3 0]
[5 0 0] ← NUMERICAL FIGURES ARE NOT UNITED IN A ROW

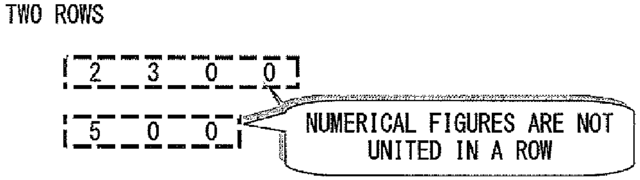

FIG. 69C

THREE ROWS
[◎ ◎ ◎ ◎ 銀行]
[▽ ▽ ▽ 銀行]
[◎ ◎ ◎ ◎ 銀行 ▽ ▽ ▽ 銀行] ← UNITED CHARACTER STRING

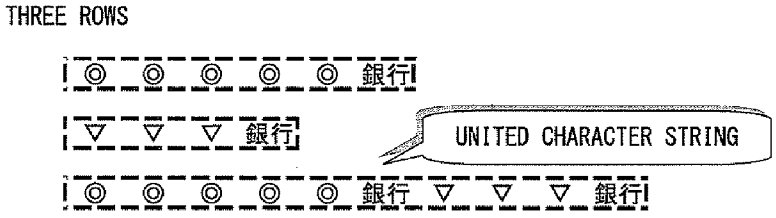

FIG. 69D

HEADLINE 1 = ONE ROW AND HEADLINE 2= ONE ROW
HEADLINE 1 [○○○○○○○○銀行]
HEADLINE 2 [○○◇支店]

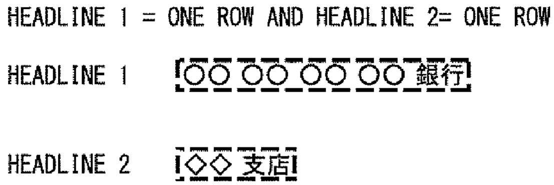

FIG. 69E

HEADLINE 1 = ONE ROW AND HEADLINE 2= ONE ROW
HEADLINE 1 [◇◇◇コーポレート銀行]
HEADLINE 2 [本店]

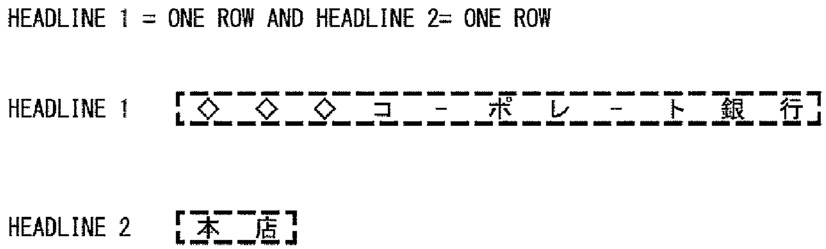

FIG. 69F

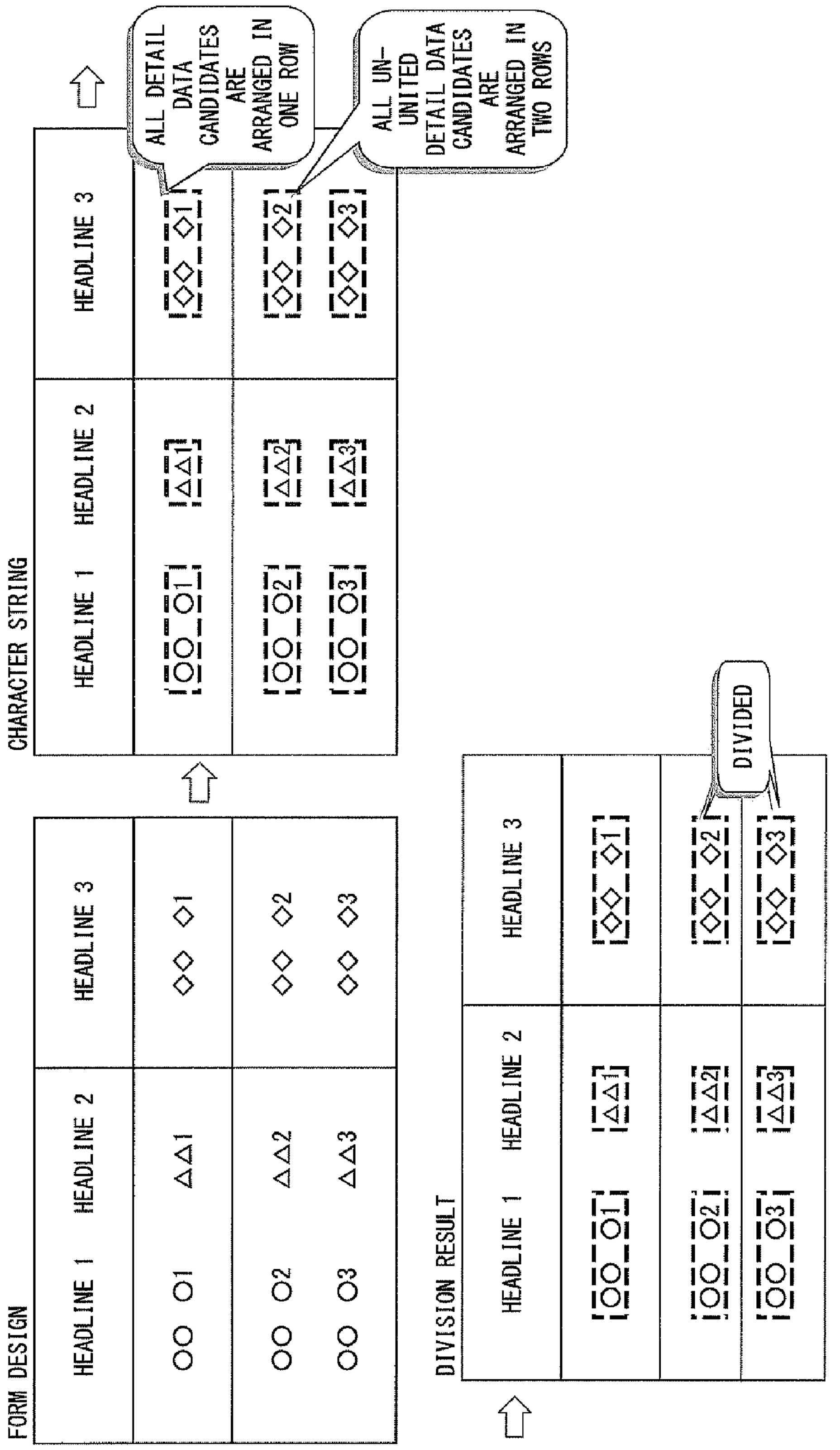
F I G. 7 0

? : LINE-ERASED CANDIDATE

| HEADLINE 1 | HEADLINE 2 | HEADLINE 3 | HEADLINE 4 |
|---|---|---|---|
| ◇◇◇1 | ○○1 | △△△△1 | □□1 |
| ◇◇◇2 | ○○2 | △△△△2 | □□□□<br>□2 |
| ◇◇◇3 | ○○3 | △△△△3 | □□3 |
| ◇◇◇4 | ○○4 | ? | □□4 |
| ◇◇◇◇◇◇<br>◇5 | ○○5 | △△△△5 | □□5 |
| ? | ? | ? | ? |
| ? | ? | ? | ? |
| ◇◇◇8 | ○○8 | △△△△8 | □□8 |

THE ENTIRE DETAIL IS A LINE-ERASED CANDIDATE

THE ENTIRE DETAIL IS A LINE-ERASED CANDIDATE

F I G. 7 1

HEADLINE CHARACTERS CANNOT BE RECOGNIZED DUE TO NOISE (DIRT, CREASES, ETC)

HEADLINE 「金額」 CANDIDATE IN CASE OF MT≥70

HEADLINE CANDIDATE IN WHICH DATA CANDIDATES EXIST

UNIQUELY DETERMINED ON THE BASIS OF THE ATTRIBUTE, FORMAT AND ACCESSORY INFORMATION OF DATA

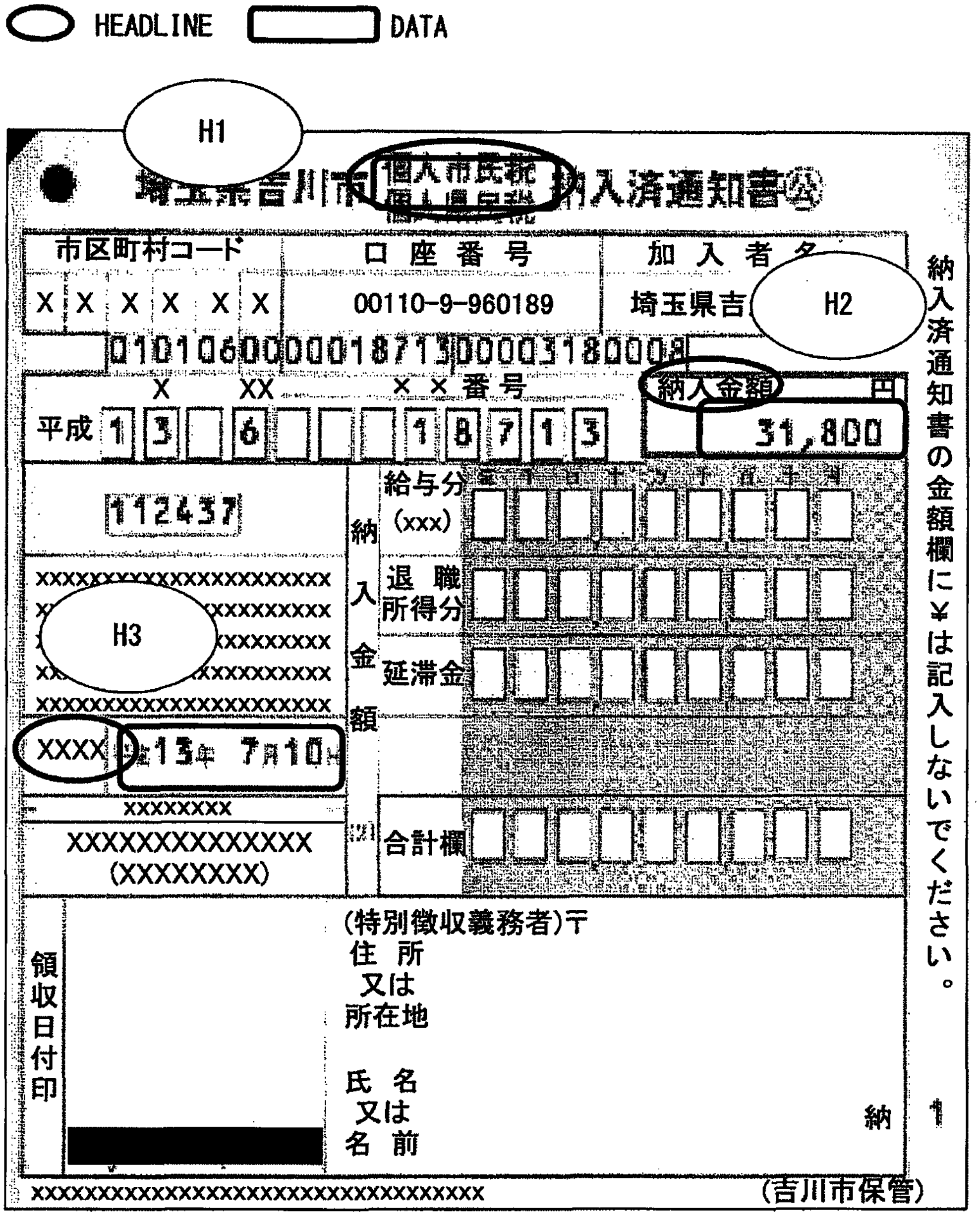
F I G. 7 3 A
○ HEADLINE ☐ DATA
H1: 個人市民税
H2: 埼玉県吉
H3: (address block)
埼玉県吉川市 個人市民税 納入済通知書
市区町村コード: X X X X X X
口座番号: 00110-9-960189
加入者名: 埼玉県吉...
0101060000018713000031800008
平成 1 3 6 1 8 7 1 3
納入金額 円: 31,800
112437
給与分 (xxx)
退職所得分
延滞金
合計欄
XXXX 13年 7月10
(特別徴収義務者)〒
住 所
又は
所在地
氏 名
又は
名 前
領収日付印
納入済通知書の金額欄に¥は記入しないでください。

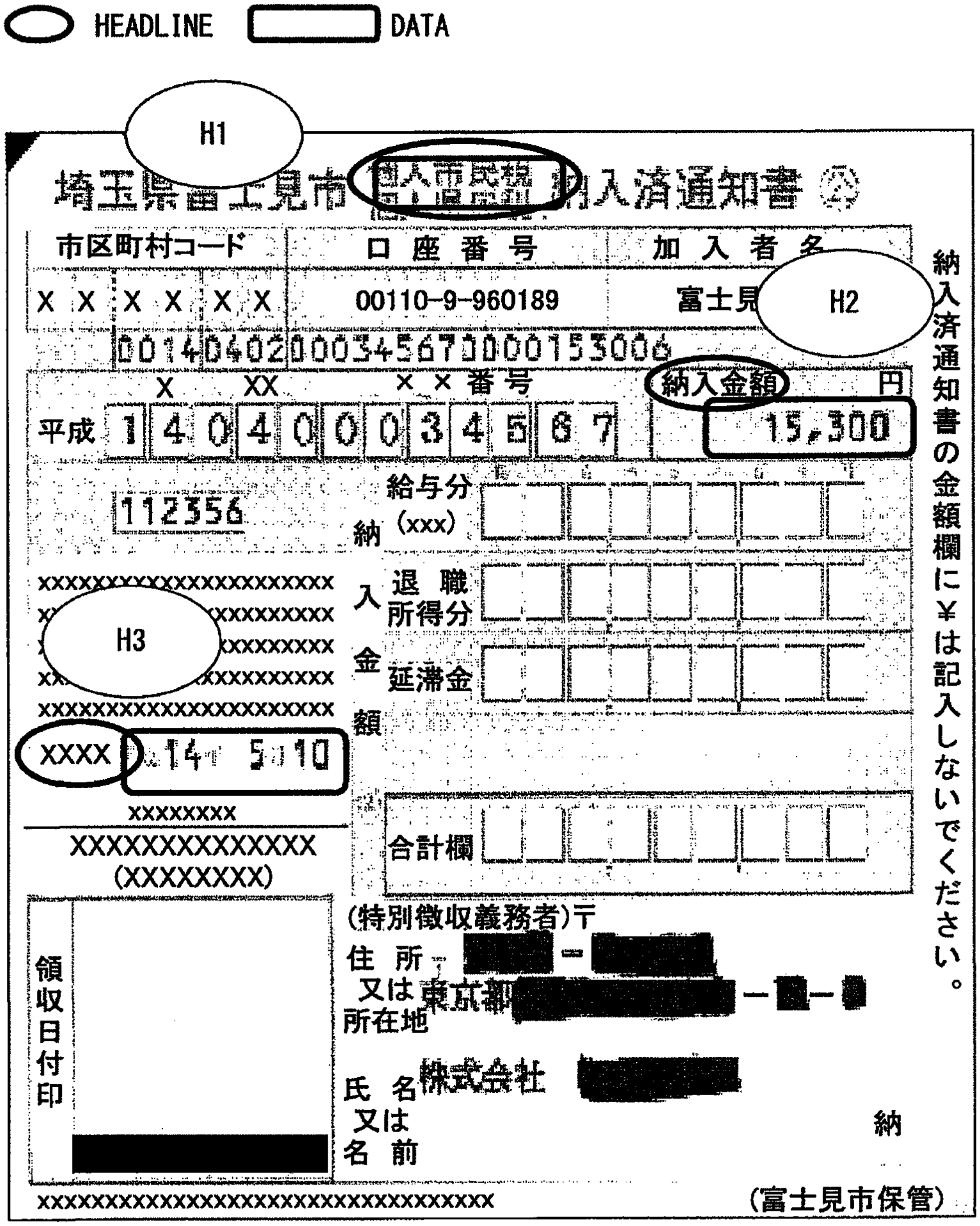
F I G. 7 3 B
○ HEADLINE  □ DATA
(H1) 埼玉県富士見市 [特別市民税] 納入済通知書 ②
| 市区町村コード | 口座番号 | 加入者名 |
|---|---|---|
| X X X X X | 00110-9-960189 | 富士見 (H2) |
0014040200034567D000153006
平成 | 1 4 | 0 4 | 0 0 3 4 5 6 7 | 納入金額 15,300 円
112356
給与分 (xxx)
退職所得分
延滞金
(H3) xxxxxxxxxxxxxxxx
xxxxxxxxxxxxxxxx
xxxxxxxxxxxxxxxx
[XXXX] 14 5 10
xxxxxxxx
XXXXXXXXXXXXX
(XXXXXXX)
合計欄
領収日付印
(特別徴収義務者) 〒
住所又は所在地  東京都 ■■-■-■
氏名又は名前  株式会社 ■■■■
納
xxxxxxxxxxxxxxxxxxxxxxxxxxxx  (富士見市保管)
納入済通知書の金額欄に¥は記入しないでください。
F I G. 7 3 B

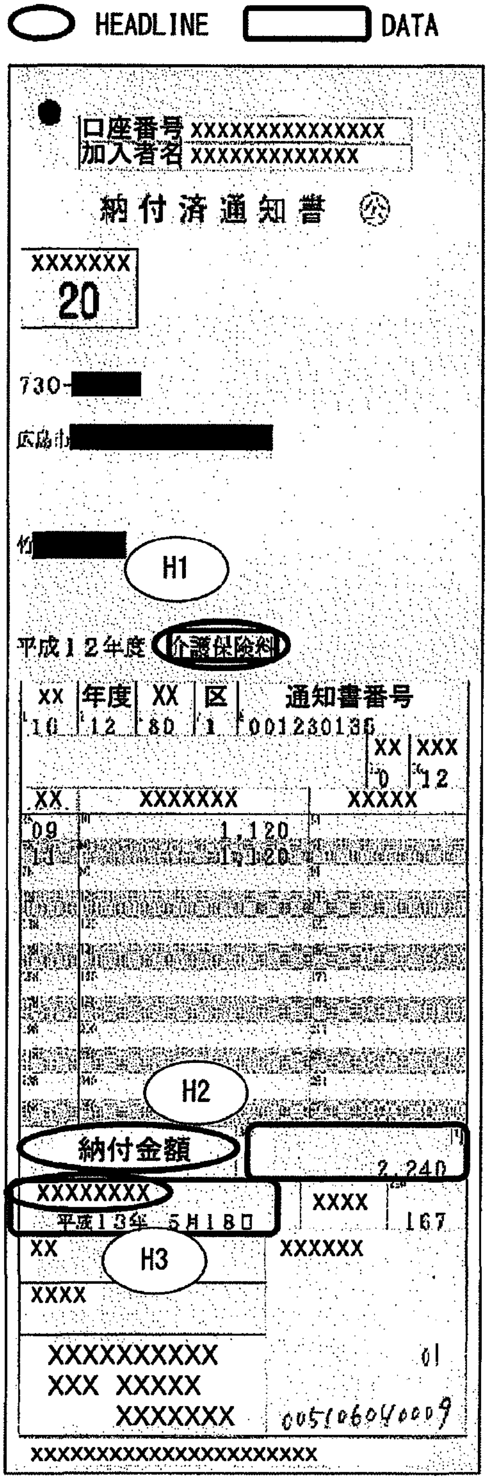
F I G. 7 3 C

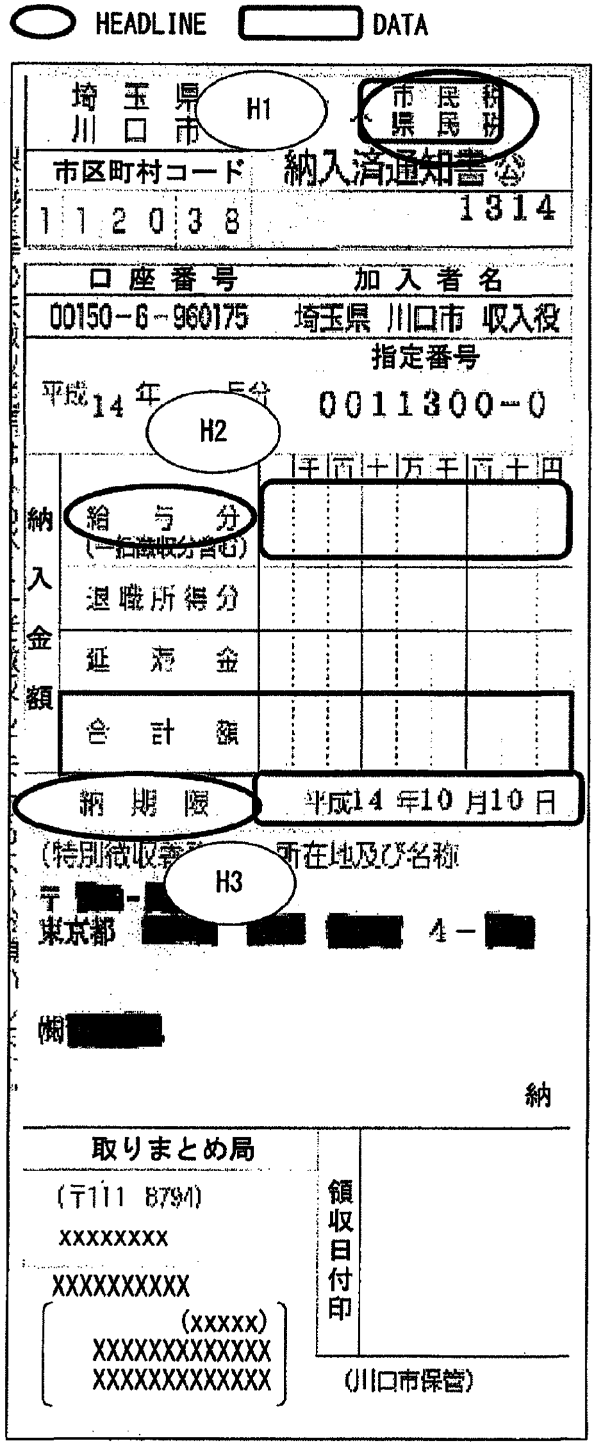
F I G. 7 3 D
○ HEADLINE ☐ DATA
埼玉県 H1 市民税
川口市    県民税
市区町村コード 納入済通知書
1 1 2 0 3 8            1314
口座番号   加入者名
00150-6-960175  埼玉県 川口市 収入役
                指定番号
平成14年  月分  0011300-0
         H2
         千百十万千百十円
納 給 与 分
入 (一括徴収分含む)
金 退職所得分
額 延 滞 金
   合 計 額
納 期 限   平成14年10月10日
(特別徴収義務者の所在地及び名称
〒■■-■■  H3
東京都■■■■■■■■ 4-■
㈱■■■■
                       納
取りまとめ局
(〒111 B794)           領
xxxxxxxx              収
XXXXXXXXXX            日
                      付
   (xxxxx)            印
  XXXXXXXXXXXX
  XXXXXXXXXXXX    (川口市保管)
F I G. 7 3 D

○ HEADLINE  ▭ DATA

H1
H2
H3

税額  9,300
平成13年 7月 2 1

XXX

XXXXXXXXXXXXXX
XXXXXXXXXXXXXX
XXXXXXXXXXXXXX
XXXXXXXXXXXXXX
XXXXXXXXXXXXXX
XXXXXXXXXXXXXX 10101  0000093004243

延滞金

古川市大字  様

個人コード | 通知書番号 | XX

13
XXXXXXXXXXX

XXXXXXXXXXXXXXXXXXXXXXXXXX
XXXXXXX    XXXXXXX    XXXXXXX

F I G. 7 3 F

○ HEADLINE ▭ DATA

| H1 | 固定資産税 都市計画税 | 納付済通知書 第4期 ㊙ 0910 |

XXXXXXXXXXXXXXXXXXXXXXXXXXXXX 01  11244504010404020228000001500082

130400000002030285310000150001720

| | ㊙ XXXX | XXXXXXXXX | XXXX | H3 | 様 |
|---|---|---|---|---|---|
| | XXXXXXXXXXXXXX | XXXXXXXXXXXX | XXXXXXXXX | | |
| XX番号 | 自治体コード | 所有者コード | | XXX | |
| | 112445 | 153017859 | | 領収 14-2.28 | |
| XX区分 | H2 | XX番号 | | XXX X | |
| 1001020101E2 | | 203028 | | | |

XXXXXXXXXX
XXXXXXXXX
XXXXXX

納付額     15000

④
領収日付印

延滞金

合計納付額

XXXXXXXX

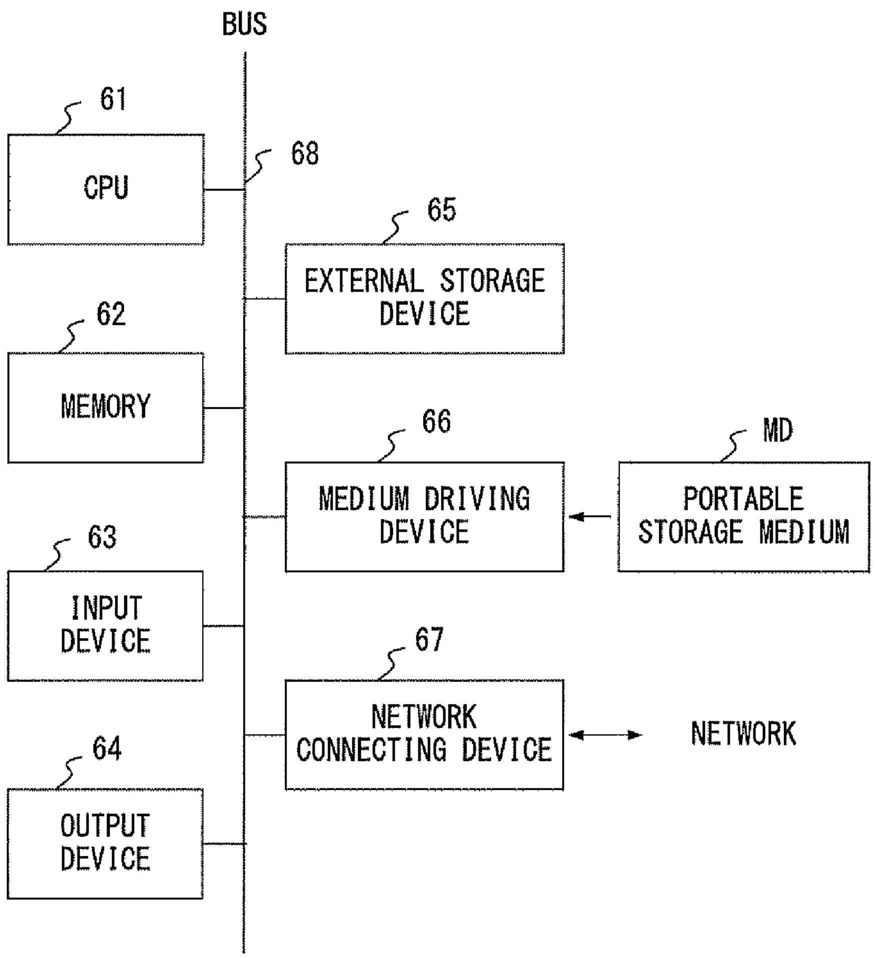
F I G. 74

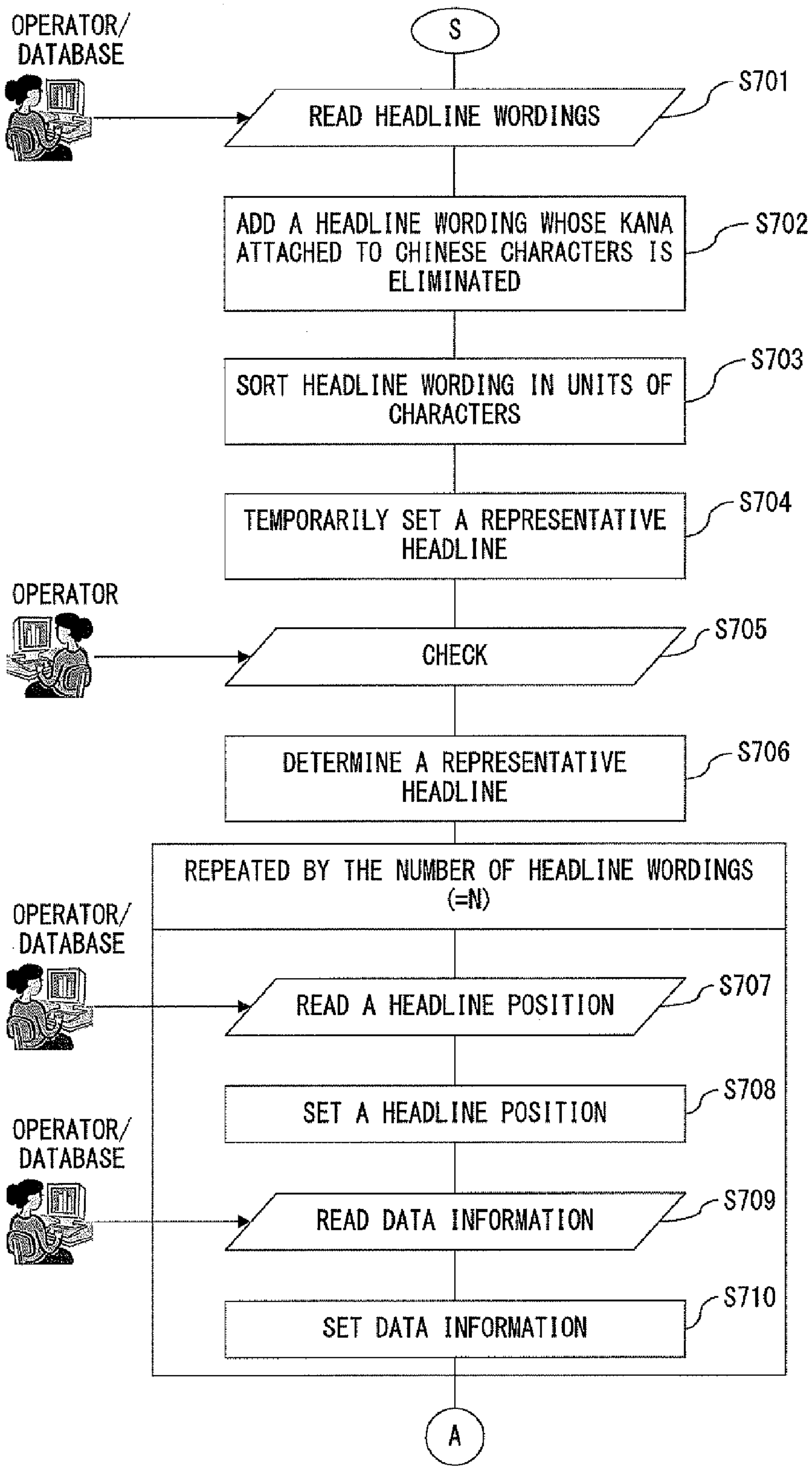
F I G. 7 6 A

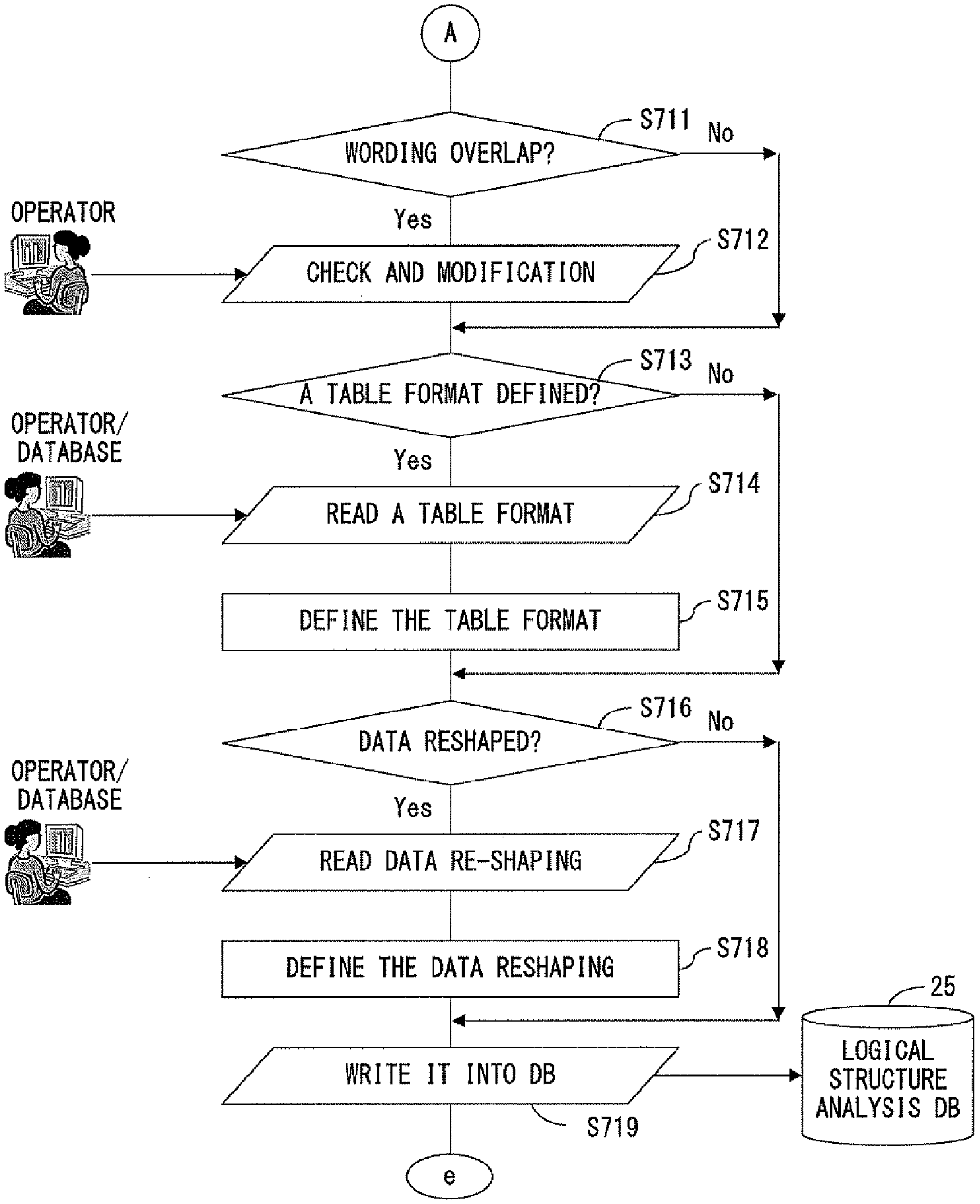
F I G. 7 6 B

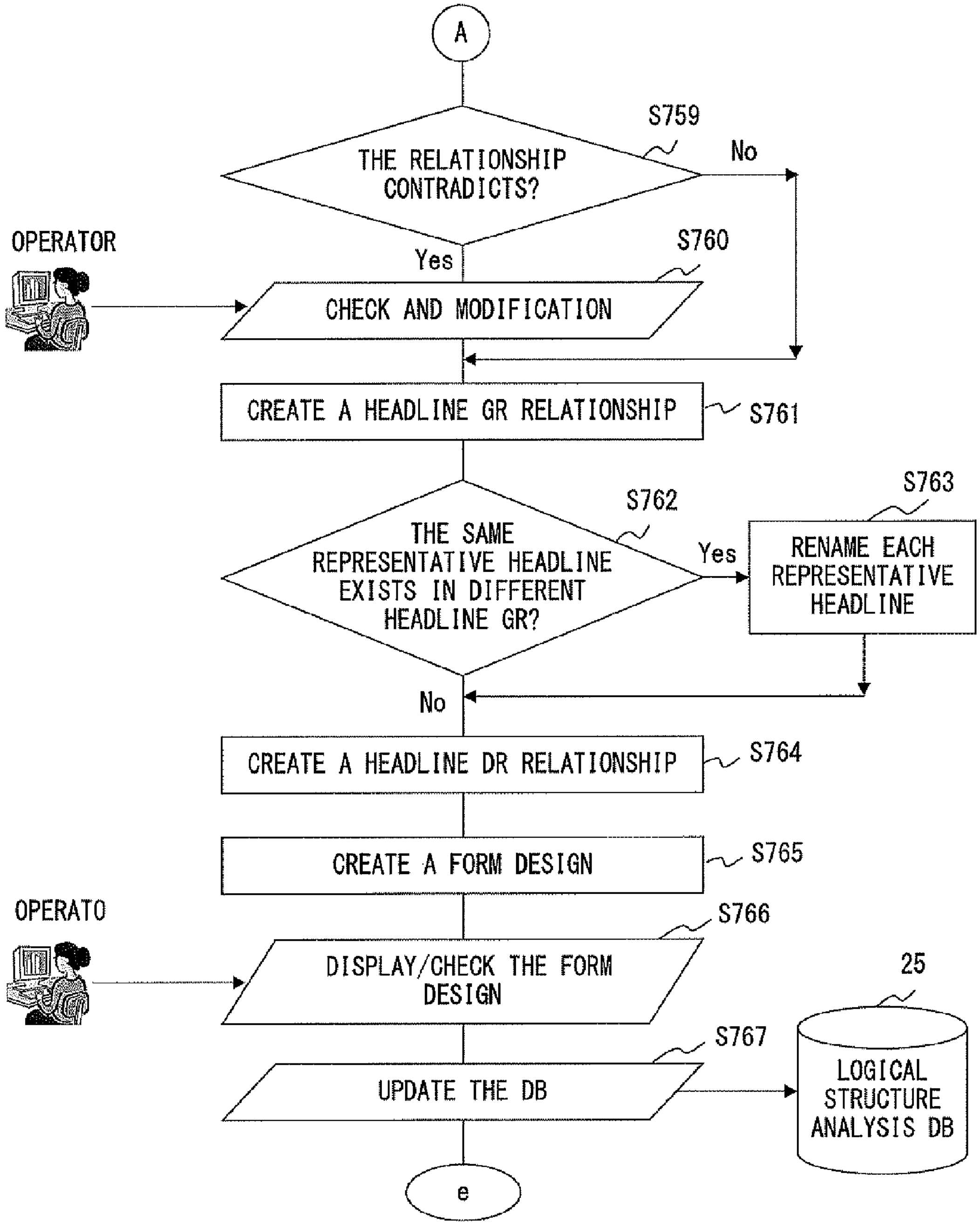
F I G. 7 7 B

LOGICAL STRUCTURE ANALYSIS DB

| REPRESENTATIVE HEADLINE | HEADLINE POSITION | DATA ATTRIBUTE | DATA FORMAT (NUMBER OF DIGITS, ETC) | DATA ACCESSORY SYMBOL PHRASE | DATA ACCESSORY SYMBOL POSITION | WORDING VARIATIONS |
|---|---|---|---|---|---|---|
| 市町村名 | 上部<br>下部 | 漢字<br>ひらがな | | | | *市<br>*村<br>—市町村<br>： |
| 金額 | 右部 | 数字 | | ¥<br>，、．<br>円<br>$<br>： | 先頭<br>中間<br>末尾<br>先頭<br>： | 金額<br>納付金額<br>納付額<br>税額<br>： |
| 口座番号 | 上部 | 数字 | 7 | | | 口座番号<br>口番<br>： |
| 郵便局口座番号 | 上部 | 数字 | 5-1-7 | -<br>= | 中間<br>中間<br>： | 口座番号<br>：<br>： |
| 受取人カナ | 中部 | カタカナ | | (カブ)<br>(ユウ) | 先頭・末尾<br>先頭・末尾 | フリガナ<br>姓名<br>受取人氏名<br>お受取人 |
| 依頼人カナ | 左部<br>中部 | カタカナ | | (カブ)<br>(ユウ) | 先頭・末尾<br>先頭・末尾 | フリガナ<br>姓名<br>依頼人氏名<br>ご依頼人 |
| 受取人名 | 中部 | 漢字<br>ひらがな<br>カタカナ<br>英字 | | (株)<br>(有) | 先頭・末尾<br>先頭・末尾 | 漢字<br>姓名<br>受取人氏名<br>お受取人 |
| 依頼人名 | 左部<br>中部 | 漢字<br>ひらがな<br>カタカナ<br>英字 | | (株)<br>(有) | 先頭・末尾<br>先頭・末尾 | 漢字<br>姓名<br>依頼人氏名<br>ご依頼人 |
| ： | | ： | ： | ： | ： | ： |

* IS THE CHARACTER STRING OF DATA ATTRIBUTE

- IS A PHRASE NOT INCLUDED AND, FOR EXAMPLE, 「市町村」 IS NOT A HEADLINE

1) OVERLAP

2) OVERLAP

3) OVERLAP

F I G. 7 8 A

FORM DESIGN IN WHICH PHRASES OVERLAP
WORDING OVERLAP IN ANOTHER FORM OR HEADLINE
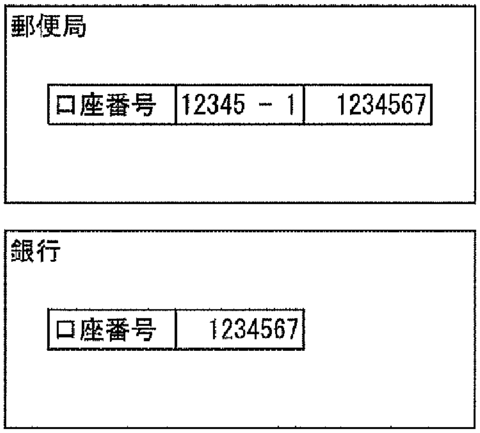
FIG. 78B
PHRASES OVERLAP IN ANOTHER HEADLINE
HEADLINE WORDING OF THE SAME 「フリガナ」 AND「姓名」
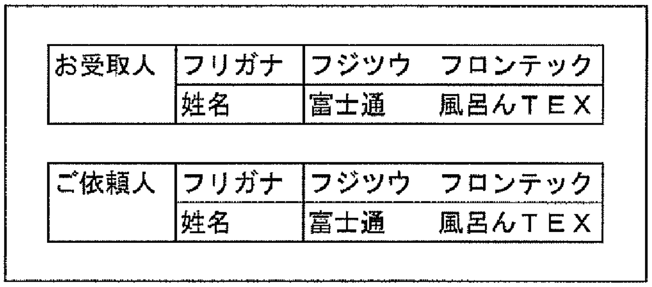
FIG. 78C
SINCE ONE HEADLINE WORDING CONTAINS A PLURALITY OF PIECES OF DATA, THE HEADLINE WORDING OF DATA OVERLAP
THE UPPER AND LOWER COLUMNS ARE A「受取人カナ」 COLUMN AND A 「受取人名」COLUMN, RESPECTIVELY
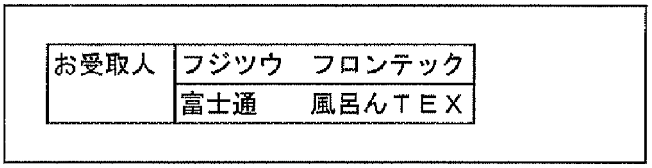

DEFINITION

SINGLE FORM

| REPRESENTATIVE HEADLINE | ∫ ∫ | NUMBER OF DATA | DATA ATTRIBUTE | ∫ ∫ |
|---|---|---|---|---|
| 受取人名 | ∫ ∫ | 1 | | ∫ ∫ |
| 金額 | ∫ ∫ | 1 | | ∫ ∫ |
| 口座番号 | ∫ ∫ | 1 | | ∫ ∫ |

ＦＩＧ．７９Ａ１

PLURAL-ENTRY FORM

| REPRESENTATIVE HEADLINE | ∫ ∫ | NUMBER OF DATA | DATA ATTRIBUTE | ∫ ∫ |
|---|---|---|---|---|
| 受取人名 | ∫ ∫ | 1以上 | | ∫ ∫ |
| 金額 | ∫ ∫ | 1以上 | | ∫ ∫ |
| 口座番号 | ∫ ∫ | 1以上 | | ∫ ∫ |
| 品名 | ∫ ∫ | 1以上 | | ∫ ∫ |
| 値引額 | ∫ ∫ | 1以上 | | ∫ ∫ |
| 見積額 | ∫ ∫ | 1以上 | | ∫ ∫ |

ＦＩＧ．７９Ａ２

PLURAL-ENTRY FORM (NON-UNIQUE NUMBER OF DETAILS)

| REPRESENTATIVE HEADLINE | ∫ ∫ | NUMBER OF DATA | グループ番号 | DATA ATTRIBUTE | ∫ ∫ |
|---|---|---|---|---|---|
| 受取人名 | ∫ ∫ | 1以上 | 1 | | ∫ ∫ |
| 金額 | ∫ ∫ | 1以上 | 1 | | ∫ ∫ |
| 口座番号 | ∫ ∫ | 1以上 | 1 | | ∫ ∫ |
| 品名 | ∫ ∫ | 2以上 | 2 | | ∫ ∫ |
| 値引額 | ∫ ∫ | 2以上 | 2 | | ∫ ∫ |
| 見積額 | ∫ ∫ | 2以上 | 2 | | ∫ ∫ |

ＦＩＧ．７９Ａ３

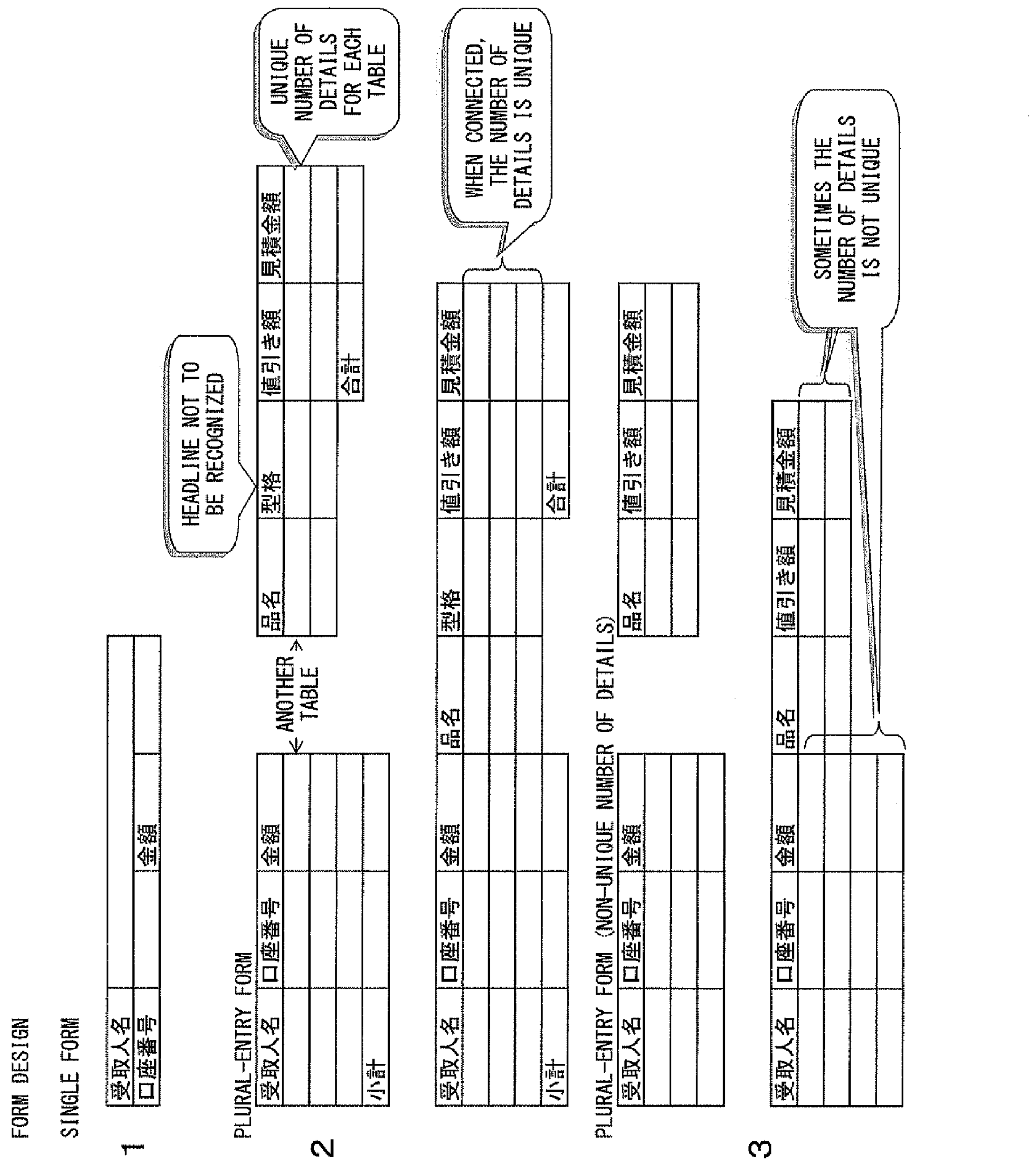

FORM DESIGN

SINGLE FORM

FIG. 79B1

| 受取人名 | 口座番号 | 金額 |
|---|---|---|
| | | |

PLURAL-ENTRY FORM

FIG. 79B2

HEADLINE NOT TO BE RECOGNIZED

← ANOTHER TABLE →

UNIQUE NUMBER OF DETAILS FOR EACH TABLE

| 受取人名 | 口座番号 | 金額 |
|---|---|---|
| | | |
| 小計 | | |

| 品名 | 値引き額 | 見積金額 |
|---|---|---|
| | | |
| | 合計 | |

PLURAL-ENTRY FORM (NON-UNIQUE NUMBER OF DETAILS)

FIG. 79B3

WHEN CONNECTED, THE NUMBER OF DETAILS IS UNIQUE

| 受取人名 | 口座番号 | 金額 |
|---|---|---|
| | | |
| 小計 | | |

| 型格 | 値引き額 | 見積金額 |
|---|---|---|
| 品名 | | |
| | | |
| | 合計 | |

| 品名 | 値引き額 | 見積金額 |
|---|---|---|
| | | |

SOMETIMES THE NUMBER OF DETAILS IS NOT UNIQUE

| 受取人名 | 口座番号 | 金額 |
|---|---|---|
| | | |
| | | |

| 品名 | 値引き額 | 見積金額 |
|---|---|---|
| | | |
| | | |
| | | |

DATA SEPARATING CHARACTER

| HEADLINE GR | NUMBER | DATA OUTPUT FORMAT |
|---|---|---|
| 振込先 | = | 見出し 銀行名 のデータ 区切文字 銀行 見出し 支店名 のデータ 区切文字 支店 |
| 種目 | 1) | 見出し 種目 のデータ のカタカナ |
| | 2) | 見出し 種目 のデータ が数字 ⇒ 1=フ、 2=ト、 else=ホカ |
| 口座番号 | = | 見出し 口座番号 のデータ |
| : | | |

THE NUMBER 「=」 OF VARIATIONS OF A DATA OUTPUT FORMAT IS ONE

USER INPUT DATA

| No. | UPPER/LEFT | LOWER/RIGHT |
|---|---|---|
| 1 | 銀行名 | 支店名 |
| 2 | 振込先 | 銀行名 |
| 3 | 振込先 | 支店名 |
| 4 | 振込先 | 種目 |
| 5 | 振込先 | 口座番号 |
| 6 | 種目 | 口座番号 |
| | : | : |
| 10 | 受取人 | 振込先 |
| 11 | 受取人 | 受取人名 |
| 12 | 受取人 | 金額 |
| 13 | 受取人 | 口座番号 |
| | : | : |
| 20 | 依頼人 | 口座番号 |
| 21 | 依頼人 | 依頼人名 |
| | : | : |
| 30 | 品名 | 型格 |
| 31 | 型格 | 品名 |
| | : | : |
| 27 | 種目 | 口番 |
| | : | : |

HEADLINE GR

| HEADLINE GR | REPRESENTATIVE HEADLINE | DATA POSITION ORDER |
|---|---|---|
| 振込先 | 銀行名 | 1 |
| | 支店名 | 2 |
| | 種目 | 3 |
| | 口座番号 | 4 |

TITLE DR

| HEADLINE DR | HEADLINE GR/ REPRESENTATIVE HEADLINE | DATA POSITION ORDER |
|---|---|---|
| 受取人 | 振込先 | 1 |
| | 受取人名 | 2 |
| | 金額 | 3 |

DEFINITION
ORDER

| HEADLINE GR | REPRESENTATIVE HEADLINE | DATA POSITION ORDER |
|---|---|---|
| 振込先 | | |
| | 銀行名 | 1 |
| | 支店名 | 2 |
| | 種目 | 3 |
| | 口座番号 | 4 |

FIG. 82A1

RELATIONSHIP BETWEEN ORDER AND DESIGN
DATA POSITION IN CASE NO REPRESENTATIVE HEADLINE EXISTS OTHER THAN A HEADLINE GR (FIGURES INDICATE DATA POSITION ORDER)

RIGHT DIRECTION

| | | | | |
|---|---|---|---|---|
| 見出しGR | 1 | 2 | 3 | 4 |

DOWNWARD DIRECTION

| | |
|---|---|
| 見出しGR | 1 |
| | 2 |
| | 3 |
| | 4 |

RIGHT/LOWER DIRECTION

| | | |
|---|---|---|
| 見出しGR | 1 | 2 |
| | 3 | 4 |

LOWER/RIGHT LOWER DIRECTION

| | | |
|---|---|---|
| 見出しGR | 1 | 3 |
| | 2 | 4 |

BOTH HAVE A POSSIBILITY

FIG. 82A2

FORM DESIGN

| | | | | |
|---|---|---|---|---|
| 振込先 | ○○○ | △△△ | ◇◇◇ | □□□ |
| | 1 | 2 | 3 | 4 |

FIG. 82A3

RESULT

| | | |
|---|---|---|
| 銀行名 | ⇒ | ○○○ |
| 支店名 | ⇒ | △△△ |
| 種目 | ⇒ | ◇◇◇ |
| 口座番号 | ⇒ | □□□ |

FIG. 82A4

EXAMPLE OF THE SAME DATA POSITION ORDER
THE SAME ORDER
| HEADLINE GR | REPRESENTATIVE HEADLINE | DATA POSITION ORDER |
|---|---|---|
| 連絡先 | | |
| | 郵便番号 | 1 |
| | 住所 | 2 |
| | 電話番号 | 3 |
| | e-mail | 3 |
THERE IS A POSSIBILITY THAT BOTH CAN BE IN A HIGHER ORDER
F I G. 8 2 B 1
RELATIONSHIP BETWEEN ORDER AND DESIGN
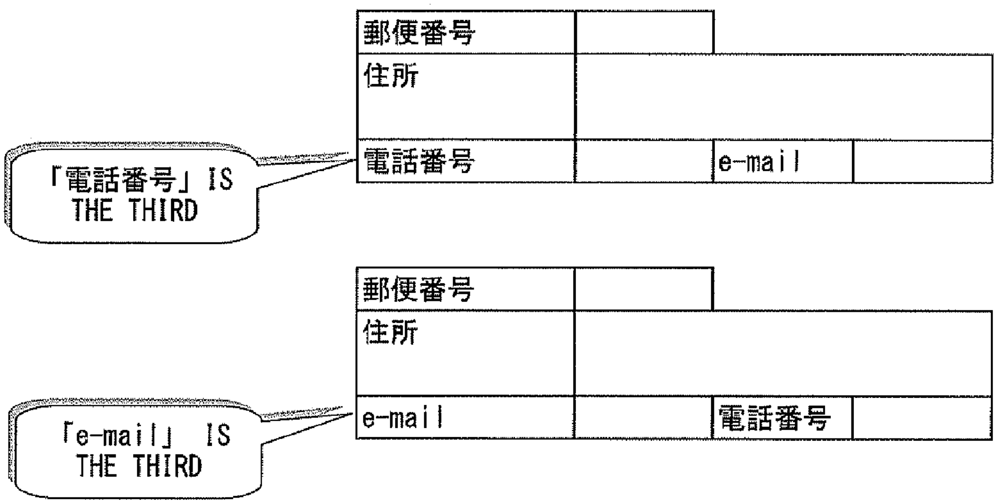
F I G. 8 2 B 2

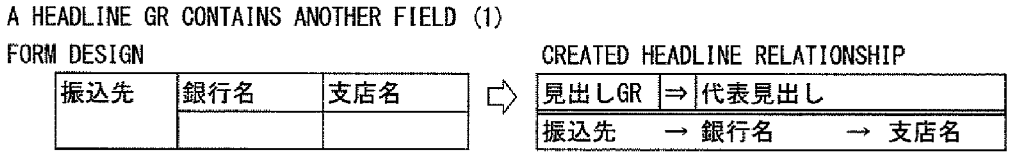
F I G. 8 3 A
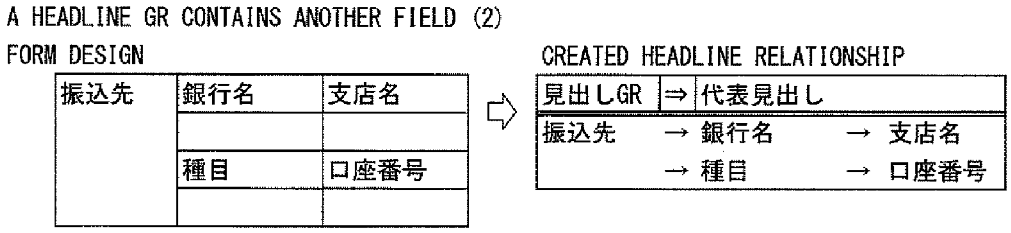
F I G. 8 3 B
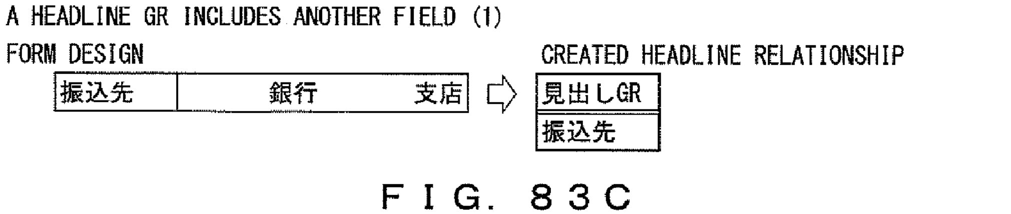
F I G. 8 3 C
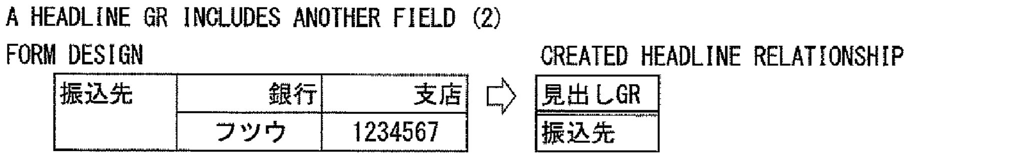
F I G. 8 3 D

A HEADLINE INCLUDES A HEADLINE GR (1)
FORM DESIGN

| 振込先銀行名 | |
|---|---|
| 振込先支店名 | |

⇨

CREATED HEADLINE RELATIONSHIP

| 代表見出し | |
|---|---|
| 銀行名 | → 支店名 |

UPDATED HEADLINE WORDING VARIATIONS

| 代表見出し | 文言バリエーション |
|---|---|
| 銀行名 | 振込先銀行名、銀行名 |
| 支店名 | 振込先支店名、支店名 |

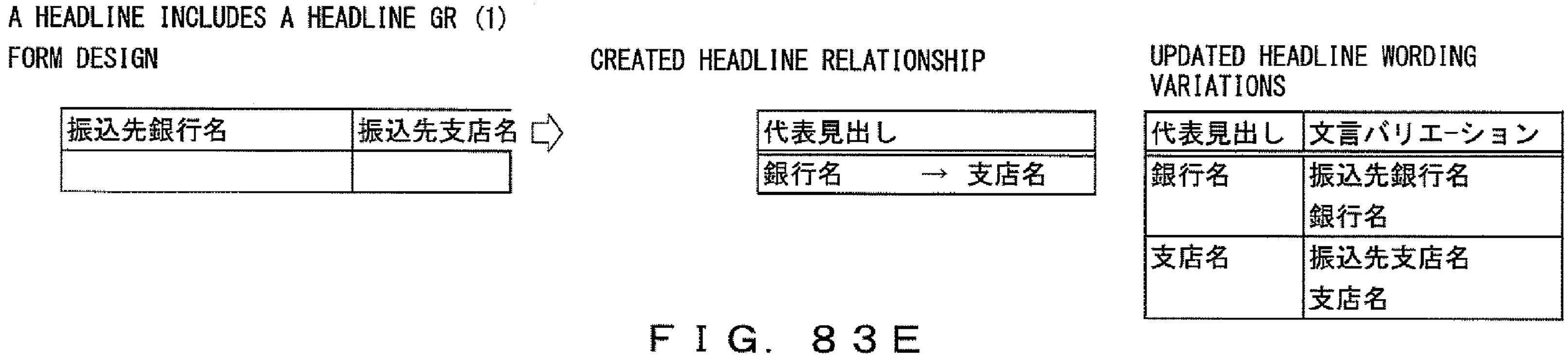

FIG. 83E

A HEADLINE INCLUDES A HEADLINE GR (2)
FORM DESIGN

| 振込先 | 銀行 | 支店 |
|---|---|---|

⇨

CREATED HEADLINE RELATIONSHIP

| 見出しGR |
|---|
| 振込先 |

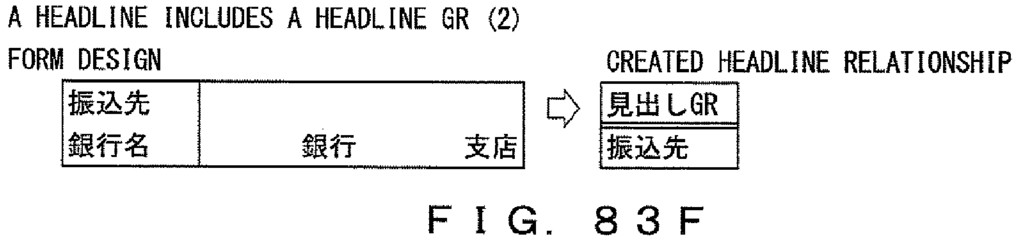

FIG. 83F

NO HEADLINE GR
FORM DESIGN

| 銀行名 | 支店名 |
|---|---|

⇨

CREATED HEADLINE RELATIONSHIP

| 見出しGR | ⇒代表見出し |
|---|---|
| 振込先 | ←銀行名 → 支店名 |

VIRTUALLY CREATED

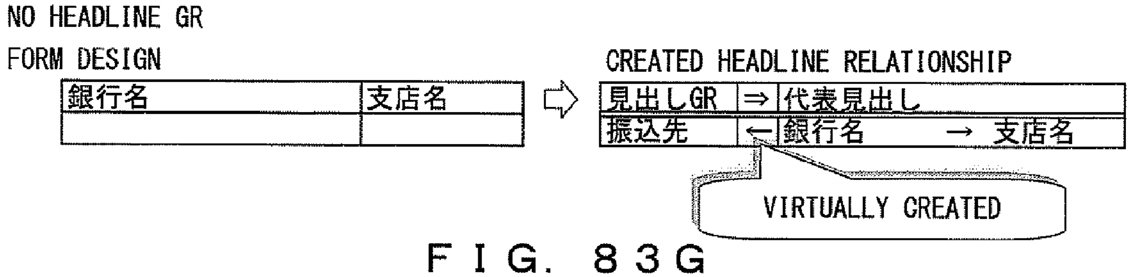

FIG. 83G

| HEADLINE DR | HEADLINE GR/REPRESENTATIVE HEADLINE | DATA POSITION ORDER |
|---|---|---|
| 依頼人 | | |
| | 依口座番号 | 1 |
| | 依頼人名 | 2 |
| 受取人 | | |
| | 振込先 | 1 |
| | 受口座番号 | 2 |
| | 受取人名 | 3 |
| | 金額 | 4 |
F I G. 8 4 A
RELATIONSHIP BETWEEN ORDER AND DESIGN
DATA POSITION IN CASE NO REPRESENTATIVE HEADLINE EXISTS OTHER THAN A HEADLINE GR
(FIGURES INDICATE DATA POSITION ORDER)
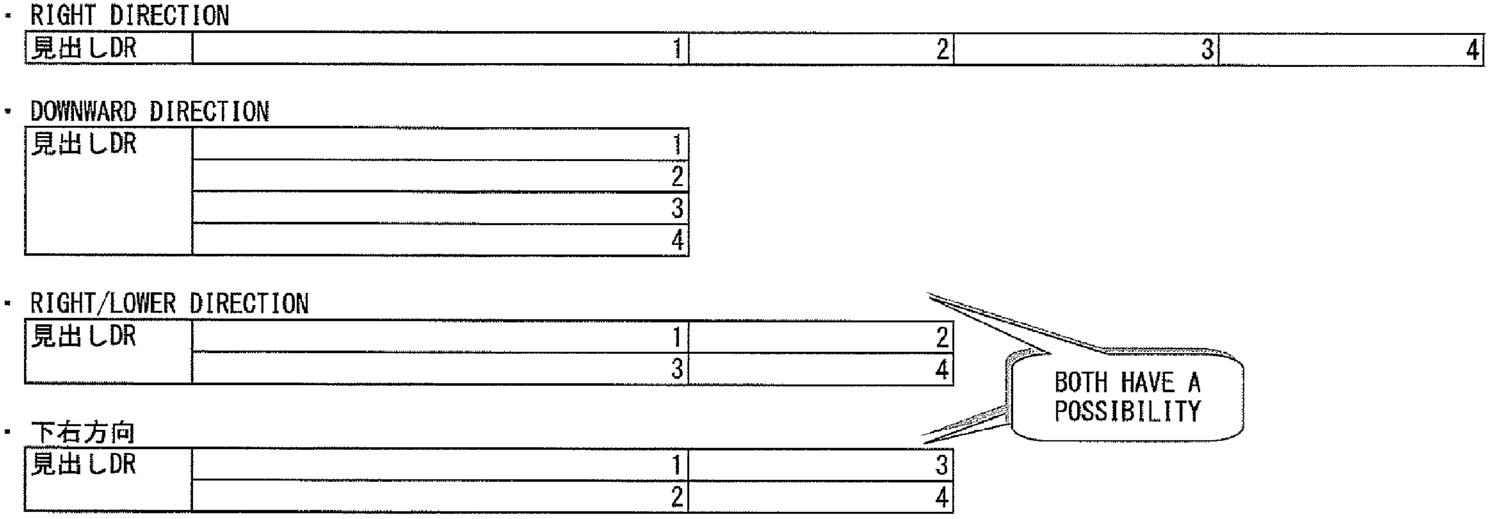
F I G. 8 4 B

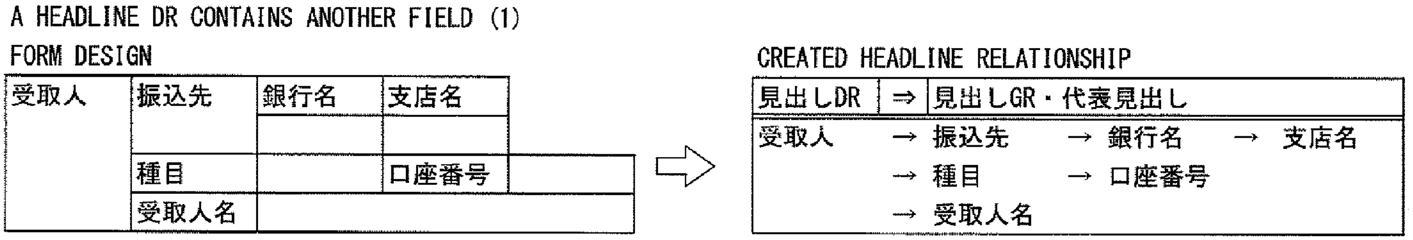
F I G. 8 5 A
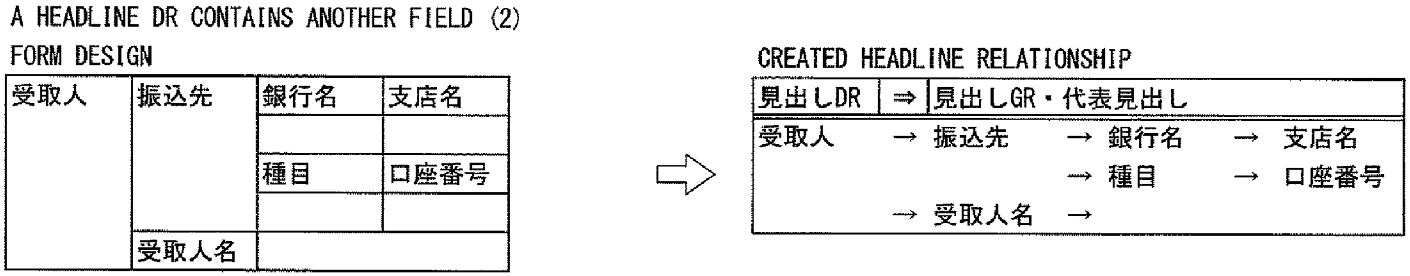
F I G. 8 5 B
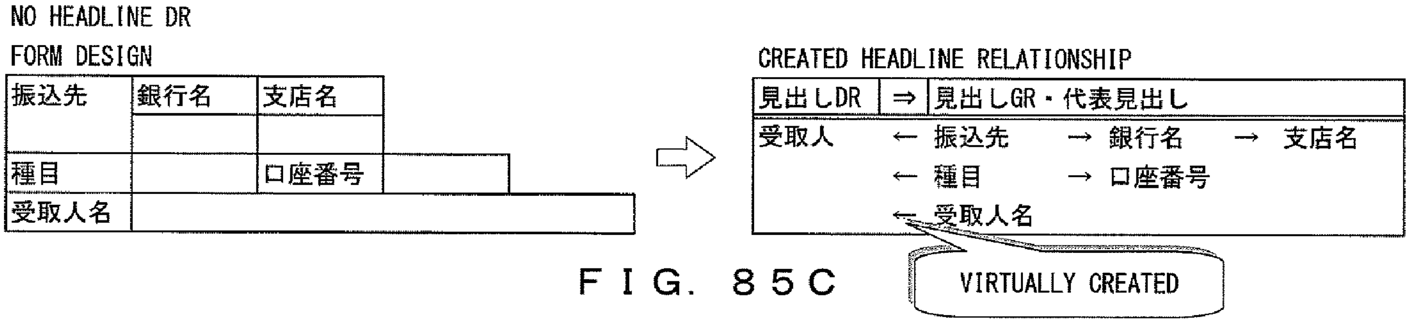
F I G. 8 5 C

FORM RECOGNITION APPARATUS, METHOD, DATABASE GENERATION APPARATUS, METHOD, AND STORAGE MEDIUM

CROSS-REFERENCE TO RELATED APPLICATION

This application is based upon and claims the benefit of priority of the prior Japanese Patent Application No. 2008-162110, filed on Jul. 20, 2008, the entire contents of which are incorporated herein by reference.

FIELD

The embodiments discussed herein are related to a technology for recognizing a character string existing in an arbitrary table structure of a form.

BACKGROUND

In an enterprise, a form is used in various business fields. For example, in a financial institute, a plurality of forms is prepared and the desired service of a customer is provided on the information written in a form by the customer. When a center collectively performs such a process for providing the service, the form is digitized and transferred to the center.

In the digitalization of a form, usually the contents entered into the form are recognized (character recognition). A form recognition apparatus recognizes the contents entered into a form by reading its digitalized image using an image reading device. It is common that the form transferred to the center, that is, the recognition result by the form recognition apparatus can be corrected by an operator, if necessary.

In a form, information (character strings) is arranged in an arbitrary table structure. Therefore, as a method for recognizing a character string to be recognized in a form image, there is a method for registering the layout structure of a form to be recognized. According to this method, a region where a character string to be recognized exists in a read form image can be immediately specified using the registered layout structure. A layout structure corresponding to a read form image can be also automatically extracted from a registered layout structure (Japanese Laid-open Patent Publication No. 2004-164674). The features of a layout structure can be also automatically extracted from a form image and the layout structure can be also automatically registered (Japanese Patent No. 3088019).

Usually, the number of types of forms handled in an enterprise and the like is not one. Generally, many types exist. The design (layout) of a form is also often modified for some reason. In a financial institute, a customer does not always use a prepared form. Specifically, a customer sometimes requests a service using its own form. For this reason, there is a form recognition apparatus capable of recognizing a form, that is, recognizing content mentioned on the form without registering the layout structure of a specific form in conventional form recognition apparatuses (Japanese Laid-open Patent Publication No. H9-274634 (hereinafter called "Patent document 1"), Japanese Laid-open Patent Publication No. H10-116314 (hereinafter called "Patent document 2") and Japanese Laid-open Patent Publication No. 2006-134106 (hereinafter called "Patent document 3"). However, any conventional form recognition apparatus described in respective Patent documents 1 through 3 has low versatility and is not practical as follows.

In the conventional form recognition apparatus described in Patent document 1, a field name to be read a form and information for recognizing the content of the field name are prepared and the content of each field are recognized. However, in some form, a plurality of field names is assigned to one piece of data (description). Alternatively, in some form, a plurality of the same field names is entered for a plurality of pieces of different usage. Therefore, the types of a form that can be recognized are limited.

In the conventional form recognition apparatus described in Patent document 2, presuming that all field names are arranged in one frame, characters are recognized by to distinct a frame having predetermined regularity and other frames as an field frame and data frames, respectively. However, in some form, a character string indicating a field name is not arranged within a frame. Alternatively, in some form, a plurality of types of character strings is arranged in one frame. The latter case corresponds to, for example, a form in which a customer describes data within a frame where a printed field name is arranged.

In the conventional form recognition apparatus described in Patent document 3, for each type of a form, field names mentioned on the form are grouped, a group to which the field name existing in a read form belongs is extracted and a form type (logical structure) candidate is estimated from the extracted group. However, since one or more field names belong to each group, each group has a small amount of information. This is because the information of each group is related to all field names belonging to the group. For this reason, the type of a form can be recognized only at a level where it can be only determined which it is, an order sheet or an entry application form.

In the conventional form recognition apparatus described in Patent document 3, by collating the data type of each field name with a data type indicated by schema information corresponding to the group to which the field name belongs, it is checked whether they coincide with each other and the check result is used to recognize the type of the form. However, the check can be actually used only to specify description (data) corresponding to the field name. This is because there is usually a relationship which is established by very high possibility, between a field name and a data type of the field name. More specifically, this is because in an field name that can be grouped into one, such as "金額" (An amount or an amount of money. A reading in Japanese is "kin"), "単価" (A unit price. A reading in Japanese is "tanka") and "納付金額" (A payment amount of money. A reading in Japanese is "noufukingaku"), any piece of data is usually expressed numerically.

In a form, there is often a plurality of pieces of data that may correspond to a field name. Therefore, usually it is necessary to specify a correspondence relationship between a field name and data. Since a data type often varies depending on a field name, a data type can be used as information for specifying data corresponding to a field name (Patent document 1). Naturally, the above-described collation can be conducted only after specifying the corresponding relationship. Therefore, if the collation can be conducted, it is necessary that a region mentioned on data corresponding to a field name for each field name can be specified in advance. Alternatively, it is necessary that a form has such a simple design that there is no need to specify it. For this reason, it is understood that the type of a form can be recognized only at a very low level.

As other technical reference literatures, there are Japanese Laid-open Patent Publication No. H11-110479, Japanese Laid-open Patent Publication No. 2000-339406, Japanese Laid-open Patent Publication No. 2004-334913 and Japanese Patent No. 3465667.

SUMMARY

Accordingly, it is an object of the invention to provide a technology for enabling information for recognizing description contents to correspond to a wide range of forms without registering the information for recognizing description contents for each form having different designs.

Any form recognition apparatus that can be configured by applying the present invention is used to recognize a character string existing in a form in an arbitrary table structure and includes the following units.

According to one aspect of the invention, a form recognition apparatus includes an image acquisition unit for obtaining the digitized form image g a form, a character string recognition unit for recognizing a character string existing in the form image obtained by the image acquisition unit, a character string extraction unit for extracting a headline wording being a predetermined character string from character strings recognized by the character string recognition unit, a table structure determination unit for determining a table structure existing in the form image, on the basis of the headline wording extracted by the character string extraction unit and the arrangement of the headline wordings in the form image and a correspondence relationship specification unit for specifying a correspondence relationship between a headline wording and a character string other than the headline wording, recognized by the character string recognition unit, using the determination result of the table structure by the table structure determination unit.

According to another aspect of the invention, a form recognition apparatus includes an image acquisition unit for obtaining a form image obtained by digitizing a form, a character string recognition unit for recognizing a character string existing in a form image obtained by the image acquisition unit, a character string extraction unit for extracting a headline wording being a predetermined character string from character strings recognized by the character string recognition unit, a position specification unit for specifying a position in a form image where a headline wording not recognized by the character string recognition unit exists, a phrase creation unit for creating a headline wording that should exist in the position specified by the position specification unit and a correspondence relationship specification unit for specifying a correspondence relationship between the headline wording including the headline wording created by the phrase creation unit, and character strings other than the headline wordings recognized by the character string recognition unit.

According to another aspect of the invention, a form recognition apparatus includes an image acquisition unit for obtaining a form image obtained by digitizing a form, a storage unit for storing a database in which a headline wording that may appear in a unit table structure in which one or more pieces of data is defined in a hierarchical structure is entered into a form as a unit, for each unit table structure, a character string recognition unit for recognizing a character string existing in a form image obtained by the image acquisition unit, a character string extraction unit for extracting a headline wording being a predetermined character string from character strings recognized by the character string recognition unit, referring to the database stored in the storage unit, a headline addition unit for extracting the range of unit table structure existing in the form image, on the basis of the extraction result by the character string extraction unit, focusing on at least one of the headline wording recognized within the extracted range and a character strings recognized as data in the unit table structure and adding a headline wording corresponding to the data and a correspondence relationship specification unit for specifying a correspondence relationship between the headline wording including the headline wording created by the phrase creation unit, and character strings other than the headline wordings recognized by the character string recognition unit.

According to another aspect of the invention, a database creation support apparatus supports the creation of a database used for the above-described form recognition apparatus to recognize a character string in a form and includes a phrase input unit for inputting headline wordings and a hierarchical structure creation unit for creating a hierarchical structure among the headline wordings inputted by the phrase input unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1 is a functional configuration of a form recognition apparatus according to this preferred embodiment;

FIGS. 3A-C are a flowchart of a keyword extraction process;

FIG. 4 is a flowchart of a headline score calculation process;

FIG. 6 is a flowchart of a form type determination process;

FIGS. 7A&B are a flowchart of a table structure determination process;

FIG. 9 is a flowchart of a cell correction process;

FIG. 10 is a flowchart of a no-ruled line table structure analysis;

FIGS. 11A-C are a flowchart of a first logical structure analysis process;

FIG. 12 is a flowchart of an unread headline restoration process;

FIG. 14 is a flowchart of a duplication examination process;

FIG. 19 is a flowchart of a bottom field candidate extraction process;

FIG. 21 is a flowchart of a plural field candidate extraction process;

FIG. 22 is a flowchart of a field analysis necessary/unnecessary determination process;

FIGS. 23A-C are a flowchart of a second logical structure analysis process;

FIG. 24 is a form example (No. 1);

FIG. 25 is a form example (No. 2);

FIG. 26 is a form example (No. 3);

FIG. 27 is a form example (No. 4);

FIG. 28 is a form example (No. 5);

FIG. 29 is a form example (No. 6);

FIG. 30 is a form example (No. 7);

FIGS. 32A-C explain the meaning of a change depending on the design of a headline wording having the same description;

FIGS. 33A1-D explain an example of a positional relationship between a headline wording and data corresponding to it;

FIGS. 34A-B explains positional relationship examples between a headline wording and a plurality of data corresponding to the headline wording.

FIGS. 35A-G are variations of a table structure, the headline GR and headline DR of which are focused (No. 1);

FIGS. 36A-C are variations of a table structure, the headline GR and DR of which are focused (No. 2);

FIGS. 37A1-C2 explain the analysis contents of the table structure analysis process;

FIGS. 40A-B2 are examples of the calculated headline score of the extracted headline wording;

FIGS. 41A-D explain examples of a comment sentence;

FIG. 42 is an example of the contents registered in a keyword DB 31;

FIGS. 43A-C are examples of the calculated headline score of the extracted headline wording;

FIGS. 44A&B explain a headline score MTn calculated when the contents illustrated in FIG. 43C is stored in a logical structure analysis DB 25;

FIGS. 45A1-C2 explain the difference between cells created by different types of a form;

FIGS. 46A1-B4 explain the determination method of a form type by the arrangement of a headline wording;

FIGS. 47A&B explain cell correction by the determination result of a form type;

FIGS. 49A-E are examples of the contents of the re-extraction process by headline position information;

FIGS. 50A-B2 are other examples of the contents of the re-extraction process by headline position information;

FIGS. 51A-B2 explain a first example of the re-extraction of a headline wording of the re-extraction process by an exclusive relationship and data information;

FIGS. 52A-B explain a second example of the re-extraction of a headline wording of the re-extraction process by an exclusive relationship and data information;

FIGS. 53A-C explain a third example of the re-extraction of a headline wording of the re-extraction process by an exclusive relationship and data information;

FIGS. 54A-C explain the restoration method of a headline wording;

FIGS. 55A1-B4 explain cell correction performed according to the restoration result of a headline wording;

FIGS. 56A-E explain the contents of the duplication examination process;

FIGS. 57A1-B3 explain the contents of DR•GR-headline wording examination process;

FIGS. 59A-D explain a method for extracting another character string from a cell (No. 2);

FIGS. 60A-D explain a method for extracting another character string from a cell (No. 3);

FIGS. 61A-D explain a method for extracting another character string from a cell (No. 4);

FIGS. 62A-D explain a method for extracting another character string from a cell (No. 5);

FIGS. 64A-C explain a method for extracting another character string from a cell (No. 7);

FIGS. 66A-C explain a method for extracting another character string from a cell (No. 9);

FIGS. 67A-F explain a method for extracting another character string from a cell (No. 10);

FIGS. 69A-F explain a method for extracting another character string from a cell (No. 12);

FIG. 70 explains detail division;

FIG. 71 explains deletion by an elimination line;

FIGS. 73A-F are the recognition result of an actual form;

FIG. 74 is a configuration of a computer capable of realizing s form recognition apparatus according to this preferred embodiment;

FIGS. 76A&B are a flowchart illustrating the flow of a process for creating a representative headline;

FIGS. 78A-C are examples of an overlapping phrase;

FIGS. 79A1-B3 explain the definition of a table format and a form design (table structure) corresponding to the definition;

FIGS. 82A1-B2 explain a form design created by a headline GR relationship;

FIGS. 83A-G explain a headline relationship created from a form design by a headline GR relationship.

FIGS. 84A-D explain a form design created by a headline DR relationship; and FIGS. 85A-C explain a headline relationship created from a form design by the headline DR relationship.

DESCRIPTION OF EMBODIMENTS

Figure 2:
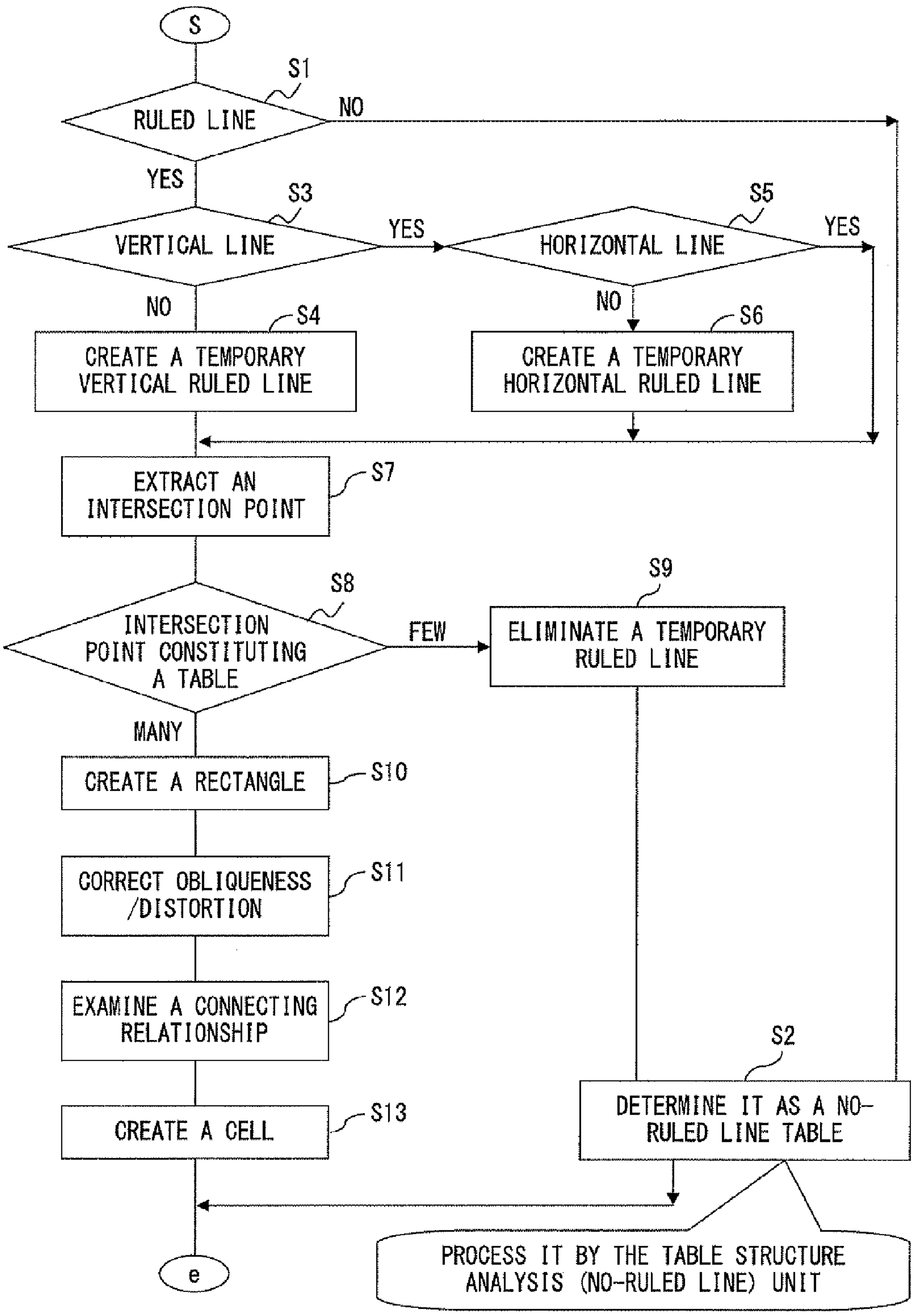
FIG. 2 is a flowchart of a table structure analysis process.

Preferred embodiments of the present invention will be explained below with reference to accompanying drawings.

FIG. 1 is a functional configuration of a form recognition apparatus according to this preferred embodiment. The form recognition apparatus 1 inputs a digitized form image obtained by reading a form and recognizes a character string (one composed of one or more characters) existing in the form image.

As illustrated in FIG. 1, the form recognition apparatus 1 includes an input unit 11 for inputting a digitized form image read by a scanner or the like, a drawing/table/sentence separation unit 12 for dividing a description existing in the form image inputted by the input unit 11 into its types, such as a drawing, a table and a character (character string) and separating them, a ruled line extraction unit 13 for extracting a ruled line from a table separated by the drawing/table/sentence separation unit 12, a table structure analysis unit 14 for dividing the table into cells recognized by a ruled line and analyzing them, a text extraction unit 15 for extracting a character existing inside/outside the table, a character recognition unit 16 for recognizing the character extracted by the text extraction unit 15, a keyword extraction unit 17 for extracting the character string being information for recognizing the type of the form as a keyword, a form type determination unit 18 for determining the type of the form from which the form image is read using the extracted keyword, a table structure analysis (no-ruled line) unit 19 for analyzing the structure of a table in which a cell cannot be recognized by a ruled line, a logical structure analysis (field candidate extraction) unit 20 for analyzing the logical structure of the table and extracting a target candidate to be recognized, a field analysis unit 21 for analyzing a field whose detailed analysis should be conducted, in the table, a logical structure analysis (field determination) unit 22 for determining a candidate to which a target to be recognized is assigned, an output unit 23 for transmitting the determination result to a display device or via a communication network or the like, a database storage unit 24 capable of storing the recognition result in a database, which is not illustrated in FIG. 1, and a storage unit 26 for storing a logical structure analysis database (DB) 25 used for various pieces of analysis.

As a matter of course, the kind of the character to use and grammar are different from Japanese in English. This is means that the recognition method of character string expressed on a form by Japanese cannot be entirely applied to the recognition of character string expressed by English. That is, the recognition method for Japanese needs modification, when applying it to the recognition for English. However, in the preferred embodiment, it is assume that character string expressed by Japanese. For this reason, each character string concerned with the recognition is expressed in Japanese notation in the state as is.

FIGS. 24 through 30 illustrate respective different types of form examples. FIGS. 31A through 36C illustrate respective design examples adopted for different headlines. Firstly, a form to be recognized by the form recognition apparatus according to this preferred embodiment will be specifically explained with reference to FIGS. 24 through 36C.

In FIGS. 24 through 30, FIG. 24 is a single form for requesting payment to a specified account, FIG. 25 is a single form for reporting the amount of a paid tax, FIGS. 26 through 28 are respective plural-entry invoices for describing the data (character string) of articles for each article, FIG. 29 is a plural-entry transfer request form for requesting for the transfer of a salary for each receiver, and FIG. 30 is a plural table (transfer form) for requesting for the transfer of a salary for each receiver, respectively. As clear from FIGS. 24 through 30, as to even forms classified into the same kind, their respective designs are different. In this example, as long as it is not especially mentioned otherwise, a "kind" is used to distinguish forms by their designs. When indicating a difference among a single form, invoices and the like, a "type" or "usage" is used. "Data" in a form is used when meaning only a character string inputted in a form by a user.

FIGS. 31A through E are variations of a headline wording, which have the same meaning although their descriptions are different. As illustrated in FIGS. 31A through E, a "金額" (An amount of money. A reading in Japanese is "kingaku"), a 付額" (A payment amount of money. A reading in Japanese is "noufugaku"), a "給料" (a salary. A reading in Japanese is "kyuryou"), a "小計金額" (A sub-total amount, or a sub-total amount of money. A reading in Japanese is "syoukeikingaku") and a "合計金額" (An amount of money in total. A reading in Japanese is "goukeikingaku") are sometimes used as phrases expressing payment or an amount to be paid.

FIG. 32A through C explain meanings varying depending on the design of a headline wording having the same description. The "合計" corresponds to the headline wording. Although in FIG. 32A, the meaning of the total amount, in FIG. 32B, it has the meaning of a total number (number of articles) besides the total amount. In FIG. 32C, "10/10" expresses the last piece of a ten pieces of form. Thus, in FIG. 32C, it means the total amount of all the ten pieces of form.

FIGS. 33A1 through D are variations of a table structure to which an account number is inputted. FIGS. 33A1 and A2 are used to input the account numbers of different financial institutes, using the same headline wording. It is anticipated that the account number is for a post office in FIG. 33A1 and is for a bank and the like, in FIG. 33A2. In FIG. 33B, two independent tables (two unit table structures) are adopted in order to input the account numbers of a requester and a receiver to the same form. In FIG. 33C, one table (table structure having a plurality of unit table structures) is adopted in order to input the account numbers of a plurality of receivers to the same form. In FIG. 33D, one table (table structure having a plurality of unit table structures) is adopted in order to input the account numbers of a requester and a plurality of receivers to the same form.

FIGS. 34A-C explains positional relationship examples between a headline wording and a plurality of data corresponding to the headline wording. The headline wording is an "口座番号" (An account number. A reading in Japanese is "kouzabangou"). Thus, FIGS. 34A-C are variations of a positional relationship between a region where a "口座番号" being a headline wording exists and a region where a "口座番号" being data.

The number of the headline wording of one piece of data to be inputted is not always one. For example, as illustrated in FIGS. 33B through D, sometimes another headline wording 頼人" (A requester. A reading in Japanese is "irainin") or 取人" (A receiver. A reading in Japanese is "uketorinin") exists besides a headline wording "口座番号" In FIGS. 33B through D, headline wordings "依頼人" and "受取人" are arranged above a headline wording "口座番号" in the logical vertical relationship. In a form, sometimes such a relationship between headline wordings exists from the viewpoint of a table structure. In this preferred embodiment, the vertical relationship (hierarchical relationship) is used for the recognition. Hereinafter, for convenience' sake, a headline wording that is regarded to be positioned at top is called "headline DR" and a headline wording that may belong to a layer next to the headline DR is called "headline GR". In order to absorb the difference between headline wordings adopted for each form, a headline wording representing a headline wording that may be used in the same state (hereinafter "representative headline") is prepared. The representative headline is prevented from duplication. Thus, each representative headline has a function as identification information to represent a group to which one or more headlines belong.

In a unit table structure being a table structure as the unit of describing one or more pieces of related data, such as the data of a receiver or requester, such as illustrated in FIG. 33C or D, each of headline wordings "受取人" and "依頼人" are handled as a headline DR or GR and a headline wording 番号" is handled as a representative headline positioned in a lower order. For this reason, in a table structure in which it is necessary to describe some amount of data, it is common that a headline DR or GR exists.

FIGS. 35A through G and FIGS. 36A-*through* C are variations of respective table structures in which a headline GR or DR is focused.

In FIGS. 35A-G, a headline GR corresponds to a "振込先" (A transfer. A reading in Japanese is "furikomisaki"). As illustrated in FIGS. 35A through D, sometimes the headline GR "振込先" is arranged in a position including anther field, that is, another headline wording or in a position directly indicated by an input field to which data is inputted. As illustrated in FIG. 35E or F, sometimes one including a headline GR "振込先" (a "振込先銀行名" (A bank name of a transfer. A reading in Japanese is "furikomisakiginnkoumei") in FIG. 35) as a headline wording. As illustrated in FIG. 35G, sometimes no headline GR "振込先" exists.

In FIGS. 36A through C, a "受取人" corresponds to the headline DR. The headline RD "受取人" is different from the headline GR and as illustrated in FIGS. 36A through C, there is a very high possibility that it may be arranged in a position regarded as the highest order with the phrase even though the table structure differs.

In this preferred embodiment, as illustrated in FIGS. 24 through 36C, not only its design varies depending on its usage, but recognition presuming a form for which various designs are adopted can be realized. Back to FIG. 1, an operation for realizing it will be explained in detail below. In FIG. 1, each element expressed by doublet is adopted the technique to realize the characteristic of this preferred embodiment. Thus, the explanation will be performed focusing each element expressed by doublet. For the convenience' sake of the explanation, as to the contents of the logical structure analysis DB, only ones related to a form often used in a financial institute, such as ones for payment or transfer, are assumed.

A ruled line being a line constituting a table separated by the drawing/table/sentence separation unit 12 is extracted by the ruled line extraction unit 13. The table structure analysis unit 14 disassembles a table into cells and analyzes its structure. The cell means a region having no concept of a size. In a table, it is a region that may be used as a field where one character or a character string is entered. Thus, by handling a character string in a cell, the amount of information needed to handle a character string is reduced. In other words, while reducing load, various operations can be easily performed.

FIG. 2 is a flowchart of a table structure analysis process of the table structure analysis unit 14. FIGS. 37A1 through C2 and 38A through E explain the analysis contents of the table structure analysis process. The analysis of the table structure analysis unit 13 will be specifically explained with reference to FIGS. 2, 37A1 through C2 and 38A through E.

Firstly, in step S1, it is determined whether there is an extracted ruled line. When a table from which a ruled line is extracted (hereinafter called "target table") is as illustrated in FIG. 37A1, the ruled line extraction unit 13 cannot extract a ruled line. Therefore, it is determined that there is no ruled line and after in step S2 it is determined that it is no-ruled line table in which there is no ruled line, this table structure analysis process is terminated. Otherwise, specifically, if the target table is as illustrated in FIGS. 37A2 through A4, an extracted ruled line exists. Therefore, it is determined that there is a ruled line and the process moves to step S3.

Figure 31A:
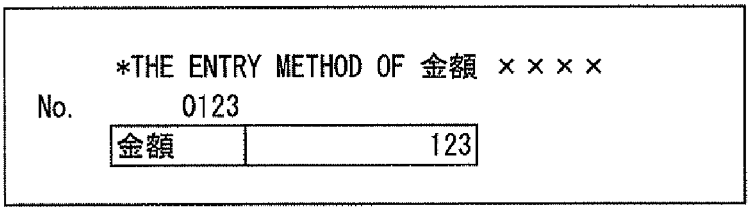
FIGS. 31A-E are variations of a headline wording having the same position.
Figure 31B:
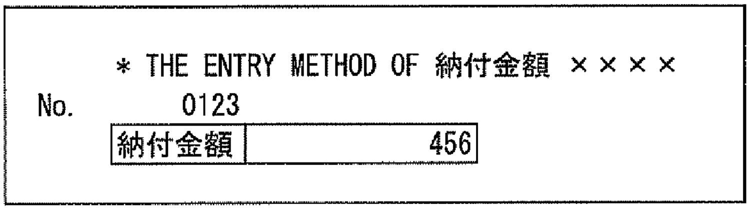
Figure 31C:
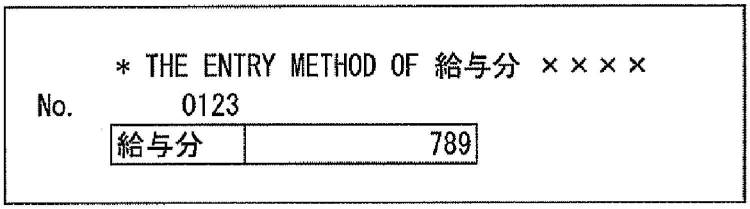
Figure 31D:
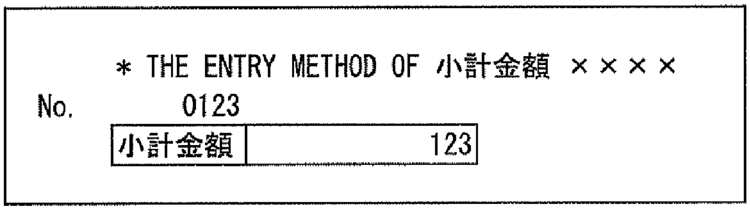
Figure 31E:
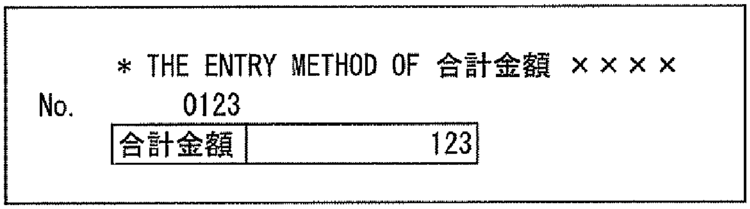

In step S3, it is determined whether there is a vertical ruled line in the extracted ruled line. When the target table is as illustrated in FIG. 37A2 or A4, it is determined that there is a vertical ruled line and the process moves to step S5. Otherwise, specifically, if the target table is as illustrated in FIG. 37A3, it is determined that there is no vertical ruled line and after in step S4 a temporary vertical line is created according to the target table, the process moves to step S7. The temporary vertical line is created in a place where a space in the horizontal direction of a character string is somewhat wide, as illustrated in FIGS. 31B1 and B2. In step S5, it is determined whether there is a horizontal ruled line in the extracted ruled line. When the target table is as illustrated in FIG. 37A3 or A4, it is determined that there is a horizontal ruled line and the process moves to step S7. Otherwise, specifically, if the target table is as illustrated in FIG. 37A2, it is determined that there is no horizontal ruled line and after in step S6 a temporary horizontal line is created according to the target table, the process moves to step S7. The temporary horizontal line is created in a place where a space in the vertical direction of a character string is somewhat wide, like the temporary vertical ruled line.

In step S7, as illustrated in FIG. 37C1 or C2, an intersection point where a vertical ruled line and a horizontal ruled line (both including temporary ruled lines) intersect is extracted. Then, in step S8, it is determined which the number of the extracted intersection points is, many or few. It is determined taking into consideration, for example, the number of rectangular regions divided by a line connecting the intersection points and the number of character strings existing in the target table. In other words, it is determined focusing on the rate of one character string corresponding to one rectangular region. Thus, when intersection points are extracted, as illustrated in FIG. 37C2, it is determined that there are many intersection points and the process moves to step S10. Otherwise, specifically, if intersection points are extracted as illustrated in FIG. 37C1, it is determined that there are few intersection points and the process moves to step S9 and after in step S9 the temporary ruled line is eliminated, the process moves to step S2.

In step S10, rectangular regions divided by lines connecting intersection points are created. Then, in step S11, oblique motion/distortion is corrected and the target table is made to enter a more appropriate state. Then, in step S12, the connection relationship between rectangular regions is examined and after in step S13 a cell in which the examination result is reflected is created, this table structure analysis process is terminated. Thus, by performing the table structure analysis process, a ruled line existing in the form image is focused and a region where a character string is arranged is created/extracted as a cell.

FIGS. 38A through E are cells created by the table structure. As illustrated in FIG. 38A through E, each rectangular region enclosed by a line is handled as a cell and rectangular regions are collected according to whether they are connected. The connection relationship is examined in order to specify the group of rectangular regions (cells).

Figure 38A:
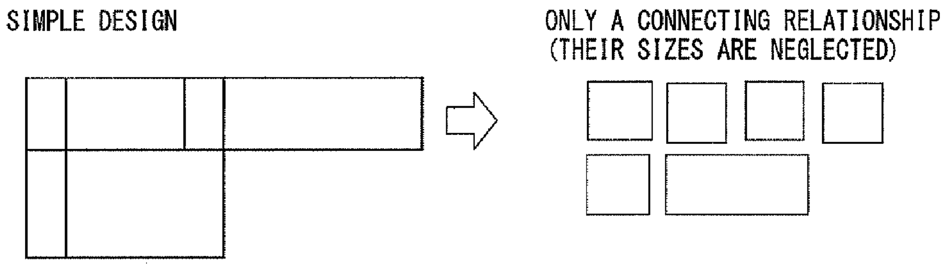
FIGS. 38A-D are cells created by a table structure.
Figure 38B:
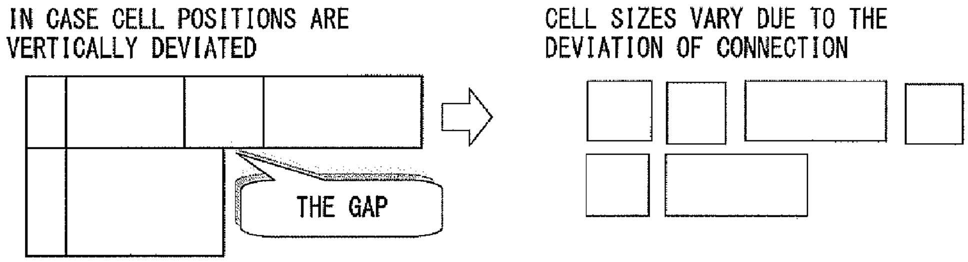
Figure 38C:
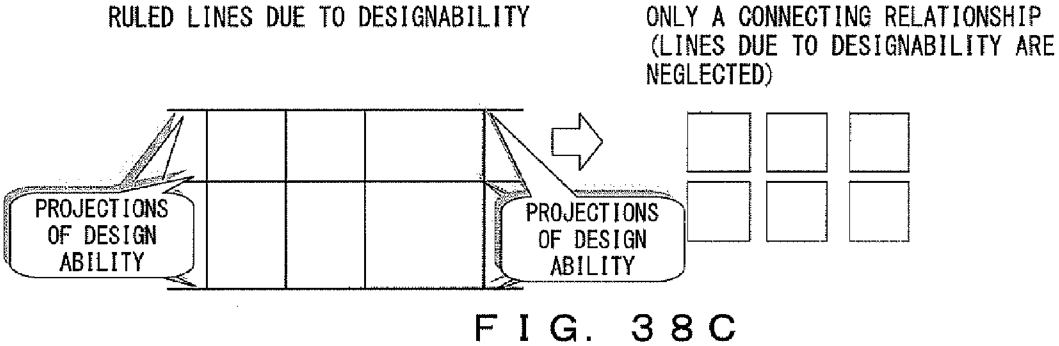
Figure 38D:
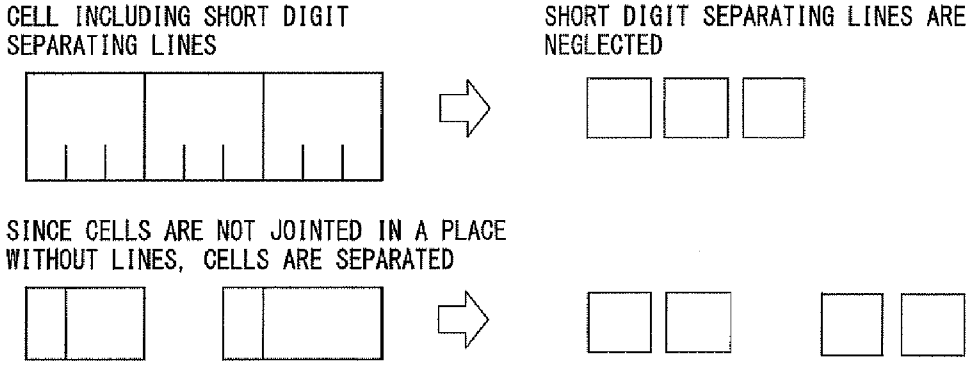

For example, as illustrated in FIGS. 38A through C, in many cases, a design in which related data is inputted one table is adopted. It is common that the positional relationship between fields to which a headline wording (for example, a field name) or data is inputted is considered in such a way that data can be appropriately inputted. It is in order to make the specification of the positional relationship easier and to enable recognition taking the positional relationship into consideration to examine the positional relationship and to create a cell.

If a cell is created, the text extraction unit 15 in FIG. 1 extracts a character string existing in the cell, for each cell. A character string is extracted even from a range where no cell is created. The extracted character string is divided into characters and recognized by the character recognition unit 16. The recognition result is inputted to the keyword extraction unit 17. After the keyword extraction, the recognition result is used as a character string.

Sometimes a headline wording used to input the same data varies depending on a form. There is a possibility that one or more character of a headline wording cannot be recognized for some reason. Therefore, in this preferred embodiment, a headline wording is checked using not only a headline wording used for each form but also a representative headline corresponding to the headline wording. The representative headline and a headline wording to which the representative headline is assigned are defined, for example, as illustrated in FIGS. 43A through C.

The logical structure analysis DB 25 stores information indicating a headline wording to which the representative headline for each representative headline is assigned. The keyword extraction unit 17 extracts a headline wording existing in the form image referring to the DB 25 and specifies a representative headline corresponding to the extracted headline wording.

Figure 3C:
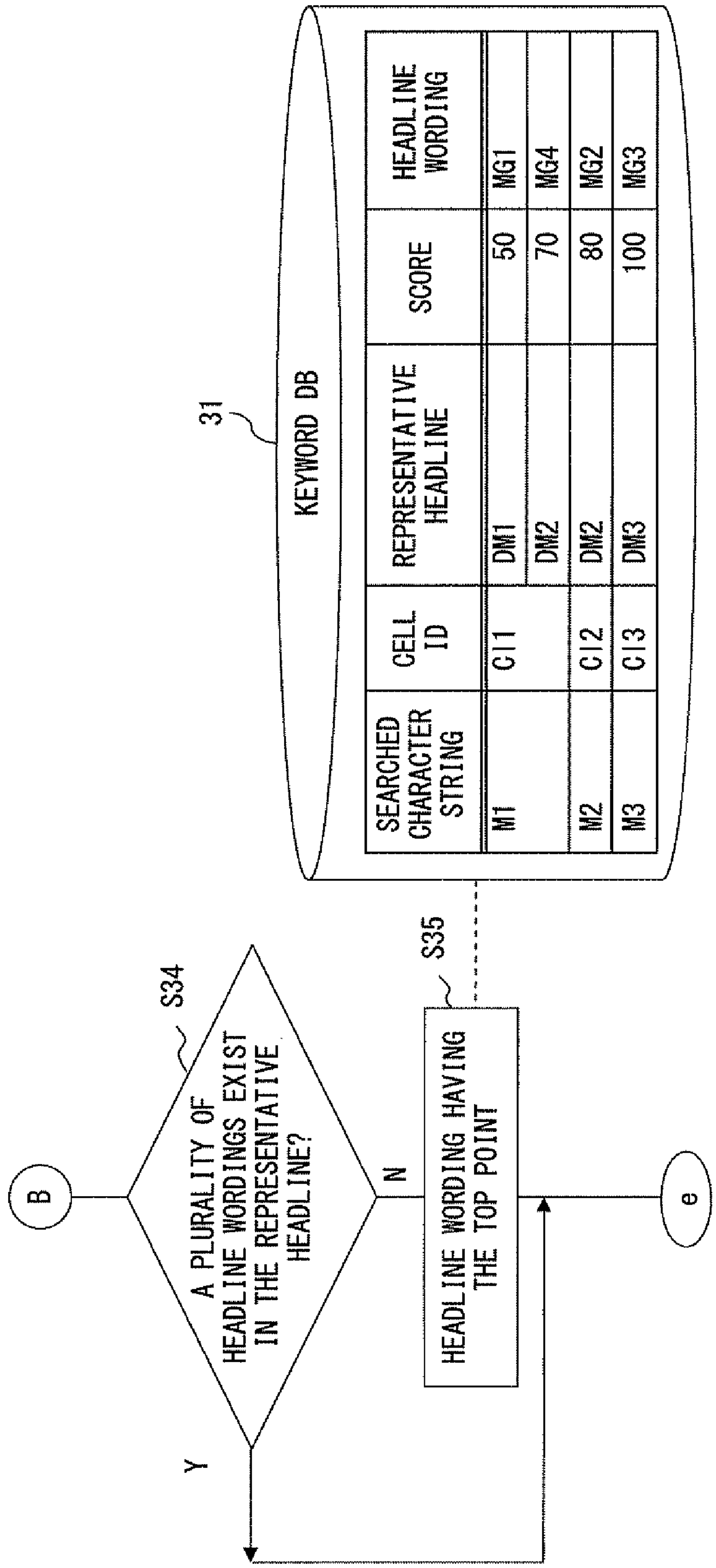

FIGS. 3A-C are a flowchart of the keyword extraction process of the keyword extraction unit 17. The extraction process will be explained in detail below with reference to FIGS. 3A-C.

Firstly, in step S21, it is determined whether a DB by business type is specified. If no business type is specified, the determination is no and after in step S22 a registered headline wording is read referring to the logical structure analysis DB 25, the process moves to step S24. Otherwise, specifically, if a business type is specified, the determination is yes and after in step S23 a registered headline wording is read referring to a corresponding DB by business type, the process moves to step S24. It is assumed that total number of headline wordings read here is N.

The logical structure analysis DB 25 is a high-versatility DB regardless of a business type. Therefore, many headline wordings are registered. However, if the number of business type is limited, the number of headline wordings can be reduced. For this reason, in this preferred embodiment, a DB by business type is prepared to reduce unnecessary load. Alternatively, the logical structure analysis DB 25 can be used as a DB by business type.

In step S24, the same character/arrangement order character unit sort of headline wordings is performed to the read headline wording for each representative headline. Then, in step S25, a headline passing mark MTth is set. Then, the process moves to step S26.

Figure 39:
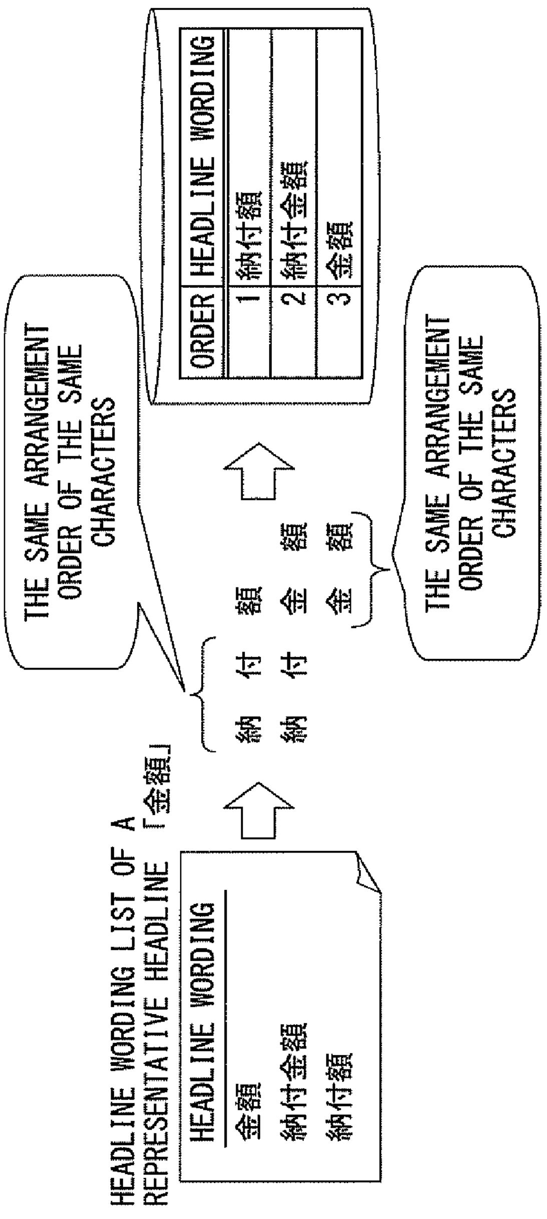
FIG. 39 is a sorting method of headline wordings.
Figure 41A:
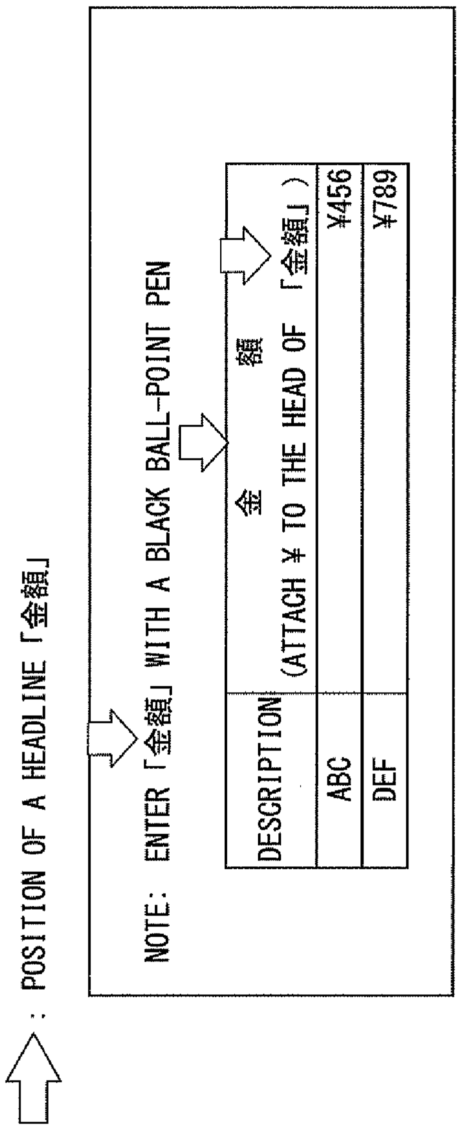
Figure 41B:
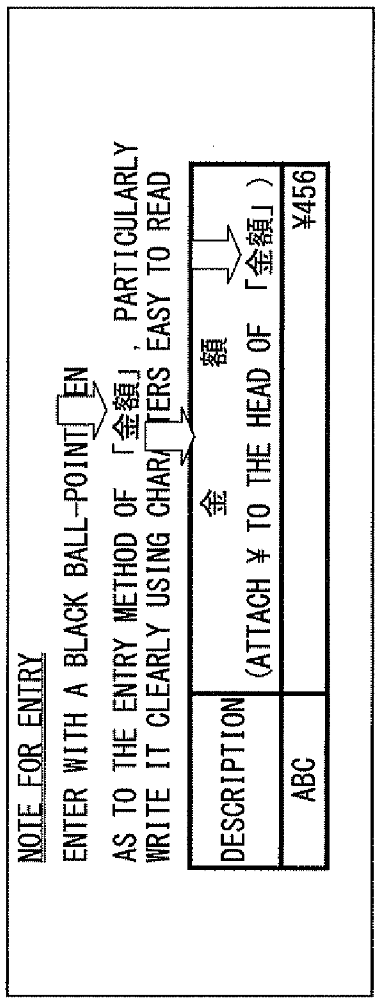

FIG. 39 is a sorting method of headline wordings. FIG. 39 illustrates the sort method of those headline wordings 額", "納付金額" and "納付額", using a case where "金額", "納付金 and "納付額", of headline wordings to which a representative headline "金額" is assigned exist in the form image. Since sorting is conducted focusing on the same arrangement order of the same characters, if the first order headline wording is 付額", "納付金額" having the same "納付" (A payment. A reading in Japanese is "noufu") is sorted in the second order and the same "金額" is sorted in the third order. For this reason, in the sort result in FIG. 3A, any of descriptions "C1" through "C6" expresses a different character.

In FIG. 3B, steps S26 through S31 are repeatedly executed the total number N of read headline wordings. Thus, steps S26 through S31 are executed for each registered headline wording.

Sometimes a plurality of the same headline wordings exists. For example, sometimes it exists in a comment sentence for explanation or the like, besides a field name. For this reason, steps S27 through S31 of them are repeatedly executed by the number of headline wordings extracted by search (described as "number of search" in FIG. 3B). Thus, as to the same headline wordings too, a difference between them is checked.

In step S26, one of the sorted headline wordings is selected and the selected headline wording is searched for. By the search, steps S27 through S31 are repeatedly executed by the number of the same detected headline wordings.

Depending on a form, there is a possibility that a character string other than the registered headline wording may be used. For this reason, in step S27, a score calculation process for calculating headline score MTn (n is a symbol indicating that it is the score of a headline wording searched in the n-th order. More particularly, when there is no need to take the searched order into consideration, it is also described as "MT") indicating the degree of coincidence between the headline wording extracted by the search and the registered headline wording is performed. After the execution, the process moves to step S28.

In step S28, it is determined whether the calculated headline score MTn is equal to or more than the headline passing score MTth. If the calculated headline score MTn is equal to or more than the headline passing score MTth, the determination is yes and after in step S29 a comment determination process for determining a possibility that a headline wording may be included in the comment sentence is performed, the process moves to step S30. Otherwise, the determination is no and a series of the processes is terminated. Thus, this time the target headline wording is not regarded as a keyword. For this reason, the headline passing score MTth is used as a threshold value for eliminating one that is not a keyword, of the extracted headline wordings.

In the comment determination process, the headline score MTn calculated by the score calculation process in step S27 is updated. In step S30, it is determined whether a headline wording is included in the comment sentence, on the basis of the headline score MTn after update. For example, if the headline scores MTn is smaller than a value set as a threshold value, the determination is yes and a series of the processes is terminated. Thus, a headline is not regarded as a keyword. However, otherwise, the determination is no and after in step S31 a headline wording is registered as a headline (keyword) candidate, a series of the processes is terminated.

Thus, if the headline wording extracted by search is clearly different from the registered headline wording (hereinafter also called "registered headline wording") or is not regarded to be included in the comment sentence, the headline wording is registered together with information, such as a cell ID indicating a cell from which the headline wording is extracted, a headline score, a registered headline wording from which the score is obtained and a representative headline. Therefore, there is a possibility that a plurality of the same representative headline, that is, a plurality of registered headline wordings to which the same representative headline is assigned may exist. The number of representative headlines corresponding to a headline wording is one. Arrangement including selecting one from a plurality of registered headline wordings to which the same representative headline are assigned is conducted in steps S32 and after.

In step S32, the results are sorted in the order of the headline wordings extracted by search. In step S33, the same headline wordings are sorted in order of the representative headlines. Then, in step S34, it is determined whether there is a headline wording in which a plurality of the registered headline wordings to which the same representative headline is assigned exists, of the headline wordings extracted by search. If such a headline wording exists, the determination is yes, and after in step S35 headline wordings other than a headline wording whose score MT is the highest are deleted from the plurality of registered headline wordings, this keyword extraction process is terminated. The headline wording extracted and arranged thus is registered in a keyword DB 31 together with a cell ID, a representative headline, a headline score and a registered headline wording.

Figure 4:
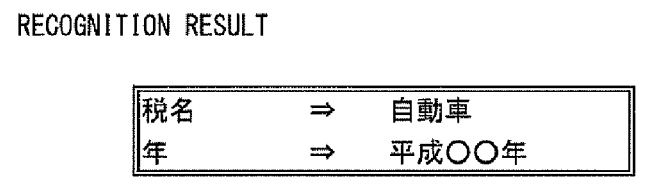

FIG. 4 is a flowchart of the headline score calculation process performed in step S27. The calculation process will be explained in detail below with reference to FIG. 4. "ML" and "MLO" in FIG. 4 indicate the number of characters of a registered headline wording and the number of characters which are matched between the extracted headline wording and the registered headline wording, respectively.

In this calculation process, a headline score MT according to the number of matched characters MLO is calculated for each number of characters ML of the registered headline wording. The initial value of the score MT is 0 and the score MT is updated as follows.

If the number of characters ML is 1, as a headline score MT a value obtained by multiplying the number of matched characters MLO by 100 is calculated (S41→S42). If the number of characters ML is 2, as a headline score MT it is updated to 70 if the number of matched characters MLO is 1 (S41→S43→S44→S45), it is updated to 100 if the number of matched characters MLO is 2 (S41→S43→S44→S46→S47) and it is left 0 if the number of matched characters MLO is a numeric value other than 1 and 2, that is, 0 (S41→S43→S44→S46→end). If the number of characters ML is 3, as a headline score MY it is updated to 70 if the number of matched characters MLO is 2 (S41→S43→S48→S49→S50), it is updated to 100 if the number of matched characters MLO is 3 (S41→S43→S44→S48→S49→S51→S52) and it is left 0 if the number of matched characters MLO is a numeric value other than 1 and 2, that is, 0 (S41→S43→S48→S49→S51→end). If the number of characters ML is more than 3, as a headline score MY a value obtained by dividing the value obtained by multiplying the number of matched characters MLO by 100 by the number of characters ML (=MLO*100/ML) is calculated (S41→S43→S48→S49→S53→S54). The headline score calculation process is terminated after the headline score MT is updated. Such an update method is one example and is not restrictive of the invention.

FIGS. 40A through B2 are examples of the headline score MT calculated in the extracted headline wording. FIGS. 40A, 40B1 and 40B2 are the result of sorting headline wordings for each representative headline, an extracted headline wording "納付？ ("?" indicates the process result of a character whose recognition has failed) and the process result of an extracted headline wording "納付*" ("*" indicates a character string whose number of characters is unknown), respectively. In FIG. 40B2, a plurality (two) of the same representative headlines exists. In FIGS. 40B1 and B2, a process step of calculating a headline score MT in the headline score calculation process illustrated in FIG. 4 is also described. The process result as illustrated in FIG. 40B1 or B2 can be obtained by executing step S3 in FIG. 4.

FIGS. 44A and B explain a headline score MTn calculated when the contents illustrated in FIG. 43C is stored in the logical structure analysis DB 25. FIGS. 44A and 44B are a case where the recognition of a representative headline "金額" has succeeded and a case where the recognition of one character of them has failed, respectively.

FIG. 42 is an example of the contents registered in the keyword DB 31. As illustrated in FIG. 42, from some headline wordings extracted by search (described as "searched character string" in FIG. 42. Hereinafter the description is also used), a plurality of registered headline wordings to which the same representative headline is assigned is extracted. In that case, only a registered headline wording whose headline scores MT is the highest is left. Thus, in a searched character string "M1", of registered headline wordings "MG4" and "MG5", only "MG4" is left. In a searched character string "M3", the scores MT of both registered headline wordings "MG3" and "MG6" are 100 and the score MT of a registered headline wordings "MG7" is 70. Therefore, two registered headline wordings "MG3" and "MG6" remain. It is because the main point is to omit a registered headline wording that is considered to be necessary as a process target that a plurality of registered headline wordings can be left.

Figure 5:
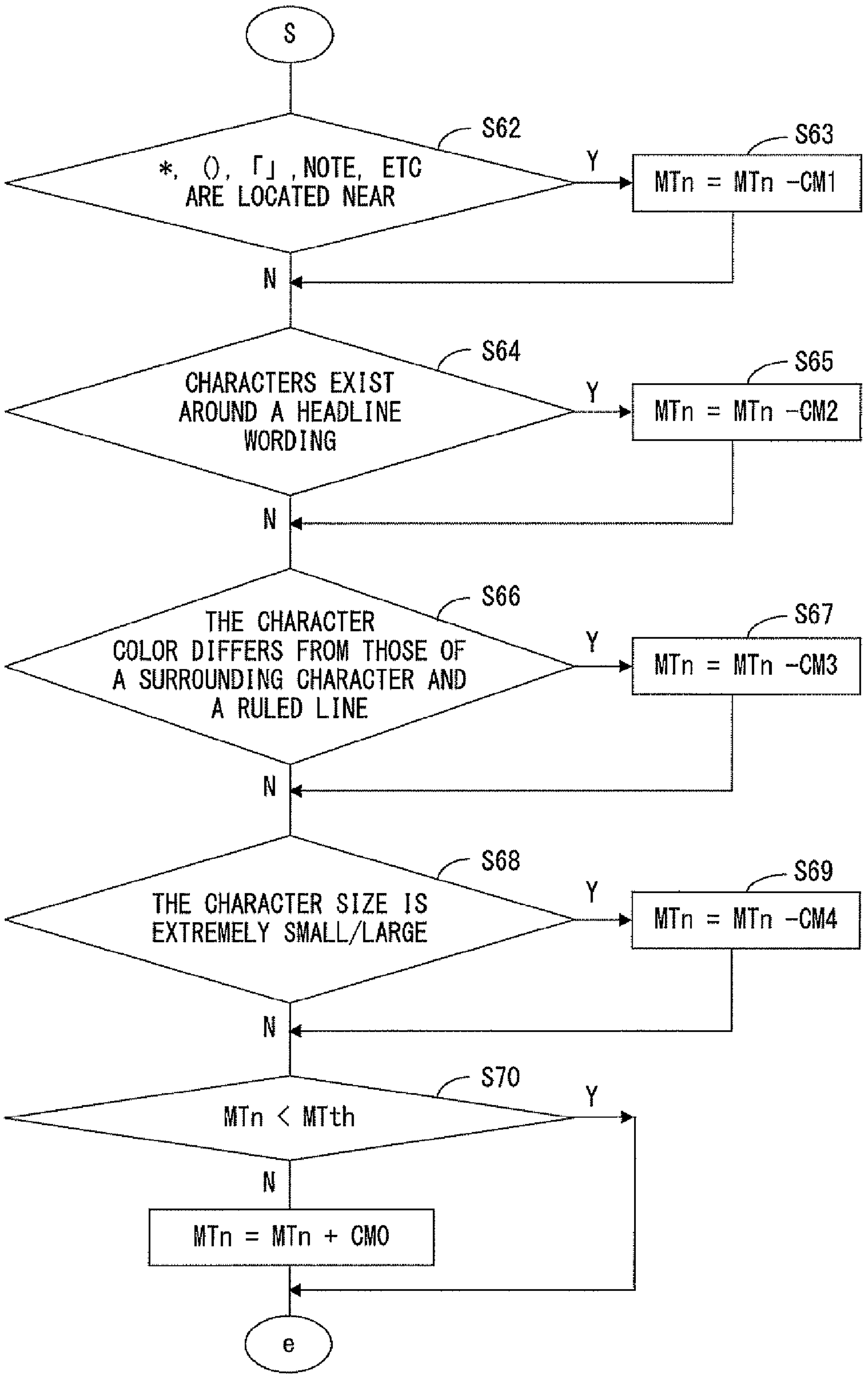
FIG. 5 is a flowchart of a comment determination process.

FIG. 5 is a flowchart of the comment determination process executed as step S29 in the keyword extraction process illustrated in FIG. 3B. Next, the determination process will be explained in detail with reference to FIG. 5.

As illustrated in FIGS. 41A through D, a headline wording "金額" being a field name sometimes exists for explanation, that is, a comment sentence in the same frame (cell) or outside the table. When it is used for explanation, it is common that at least one of conditions, such as that it exists together with another character string (FIGS. 41A-D) and that their colors or sizes are different (FIG. 41C or D) and the like. Whether a headline wording constitutes a comment sentence is determined focusing on such conditions. The headline score MTn is updated according to a met condition.

Firstly, in step S62 it is determined whether there is a symbol having a high possibility of existing in a comment sentence, such as "*", parentheses, "note" or the like, near a headline wording. If there is such a symbol near a comment sentence, the determination is yes and after in step S63 a prescribed value CM1 is subtracted from the headline scores MTn, the process moves to step S64. Otherwise, the determination is no and the process moves to step S64. In steps S64 through S69, similarly, a process for updating the headline score MTn according to a condition met by a headline wording is performed. Thus, if a character exists on the left/right of or above/under the headline wording, a prescribed value CM2 is subtracted from the headline score MTn (S64→S65→S66). If the color of a headline wording is different from the color of a surrounding character or ruled line, a prescribed value CM3 is subtracted from the headline score MTn and is determined (S64 or S65→S66→S67). If the size of a character is extremely (clearly) smaller or larger than those of other characters, a prescribed value CM4 is subtracted from the headline score MTn (S66 or S67→S68→S69). After the subtraction of the prescribed value CM4 or according to "no" determination in step S68, the process moves to step S70.

In step S70, it is determined whether the value of the headline score MTn is less than the headline passing score MTth. If the value of the headline scores MTn is less than the headline passing score MTth, the determination is yes and the comment determination process is terminated here. Otherwise, the determination is no and after in step S71 a prescribed value CM0 is added to the headline score MTn, this comment determination process is terminated. Thus, an operation to increase the headline score MTn is applied to a headline wording that should not be included in a comment sentence.

In keyword extraction unit 17, the above-described various processes are performed and a keyword obtained as the execution result or its information is stored in the keyword DB 31. The form type determination 18 refers to the keyword DB 31 and determines the type of a form. Thus, in this example, it is specified which the form is, a single form, a plural-entry form or a plural form.

FIG. 6 is a flowchart of the form type determination process of the form type determination unit 18. The determination process will be explained in detail below with reference to FIG. 6.

Firstly, in step S81, it is determined whether the type of a form is already defined. For example, when the operator specifies the type of a form or information indicating the type of a form exists in the form, the determination is yes and after in step S82 the form type is set, the process moves to step S94. Otherwise, the determination is no and the process moves to step S83.

In step S83 it is determined whether the form is a no-ruled line table. If it is determined that the form is a no-ruled line table by performing the table structure analysis process illustrated in FIG. 2, the determination is yes and the process moves to step S85. Otherwise, the determination is no and after in step S84 a table structure determination process for determining the structure of a no-ruled line table, the process moves to step S85.

In step S85, a headline wording determination process for focusing on a headline wording and determining the type of a form is performed. After the execution, the process moves to step S86 and the maximum value MaxSyu is calculated. After the calculation, the process moves to step S87.

In the table structure determination process, variables for calculating a score is prepared for each type of a form and a score of the variable is updated, if necessary. The variables are FRT, TRT and RRT in a plural form, a single form and a plural-entry form, respectively. In the headline wording determination process too, those variables are updated, if necessary. The maximum value MaxSyu in step S86 is calculated using each of those variables of FRT and RRT. Although the calculation method is not particularly limited, for example, one of those values is added.

In step S87 it is determined whether the maximum value MaxSyu is larger than the minimum score SyuTh of table-likeness. If the maximum value MaxSyu is equal to or less than the minimum score SyuTh, the determination is no and after in step S88 the type is set to a single form, the process moves to step S94. Otherwise, the determination is yes and the process moves to step S89.

In step S89 it is determined whether the maximum value MaxSyu is the value of the variable PRT. If the value of the variable FRT is the largest of the three variables, the determination is yes and after in step S92 the type is set a plural form, the process moves to step S94. Otherwise, the determination is no and after in step S93 the type of the target table is set to a single form, the process moves to step S94.

In step S94 it is determined whether the target table is a no-ruled line table. If in step S83 it is determined that it is a no-ruled line table, the determination is yes and after in step S95 a no-ruled table structure analysis process for analyzing the structure of a no-ruled line table is performed, this form type determination process is terminated. Otherwise, the determination is no and after in step S96 a cell correction process is performed, this form type determination process is terminated.

As described above, a form has a peculiar table structure depending on the type. Therefore, by determining (specifying) the type of a form, a correspondence relationship between a headline wording and data can be accurately specified. Thus, a form can be recognized with high accuracy.

Various sub-routine processes of the above-described form type determination process will be explained in detail below with reference to FIGS. 7 through 9.

FIGS. 7A and B are a flowchart of the table structure determination process performed in step S84. Firstly, the determination process will be explained in detail with reference to FIGS. 7A and B.

This table structure determination process analyzes a structure peculiar depending on the type of a form, focusing on the arrangement of cells. In a plural-entry form, as illustrated in FIG. 45A1 or A2, the cells of each row are often almost uniformly arranged. In a plural form, as illustrated in FIG. 45B1 or B2, the cells of a plurality of rows are often repeated. In a single form, as illustrated in FIG. 45C1 or C2, often cells are not uniform but close to each other or cells are not close to each other. The above-described variables FRT, TRT and RRT are updated focusing on such arrangement features of cells that are differ depending on the type of a form. The initial value of these is 0.

Firstly, in step S101 the number C1Yn of cells horizontally (in one row) arranged for each row is calculated. Then, in step S102 the average number C1Yave of cells arranged in one row is calculated. In step S103 the number KDYn of corners existing between adjacent cells, of the cells horizontally (in one row) arranged for each row, that is, ruled lines dividing adjacent cells is calculated. In step S104 a value obtained by dividing the number KDYn by the number C1Yn for each row is calculated as the degree of cell deviation ZRY. After the calculation, the process moves to step S105. The degree of cell deviation ZRY calculated in step S104 indicates the existing rate of adjacent cells, of cells in one row. A threshold value ZRYth is set in order to determine whether cells are uniformly arranged in the row direction.

In steps S105 through S108, similarly, a row is focused and various numbers and the degree of cell deviation ZRT are calculated.

Firstly, in step S105 the number C1Tn of cells vertically (in one column) arranged for each column is calculated. Then, in step S106 the average number C1Tave of cells arranged in one column is calculated. In step S107 the number KDTn of corners existing between vertically adjacent cells, of the cells vertically (in one column) arranged for each column, that is, ruled lines dividing adjacent cells is calculated. In step S108 a value obtained by dividing the number KDTn by the number C1Tn for each column is calculated as the degree of cell deviation ZRT. A threshold value ZRTth is set in order to determine whether cells are uniformly arranged in the column direction.

The larger is the degree of cell deviation ZRY or ZRT calculated as described above, the cell arrangement is more uniformity. In step S109 it is determined whether the degree of cell deviation ZRY is larger than the threshold value ZRYth and also the degree of cell deviation ZRT is larger than the threshold value ZRTth. If the degree of cell deviation ZRY is larger than the threshold value ZRYth and also the degree of cell deviation ZRT is larger than the threshold value ZRTth, that is, cells can be regarded to be almost uniformly arranged vertically and horizontally, the determination is yes and after in step S110 a value obtained by adding a prescribed value R1 to the current value is assigned to the variable RRT as it is regarded to have the features of a plural-entry form, this table structure determination process is terminated. If one of more of the size relationships that the degree of cell deviation ZRY is larger than the threshold value ZRYth and also that the degree of cell deviation ZRT is larger than the threshold value ZRTth are not satisfied, the determination is no and the process moves to step S111.

In step S111 it is determined whether the number C1Yn of cells for each row are repeated every two rows. If a plurality of such repetitions exists, the determination is yes. After in step S112 a value obtained by adding a prescribed value F1 to the current value is assigned to the variable FRT as it is regarded to have the features of a plural form, this table structure determination process is terminated. Otherwise, the determination is no and the process moves to step S113.

In step S113 it is determined whether the number C1Yn of cells for each row are repeated every three rows. If a plurality of such repetitions exists, the determination is yes and after in step S114 a value obtained by adding a prescribed value F1 to the current value is assigned to the variable FRT as it is regarded to have the features of a plural form, this table structure determination process is terminated. Otherwise, the determination is no and the process moves to step S115.

In step S115 it is determined whether cells are close to each other. In this state, if cells are close to each other, cells are arranged as illustrated in FIG. 45C1. Therefore if cells are arranged as illustrated in FIG. 45C1, the determination is yes and after in step S116 a value obtained by adding a prescribed value T1 to the current value is assigned to the variable TRT as it is regarded to have the features of a single form, this table structure determination process is terminated. Otherwise, the determination is no and this table structure determination process is terminated.

Figure 8:
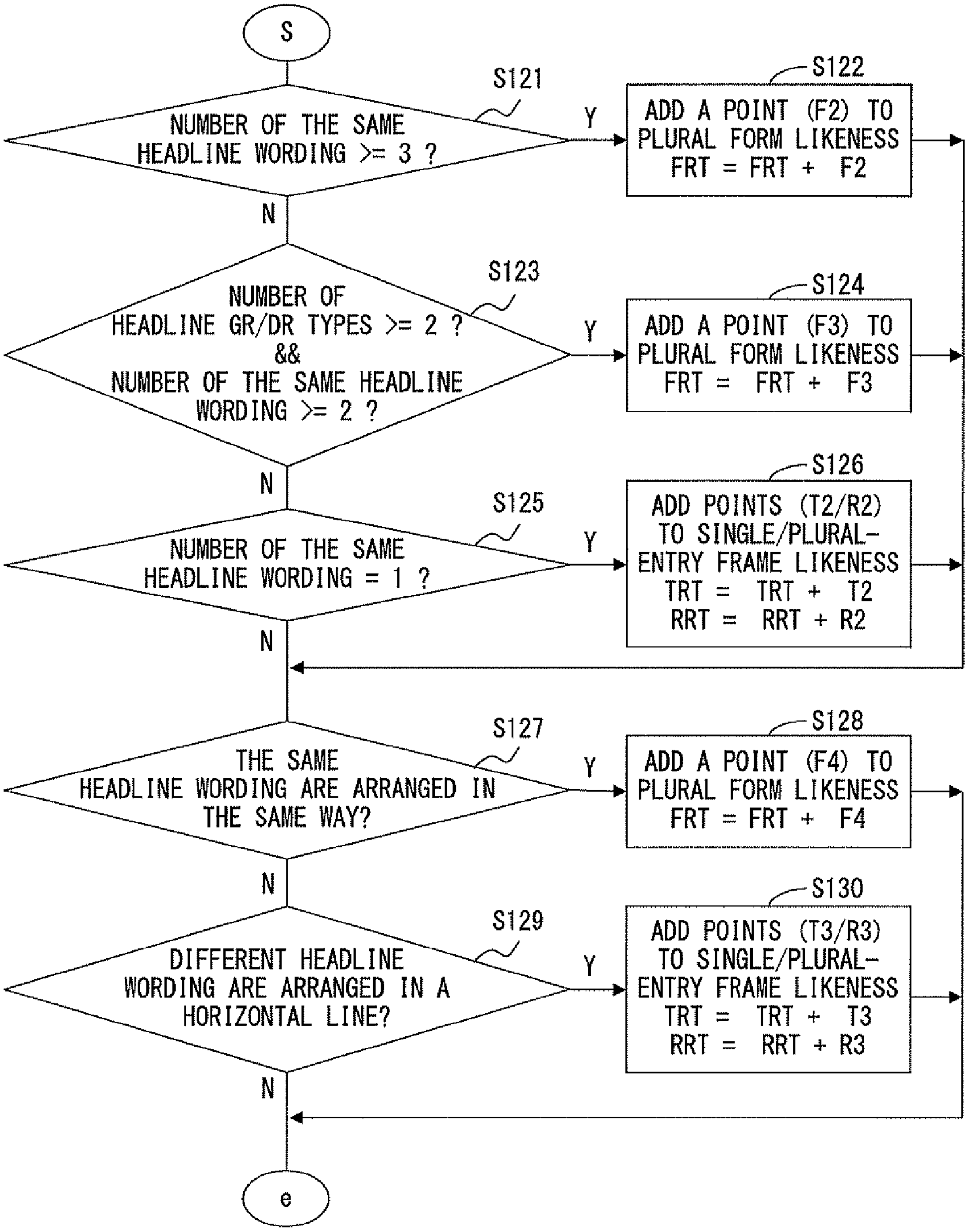
FIG. 8 is a flowchart of a headline wording determination process.

FIG. 8 is a flowchart of the headline wording determination process performed in step S85 of the form type determination process illustrated in FIG. 6. Next, the determination process will be explained in detail with reference to FIG. 8.

In a plural form as illustrated in FIG. 30, since the same headline wording is searched for in different places, as illustrated in FIG. 46A1 a keyword is extracted. However, in a single form as illustrated in FIGS. 24 and 25 and in a plural-entry form as illustrated in FIGS. 26 through 29, as illustrated in FIG. 46A2, a keyword is extracted and the same headline wording seldom exists in another cell.

However, in a plural form, as illustrated in FIG. 46B1, it is common that cells in which the same searched character string exists are arranged in the similar vertical or horizontal positions. In single and plural-entry forms, as illustrated in FIG. 46B2, sometimes different searched character strings are arranged in the similar vertical or horizontal positions. This phenomenon more often appears in the plural form. In the single form, as illustrated in FIG. 46B3, there is also often no relationship (regularity) between positions where searched character strings exist. In the single and plural-entry forms, as illustrated in FIG. 46B4, sometimes only one character string is searched for. In the headline wording determination process, such a keyword extraction result (the arrangement of a headline wording) that varies depending on the type of the form is focused and the value of the variable FRT, TRT or RRT is updated.

Firstly, in step S121 it is determined whether three or more the same searched character strings exist. If the same searched character strings are extracted as a keyword, the determination is yes and after in step S122 a value obtained by adding a prescribed value F2 to the current value is assigned to the variable FRT, the process moves to step S127. Otherwise, the determination is no and the process moves to step S123.

In step S123 it is determined whether the number of types of headline GR or DR extracted as searched character string is two or more and also the same two or more searched character strings are extracted. If the number of types of headline GR or DR is two or more and also the same two or more searched character strings are extracted, the determination is yes and after in step S124 a value obtained by adding a prescribed value F3 to the current value is assigned to the variable FRT, the process moves to step S127. Otherwise, the determination is no and the process moves to step S125.

In step S125 it is determined whether the number of each the same searched character string is one. If the extracted searched character strings are different from each other, the determination is yes and after in step S126 values obtained by adding prescribed values T2 and R2 to the current values are assigned to the variables TRT and RRT, respectively, the process moves to step S127. Otherwise, the determination is no and the process moves to step S127.

In step S127 it is determined whether the same searched character strings are arranged in the similar vertical or horizontal positions. If a plurality of the same searched character strings is extracted in the similar vertical or horizontal positions, the determination is yes and after in step S128 a value obtained by adding a prescribed value F4 to the current value is assigned to the variable FRT, this headline wording determination process is terminated. Otherwise, the determination is no and the process moves to step S129.

In step S129 it is determined whether different searched character strings are vertically or horizontally arranged. If different searched character strings are arranged in such a way, the determination is yes and after in step S130 values obtained by adding prescribed values T3 and R3 to the current values are assigned to the variables TRT and RRT, respectively, this headline wording determination process is terminated. Otherwise, the determination is no and this headline wording determination process is terminated here.

FIG. 9 is a flowchart of the cell correction process performed in step S96 of the form type determination process illustrated in FIG. 6. Next, the correction process will be explained in detail with reference to FIG. 9.

After the process has moved to step S96, except a form having a no-ruled line table, the type is already determined. In the cell correction process, according to the determination result, the shape and arrangement of cells are corrected. Thus, the shape/arrangement of cells as illustrated in FIGS. 45A2 and B2 are corrected as illustrated in FIGS. 47A and B, respectively.

Firstly, in step S141 it is determined whether the determined form is a plural-entry form. If it is not a plural-entry form, the determination is no and the process moves to step S145. Otherwise, the determination is yes and the process moves to step S142.

In step S142 a row or column in which headline wordings extracted as searched character strings are arranged is extracted (FIG. 46B2). Then, in step S143 the extracted rows or columns are corrected to be arranged in one straight line respectively. Then, in step S144 other rows or columns are also corrected in conformity with the corrected rows or columns. Then, this cell correction process is terminated.

However, in step S145 it is determined whether the determined form is a plural form. If it is not a plural form, the determination is no and this cell correction process is terminated here. Otherwise, the determination is yes and the process moves to step S146.

In step S146 the average row arrangement is calculated every a plurality of rows. Then, in step S147 it is determined whether there is a row fairly different from the calculated average arrangement. If there is such a row, the determination is yes and after in step 148 the arrangement of such a row is corrected to the average one, this cell correction process is terminated. Otherwise, specifically, if a row to be corrected exists, the determination is no and this cell correction process is terminated here.

FIG. 10 is a flowchart of the no-ruled line table structure analysis process performed in step S95 of the form type determination process illustrated in FIG. 6. Lastly, the analysis process will be explained in detail with reference to FIG. 10. The table structure analysis (no-ruled line) unit 19 in FIG. 1 can be realized by performing this analysis process.

Figure 48A:
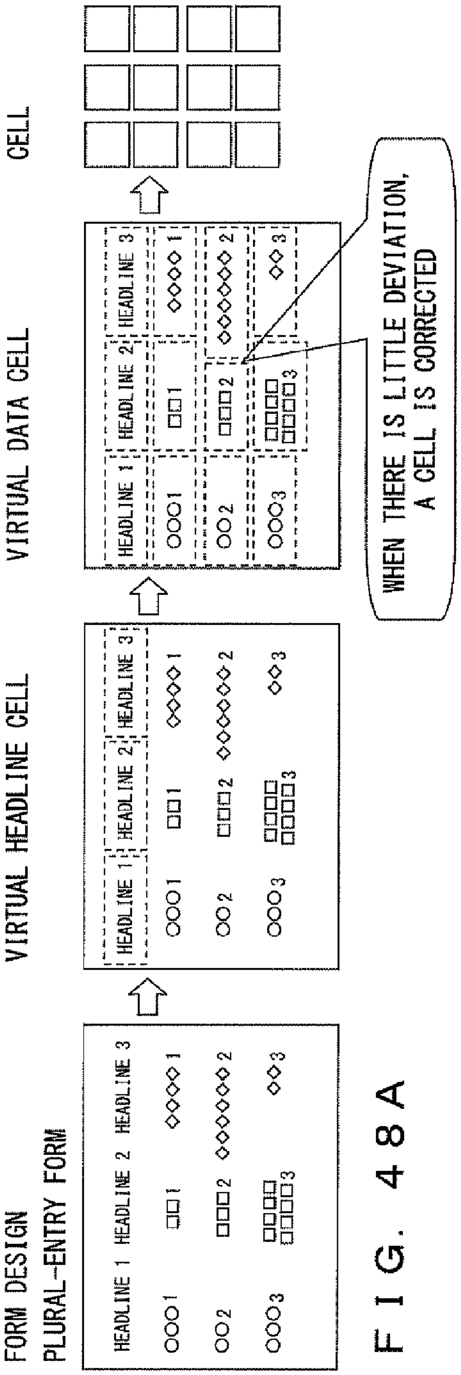
FIGS. 48A&B explain a virtual cell created from a no-ruled line table.

In this analysis process, a searched character string is focused and a cell including the searched character string is virtually created (Hereinafter, cell virtually created for convenience' sake is generally called "virtual cell) and the virtual cell of a searched character string is called "virtual headline cell). A virtual cell including data (hereinafter called "virtual data cell") is created taking into consideration the arrangement of created virtual cell, a searched character string existing in each virtual cell to the type determination result of a form. A virtual cell created thus is set as an actual cell. FIGS. 48A and B illustrated a process of creating a cell thus by dividing it into an actual design stage, a virtual headline cell creation stage and a final cell creation stage. FIGS. 48A and B illustrate those of plural-entry and plural forms, respectively.

Firstly, in step S151 a virtual headline cell is created in a place where a searched character string is extracted respectively. Then, in step S152 it is determined whether a form is a plural-entry one, on the basis of a place where the virtual headline cell is created and the searched character string of each virtual headline cell. If the virtual headline cells of different searched character strings could not be created in such a way to be vertically or horizontally arranged, the determination is no and the process moves to step S156. Otherwise, specifically, if virtual headline cells could be created as illustrated in FIG. 48A, the determination is yes and the process moves to step S153.

In step S153 the virtual cell of a row or column where virtual headline cells are arranged is created or corrected, if necessary, in such a way that the virtual headline cells may be vertically or horizontally arranged in another row or column. Then, in step S154 a virtual data cell is created in a row or column different from the row or column where the virtual headline cells are arranged. After the creation is completed, the process moves to step S155. In step S155 the created virtual cell arrangement is corrected to be more suitable as a plural-entry form. After the correction, the process moves to step S161.

Figure 48B:
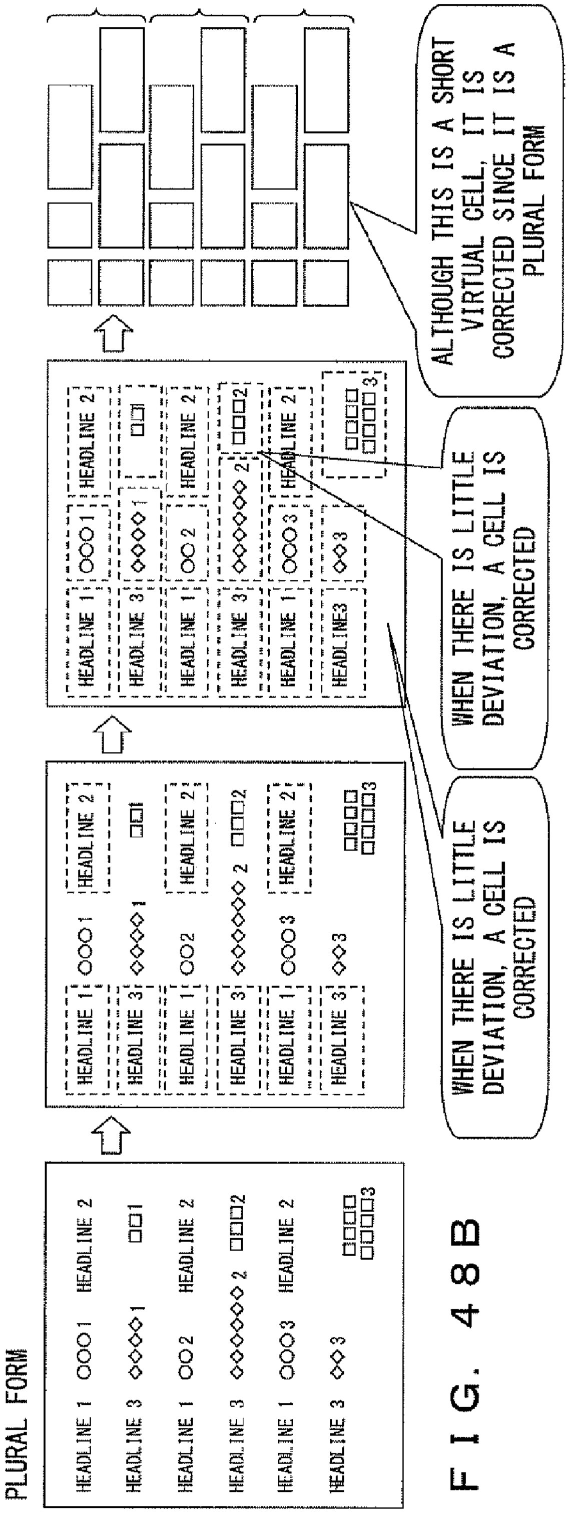

In step S156 it is determined whether a form is a plural one, on the basis of a place where each virtual headline cell is created and the searched character string of each virtual headline cell. If a plurality of virtual headline cells having the same searched character string could not be created in the similar vertical or horizontal positions, the determination is no and the process moves to step S160 to create the virtual cell of a character string regarded as data. After the creation, the process moves to step S161. Otherwise, specifically, if a virtual headline cell could be created as illustrated in FIG. 48B, the determination is yes and the process moves to step S157.

In step S157 a plurality of row or column regions where the arrangement pattern of virtual cells is repeated. Then, in step S158 a virtual data cell is created in each created region. Then, in step S159 the virtual cell arrangement is corrected in conformity with an average arrangement pattern in a plurality of repeated rows or columns, that is, in each created region. Then, the process moves to step S161.

In step S161 the size of deviation between virtual cells regarded to be uniformly arranged is determined. If the deviation is fairly small, it is determined so and the process moves to step S162 to correct the virtual cell arrangement in such a way as to reduce the deviation. After the correction, the process moves to step S163 to examine the positional relationship with a surrounding virtual cell and to correct the arrangement if there is virtual cells whose arrangement should be corrected. After such correction is made to adjust the entire virtual cell arrangement to a more suitable one, the process moves to step S164 to create a virtual cell as an ordinary cell. Then, this no-ruled line table structure analysis process is terminated.

If the deviation between virtual cells regarded to be uniformly arranged is fairly large, it is determined so and the process moves to step S165. In step S165 adjacent virtual cells in the existing direction of the deviation are jointed. Then, the process moves to step S164 to create a virtual cell as an ordinary cell.

Thus, a cell is created even if a form is a no-ruled line table. Therefore, the logical structure analysis (field candidate extraction) unit 20 logically analyzes the structure of a form expressed by a cell, extracts a structurally inappropriate place or a headline wording considered not to be appropriately recognized and corrects it. By the correction, even if it is a table structure without a ruled line, a form can be recognized with higher accuracy, that is, a relationship between a headline wording and data can be recognized.

Figure 11A:
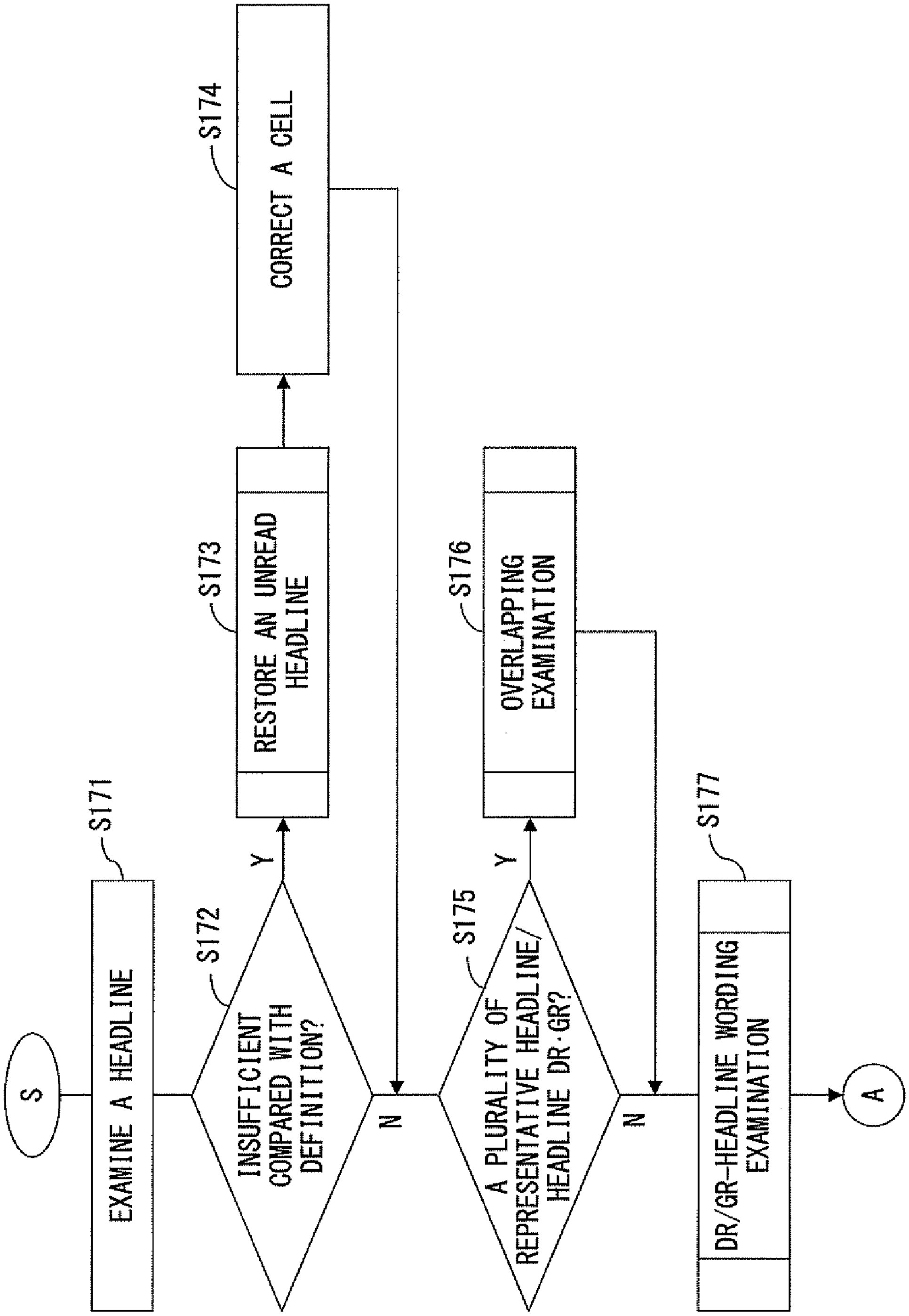
Figure 11C:
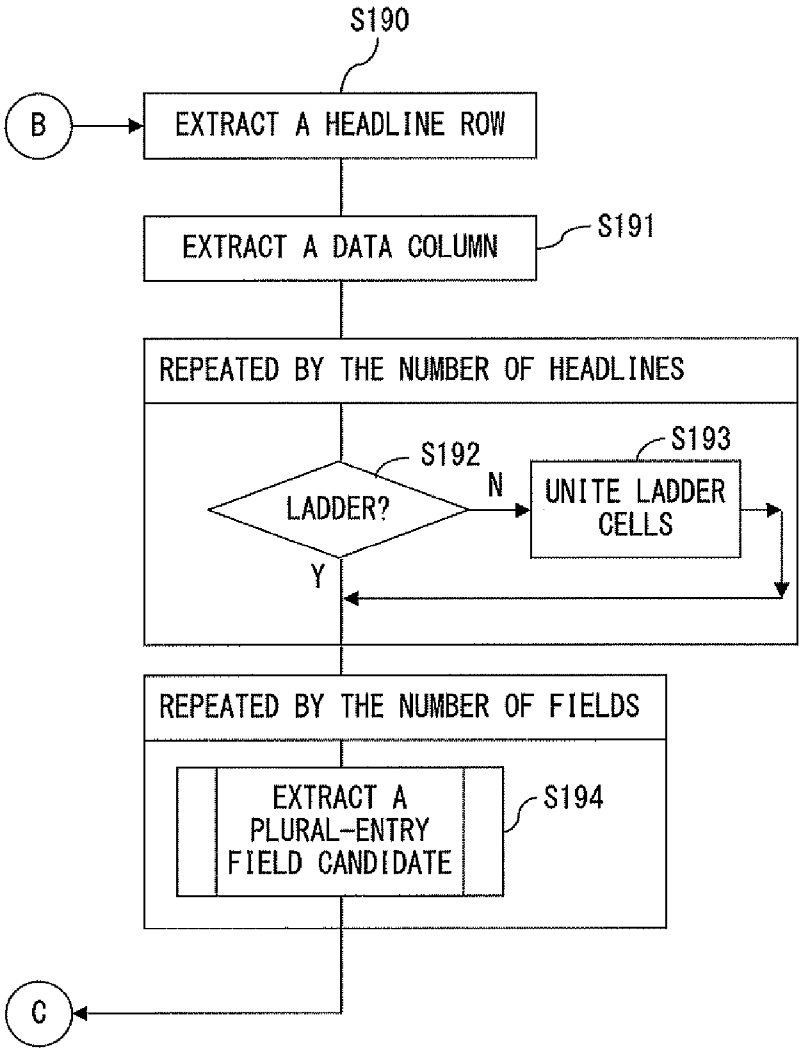

FIGS. 11A-C are a flowchart of the first logical structure analysis process of the logical structure analysis (field candidate extraction) unit 20. Next, the analysis process of the logical structure analysis (field candidate extraction) unit 20 will be explained in detail with reference to FIGS. 11A-C.

Firstly, in step S171 a headline wording extracted by search, that is, a searched character string is examined. Then, in step S172 it is determined whether headline wordings unrecognized by a definition registered in the logical structure analysis DB 25 are insufficient. If unrecognized one exists in the headline wordings considered to be recognized by the definition, the determination is yes and after an unread headline restoration process and a cell correction process in steps S173 and S174, respectively, are performed, the process moves to step S175. Otherwise, specifically, if all the headline wordings considered to be recognized are recognized, the determination is no, the process moves to step S175.

The unread headline restoration process and the cell correction process will be specifically explained.

FIG. 12 is a flowchart of an unread headline restoration process. This restoration process estimates and extracts a headline wording that could not be recognized for a reason, such as noise, dirt, damage or the like. In this restoration process, a re-extraction process by headline position information and a re-extraction process by an exclusive relationship and data information are performed in steps S201 and 202, respectively.

Figure 49C:
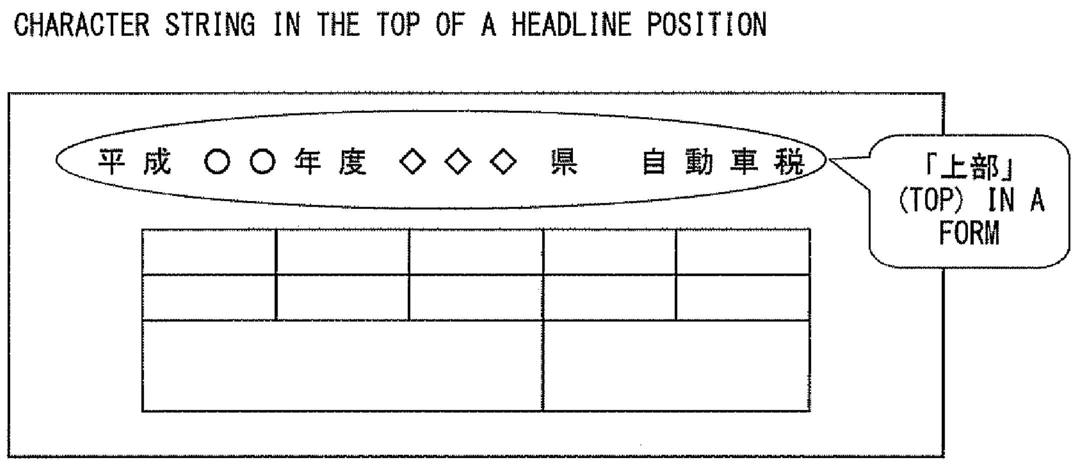
Figure 49D:
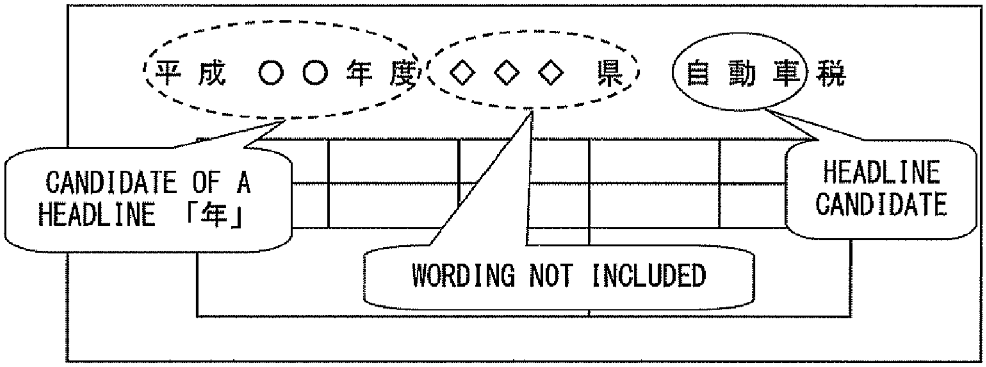

FIGS. 49A through E explain examples of the contents of the re-extraction process by headline position information. FIG. 49A is an extract of the contents defined in the logical structure analysis DB 25 and it is headline position information indicating a position in a form, where a headline wording should exist that is defined in a field "headline position". FIGS. 49B through E are prepared in conformity with the extract of the contents illustrated in FIG. 49A and are a form design, a character string extracted by headline position information in the form design, the operation of the character string and a recognition result obtained by the operation, respectively.

FIG. 49B indicates that of a character string "平成○◇県自動車税" positioned at top of a form, "税" (Tax. A reading in Japanese is "zei") could not be recognized. However, the character string is re-extracted referring to the headline position information of the extract illustrated in FIG. 49A and the operation illustrated in FIG. 49D using the logical structure analysis DB 25. In the operation, since a character string "◇◇◇県" is not included in a representative headline "税名" (Tax name. A reading in Japanese is "zeimei"), it is neglected and even if "税" cannot read (recognized), a character string "自動車税" (Automobile tax. A reading in Japanese is "jidousyazei") can be accurately estimated. A character string "平成○○年度" is related to a representative headline "年" (Year. A reading in Japanese is "nen") corresponding to it. As a result, the character string "平成○○年度◇◇◇県自動車税" is recognized as illustrated in FIG. 49E.

FIGS. 50A through B2 explain another example of the contents of the re-extraction process by headline position information. Like FIG. 49A, FIG. 50A is an extract of the contents defined in the logical structure analysis DB 25. FIGS. 50B1 and B2 are the respective process contents by a form design.

In an extract illustrated in FIG. 50A, headline position information is positioned at top and bottom. A phrase to be extracted is a character string that ends with "市" (City. A reading in Japanese is "shi"). Therefore, in the example illustrated in FIG. 50B1, a character string "○○○市" existing at the top and bottom of a form is re-extracted. However, in the example illustrated in FIG. 50B2, a character string △△税" existing at the top of a form is neglected. Thus, it is regarded that a character string to be extracted does not exist at the top and bottom of the form.

FIGS. 51A through B2 explain the first example of the re-extraction of a headline wording, performed in the re-extraction process by an exclusive relationship and data information. FIG. 51A is an extract of the contents defined in the logical structure analysis DB 25. FIGS. 51B1 and B2 are respective process contents that vary depending on the number of headline wordings that cannot be recognized in the same form design.

Respective form designs illustrated in FIGS. 51B1 and B2 are those of a plural-entry form corresponding to the extract illustrated in FIG. 51A. For simplification sake, all the headline wordings are assumed to be representative headlines. Therefore, in this example, a headline wording is used for the same meaning as a representative headline. This also applies to FIGS. 52A and B and FIGS. 53A through C. In FIG. 51B1, a seal is affixed on a representative headline "口座番号" and cannot be recognized. In FIG. 51B2, besides the representative headline "口座番号" a seal is also affixed on a representative headline "金額" and cannot be recognized.

As described above, representative headlines are determined not to overlap. Therefore, in a plural-entry form, an exclusive relationship for preventing duplication is established between adjacent representative headlines. For this reason, in the example illustrated in FIG. 51B1, the missing character string of the representative headline can be specified to be only one of "口座番号" referring to the logical structure analysis DB 25. Thus, the unrecognizable headline wording can be accurately estimated (restored) to be 号".

In the example illustrated in FIG. 51B2, the missing character strings of the representative headline can be specified to be two of "口座番号" and "金額" referring to the logical structure analysis DB 25. However, since a plurality of representative headlines is missing, positions where the missing representative headlines are arranged cannot be specified. Therefore, in order to specify the positions, data information having respective pieces of information of an attribute, a format and an accessory symbol are used.

The data of the data information of the representative headline "口座番号" is a seven-digit numeral string and the data information indicates that no accessory symbol is attached to the data. The data of the data information of the representative headline "金額" is a numerical string whose number of digits is not limited and the data information indicates that there is a possibility that a phrase "¥" may be attached to the head (beginning) of the data, a phrase "円" may be attached to the end or a phrase "," is arranged between figures. For this reason, it can be accurately estimated (restored) that the representative headline corresponding to data to the head of whose numeral string a phrase "¥" is attached will be "金額" Thus, it can be accurately estimated (restored) that the remaining representative headline will be "口座番号"

FIGS. 52A and B explain the second example of the re-extraction of a headline wording, performed in the re-extraction process by an exclusive relationship and data information. FIG. 52A is an example of a form in which un-recognizable headline wording exists. FIG. 52B is the contents corresponding to the form, defined in the logical structure analysis DB 25.

In FIG. 52A, representative headlines "支店名" (Branch name. A reading in Japanese is "shitenmei") and "口座番号" are not extracted. However, "支店" (Branch. A reading in Japanese is "shiten") is attached to each piece of data of the representative headline "支店名" as an accessory symbol and the representative headline "口座番号" is attribute of the data is a numerical string. Therefore, because of such a data difference, both the undetected representative headlines "支店名" and 座番号" can be accurately estimated.

In this way, depending on a headline wording, there is a possibility that a peculiar accessory symbol, such as "円" or "支店" may be attached to a character string existing as the information. A position where such an accessory symbol is attached is peculiar to the accessory symbol. Therefore, an accessory symbol and information indicating the position (accessory symbol information) is very effective in specifying information (character string) corresponding to a headline wording. Therefore, accessory symbol information is prepared for a headline having a possibility that an accessory symbol may be attached to a corresponding character string.

Figure 54A:
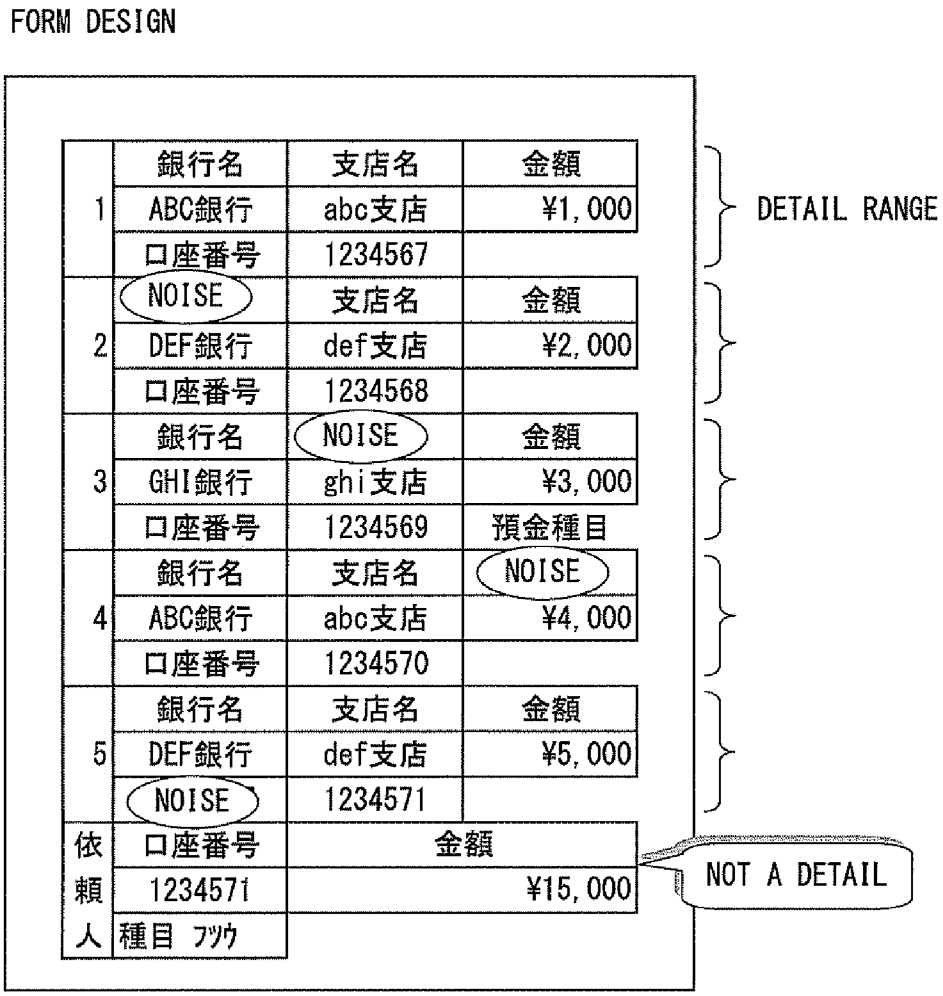
Figure 54B:
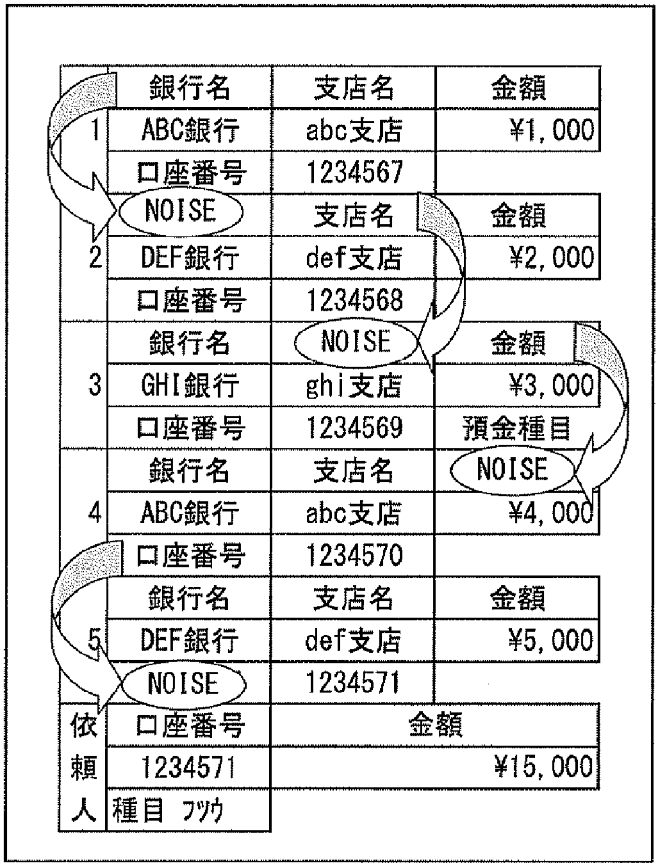
Figure 56A:
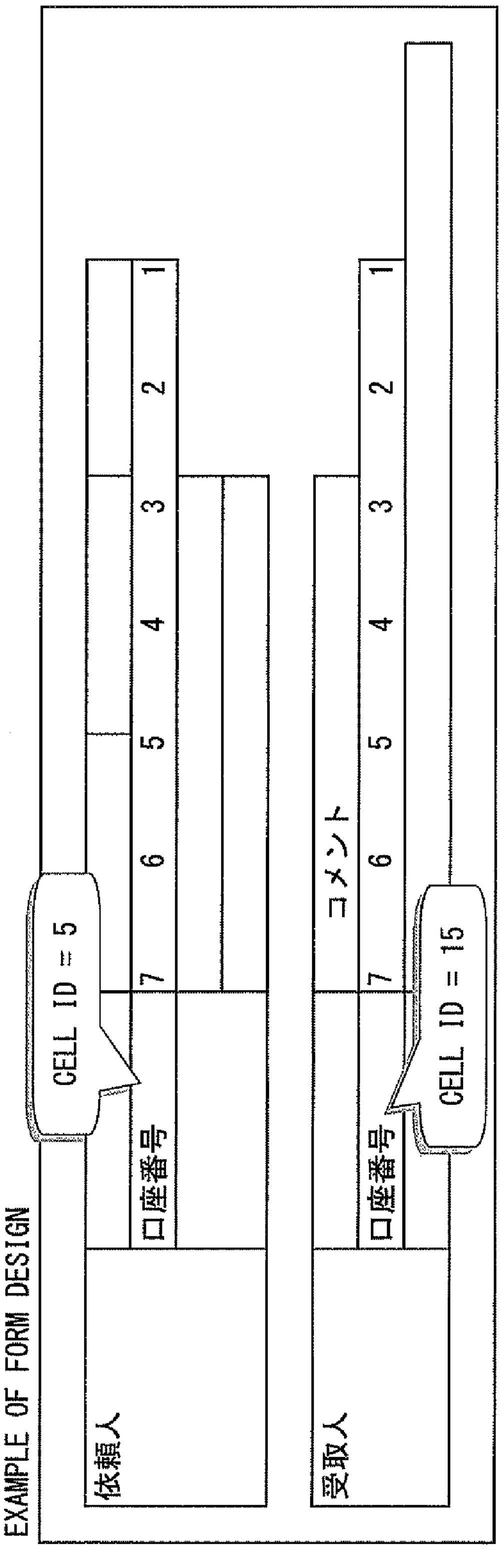
Figure 56D:
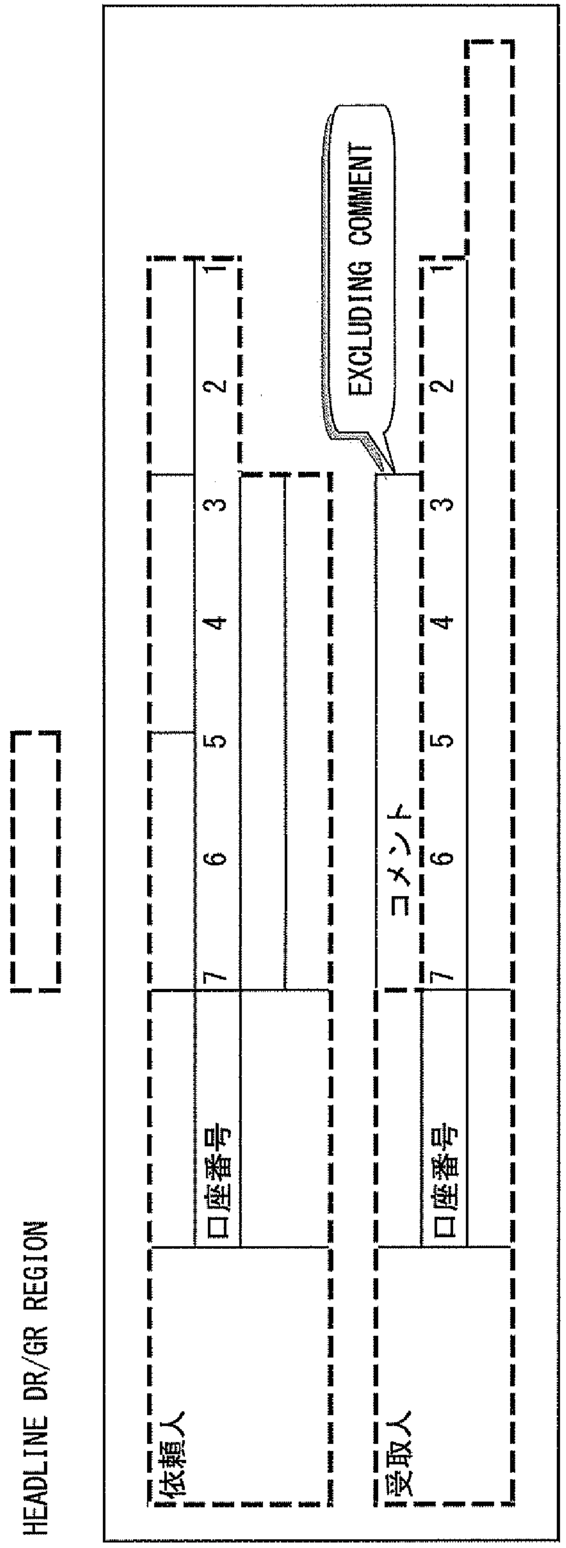

In a plural form, a table structure having the same one or more representative headlines is repeated. In the repeated part of a table structure (hereinafter called "detail range"), the same representative headline exists in the same position. Therefore, when a representative headline is extracted from the same position of another detail range even if there is a cell from which a representative headline is not extracted in some detail range, as illustrated in FIGS. 54A through C, the un-extracted representative headline can be accurately estimated. However, otherwise, specifically, if the same representative headline is not extracted all the detail ranges, an un-extracted representative headline cannot always accurately estimated. For example, unless either a condition that only one representative headline is considered not to be extracted or a condition that the attribute of the data of an un-extracted representative headline is different from the attribute of any piece of the data of other representative headlines is met, it cannot be accurately estimated. Therefore, in this preferred embodiment, when an un-extracted representative headline cannot be accurately estimated, a representative headline to be assigned to the un-extracted representative headline and the order (data position order) is created and is assigned to a representative headline that may be not extracted.

Figure 53A:
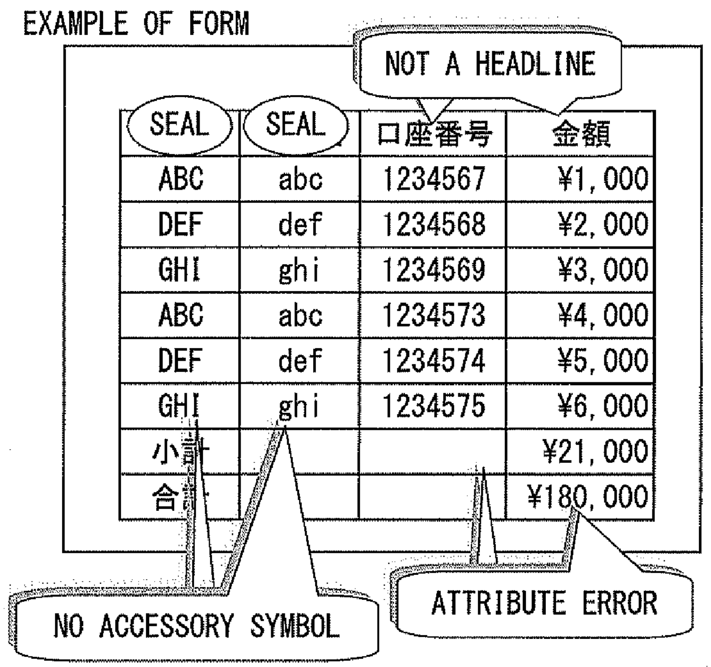

FIGS. 53A through C explain the third example of the re-extraction of a headline wording, performed in the re-extraction process by an exclusive relationship and data information. Since an undetected representative headline cannot be estimated even using the exclusive relationship and data information of a representative headline, FIG. 53A through C is a case where a representative headline is estimated by creating data position order. FIGS. 53A, 53*b* and 53C illustrate an example of a form in which an un-recognizable headline wording exists, the contents corresponding to the form defined in the logical structure analysis DB 25 and created data position order, respectively.

In FIG. 53A, both representative headlines 〝銀行名〞 (Bank name. A reading in Japanese is "ginkoumei") and 〝支店名〞 are not extracted. However, the attributes of respective piece of data of the representative headlines 〝銀行名〞 and 〝支店名〞 are the same and no accessory symbol distinguishable those pieces of data is attached to them. Therefore, no information for specifying an undetected representative headline can be obtained. Thus, data position order of specifying the representative headlines 〝銀行名〞 and 〝支店名〞 as the first and second order, respectively, is created and respective representative headlines whose data position order is created are assigned to the undetected representative headlines according to a prescribed rule.

Thus, by assigning some representative headline to undetected representative headline, the operator can modify an extracted representative headline if necessary. Therefore, compared with a case where the operator has to input all undetected representative headlines, the load of the operator can be reduced more.

Figure 13A:
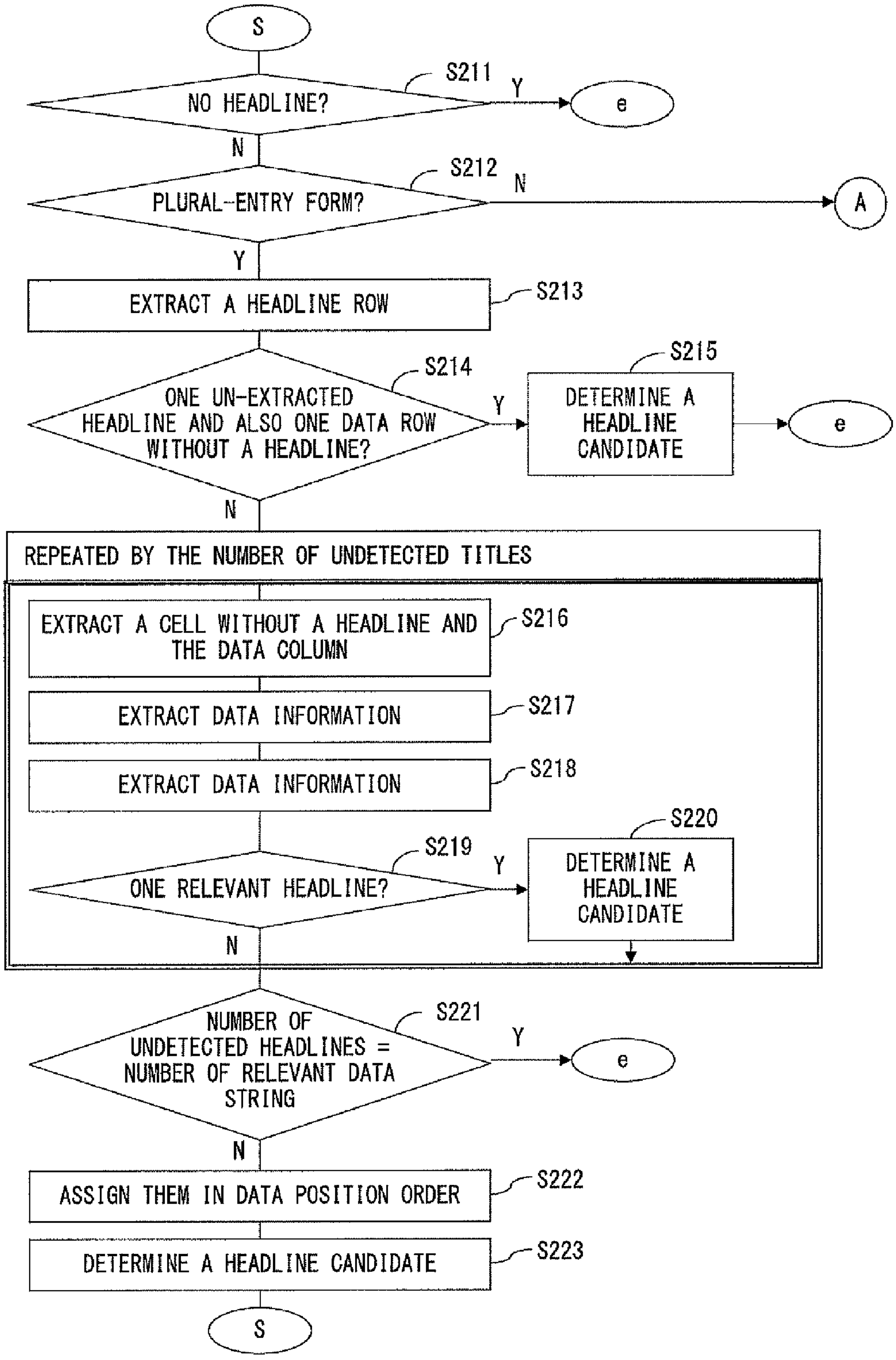
FIGS. 13A&B are a flowchart of a re-extraction process by an exclusive relationship and data information.

FIGS. 13A and B are a flowchart of the re-extraction process by an exclusive relationship and data information, explained with reference to FIGS. 51A through 53C. Next, the re-extraction process will be explained in more detail with reference to FIGS. 13A and B.

Firstly, in step S211 it is determined whether there is no detected headline. If even one headline could not be detected, the determination is yes and this re-extraction process is terminated here. Otherwise, the determination is no, and the process moves to step S212.

In step S212 it is determined whether the form is a plural-entry one. If the form type determination unit 18 determines that it is not a plural-entry one, the determination is no, and the process moves to step S224. Otherwise, the determination is yes, the process moves to step S213.

In step S213 a row in which headline wordings are arranged (headline row) is extracted. In step S214, the logical structure analysis DB 25 is referenced and it is determined whether the number of extracted headline wordings in the headline row is one and also the number of data strings in which no headline wording is detected is one. If the number of headline wordings considered to be one of a data string is only one, the determination is yes and after in step S215 the representative headline is determined as an undetected representative headline candidate, this re-extraction process is terminated. Otherwise, the determination is no, and the process moves to step S216.

Steps S216 through S220 form a process loop performed by the number of undetected headline wordings. Thus, one is selected from the undetected headline wordings, the selected headline wording is focused and a representative headline corresponding to the headline wording is specified.

Firstly, in step S216 an undetected headline wording is selected and a cell in which the headline wording exists and a data string in which data related to the cell exists are extracted. In step S217 the data information of the data string is extracted. After the extraction of the data information, the process moves to step S218. In step S218 the logical structure analysis DB 25 is referenced and a representative headline is selected focusing on the exclusive relationship and data information of the representative headline is extracted. The representative headline is selected as explained with reference to FIGS. 51A through 52B.

In step S219 it is determined whether the number of representative headlines extracted by selection is one. If only one representative headline could be extracted, the determination is yes and the process moves to step S220. After in step S220, it is determined that the extracted representative headline is undetected headline wording, a series of processes is terminated and the process returns to step S216. Otherwise, the determination is no and the series of processes is terminated.

After the above-described series of processes is performed by the number of undetected headline wordings, the process moves to step S221. In step S221 it is determined whether the number of undetected headline wordings is the same as the number of extracted data strings. If a data string related to each undetected headline wording could not be extracted, the determination is no, and the re-extraction process by an exclusive relationship and data information is terminated here. This is because there is a possibility that there may be an error in determining a headline wording considered to be undetected or the like. Otherwise, the determination is yes and the process moves to step S222.

In step S222, data position order is created and representative headlines are assigned to undetected headline wordings according to the priority order. Then, in step S223 the assigned representative headlines are determined. Subsequently, the re-extraction process by an exclusive relationship and data information is terminated.

If the determination in step S212 is no, the process moves to step S224. In step S224 it is determined whether a form is a plural form. If the form type determination unit 18 determines that it is not a plural form, that is, it is a single form, the determination is no and the re-extraction process by an exclusive relationship and data information is terminated here. Otherwise, the determination is yes and the process moves to step S225.

In step S225 a detail range being the repeated part of a table structure is extracted. After the extraction the process moves to step S226. In step S226 it is determined whether all undetected headline wordings are the same in the extracted detail range, in other words, the undetected headline wordings in a certain detail range is detected in another detail range. If all the headline wordings in a certain detail range are detected in any detail range, the determination is yes and after in step S227 the undetected headline wordings (of a representative headline) are determined as illustrated in FIGS. 54A through C, the re-extraction process by an exclusive relationship and data information is terminated. Otherwise, the determination is no and the process moves to step S228.

Steps S228 through S233 form a process loop performed by the number of undetected headline wordings in all detail ranges like steps S216 through S220. Thus, one is selected from the undetected headline wordings, the selected headline wording is focused and a representative headline corresponding to the headline wording is specified.

Firstly, in step S228 undetected headline wording is selected, and a cell in which the headline wording is existed and data related to the cell are extracted. Then, in step S229 the data information of data is extracted. After the extraction of the data information the process moves to step S230. In step S230 the logical information analysis DB 25 is referenced and a representative headline is selected focusing on the exclusive relationship and data information of the representative headline is extracted.

Then, in step S231 it is determined whether only one representative headline is extracted by selection. If only one representative headline is extracted, the determination is yes and the process moves to step S232. In step S232 the extracted representative headline is determined to be for an undetected headline wording. In step S233, after the determination result is reflected in other detail ranges, a series of processes is terminated and the process returns to step S228. Otherwise, the determination is no, and a series of processes is terminated here.

After the above-described series of processes is performed by the number of undetected headline wordings, the process moves to step S234. In step S234 it is determined whether the number of undetected headline wordings is the same as the number of extracted data. If data related to an undetected headline wording could not be extracted for each undetected headline wording, the determination is no and the re-extraction process by an exclusive relationship and data information is terminated here. This is because there is a possibility that there may be an error in the determination of a headline wording considered to be not detected or the like. Otherwise, the determination is yes and the process moves to step S235.

In step S235, data position order is created and representative headlines are assigned to undetected headline wordings according to the priority order. Then, in step S236 the assigned representative headlines are determined. Then, the process moves to step S237. In step S237 the determination result is reflected in other detail ranges. After the reflection, the re-extraction process by an exclusive relationship and data information is terminated.

When an unread headline restoration process including the above-described sub-routine processes is performed, there is a possibility that a representative headline or a read headline wording may be assigned to an unread headline wording. Therefore, in the cell correction process performed in step S174 illustrated in FIG. 11A, a cell is created, as illustrated in FIGS. 55A through B4, according to the execution result of the unread headline restoration process, specifically, the restoration result performed by assigning a representative headline or a read headline wording to an unrecognized headline wording. In FIGS. 55A1 through B4, an unrecognized headline wording is described as "headline". Sometimes a cell is created even if it could not be recognized. In that case, the new cell of data is created, as illustrated in FIGS. 55A1 through A3. When a cell is not created, new cells for a headline wording and data are created.

Back to the explanation of FIG. 11A, after the cell correction process in step S174, the process moves to step S175. In step S175 it is determined whether there is a plurality of any of representative headlines or headline GR or DR. If a plurality of at least one of representative headlines or headline GR or DR exists, the determination is yes and after in step S176 a duplication examination process is performed, the process moves to step S177. Otherwise, the determination is no and the process moves to step S177. In step S177 DR/GR-headline wording examination process is performed. After the execution the process moves to step S178.

Here, sub-routine processes performed in steps S176 and S177 will be explained in detail.

FIG. 14 is a flowchart of the duplication examination process performed in step S176. Firstly, the examination process will be specifically explained with reference to FIG. 14.

It is set that only one headline DR and GR each exist in a table structure (unit table structure) in the range of which one or more pieces of related data are inputted. In the table structure, a plurality of the same representative headlines does not exist. Therefore, the duplication examination is performed in order to evaluate (extract) a correspondence relationship between headlines DR and GR and a representative headline. Since in a plural form a table structure in the range of which only one headline DR/GR exists, corresponds to a detail range, hereinafter the "detail range" is also used to mean the table structure.

FIGS. 56A through E explain the contents of the duplication examination process. FIGS. 56A, 56B, 56C, 56D and 56E indicate an example of a form design, the contents of the logical structure analysis DB 25 corresponding to the example of a form design, a keyword extraction result updated by the connection with the logical structure analysis DB 25, a region set for each headline DR or GR (headline DR/GR region) and a keyword extraction result after the duplication examination, respectively. The headline DR/GR region corresponds to a table structure-existing range to which one or more pieces of related data are inputted and only one headline DR/GR exists in the range. In the duplication examination process, a correspondence relationship between a headline DR or GR and a representative headline is extracted by specifying a representative headline existing in a headline DR/GR region for each headline DR/GR region being the range.

Firstly, in step S251 it is determined whether there is a plurality of the same representative headlines. If there is only one of the same representative headline, the determination is no and the duplication examination process is terminated here. Otherwise, the determination is yes and the process moves to step S252.

In step S252 it is determined whether a headline score MT are larger than a headline passing score MTth being a threshold value in all existing representative headlines. If any representative headline cannot be regarded as a keyword, the determination is no and the duplication examination process is terminated here. Otherwise, the determination is yes and the process moves to step S253. In step S253 the number of representative headlines is assigned to a variable DMn. After the assignment, the process moves to step S254.

Steps S254 through S261 form a process loop repeatedly performed by the number of the same extracted headline wordings (searched character string). Of them, steps S259 through S261 further form a process loop repeatedly performed by the number of representative headlines. Steps S254 through S261 are performed to only representative headlines as a searched character string, focusing on the headline DR or GR of one representative headline. Thus, one headline DR/GR region is set and a representative headline that may be considered to exist in the region is evaluated.

Firstly, in step S254, search for extracting the headline DR or GR of a representative headline from the logical structure analysis DB 25 is conducted using the keyword extraction result. Then, in step S255 the wording of a headline DR or GR is extracted from a form and the process moves to step S256. In step S256, a headline DR/GR region is set using the extraction result. Then, in step S257 it is determined whether there is a comment in the headline DR/GR region. If a comment exists in the region, it is determined so and the process moves to step S258. After the comment region in which the comment exists is disturbed and eliminated from the DR/GR region, the process moves to step S259. Otherwise, it is determined so and the process moves to step S259.

In step S259 the representative headline used for the search in step S254 is focused, one is selected from the representative headlines obtained by the keyword extraction and it is determined whether the ID of a cell in which the selected representative headline exists is in the headline DR/GR region. If the cell constitutes a headline DR/GR region, the determination is yes and after in step S260 the headline score MTn is updated to a value obtained by adding a prescribed value (described as the "OK point of a headline DR/GRQ" in FIG. 11) to the current value, the duplication examination process is terminated. Otherwise, the determination is no and after in step S261 the headline score MTn is updated to a value obtained by subtracting another prescribed value (described as the "NG point of a headline DR/GRQ" in FIG. 14) from the current value, the duplication examination process is terminated. By evaluating the headline score MYn by updating it thus, a headline DR or GR corresponding to the representative headline (headline wording) of each cell is related (FIG. 56E).

Figure 15A:
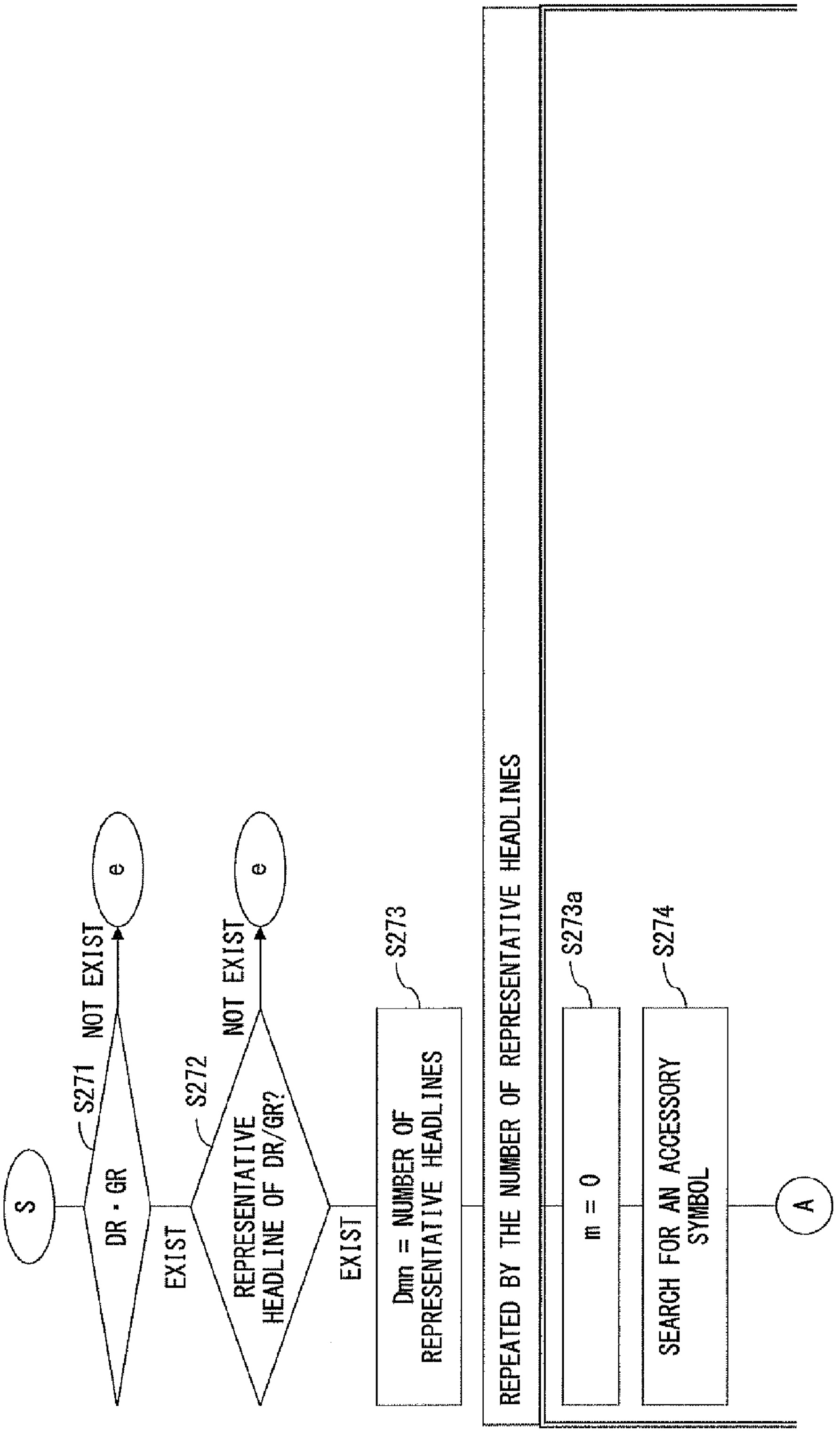
FIGS. 15A&B are a flowchart of a DR•GR-headline wording examination process.

FIGS. 15A and B are a flowchart of the DR/GR-headline wording examination process performed in step S177. Next, the examination process will be explained in detail with reference to FIGS. 15A and B.

Only one headline DR and GR each exist in a table structure (detail range) in the range of which one or more related data are inputted. However, a representative headline or a headline wording to which a representative headline is assigned does not always exist in the table structure. Therefore, the DR/GR-headline wording examination is made in order to estimate/supplement a representative headline not existing in the table. By adding the representative headline, the operator can be assisted in understanding the contents of a form more easily. Since a correspondence relationship between a headline wording and data is automatically created, the necessity of information input is reduced.

FIGS. 57A1 through B3 explain the contents of the DR/GR-headline wording examination process. FIGS. 57A1 through A3 and B1 through B3 indicate an example of a form design (detail range), the contents of the logical structure analysis DB 25 and a representative headline estimated/added from a form design using the logical structure analysis DB 25 in FIGS. 57A1 and B1, FIGS. 57A2 and B2 and FIGS. 57A3 and B3, respectively. The estimated/added representative headline is described as a "virtual headline" in FIGS. 57A1 through B3. The virtual headline is essentially set by a connection relationship in a dimension different from one of a cell in a form. A cell in which a virtual headline is arranged (cell indicated by a two-point chain line is arranged at the top of a table structure. Therefore, in the DR/GR-headline wording examination process, besides a virtual headline a connection relationship between the virtual headline and data is specified. The DR/GR-headline wording examination process will be explained in detail below with reference to FIGS. 15A and B.

Firstly, in step S271 it is determined whether there are headline DR and GR. If neither a headline DR nor GR exists, it is determined so and the examination process is terminated here. Otherwise, it is determined so and the process moves to step S272. In step S272 it is determined whether a representative headline exists in an existing headline DR or GR. If a representative headline exists in any of a headline DR or GR, it is determined so and this examination process is terminated.

Otherwise, specifically, if there is a headline DR or GR in which no representative headline exists, it is determined so. After in step S273, the number of representative headlines is assigned to a variable Dmn, the process moves to step S273*a*. In this case, the number of representative headline assigned to the variable Dmn is, for example, the number of headline DR or GR in which a representative headline is not detected. This is because it is all right if only a table structure (detail range) in which a representative headline should be estimated (created) is targeted.

Steps S273*a* through S285 form a process loop repeatedly performed for the initial value of a variable DMn. Thus, a representative headline is estimated for each table structure in which a representative headline should be estimated (created).

Firstly, in step S273*a*, 0 is assigned to a variable m and in step S274 the accessory symbol of data information set in a headline wording to which a headline DR or GR is assigned is searched for in a table structure (detail range). Then, in step S275 it is determined whether there is an accessory symbol extracted by the search. If the accessory could be extracted, it is determined so and the process moves to step S278. Otherwise, specifically, the accessory symbol could not be extracted or an accessory symbol is not defined in the data information, it is determined so and the process moves to step S276.

In step S276 a data cell range to which a virtual headline is assigned is extracted from data position order. In this case, for example, as illustrated in FIGS. 57B1 through B3, a data cell in which data exists is extracted according to the data position order. Then, in step S277 a virtual cell to be jointed to the extracted data is created. Subsequently, the process moves to step S283.

In step S278 it is determined whether an accessory symbol is existed in a cell arranging in a position defined by the data information. For example, as illustrated in FIGS. 57A1 through A3, if a data cell having data "ABC 銀行" to which an accessory symbol "銀行" (Bank. A reading in Japanese is "ginkou") is attached at the end whose position is defined exists, it is determined that there is a target cell. After in step S279, a virtual cell to be jointed to the data cell is created, the process moves to step S283. Otherwise, it is determined so and the process moves to step S280. In step S279 a virtual headline is uniquely specified by the data cell.

In step S280, of data (character string) to which an accessory symbol is attached, one to which a representative headline can be assigned is searched for and it is determined whether there is data to which a representative headline can be assigned. If data to which data can be assigned exists, it is determined so and after in step S281 a virtual cell to be jointed to the data cell, the process moves to step S283. Otherwise, it is determined so and after in step S282 a corresponding headline score MTn is updated, a series of the processes is terminated. The corresponding headline score MTn currently belongs to the headline DR or GR of a target table structure (detail range) and the score MTn is updated by subtracting a prescribed value for evaluating the fact that there is no representative headline candidate from the current value. Thus, the evaluation of a headline DR or GR as a headline is reduced. In step S281 a virtual headline is specified by the data cell extracted by search or the data position order.

In step S283 a virtual headline is set (created) in each of the created virtual cells. Then, in step S284 the value of the variable m is updated. In this case, the value is updated by adding a value obtained by subtracting 1 from the number of the set virtual headlines to the current value. It is because it is assumed that at least one representative headline is set in the headline DR or GR that 1 is subtracted. After the update, in step S285 a virtual headline point being a value set as the initial value of a virtual headline is set as each headline score MTn of the set virtual headline. Then, a series of the processes is terminated.

Back to the explanation of FIGS. 11A and B again, after the DR/GR-headline wording examination process is completed, the process moves to step S178 and it is determined whether the form is a plural-entry one. If the form is a plural-entry one, the determination is yes and the process moves to step S190. Otherwise, the determination is no and the process moves to step S179.

By the execution of the DR/GR-headline wording examination process, besides the headline wording extracted from a form as a keyword, a headline wording considered to exist (a representative headline) is extracted and a headline wording to be considered is determined. Steps S179 through S185 form a process loop repeatedly performed by the number of the determined headline wordings. Thus, a headline wording is evaluated for each headline wording.

Firstly, in step S179 one is selected from headline wordings and it is determined whether there is another character string in the cell of the selected headline wording (hereinafter described as a "target cell" in order to distinguish it from other cells). If there is only a headline wording in the target cell, it is determined that there is no other character string and the process moves to step S182. Otherwise, it is determined that there is another character string and the process moves to step S180.

In step S180 a prescribed value (described as "an intra-the same cell data point" in FIG. 11B) is set as the initial value of a score DTnm for evaluating a character string in a target cell for each row. Then, in step S181 an intra-cell field candidate extraction process for extracting a character string that can be another field name or data candidate is performed. After the execution, the process moves to step S182. The n and m of the score DTnm indicate the m-th character string in a target cell in which the n-th headline wording exists, respectively.

In step S182 it is determined whether there is a character in a cell on the right. If there is a character in the cell positioned on the right of the target cell, it is determined that there is a character and the process moves to step S183. In step S183 a right field candidate extraction process for reflecting the fact that there is the character in the score DTnm is performed. Then, the process moves to step S184. Otherwise, it is determined so and the process moves to step S184. It is because there is a high possibility that a design in which data may be inputted on the right of the field name that whether there is a character in a cell position on the right is reflected in the score DTnm.

In step S184 it is determined whether there is a character string in a cell below. If a character string exists in a cell positioned under the target cell, it is determined that there is a character string and the process moves to step S185. In step S185 a bottom field candidate extraction process for reflecting the fact that there is a character string in the score DTnm is performed. Then, a series of the processes is terminated. Otherwise, it is determined so and a series of the processes is terminated here. It is because there is a high possibility that a design in which data may be inputted to a cell positioned under the field name that whether there is a character in a cell position blow is reflected in the score DTnm.

Thus, headline wordings are evaluated for each extracted headline wording. After the entire evaluation is completed, the process moves to step S186.

The extraction of a headline wording and data is applied to a recognition result by the character recognition unit 16 illustrated in FIG. 1. All characters are not always accurately recognized. If there is an error in the recognition, there is a possibility that a headline wording may not be appropriately extracted. Therefore, in step S186 recognition accuracy is focused and a field analysis necessary/unnecessary determination process for determining whether a headline wording should be analyzed is performed. After the execution, the process moves to step S187. Various types of information for determining the recognition accuracy is obtained from the character recognition unit 16.

In step S187 it is determined whether the execution result of the field analysis necessary/unnecessary determination process should be analyzed the field. If a headline wording whose recognition accuracy is fairly low exists, the field analysis is needed. As a result, the determination is yes and after in step S189 necessary field analysis is conducted, this logical structure analysis process is terminated. Otherwise, the determination is no and the logical structure analysis process is terminated here.

If the determination in step S178 is yes, the process moves to step S190. In step S190 a headline row in which headline wordings considered to be field names are arranged is extracted. Then, in step S191 a data string connected to the headline row is extracted. Then, the process moves to step S192.

Steps S192 and S193 form a process loop repeatedly performed by the number of the headline wordings extracted as field names in a headline row.

In the process loop, firstly, in step S193 one is selected from headline wordings (field names) existing in a headline row and it is determined whether the cell of data strings related to the headline wording clearly forms a ladder. If the cells of data strings are almost uniformly arranged, as illustrated in FIG. 45A1 or A2, the determination is no and after in step S193 cells are united in such a way as to uniformly arrange them, a series of the processes is terminated. Otherwise, the determination is yes and a series of the processes is terminated here. After the process loop is repeated by the number of headline wordings, the process moves to step S194.

After in step S194 a plural-entry field candidate extraction process for extracting a character string that can be another headline wording existing in the cell is performed by the number of cells corresponding to fields in which headline wordings are detected, the process moves to step S186.

Next, the sub-routine processes performed in steps S181, S183, S185, S186 and S194 will be explained in detail respectively.

Figure 16B:
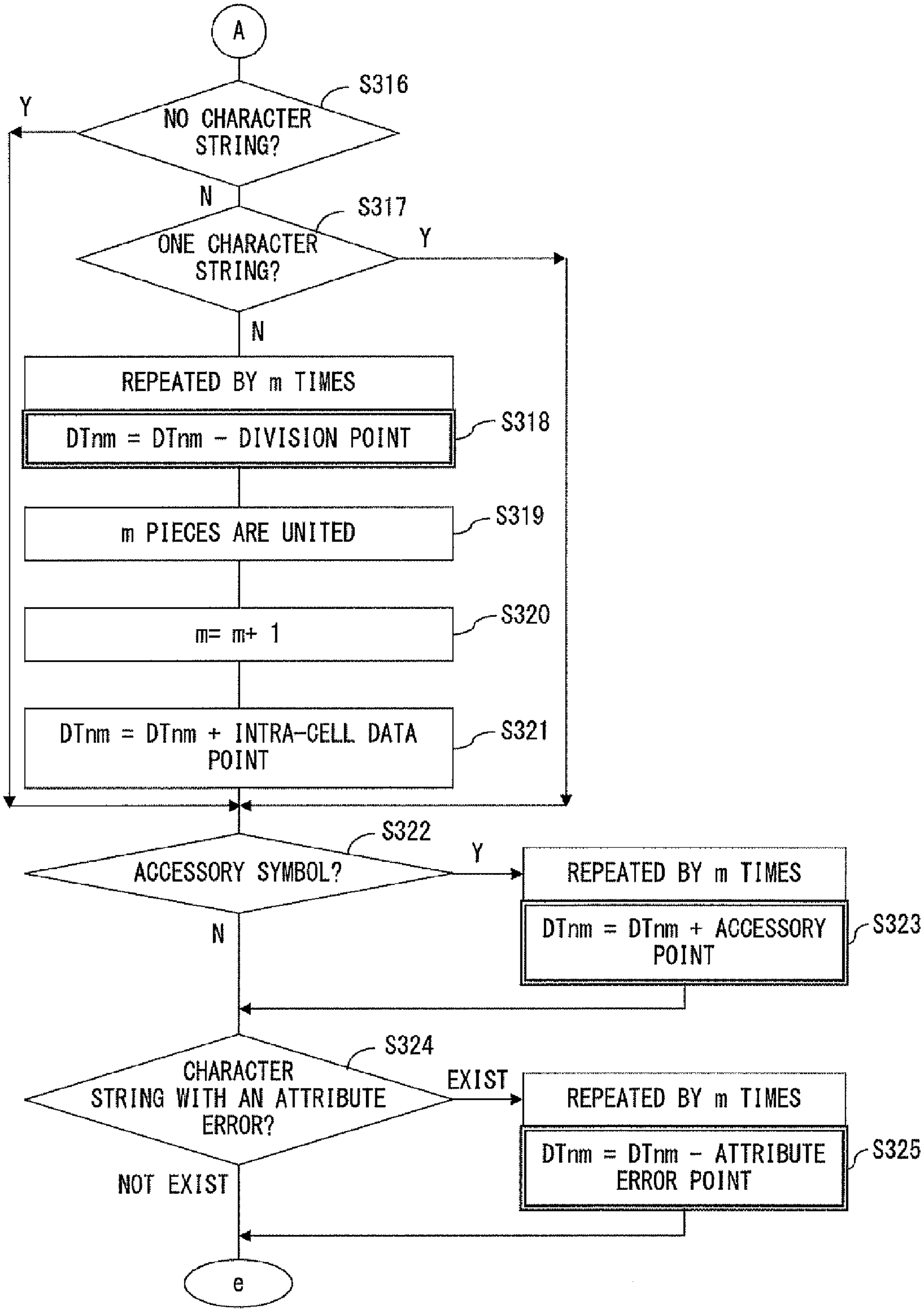
FIGS. 16A & B is a flowchart of an intra-cell field candidate extraction process.

FIGS. 16A and B are a flowchart of the intra-cell field candidate extraction process performed in step S181. Firstly, the extraction process will be explained in detail with reference to FIGS. 16A and B. This extraction process is performed focusing on only a target cell.

As illustrated in FIGS. 58A through E, sometimes a plurality of distinguishable character strings exists in the same cell. This intra-cell field candidate extraction process is performed in order to extract a character string that can be another field name or data candidate from a cell. In the extraction, character strings that can be a candidate is extracted, all unnecessary things are eliminated from the extracted character strings and the remaining character strings are united if necessary. The unification corresponds to the case illustrated in FIGS. 58D and E, of FIGS. 58A through E. In FIGS. 58A through E, a "headline" indicates an already extracted headline wording and a character string enclosed by a broken line indicates an extracted character string or a united character string. A "pre-print" is a non-recognition target character string existing in a form and it can be determined by, for example, the color, the shape of a character or the contents.

Firstly, in step S301 it is determined whether a plurality of headline wordings exists in a target cell. If a plurality of headline wordings exists in a target cell, the determination is yes and the process moves to step S302. After in step S302 an intra-cell plural field candidate extraction process for extracting one that can be a field name candidate, of the plurality of headline wordings is performed, this intra-cell plural field candidate extraction process is terminated. Otherwise, the determination is no and after in step S303 0 is assigned to the variable m, the process moves to step S304.

Steps S304 through S315 form a process loop repeatedly performed by the number of character strings extracted from a target cell other than headline wordings. Thus, character strings are evaluated as data for each character string changing a focused character string and the score DTnm is updated if necessary. In this case, the focused character string is described as a "target character string".

Firstly, in step S304 it is determined whether a target character string is composed of only accessory symbols that may be attached to data inputted by a headline wording. If only accessory symbols exist as a target character string, the determination is yes and after in step S305 a headline score MTn is updated, a series of the processes is terminated. In the update, headline wording likeness is evaluated higher, for example, by adding a predetermined headline accessory point to the current value. Otherwise, the determination is no and the process moves to step S306.

In step S306 it is determined whether the target character string is a "pre-print". If the target character string is a "pre-print", the determination is yes and a series of the processes is terminated here. Thus, in the example illustrated in FIG. 58A, the pre-print is eliminated. Otherwise, the determination is no and the process moves to step S307.

In step S307 it is determined whether the attribute of the target character string is the same as the attribute of data inputted by a headline wording. If their attributes are the same, the determination is yes and after in step S309 the score DTnm is updated, the process moves to step S310. Otherwise, the determination is no and after in step S308 it is determined that there is an attribute error in the target character string, a series of the processes is terminated. The score DTnm is updated by adding an intra-data point being a predetermined value to the current value. Thus, the target character string is evaluated higher as data inputted by a headline wording.

In step S310 it is determined whether the target character string includes an accessory symbol that may be attached to the data inputted by a headline wording. If the accessory symbol is attached to the target character string, the determination is yes and after in step S311 the score DTnm is updated, the process moves to step S312. Otherwise, the determination is no and the process moves to step S312. In step S311 the score DTnm is updated by adding an accessory point being a predetermined value to the current value. Thus, the target character string is evaluated higher as data inputted by a headline wording.

In step S312, since the target character string is the same as data inputted by a headline wording at least in the attribute, the target character string is determined as its data candidate. Then, in step S313 it is determined whether the target character string is near the previous row (for example, a row above). If the target character string exists in a position corresponding to any of the character strings "レート銀行", "× and "□□棟◇◇号" illustrated in FIGS. 58D and E, the determination is yes and after in step S314 the target character string and a character string in the previous row are united into one character string, a series of the processes is terminated. Otherwise, the determination is no and after in step S315 the value of a variable m is incremented, a series of the processes is terminated.

Thus, the target character string is evaluated as a data candidate and is united with another character string as requested. After such a process is applied to all character strings, the process moves to step S316. At this moment, the number of character strings to be considered as data candidates in a target cell is assigned to the variable m.

In step S316 it is determined whether there is a character string as a data candidate. If there is no character string in the situation that moved to step S316, the determination is yes, and the process moves to step S322. Otherwise, the determination is no and the process moves to step S317. In step S317 it is determined whether the number of character strings as data candidates is one. If there is only one character string, the determination is yes and the process moves to step S322. Otherwise, the determination is no and the process moves to step S318.

Figures 58A, 58B, 58C:
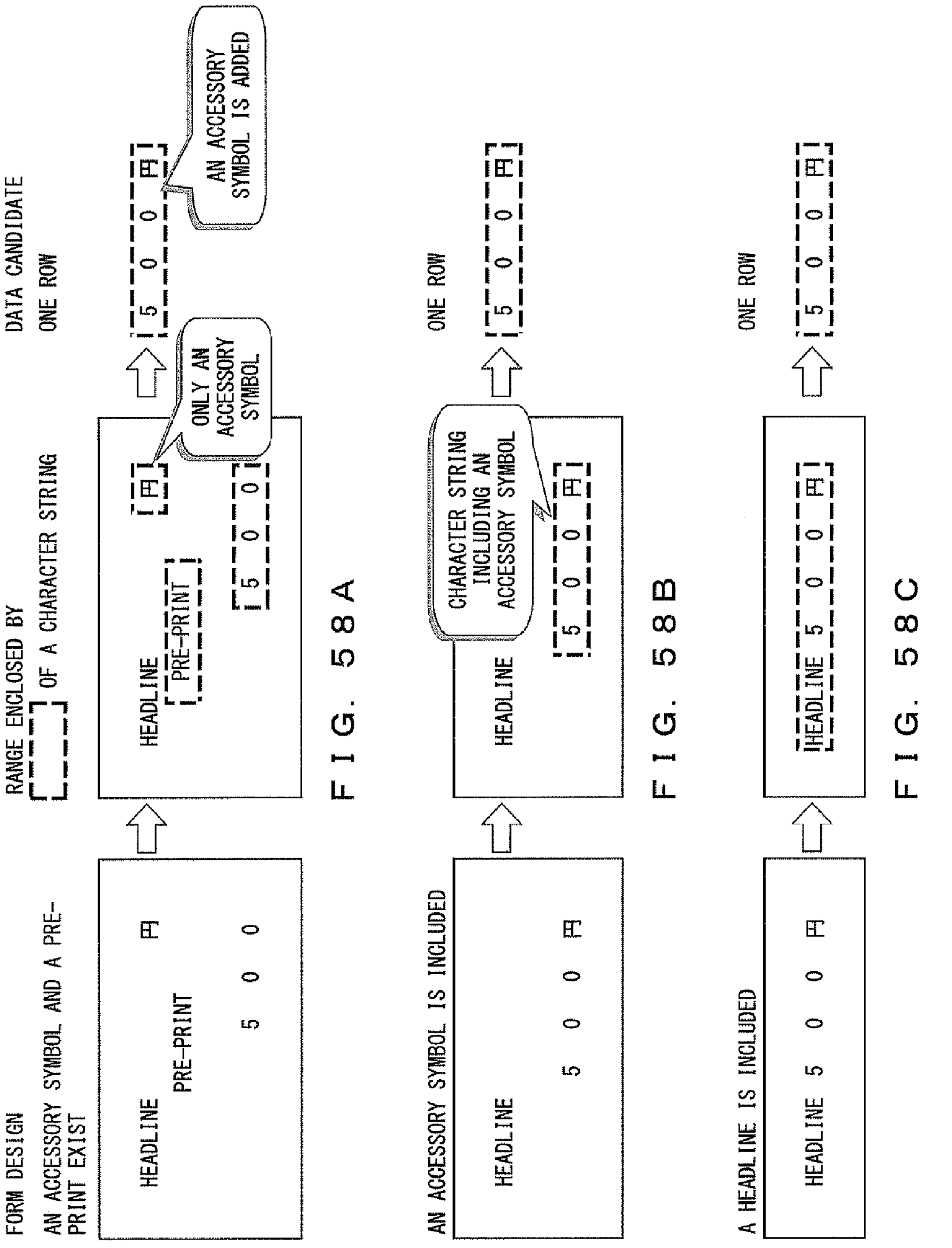
FIGS. 58A-E explain a method for extracting another character string from a cell (No. 1)
Figure 58D:
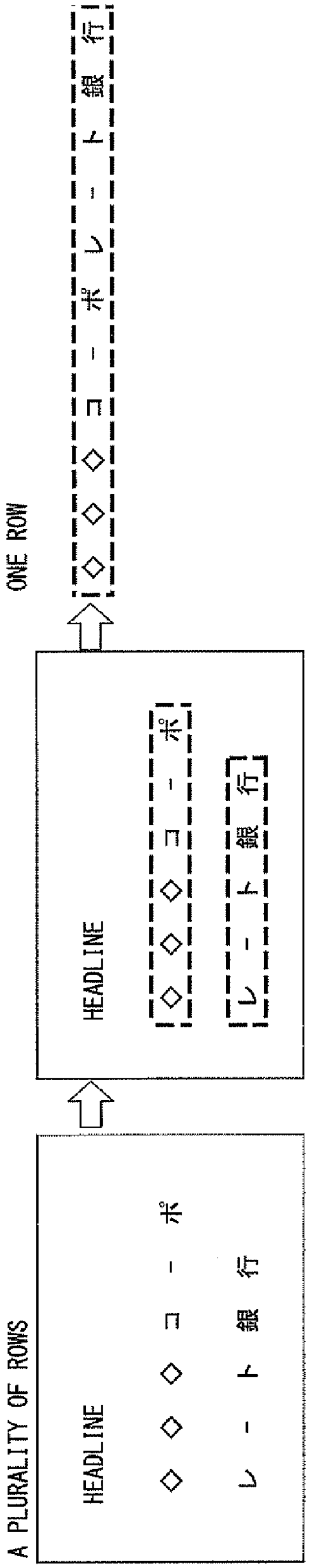
Figure 58E:
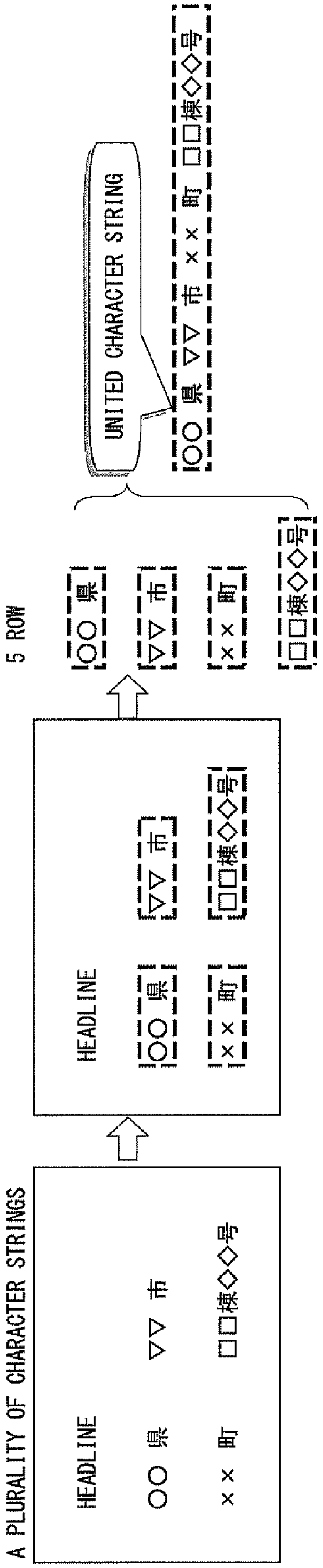
Figure 63A:
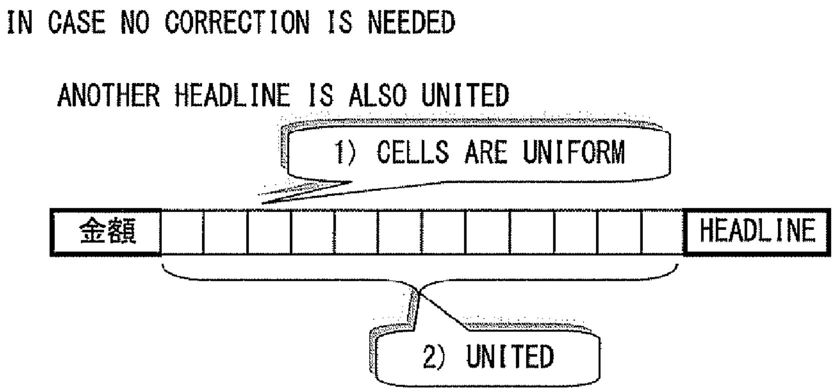
FIGS. 63A&B explain a method for extracting another character string from a cell (No. 6)
Figure 63B:
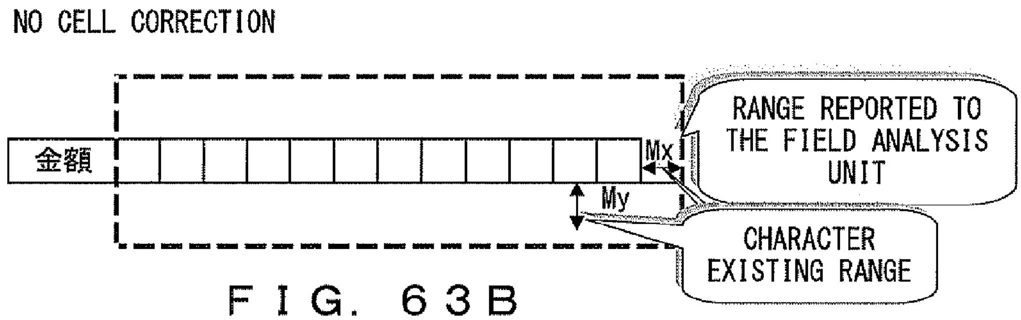

In step S318 the score DTnm of each character string is updated by subtracting a predetermined a division point from the current value. Then, in step S319 the number indicated by the variable m, of character strings are united (FIGS. 58A, D and E). Then, in step S320 the value of the variable m is incremented. After the increment, in step S321 the above-described intra-the same cell data point is set in the score DTnm and then the process moves to step S322.

In step S322 it is determined whether there is a character string having a data accessory symbol in the m united character strings. If a character string having such an accessory symbol exists, the determination is yes and the process moves to step S323. In step S323 the score DTnm of each character string is update by adding the above-described accessory point to the current value. Then, the process moves to step S324. Otherwise, the determination is no and the process moves to step S324.

In step S324 it is determined whether there is a character string in which an attribute error is set in the m united character strings. If a character string in which an attribute error is set exists, it is determined that there is a character string in which an attribute error is set and the process moves to step S325. In step S325 the score DTnm of each character string is update by adding a predetermined attribute error point to the current value. Then, the intra-cell field candidate extraction process is terminated. Otherwise, it is determined so and the intra-cell field candidate extraction process is terminated here.

Figure 17A:
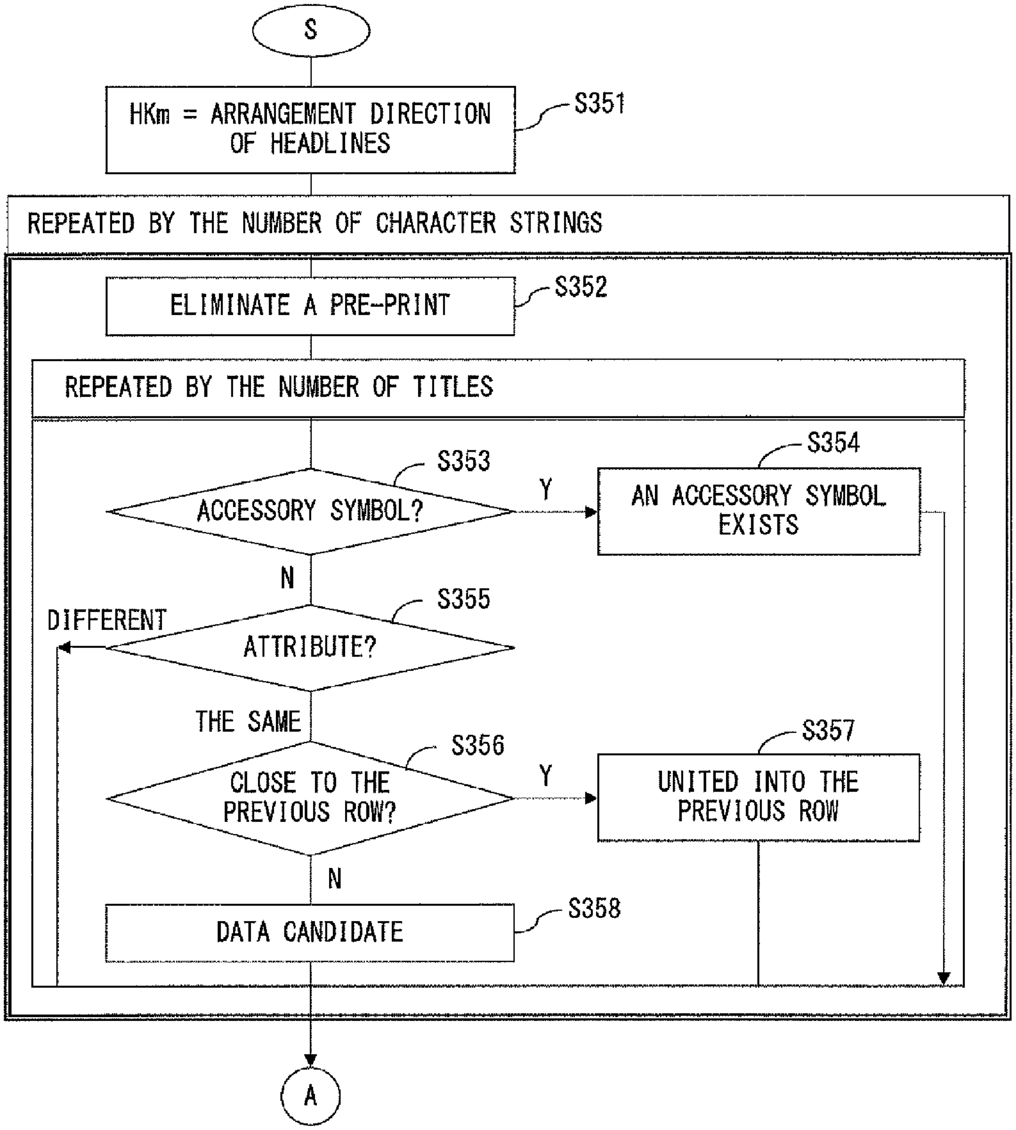
FIGS. 17A&B are a flowchart of an intra-cell plural field candidate extraction process.

Next, an intra-cell plural field candidate extraction process performed in step S302 will be explained in detail with reference to the flowchart illustrated in FIGS. 17A and B. As described above, the extraction process is performed in order to extract a headline wording that can be a field name candidate from a plurality of headline wordings.

If a plurality of character strings including two headline wordings of "outline 1" and "outline 2", as illustrated in FIGS. 59A through D, character strings other than a headline wording are extracted, as illustrated in FIGS. 60A through D. Specifically, for example, in the example illustrated in FIG. 59A, as illustrated in FIG. 60A, two "pre-print", "○○○○○", "ΔΔΔΔ", "銀行" and "支店" are extracted. Similarly, in FIGS. 59B through D, character strings enclosed by broken lines in FIGS. 60B through D are extracted. As illustrated in FIGS. 61A through D, a virtual cell is created in such a way that the extracted character string may be the same by a headline wording. After the creation, as explained with reference to FIGS. 58A through E, unnecessary character strings are eliminated and the remaining character strings are united as requested. Thus, in the examples illustrated in FIGS. 59A through D, finally the character strings illustrated in FIGS. 62A through D are obtained as data candidates. The intra-cell plural field candidate extraction process realizes such an operation.

Firstly, in step S351, a value indicating the arrangement direction of headline wordings is assigned to a variable HKm. After the assignment, the process moves to step S352.

Steps S352 through S358 form a process loop repeatedly performed by the number of character strings extracted from a target cell, other than a headline wording. Of steps S352 through S358, steps S353 through S358 form a process loop repeatedly performed by the number of headline wordings. Thus, character strings are evaluated as data for each character string taking each headline wording into consideration while changing a focused character string. In this example, the focused character string is described as a "target character string".

Firstly, in step S352, if a target character string is a preprint, it is eliminated. Then, in step S353 it is determined whether the target character string is composed of only accessory symbols that may be attached to data inputted by a headline wording. If only such accessory symbols exist as a target character string, the determination is yes and after in step S354 after the existence of an accessory symbol is set, a series of the processes is terminated. Otherwise, the determination is no and the process moves to step S355.

In step S355 the attribute of the target character string is compared with the attribute of data inputted by a headline wording. If their attributes are the same, it is determined so and in step S356 it is determined whether a distance between the target character string and the previous character string is short. If the distance is short, the determination is yes and since the target character string follows the previous row, in step S357 the target character string is united with the previous character string. Otherwise, the determination is no and after in step S358 the target character string is set as a new data candidate, a series of processes is terminated. Thus, it is checked for each headline wording whether the target character string should be determined to be a data candidate. After the completion of the check the process moves to step S361.

In step S361 it is determined whether there is a data candidate in character strings. If any character string is determined to be a data candidate, it is determined that there is a data candidate and the process moves to step S362. Otherwise, it is determined so and the process moves to step S368.

In step S362 information indicating an arrangement relationship between the data candidate and a headline wording related to it is obtained. Then, in step S363 the arrangement direction of the data candidate and the headline wording is determined. After in step S364 a virtual cell for a headline wording is created as illustrated in FIG. 61D, the process moves to step S365. Otherwise, specifically, if the headline wording and the data candidate are arranged as illustrated in any of FIGS. 59A through C, it is determined that the arrangement direction is vertical and the process moves to step S365.

In step S365 a virtual cell is created as illustrated in any of FIGS. 61A through C. Then, in step S366 the above-described intra-the same cell data point is set as the initial value of a score DTnm for evaluating character strings in a target cell. Then, in step S367 the intra-cell field candidate extraction process in FIGS. 16A and B are performed by the number of headline wordings. After the execution, this intra-cell field candidate extraction process is terminated. The target cell of this intra-cell field candidate extraction process is a cell including no headline wording.

Figure 18:
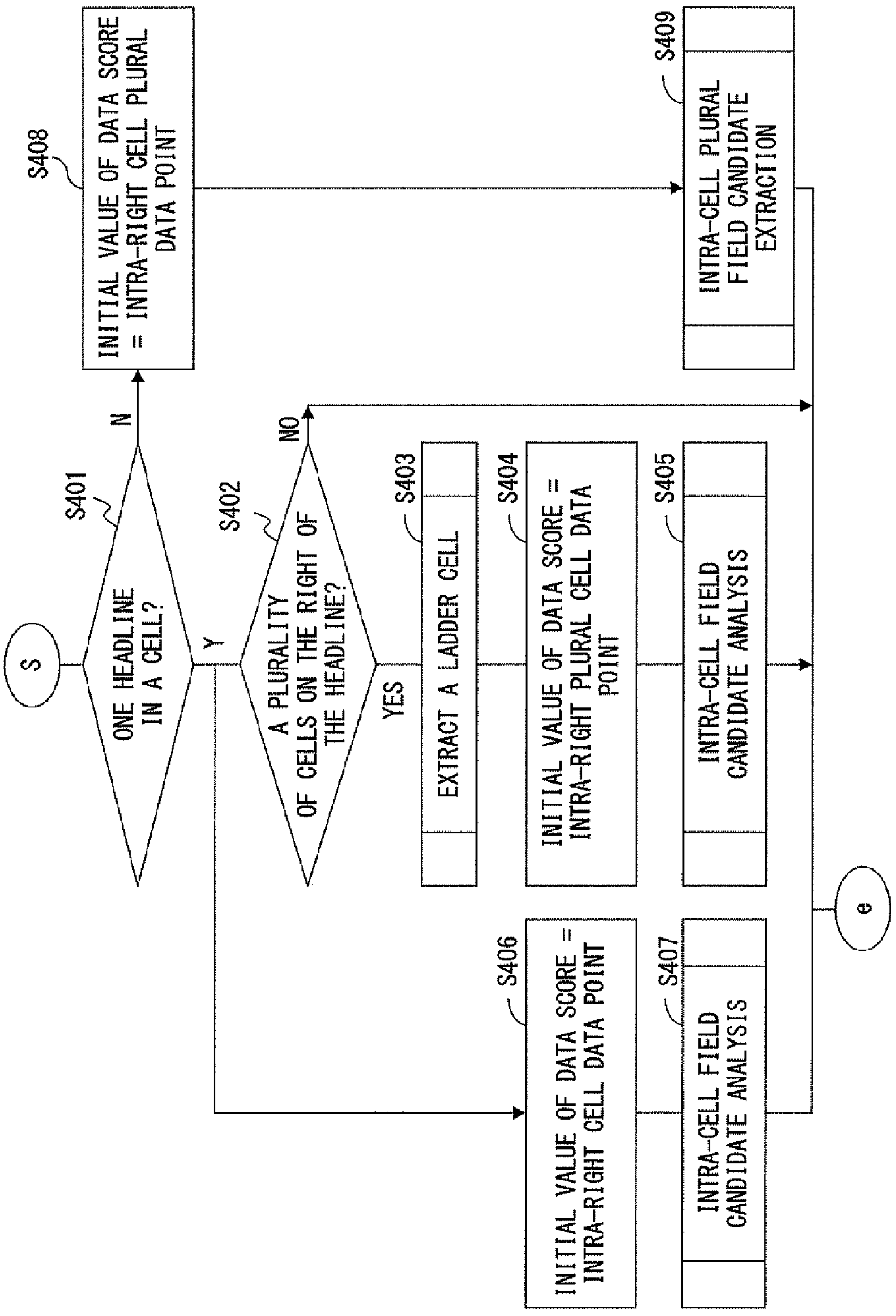
FIG. 18 is a flowchart of a right field candidate extraction process.

FIG. 18 is a flowchart of the right field candidate extraction process performed in step S183 of the first logical structure analysis process illustrated in FIG. 11B. Next, the extraction process will be explained in detail with reference to FIG. 18.

Firstly, in step S401 it is determined whether the number of headline wordings in a target cell is only one. If two or more headline wordings exist, the determination is no and the process moves to step S408. Otherwise, the determination is yes and the process moves to step S402.

In step S402 it is determined whether a plurality of cells exists on the right of the target cell including a headline wording. If a plurality of cells exists, the determination is yes and the process moves to step S403. Otherwise, the determination is no and the right field candidate extraction process is terminated here.

A plurality of cells on the right does not always have the same shapes. Furthermore, they are not always accurately arranged. Therefore, as illustrated in FIGS. 63A through 65C, in this preferred embodiment a cell fairly different from the average (a ladder cell) is extracted and corrected. In step S403 a ladder cell extraction process for realizing the correction is performed. After the execution, in step S404 a pre-determined intra-right plural cell data point is set as the initial value of a score DTnm for evaluating character strings in the target cell for each row and in step S405 the intra-cell field candidate extraction process in FIGS. 16A and B are performed. After the execution, this right field candidate extraction process is terminated.

If the determination in step S401 is yes since there is a possibility that a character string becoming a data candidate may exist in a cell including a headline, steps S406 and S407 are executed. In step S406 a pre-determined an intra-right cell data point is set as the initial value of the score DTnm for evaluating character strings in the target cell for each row and in step S407 the intra-cell field candidate extraction process in FIGS. 16A and B are performed. After the execution, this right field candidate extraction process is terminated. It is because a probability that a character string becoming a data candidate may exist in the target cell varies depending on whether a plurality of cells are arranged on the right of the target cell that the intra-cell field candidate extraction process is performed by changing the initial value of the score DTnm thus.

If the determination in step S401 is no, the process moves to step S408. In step S408 a pre-determined intra-right cell plural data point is set as the initial value of the score DTnm for evaluating character strings in the target cell for each row. Then, in step S409 the intra-cell plural field candidate extraction process in FIGS. 17A and B are performed. After the execution, this right field candidate extraction process is terminated.

FIG. 19 is a flowchart of the bottom field candidate extraction process performed in step S185 of the first logical structure analysis process illustrated in FIG. 11B.

This extraction process is the same as the above-described right field candidate extraction process except for that an initial value set in the score DTnm and the like are different. Therefore, its detailed explanation is omitted. It is a case where a positional relationship between a headline wording and data is as illustrated in (4) of FIG. 34 that the process moves to step S453.

Figure 20:
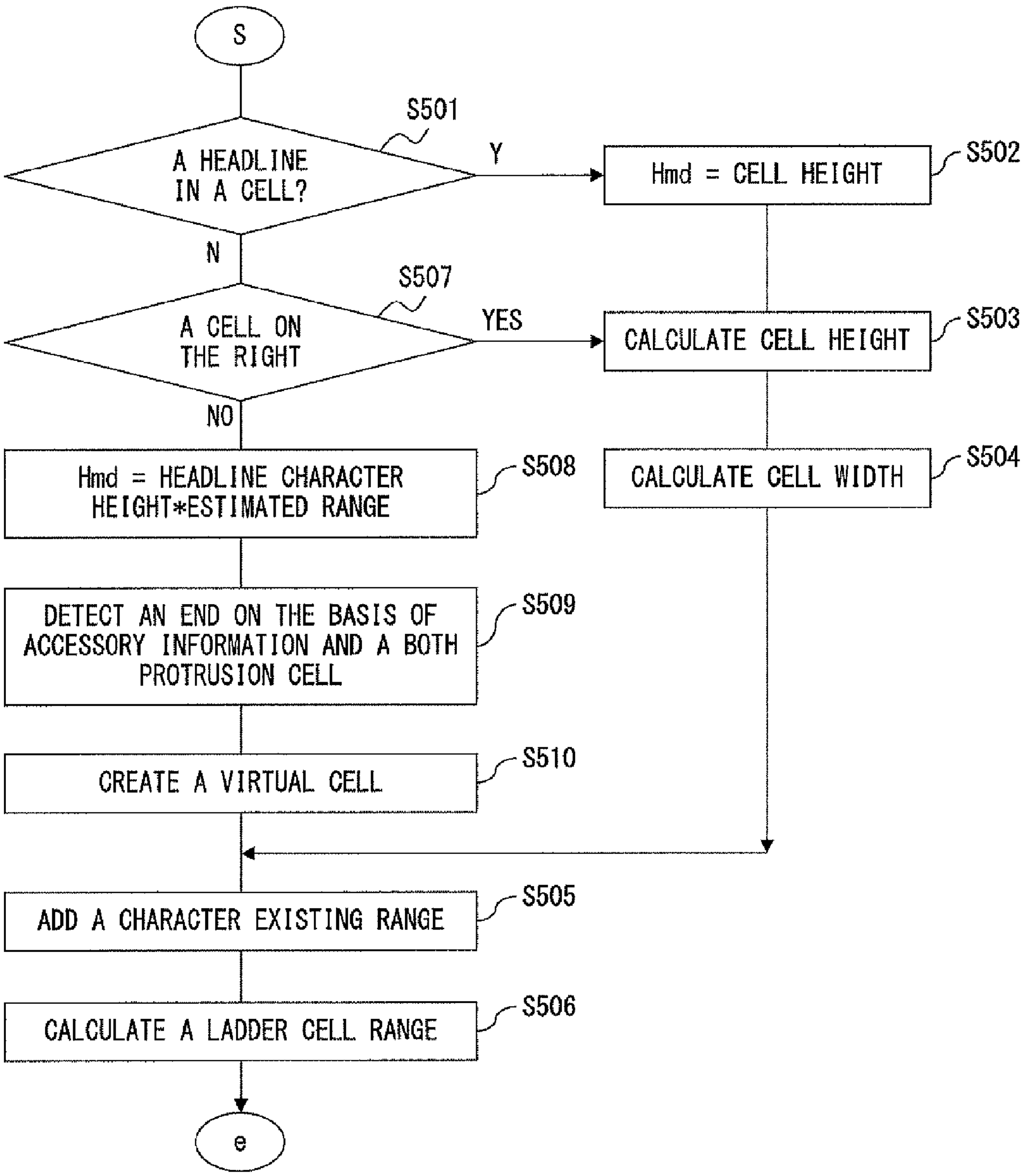
FIG. 20 is a flowchart of a ladder cell candidate extraction process.

Next, the ladder cell extraction process performed in FIG. 18 and steps S403 and S453 will be explained in detail with reference to the flowchart illustrated in FIG. 20.

Firstly, in step S501 it is determined whether there is a headline wording in a cell. If the cell of headline wordings is not created, the determination is no and the process moves to step S507. Otherwise, the determination is yes and the process moves to step S502.

In step S502 the height of the cell of headline wordings is assigned to a variable Hmd (FIG. 64A). Then, in step S503 average height is calculated on the basis of the height of respective cells and in step S504 average width is calculated on the basis of the width of respective cells. The average height and width are calculated, for example, by calculating average using the height and width of respective height and width of respective cells and calculating average again eliminating cells greatly different from the average and using only the remaining cells. After the average of height and width are calculated, the process moves to step S505.

In step S505 the size of a cell to be corrected is corrected using the calculated average height and width and a character existence range being a margin is added to the corrected range of the cell. Then, in step S506 a region obtained by adding the character existence range to the corrected range of the cell is calculated as a ladder cell range. Then, the ladder cell extraction process is terminated.

Figure 65A:
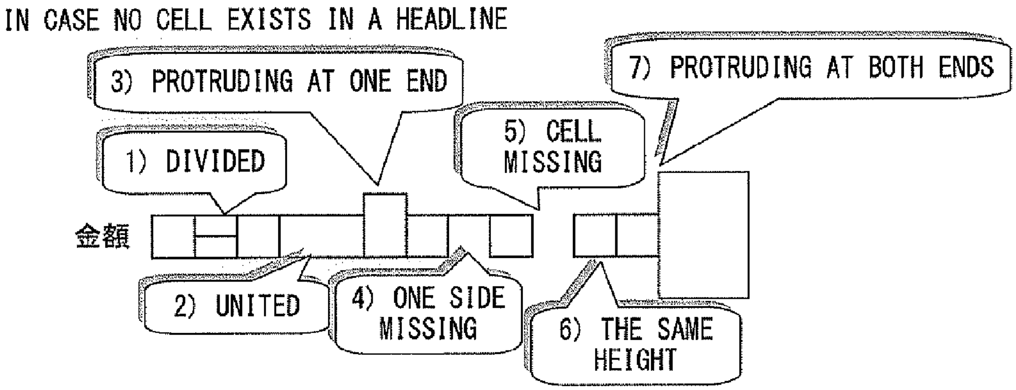
FIGS. 65A-C explain a method for extracting another character string from a cell (No. 8)
Figure 65B:
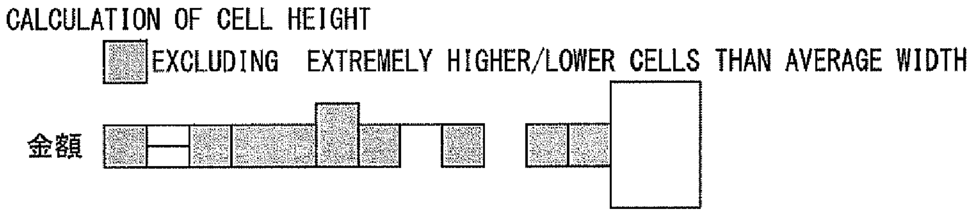
Figure 65C:
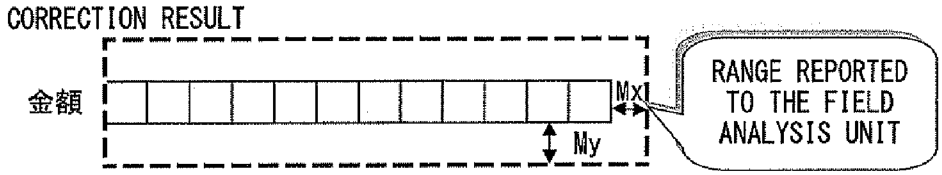

In step S507, to which the process moves when the determination in step S501 is no, it is determined whether there is a cell on the right of the headline wording. If no cell exists on the right, the determination is no and the process moves to step S508. Otherwise, the determination is yes and the process moves to step S503. In step S503 average height is calculated on the basis of cells on the right (including cells if there are one or more cells positioned further on the right of the cell). Then, in step S504, to which the process moves after that, similarly average width of the cells is calculated. Then, by moving to step S505, an operation as illustrated in FIG. 64C or 65C can be realized.

In step S508 the height Hmdm of the character of a headline wording is multiplied by a coefficient indicating the hypothetic range of the size of a character to be inputted as data, which is determined using the height Hmdm as a reference and the multiplication result is assigned to the variable Hmd. Then, in step S509 the last end of a range regarded as data is detected on the basis of accessory information, that is, accessory symbols, their positions and the cell of headline wordings on the right. Furthermore, if the cell height protrudes from both top and bottom (both protrusion) ((7) of FIG. 65A)), it is determined to be the last end of a range regarded as a data. After the detection, in step S510 a virtual cell is created. Then, the process moves to step S505. Thus, operations as illustrated in FIGS. 66A through C can be realized.

Now, we are back to the explanation of the sub-routine processes of the first logical structure analysis process illustrated in FIG. 11B or C.

FIG. 21 is a flowchart of the plural-entry field candidate extraction process performed in step S194 of the first logical structure analysis process illustrated in FIG. 11C. Next, the extraction process will be explained in detail with reference to FIG. 21.

Firstly, in step S551 it is determined whether the number of headline wordings in the target cell is only one. If the number of headline wordings in the target cell is only one, the determination is yes and the process moves to step S558. Otherwise, the determination is no and the process moves to step S552.

In step S552 it is determined whether headline wordings are horizontally arranged. If the arrangement direction is horizontal, the determination is yes and the process moves to step S556. Otherwise, the determination is no and the process moves to step S553.

In step S553 a row in which a target cell of headline wordings exists is specified and in step S554 a character string regarded as the data of the row is extracted. The process moves to step S555. In step S555, after the intra-cell plural field candidate extraction process illustrated in FIGS. 17A and B are performed, this plural-entry field candidate extraction process is terminated. When the process moves to step S556, in step S556 a string in which the target cell of headline wordings exists is specified and in step S557, after a character string regarded as the data of the string is extracted, the process moves to step S555. Thus operations as illustrated in FIGS. 67B through F, 68B through F and 69B through F can be realized.

Figure 68A:
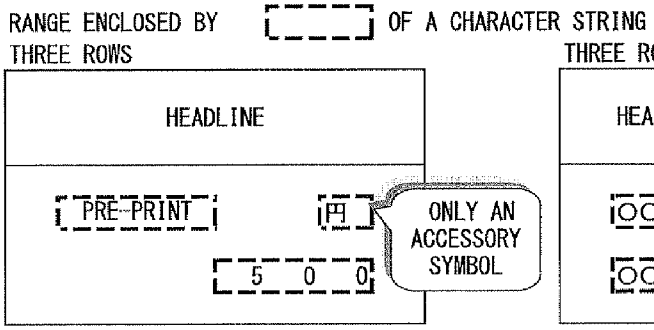
FIGS. 68A-F explain a method for extracting another character string from a cell (No. 11)
Figure 68E:
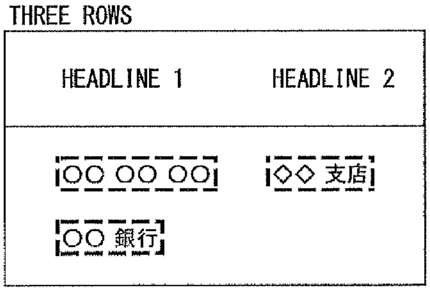
Figure 68B:
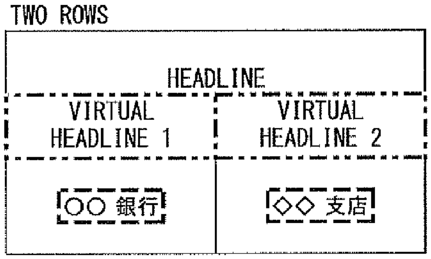
Figure 68F:
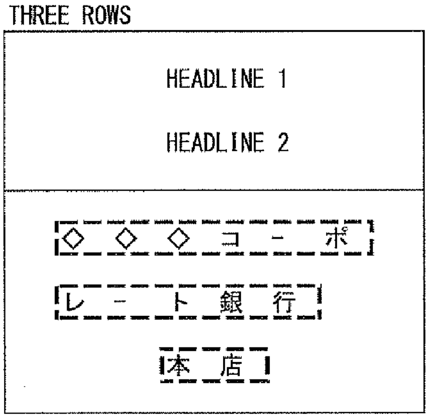
Figure 68C:
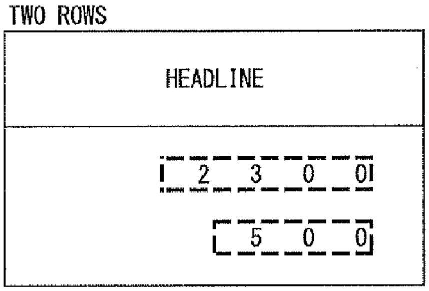
Figure 68D:
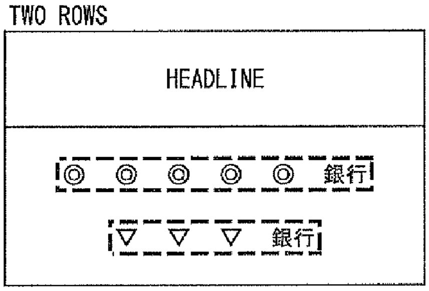

In step S558, to which the process moves when the determination in step S551 is yes, the intra-cell field candidate extraction process in illustrated in FIGS. 16A and B are performed. By this execution, operations as illustrated in FIGS. 68A and 69A can be realized.

Then, in step S559 it is determined whether a plurality of pieces of data exists in all details corresponding to data cells for headline fields (cells) arranged in the same direction as the arrangement direction of headline fields, in a direction orthogonal to the arrangement direction. If there is a data cell in which character strings exist across a plurality of rows or columns, the determination is yes and after in step S560 a detail is divided in such a way that data may form one row or column, this plural-entry field candidate extraction process is terminated. Otherwise, the determination is no and the extraction process is terminated here. FIG. 70 explains the detail division and an operation as illustrated in FIG. 70 can be realized by the execution of step S560.

FIG. 22 is a flowchart of the field analysis necessary/unnecessary determination process performed in step S186 of the first logical structure analysis process illustrated in FIG. 11B. Lastly, the determination process will be explained in detail with reference to FIG. 22. This determination process is performed obtaining the degree of character conviction indicating the accuracy of character recognition and a hand-written/printed character determination rate TK for all the characters from the character recognition unit 16. In FIG. 22 "MJth" and "THth" indicate the threshold value of the degree of character conviction for regarding character recognition to be accurate and a threshold value for determining whether it is hand-written, respectively.

In this determination process, since a headline wording related to each data candidate exists, steps S601 through S605 are repeatedly performed by the number of data candidates. Of steps S601 through S605, step S601 is repeatedly performed by the number of characters in a target headline wording. Therefore, when any of conditions that in each headline wording, there is one contacting a frame in which exists a character the degree of character conviction of which is lower than the threshold value MJth, of characters constituting the headline wording that there is a character can be recognized even when its components are separated in such a way that a katakana "ル" can be divided into "ノ" and "レ" and that there is a character whose hand-written/printed character determination rate TK is smaller than the threshold value TKth, field analysis is needed. When the ladder cell extraction process illustrated in FIG. 20 is performed too, field analysis is needed. Thus, necessary field analysis is conducted by the field analysis unit 21 and a more highly accurate recognition result of a headline wording is transferred to the logical structure analysis (field determination) unit 22.

Figure 23C:
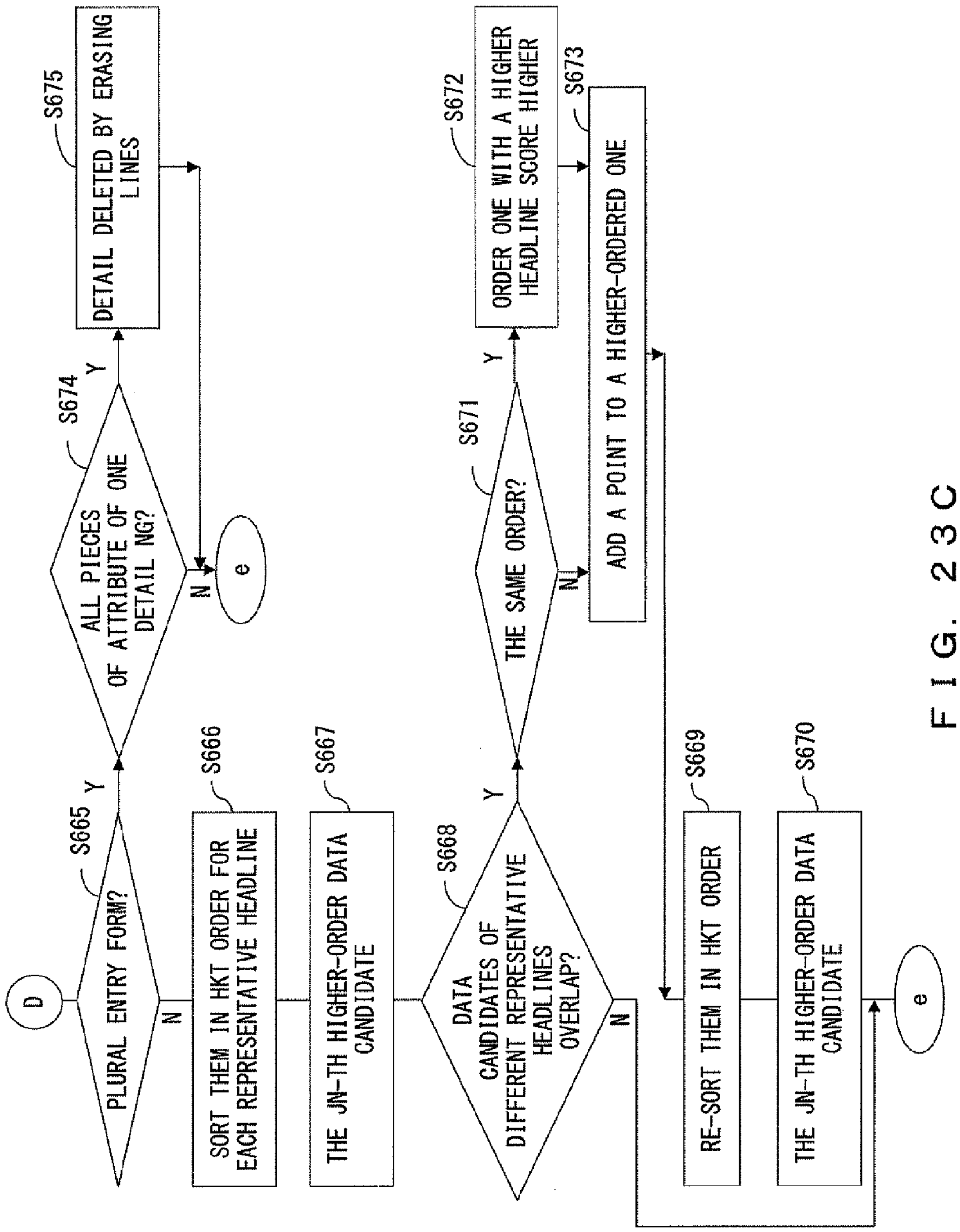

FIGS. 23A-C are a flowchart of the second logical structure analysis process of the logical structure analysis (field determination) unit 22. Next, the analysis process will be explained in detail with reference to FIGS. 23A-C. In FIGS. 23A-C, "DTmin", "HKT", "єm", "єd" and "Jn" indicate the minimum point of data likeness, that is, the threshold value of a score DTnm regarding it as data, the final evaluation point of a headline wording, a coefficient by which a headline score MTn is multiplied in order to calculate the evaluation value, a coefficient by which the score DTnm in order to calculate the evaluation value and the number of higher-order data candidates, respectively.

Steps S651 through S664 form a processing loop repeatedly performed by the number of the data candidates for each headline wording. Thus, the evaluation point is calculated taking all the data candidates into consideration.

Firstly, in step S651 it is determined whether a data candidate is not entered into a cell corresponding to a target headline wording. If the data candidate is not entered, the determination is yes and after in step S652 a final evaluation point HKT is calculated and in step S653 the fact that the data candidate is no entered is registered, a series of the processes is terminated. Otherwise, the determination is no and the process moves to step S654. In step S652 the final evaluation point HKT is calculated by multiplying the headline score MTn by the coefficient єm and adding a pre-determined non-entry data point (=MTn*єm+non-entry data point) to the multiplication result.

In step S654 it is determined whether field analysis is applied to the target headline wording. If in the field analysis process in step S189 of FIG. 11B, field analysis is applied to the target headline wording, it is determined that the field analysis is performed and the process moves to step S655. Otherwise, it is determined so and the process moves to step S664. Therefore, in steps S655 through S663 a process for reflecting the result of the field analysis is performed.

In step S655 it is determined whether the score DTnm is smaller than the threshold value DTmin. If the score DTnm is smaller than the threshold value DTmin, the determination is yes and the process moves to step S656. After in step S656, it is registered as a data candidate to be erased by lines in order to indicate that there is no data, a series of the processes is terminated. Otherwise, the determination is no and the process moves to step S661.

In step S658 it is determined whether a restored accessory symbol is correct. If the accessory symbol is not correct for the reason that it is different from an accessory symbol specified by the target headline wording or the position of the accessory symbol is different, the determination is no and after in step S660 the score DTnm is updated, the process moves to step S661. Otherwise, the determination is yes and after in step S659 the score DTnm is updated, the process moves to step S661. In steps S660 and S659 the score DTnm is updated by subtracting/adding a pre-determined accessory point from/to the current value, respectively. Thus, if an accessory symbol is correct, the score DTnm is increased and if it is not correct, the score DTnm is reduced.

In step S661 it is determined whether the attribute of the entered data candidate coincides with an attribute specified by the target headline wording. If their attributes are matched, the determination is OK and after in step D663 the score DTnm is updated, the process moves to step S664. Otherwise, the determination is NG and after in step S662 the score DTnm is updated, the process moves to step S664. In steps S663 and S662 the score DTnm is updated by adding/subtracting a pre-determined an attribute OK point to/from the current value, respectively. Thus, if there is no problem, the score DTnm is increased and if there is a problem, the score DTnm is reduced.

In step S664 the evaluation point HKT is calculated. The evaluation point HKT is calculated by adding the multiplication result of the score DTnm and the coefficient єd to a result of multiplying the headline score MTn by the coefficient єm (=MTn*єm+DTnm*єd). After the calculation, a series of the processes is terminated.

In step S665 to which the process moves after performing the above-described process by the number of data candidates for each headline wording, it is determined whether the form is a plural-entry one. If the form is a plural-entry one, the determination is yes and the process moves to step S674. Otherwise, the determination is no and the process moves to step S666.

At the moment the process moves to step S665, all the evaluation points HKT of each headline wording are already calculated. Therefore, in step S666 the headline wordings are sorted for each representative headline in the evaluation point HKT order. Then, in step S667 data candidates related to headline wordings up to the higher-order Jn-th are extracted in accordance with the sorting in the evaluation point HKT order. Then, the process moves to step S668 and it is determined whether data candidates related to different representative headlines overlap. If the data candidates overlap in the extracted data candidates, the determination is yes and the process moves to step S671. Otherwise, the determination is no and this analysis process is terminated here, As described above, the logical structure analysis DB 25 is created in such a way that representative headlines may not overlap in each detail range (a table structure for related data input). Therefore, the overlap of data candidates means that a place unsuitable for the sorting of headline wordings in step S666 exists.

In step S671 it is determined whether headline wordings related to respective overlapping data candidates are in the same order. If the evaluation points HKT of those headline wordings are the same value, the determination is yes. In this case, after in step S672 a headline wording whose headline score MTn is larger is determined to in a higher order, and in step S673 the evaluation point HKT of the higher-order and lower-ones are increased and reduced, respectively, the process moves to step S669. Otherwise, the determination is no and the process moves to step S672. In step S672 the evaluation points HKT of the respective headline wordings related to the overlapping data candidates are updated.

By the above-described update, a possibility that both overlapping data candidates may be selected is reduced. Thus, the occurrence of a failure can be suppressed.

In step S669, since the operation points HKT are operated, the headline wordings are sorted in the evaluation point HKT order again. Then, in step S670 the data candidates related to the headline wordings up to the higher-order Jn-th are re-extracted in accordance with the re-sorting in the evaluation point HKT order. Then, this analysis process is terminated.

In step S674 to which the process moves when the determination in step S665 is yes, it is determined whether the attribute of all the cells in one detail is NG. If no character string that can be a data candidate exists in all the cells of one detail, for example, if there is an entry in which data is erased by lines in order to indicate that entered data is invalid, if no data is not entered due to dirt or if there is a scribble in an entry field, the determination in step S665 is yes in all the cells. Specifically, as illustrated in FIG. 71, all the cells in one detail are erased by lines. Therefore, in such a case the determination is yes and after in step S675 the entire detail is erased by lines, this analysis process is terminated. Otherwise, the determination is no and this analysis process is terminated here.

Figure 72A:
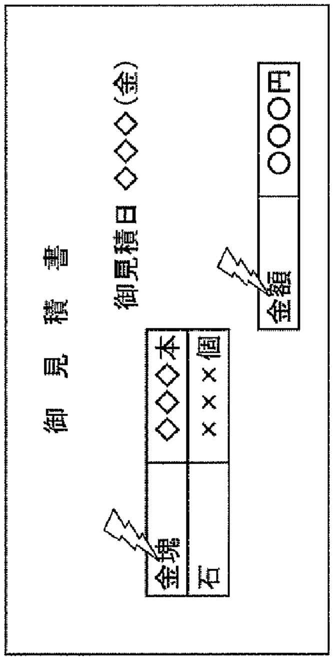
FIGS. 72A-D explain the recognition result obtained by performing the second logical structure analysis process.
Figure 72B:
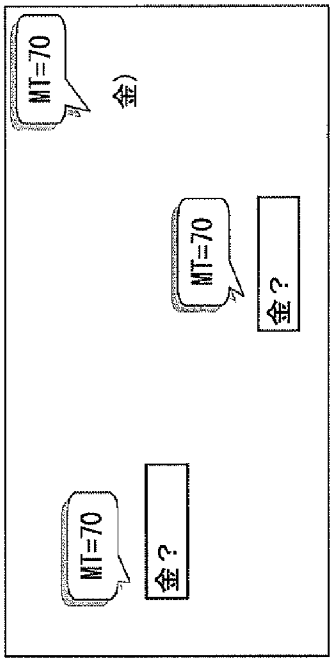
Figure 72C:
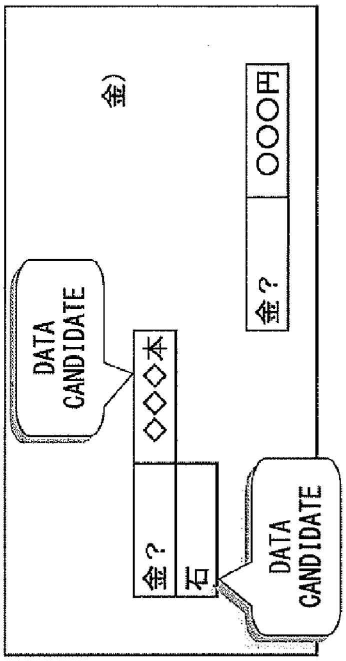
Figure 72D:
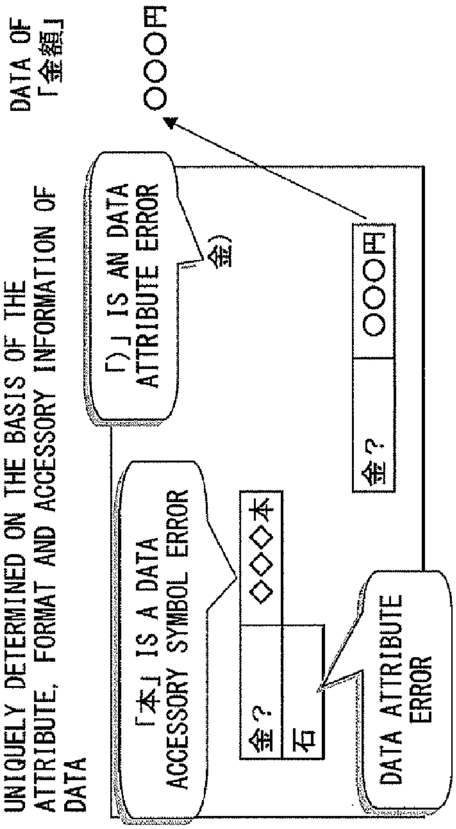
Figure 73E:
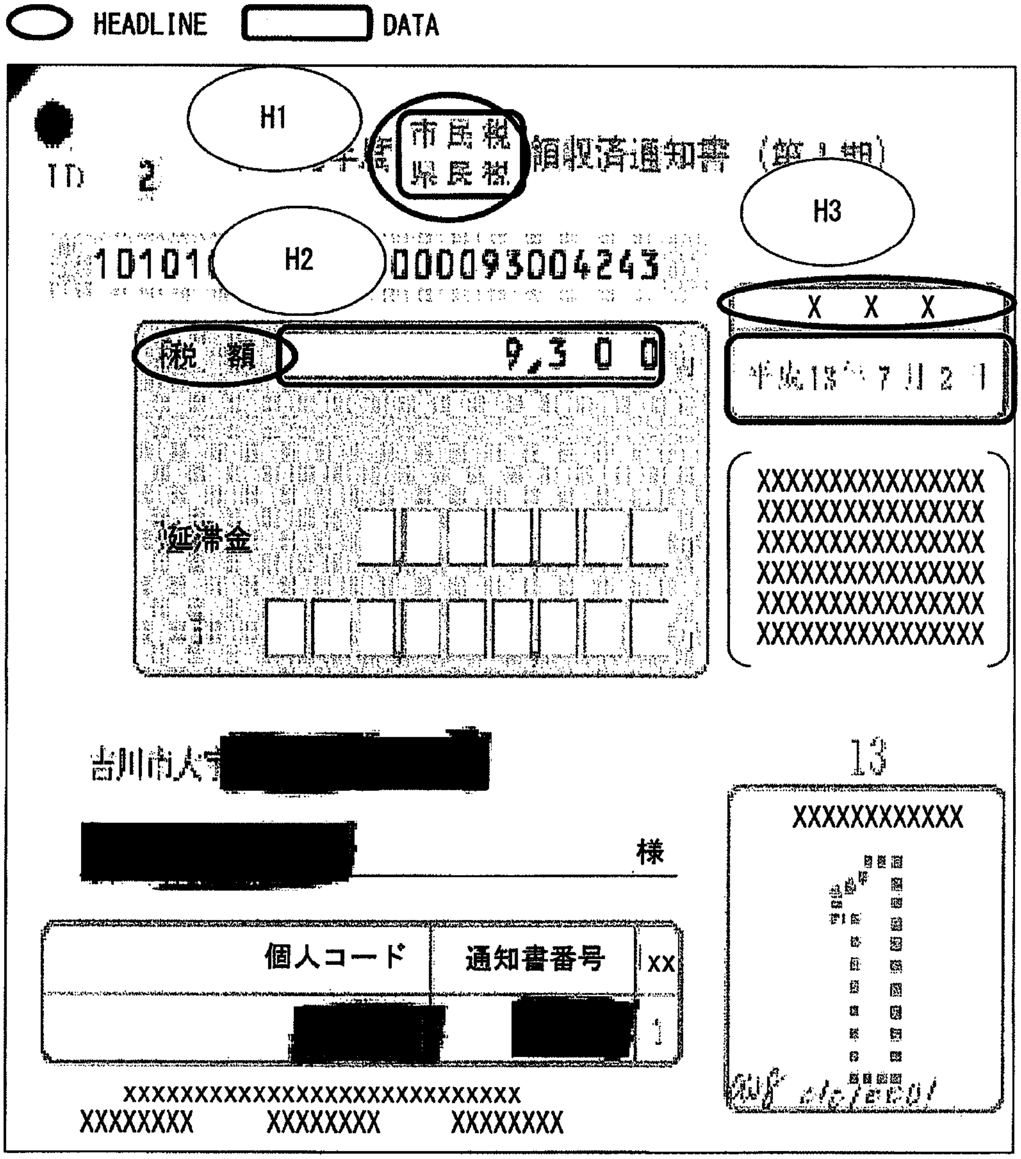
Figure 73F:
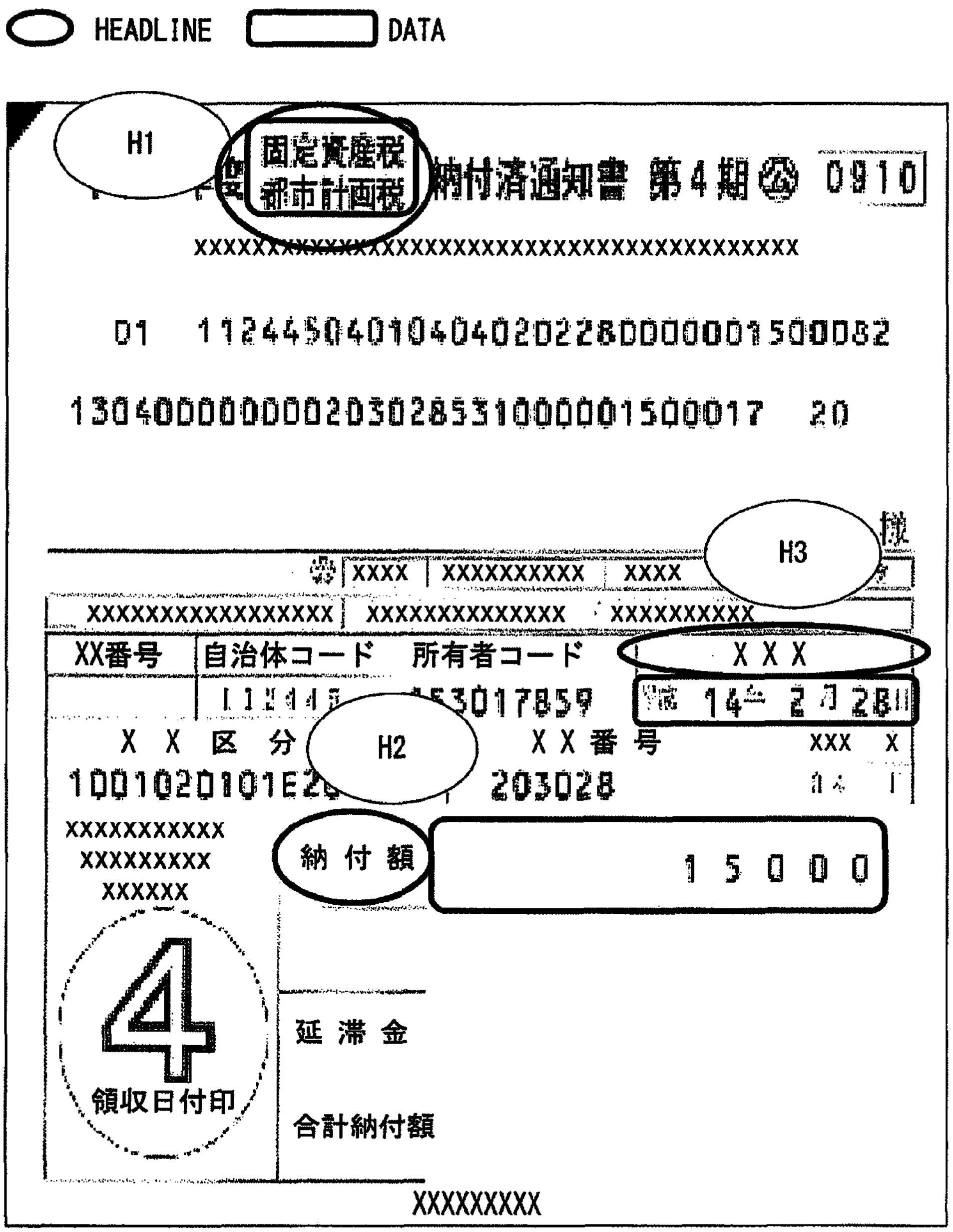

FIGS. 72A through D explain the recognition result of the above-described second logical structure analysis process. In FIGS. 72A through D the recognition result is explained using a single form as an example. FIG. 72A is an inputted form image and illustrates that characters "塊" and "額" cannot be recognized. FIG. 72B illustrates that headline wordings extracted from the headline score MTn are "金?", "金?" and "金)". FIG. 72C illustrates a data candidate that can be related by a headline wording handled as "金?" since the character "塊" cannot be recognized. FIG. 72D illustrates that the headline wording "金?" is recognized to be a representative headline 額" by a data candidate that can be related "○○○円" and that the data is determined to be "○○○円".

FIGS. 73A through F illustrate the recognition results of an actual form. FIGS. 73A through F illustrate respective recognition results in different forms. It can be understood from FIGS. 73A through F that a headline wording and the data including the correspondence relationship can be accurately recognized.

FIG. 74 is a configuration of a computer capable of realizing the form recognition apparatus according to this preferred embodiment illustrated in FIG. 1.

The computer illustrated in FIG. 1 includes a CPU 61, memory 62, an input device 63, an output device 64, an external storage device 65, a storage medium driving device 66 and a network connecting device 67, which are all connected to each other by a bus 68. The configuration is one example and is not restrictive of the invention.

The CPU 61 controls the entire computer.

The memory 62 temporarily stores programs or data stored in the external storage device 65 (or a portable storage medium MD) when updating data or the like and is, for example, RAM. The CPU 61 controls the entire computer by reading the programs into the memory 62 and executing it.

The input device 63 is an interface connected to an input device, such as a keyboard, a mouse or the like, or connected to an image reading device, such as a scanner or the like. The input device detects the operation of a user on the input device and notifies the CPU 61 of the detection result.

The output device 64 is, for example, a display control device connected to a display device or one having them. The output device 64 outputs data transmitted under the control of the CPU 61 on the display device.

The network connecting device 67 is used to communicate with an external device via a network, such as an intra-net, the Internet or the like. The external device can be an image reading device or a device connected to the image reading device. The external storage device 65 can be, for example, a hard disk. The external storage device 65 is mainly used to store various types of data or programs.

The storage medium driving device 66 is used to access a portable storage medium MD, such as an optical disk, a magneto-optical disk and the like.

The form recognition apparatus 1 according to this preferred embodiment can be realized by the CPU 61 executing the programs (hereinafter called "form recognition software") provided with necessary functions. The recognition software can be recorded on the storage medium MD or be obtained from the network connecting device 67. In this example, it is assumed that both the recognition software and the logical structure analysis DB 25 are stored in the external storage device 65.

In the above-described assumption, the input unit 11 can be realized, for example, by the CPU 61, the memory 62, the input device 63, the external storage device 65, the network connecting device 67 and the bus 68. The output unit 23 can be realized, for example, by the CPU 61, the memory 62, the output device 64, the external storage device 65, the network connecting device 67 and the bus 68. The database storage unit 24 can be realized, for example, by the CPU 61, the memory 62, the external storage device 65 and the bus 68. The memory 26 corresponds to the external storage device 65. The others can be realized, for example, by the CPU 61, the memory 62, the external storage device 65 and the bus 68.

As described above, a table structure existing in a form has a peculiar feature depending on the usage (type, format or the like) of the form. The feature appears in the arrangement of field names. The range of field names arranged in the table structure, that is, the type and number of data that may be inputted (entered) to (into) the stable structure can be specified by the usage (type, format or the like) of the form. Therefore, by adopting a character string common to the same usage, such as a field name, by a headline wording, the type and number of data that is entered into a form can be specified using the extracted headline wording. As a result, it can widely correspond to a form with high accuracy without registering information for recognizing the entered contents for each form.

A headline wording that could not be recognized by character recognition means one that is not entered into a form or could not be recognized. Since the headline wording that could not be recognized is a character string in which a recognition error has occurred, the position can be specified by the recognition result. The headline wording that is not entered into a form can be specified focusing on a table structure. This is because the table structure has a peculiar feature depending on the e usage (type, format or the like) of the form and the feature can be specified by a recognized headline field. In other words, a relationship with another recognized headline wording or the recognition result in another same table structure can be utilized, specifying the table structure. Thus, a headline wording which has no logical contradiction with the table structure can be assigned as an unrecognized headline wording. Therefore, a headline wording corresponding to the data can be specified with high accuracy focusing on at least one of a recognized headline wording and a character string recognized as data in a unit table structure. Thus, bad influences by the missing of a headline wording or impossible recognition can be avoided or reduced. As a result, the form recognition apparatus can appropriately correspond to a recognition error, entry omission and the like without registering information for recognizing the entry contents for each form. This means that the form recognition apparatus can be applied to a wide range of forms in which a recognition error occurs or entry omission and the like exist.

As described above, the feature of a table structure existing in a form can be specified by a recognized headline field. The range of a field name (headline wording) arranged in a unit table structure, specifically, the type and number of data that may be inputted (entered) to (into) a table structure can be specified by the usage (type, format or the like) of the form. Sometimes there is a difference in the type (attribute), number of characters, an attached peculiar symbol, the position of the symbol and the like of a character string inputted as data depending on the field name. Therefore, a headline wording corresponding to the data can be specified with high accuracy focusing on at least one of a recognized headline wording and a character string recognized as data in a unit table structure. Thus, the recognition result of a form can be provided in a form more desirable for the operator without registering information for recognizing the entry contents for each form. Since the number of headline wordings is few and a form whose contents are difficult to understand can be processed in a more suitable shape, the form recognition apparatus can respond to a wide range of forms.

Figure 75:
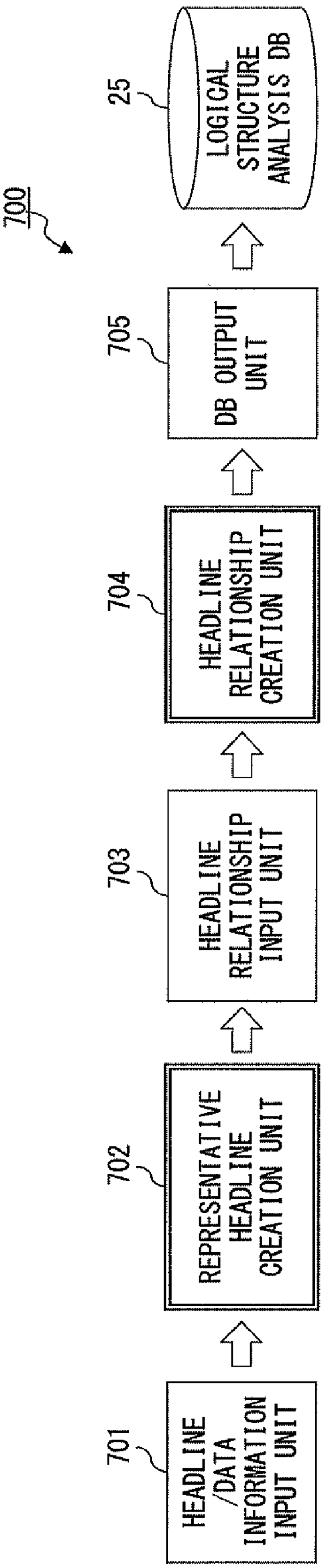
FIG. 75 is a functional configuration of a database creation support apparatus according to this preferred embodiment.

FIG. 75 is a functional configuration of a database creation apparatus according to this preferred embodiment.

The form recognition apparatus 1 recognizes a form referring to the logical structure analysis DB 25. This database (DB) creation support apparatus 700 is used to support the creation of the analysis DB 25.

The logical structure analysis DB 25 manages a headline wording by a hierarchical structure and also by a table structure (unit table structure) capable of being used to input related data. Thus, a range (detail range (headline DR/GR regions) handled as one table in a form can be recognized using information managed by a table structure.

In the management by a hierarchical structure, a character string regarded by a headline wording is defined, in the higher-order, a representative headline having a non-overlapping exclusive relationship in the same table is defined and further in the higher-order, a headline DR or GR is defined. Headline wordings to which the same representative headline is assigned share the data information of data inputted by the headline wording. By adopting such a hierarchical structure, the correspondence relationship between a headline wording in a table structure and inputted data can be recognized with high accuracy without registering the table structure. Furthermore, even though a headline wording cannot be recognized, a representative headline (a headline wording in which logical consistency is maintained) can be used instead of the headline wording. Thus, even though a headline wording cannot be accurately recognized, logically appropriate analysis can be conducted using a representative headline. Even though an un-recognizable part exists, the part can be accurately estimated. Therefore, bad influences by the low accuracy of character recognition can be suppressed and logically appropriate analysis can be conducted with high accuracy. In a table structure in which there are few headline wordings, by adding a non-described headline (a representative headline or the like), the contents of a form can be also made easier to understand. Therefore, besides that there is no need to register a table structure, such effects that the range of a form, in which a form can be appropriately recognized, is wide (bad influences by dirt, creases and the like can be reduced) and that information not existing in a form can be also provided can be obtained. These are clearly understood from the above explanation of the form recognition apparatus 1.

The database (DB) creation support apparatus 700 for supporting the creation of the analysis DB 25, which enables such a thing includes a headline/data information input unit 701 used to input a headline wording, data information and the like, a representative headline creation unit 702 for creating a representative headline from an inputted headline wording and data information, a headline relationship input unit 703 used to input a headline relationship between hierarchical layers, a headline relationship creation unit 704 for creating a headline wording for each hierarchical layer from the inputted headline relationship and a database (DB) output unit 705 for outputting the inputted information and the created information to the logical structure analysis DB 25 and registering them.

In such assumption that in the configuration illustrated in FIG. 74, programs for realizing respective units 701 through 705 and the logical structure analysis DB 25 are stored in the external storage device 65, of the respective units 701 through 705, the headline/data information input unit 701, the headline relationship input unit 704 and the DB output unit 705 can be all realized, for example, by the CPU 61, the memory 62, the input device 63, the external storage device 65, the network connecting device 67 and the bus 68. The others can be realized, for example, by the CPU 61, the external storage device 65 and the bus 68.

FIGS. 76A and B are a flowchart illustrating the flow of a process for creating a representative headline. Next, the operation of the operator up to the creation of a representative headline and a process performed according to the operation will be explained in detail with reference to FIGS. 76A and B. In FIGS. 76A and B, the flow of the process is illustrated assuming that information for one table structure (including variations) is stored in the analysis DB 25, for the convenience' sake of explanation. This also applies to FIGS. 77A and B, which will be described later.

Firstly, in step S701 a headline wording that is instructed to input by the operator is read. Then, in step S702 a headline wording from which kana attached to Chinese characters to show its Japanese declension is eliminated is automatically added. Then, in step S703, headline wordings are sorted in units of characters. Then, in step S704, a representative headline is temporarily selected and set from the inputted headline wordings. After the temporarily set representative headline is, for example, displayed on a display device, the process moves to step S705.

The operator checks the temporarily set representative headline and modifies it, if necessary. Thus, in step S705 the temporarily set representative headline is modified, as requested, according to the instruction of the operator. The process is moved to step S706 by the operator instructing the termination of the modification to determine a representative headline. Then, in steps S707 through S710, the outline position and the data information are inputted by the number of the headline wordings, the inputted information is set and so on. After the input/setting of such information is completed, the process moves to step S711. At the time of transition, such information as illustrated in FIG. 78A is stored in the logical structure analysis DB 25.

In step S711 it is determined whether phrases among representative headlines overlap. If an overlapping phrase exists, the determination is yes and in step S712 the operator is requested to check the overlapping phrase and to modify, if necessary. Thus, by the operator responding to the request, the process moves to step S713. Otherwise, the determination is no and the process moves to step S713. FIGS. 78A through C examples of an overlapping phrase.

In step S713 it is determined whether a table format should be defined. If it should be defined, the determination is yes and in step S714 the operator is urged to input a table format and inputs it. After the input, in step S715 a table format is defined. Then, the process moves to step S716. Otherwise, the determination is no and the process moves to step S716.

FIGS. 79A1 through B3 explain the definition of a table format and a form design (a table structure) corresponding to the definition. In FIGS. 79A1 through B3, for example, FIG. 79A1 corresponds to FIG. 79B1 and the correspondence relationship is indicated by numeric values following "A" and "B". As illustrated in FIGS. 78A1 through B3, a table format to be defined can correspond to one or more form designs.

In step S716 it is determined whether data should be re-shaped. If the data should be re-shaped, the determination is yes and in step S717 the operator is urged to input data re-shaping information and inputs the information. After the input, in step S718 data re-shaping is defined. After in step S719 information stored up to then is written in the analysis DB 25, a series of the processes is terminated.

Figure 80A:
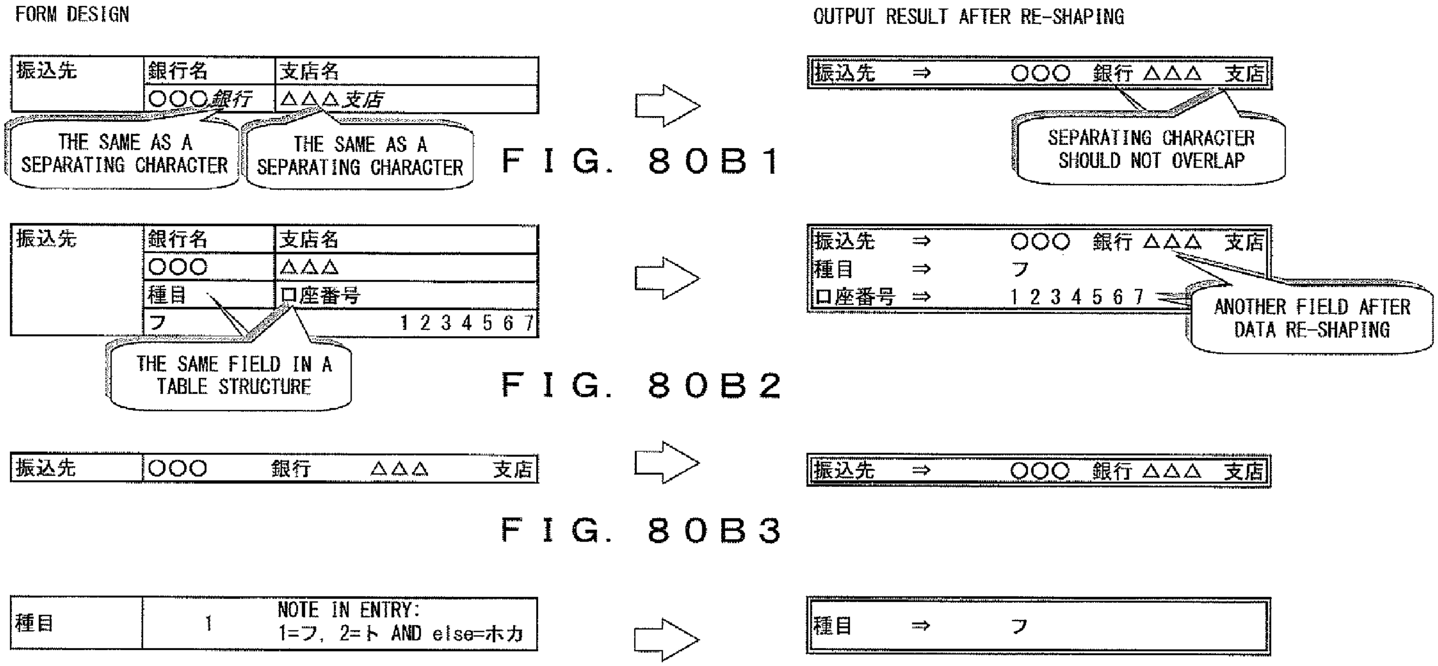
FIG. 80A-B4 explain the definition of a table format and data shaping by the definition.

FIGS. 80A through B4 explain the definition of data re-shaping and data re-shaping performed by the definition. FIG. 80A is the definition contents and FIGS. 80B1 through 4 are respective form designs.

Figure 77A:
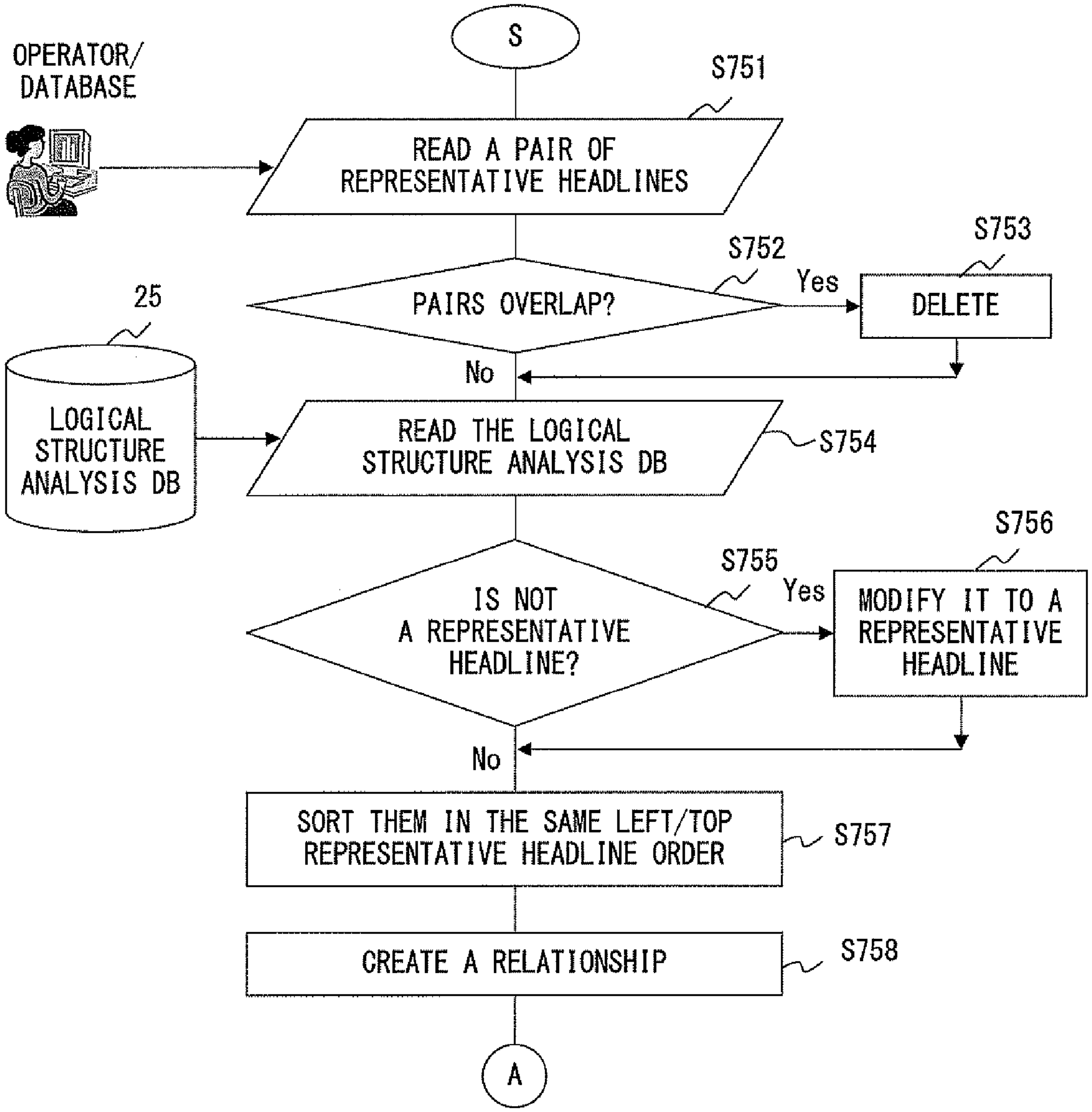
FIGS. 77A&B are a flowchart illustrating the flow of a process for creating a headline relationship.

FIGS. 77A and B are a flowchart illustrating the flow of a process for creating a headline relationship. Next, the operation of the operator up to the creation of the headline relationship and a process performed according to the operation will be explained in detail with reference to FIGS. 77A and B. FIGS. 77A and B presumes that information is stored in the logical structure analysis DB 25 by performing the process in FIGS. 76A and B.

Figure 81:
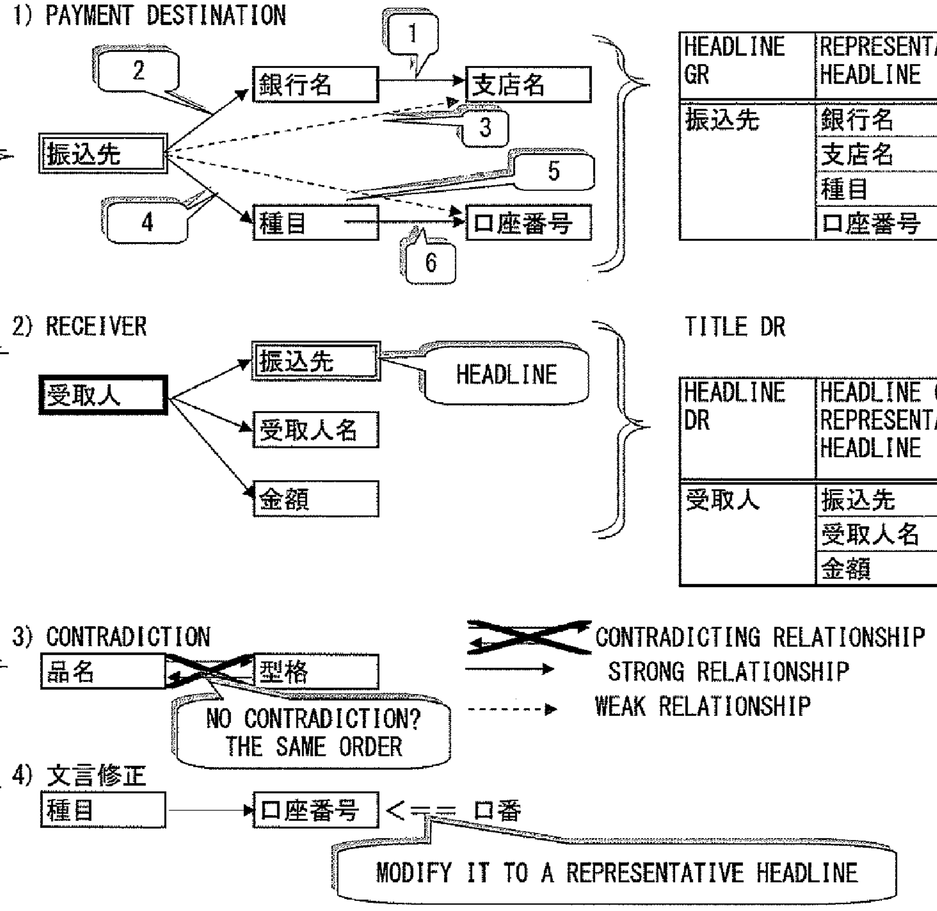
FIG. 81 explains the creating method of a headline relationship.
Figure 84C:
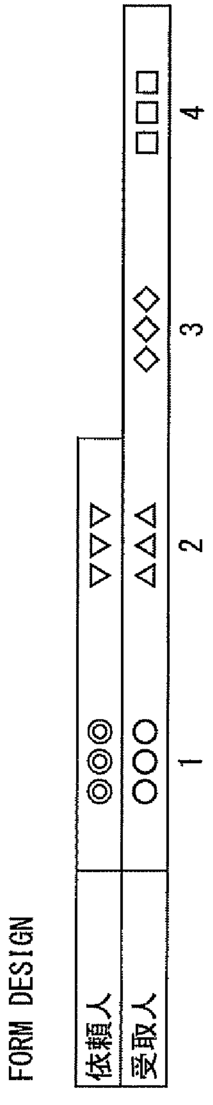
Figure 84D:
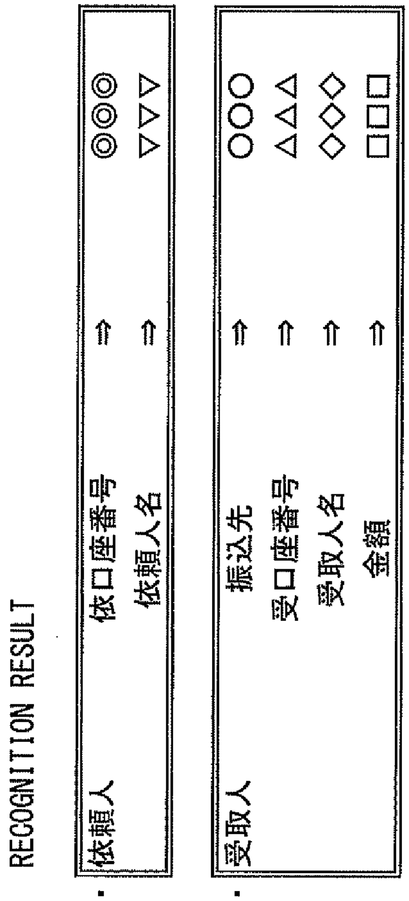

Firstly, in step S751, as illustrated as user input data in FIG. 81, a pair of representative headlines inputted by the operator is read. Then, in step S752 it is determined whether there is a pair of overlapping representative headlines. If there is a pair of overlapping representative headlines, the determination is yes and after in step S753 one of them is left and the other is deleted, the process moves to step S754. Otherwise, the determination is no and the process moves to step S754.

In step S754, necessary information is read from the logical structure analysis DB 25. Then, in step S755 it is determined whether there is a pair of representative headlines in the headline wording defined by the read information. If there is the determined representative headline, of the pair of representative headlines in the headline wordings, the determination is yes and after in step S756 the headline wording is modified to the representative headline, the process moves to step S757. Otherwise, the determination is no and the process moves to step S757.

In a pair of representative headlines, as illustrated as user input data in FIG. 81, the positional relationship between two representative headlines is specified by "upper side/left side" and "lower side/right side". Specifically, two representative headlines are inputted in such a way that different positions may be specified. Those positions indicate a hierarchical relationship and "upper side/left side" is ordered higher than "lower side/right side". Thus, in step S757 all the types of representative headlines on the "lower side/right side" in such a way that priority may be given to representative headlines on the "upper side/left side", in other words, while the representative headlines on the "upper side/left side" are maintained in the same positions. Therefore, the user input data in FIG. 81 illustrates a state after the sorting.

In step S758 a relationship among representative headlines is created. As illustrated in FIG. 81, the relationship specifies a representative headline to be ordered at top among the representative headlines, a representative headline to be ordered at the second top and the like. Thus, among the pairs of representative headline whose number is 1 through 6, a representative headline "振込先" is ordered at top and four representative headlines "銀行名", "支店名", "種目" and "口座番号" are ordered at the second top. The data position order is set in sorting order. After the creation of such a relationship, the process moves to step S759.

In step S759 it is determined whether there is contradiction in the relationship. A relationship created by a pair of representative headline whose number is 30 and 31, being the user input data illustrated in FIG. 81 indicates that two hierarchical relationships exist in the two representative headlines. Therefore, it is determined that contradiction exists in such a relationship and the determination is yes. Then, in step S760 the operator is urged to present the contradicted relationship and to modify it. After re-creating a relationship in which the modification result of the operator is reflected by the operator modifying it, for example, re-inputting a pair of representative headlines, the process moves from step S760 to step S761.

In step S761 a headline GR relationship is created. A headline GR is a representative headline ordered at the above of representative headlines and a headline GR relationship indicates a relationship between a higher-order headline GR and the second higher-order representative headline. In the example illustrated in FIG. 81, since a representative headline 取人" which is ordered higher than a representative headline "振込先" exists, the representative headline "振込先" is specified as a headline GR. Since a headline DR is a representative headline ordered far higher than a headline GR, the headline DR is specified as "受取人". A headline DR relationship is a relationship between the headline DR and the second higher-order representative headline.

In step S762 it is determined whether the same headline GR exists in a different created headline relationship. If headline GR overlaps in the different headline relationship, the determination is yes and the process moves to step S763. In step S763 the headline GR and a representative headline specified as the headline GR are modified (re-named) so that overlap does not exist. Then, the process moves to step S764. Otherwise, the determination is no and the process moves to step S764.

In step S764 the headline DR relationship is created. After the creation, the process moves to step S765. In step S765 a form design is created. In step S765, created form design is displayed to confirm it to the operator. In step S766, the logical structure analysis DB 25 is updated depending on the instructions of the operator. After, a series of the processes is terminated.

FIGS. 82A1 through B2 explain a form design created by the definition of the headline GR relationship. FIGS. 82A1, 82A2, 82A3 and 82A4 are a created headline GR relationship, variations of a form design matched with the created headline GR relationship, an actually read form design and data related to each representative headline in the form design in FIG. 82A3, respectively. Reference numerals "1" through "4" in FIG. 82A1 through 82A4 indicate data position order. FIGS. 82B1 and 82B2 indicate a created headline GR relationship and variations of a form design matched with the created headline GR relationship.

FIGS. 83A through G explain a headline relationship created from a form design by a headline GR relationship and illustrate respective different examples.

As described above, when there is a headline wording not detected from a table structure for the reason that there is no headline wording or headline wording cannot be recognized, a representative headline is assigned to a data candidate according to data position order. It is for this purpose that a form design is created and is checked by the operator. In other words, it is for this purpose that an inappropriate part is checked using a form design. The created headline relationship is used to determine a representative headline assigned to the un-detected headline wording, depending on the situation. Any of the examples illustrated in FIGS. 83A through G is a headline relationship created according to the recognition result of a headline wording and the headline relationship is a target to be modified by the logical structure analysis (field candidate extraction) unit 20 in FIG. 1.

FIGS. 84A through D explain a form design created by a headline DR relationship. FIGS. 85A through C explain a headline relationship created from a form design by a headline DR relationship. As clear from FIGS. 84A through 85C, in the headline DR relationship too, the same process as in the headline GR relationship can be performed.

Although in this preferred embodiment, a form is targeted, the present invention is applicable to any medium other than a form, in which related information is arranged in a table structure. As to the detailed part, various variations can be applied to it.

As described above, when a hierarchical structure among headline wordings is applied to a character string in a form, recognition in a higher-order concept or the check of a recognition result and the like can be realized. In other words, the amount of information needed to recognize a character string, to check the recognition result and so on can be suppressed. Thus, higher versatility can be more easily realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment of the present invention have been described in detail, it should be understood that the various changes, substitutions, and alterations could be made hereto without departing from the spirit and scope of the invention.

The invention claimed is:

1. A form recognition apparatus for recognizing a character string existing in an arbitrary table structure in a form, comprising:

an image acquisition unit capable of obtaining a digitized form image of the form;

a character string recognition unit capable of recognizing a character string existing in the form image obtained by the image acquisition unit;

a character string extraction unit capable of extracting a headline wording consisting of a predetermined character string from character strings recognized by the character string recognition unit;

a table structure determination unit capable of determining a table structure existing in the form image, on the basis of each of the headline wordings extracted by the character string extraction unit entirely from the form image and arrangement of each of the headline wordings in the form image, when the character string extraction unit extracted plurality of the headline wording;

a correspondence relationship specification unit capable of specifying a correspondence relationship between the headline wording and a character string other than the headline wording recognized by the character string recognition unit, using a determination result of the table structure by the table structure determination unit; and a storage unit capable of storing a database in which headline wordings that may appear in a unit table structure being a unit for entering one or more pieces of related data in the form are defined in a hierarchical structure for each unit table structure, wherein the table structure determination unit determines the entire table structure existing in the form image, referring to the database stored in the storage unit.

2. The form recognition apparatus according to claim 1, wherein the hierarchical structure includes a first layer in which one or more headline wordings are defined, a second layer in which a first representative headline being a headline wording that represents a headline wording defined in the first layer and can be replaced with another headline wording and a third layer in which a second representative headline being a headline wording ordered higher than the first representative headline in the table structure, and the table structure determination unit sets a range of the unit table structure having the second representative headline, on the basis of an extraction result of the second representative headline, by the character string extraction unit, evaluates other headline wordings extracted in the set range and specifies a headline wording existing in the unit table structure.

3. The form recognition apparatus according to claim 1, wherein the hierarchical structure includes a first layer in which one or more headline wordings are defined, a second layer in which a first representative headline being a headline wording that represents a headline wording defined in the first layer and can be replaced with another headline wording and a third layer in which a second representative headline being a headline wording ordered higher than the first representative headline in the table structure, further comprising:

a headline addition unit capable of setting a range of the unit table structure having the second representative headline, on the basis of an extraction result of the second representative headline, by the character string extraction unit and specifying and adding a first representative headline to be added to the unit table structure, focusing on the first representative headline replaceable with another headline wording extracted in the set range and data recognized as a character string different from the headline wording in the unit table structure.

4. The form recognition apparatus according to claim 1, further comprising:

a position specification unit capable of specifying a position in the form image, in which a headline wording not recognized by the character string recognition unit exists, on the basis of a headline wording extracted by the character string extraction unit and the table structure determined by the table structure determination unit; and a phrase creation unit capable of creating a headline wording to exist in a position specified by the position specification unit.

5. The form recognition apparatus according to claim 1, wherein the correspondence relationship specification unit refers to accessory information of a symbol that may be attached to a character string existing as information of the headline wording, defined for each of the headline wordings and specifies the correspondence relationship.

6. A form recognition apparatus for recognizing a character string existing in an arbitrary table structure in a form, comprising:

an image acquisition unit capable of obtaining a digitized form image of the form;

a character string recognition unit capable of recognizing a character string existing in the form image obtained by the image acquisition unit;

a character string extraction unit capable of extracting a headline wording that is a predetermined character string from character strings recognized by the character string recognition unit;

a position specification unit capable of specifying a position in the form image, in which a headline wording not recognized by the character string recognition unit, on the basis of a result extracted by the character string extraction unit;

a phrase creation unit capable of creating a headline wording to existing a position specified by the position specification unit; and a correspondence relationship specification unit capable of specifying a correspondence relationship between the headline wording including a headline wording created by the phrase creation unit and a character string other than the headline wording recognized by the character string recognition unit.

7. The form recognition apparatus according to claim 6, further comprising:

a table structure determination unit capable of for determining a table structure existing in the form image, on the basis of a headline wording extracted by the character string extraction unit and arrangement of the headline wordings in the form image, wherein the position specification unit specifies the position using a determination result of the table structure determination unit; and the phrase creation unit creates a headline wording to exist in the position from a determination result of the table structure determination unit.

8. The form recognition apparatus according to claim 7, further comprising:

a storage unit capable of storing a database in which headline wordings that may appear in a unit table structure being a unit for entering one or more pieces of related data in the form are defined in a hierarchical structure for each unit table structure, wherein the table structure determination unit determines the entire table structure existing in the form image, referring to a database stored in the storage unit.

9. The form recognition apparatus according to claim 8, wherein the hierarchical structure includes a first layer in which one or more headline wordings are defined, a second layer in which a first representative headline being a headline wording that represents a headline wording defined in the first layer and can be replaced with another headline wording and a third layer in which a second representative headline being a headline wording ordered higher than the first representative headline in the table structure, and the table structure determination unit sets a range of the unit table structure having the second representative headline, on the basis of an extraction result of the second representative headline, by the character string extraction unit, evaluates other headline wordings extracted in the set range and specifies a headline wording existing in the unit table structure.

10. The form recognition apparatus according to claim 8, wherein the hierarchical structure includes a first layer in which one or more headline wordings are defined, a second layer in which a first representative headline being a headline wording that represents a headline wording defined in the first layer and can be replaced with another headline wording and a third layer in which a second representative headline being a headline wording ordered higher than the first representative headline in the table structure, the position specification unit extracts a range of the unit table structure having the second representative headline, on the basis of an extraction result of the second representative headline, by the character string extraction unit and specifies the position in the range, focusing on the first representative headline replaceable with another headline wording recognized in the extracted range and a character string recognized as data in the unit table structure, and the phrase creation unit creates the headline wording by specifying a first representative to be added to a position specified in the range by the position specification unit.

11. The form recognition apparatus according to claim 10, wherein the first representative headline has a non-overlapping exclusive relationship for each of the unit table structures, and the phrase creation unit specifies a first representative headline different from a first representative headline recognized in the range, using the exclusive relationship.

12. The form recognition apparatus according to claim 11, wherein the database defines data information of data entered into the unit table structure, and the phrase creation unit specifies a first representative headline different from a first representative headline recognized in the range, using the exclusive relationship and the data information.

13. The form recognition apparatus according to claim 6, further comprising:

a storage unit capable of storing a database in which headline wordings that may appear in a unit table structure being a unit for entering one or more pieces of related data into the form are defined in a hierarchical structure for each unit table structure; and a headline addition unit capable of setting a range of the unit table structure having the headline wording, on the basis of an extraction result of the headline wording, by the character string extraction unit and specifying and adding a headline wording corresponding to data in the unit table structure, focusing on headline wording extracted in the set range and data recognized as a character string in the unit table structure.

14. The form recognition apparatus according to claim 6, further comprising:

a cell creation unit capable of for creating a cell that is a region including the character string, using a recognition result of the character string recognition unit, wherein the position specification unit specifies the position for each cell created by the cell creation unit.

15. The form recognition apparatus according to claim 6, further comprising:

a cell creation unit capable of creating a cell that is a region including the character string; and a cell correction unit capable of correcting a plurality of cells that is for a character string entered into the form as data and continues in the same direction, of cells created by the cell creation unit.

16. The form recognition apparatus according to claim 6, wherein the correspondence relationship specification unit specifies the correspondence relationship, referring to accessory information of a symbol that may be attached to a character string existing as information of the headline wording, defined for each of the headline wordings.

17. A form recognition apparatus for recognizing a character string existing in an arbitrary table structure in a form, comprising:

an image acquisition unit capable of obtaining a digitized form image of the form;

a storage unit capable of storing a database in which headline wordings that may appear in a unit table structure being a unit for entering one or more pieces of related data into the form are defined in a hierarchical structure for each unit table structure;

a character string recognition unit capable of recognizing a character string existing in the form image obtained by the image acquisition unit;

a character string extraction unit capable of extracting a headline wording that is a predetermined character string from character strings recognized by the character string recognition unit, referring to a database stored in the storage unit;

a headline addition unit capable of extracting a range of the unit table structure existing in the form image, on the basis of an extraction result by the character string extraction unit and adding a headline wording corresponding to data, focusing on at least one of the headline wording recognized in the extracted range and a character string recognized as data in the unit table structure; and a correspondence relationship specification unit capable of specifying a correspondence relationship between the headline wording including a headline wording added by the headline addition unit and a character string other than the headline wording recognized by the character string recognition unit.

18. The form recognition apparatus according to claim 17, wherein the hierarchical structure includes a first layer in which one or more headline wordings are defined, a second layer in which a first representative headline being a headline wording that represents a headline wording defined in the first layer and can be replaced with another headline wording and a third layer in which a second representative headline being a headline wording ordered higher than the first representative headline in the table structure; and the headline addition unit extracts a range of the unit table structure having the second representative headline, on the basis of an extraction result of the second representative headline, by the character string extraction unit and adds a first representative headline corresponding to data, focusing on at least one of the first representative headline recognized in the extracted range and a character string recognized as data in the unit table structure.

19. The form recognition apparatus according to claim 17, wherein the correspondence relationship specification unit specifies the correspondence relationship, referring to accessory information of a symbol that may be attached to a character string existing as information of the headline wording, defined for each of the headline wordings.

20. A form recognition apparatus for recognizing a character string existing in an arbitrary table structure in a form, comprising:

an image acquisition unit capable of obtaining a digitized form image of the form;

a character string recognition unit capable of recognizing a character string existing in the form image obtained by the image acquisition unit;

a character string extraction unit capable of extracting a headline wording that is a predetermined character string from character strings recognized by the character string recognition unit;

a table structure determination unit capable of determining a table structure existing in the form image, on the basis of each of the headline wordings extracted by the character string extraction unit and arrangement of each of the headline wordings in the form image, when the character string extraction unit has extracted a plurality of the headline wordings;

a position specification unit capable of specifying a position in the form image, in which a headline wording not recognized by the character string recognition unit exists, on the basis of a result extracted by the character string extraction unit;

a phrase creation unit capable of creating a headline wording to exist in a position specified by the position specification unit;

a headline addition unit capable of extracting a range of the unit table structure that is a table structure being a unit for entering one or more pieces of related data, from table structures determined by the table structure determination unit, on the basis of an extraction result by the character string extraction unit and adding a headline wording corresponding to data, focusing on at least one of the headline wordings recognized in the extracted range and a character string recognized as data in the unit table structure; and a correspondence relationship specification unit capable of specifying a correspondence relationship between the headline wording, including a headline wording added by the headline addition unit and a character string other than the headline wording recognized by the character string recognition unit.

21. The form recognition apparatus according to claim 20, wherein the correspondence relationship specification unit specifies the correspondence relationship, referring to accessory information of a symbol that may be attached to a character string existing as information of the headline wording, defined for each of the headline wordings.

22. A form recognition method for recognizing a character string existing in an arbitrary table structure in a form, comprising:

obtaining a digitized form image of the form;

recognizing a character string existing in the form image obtained by the image acquisition unit;

extracting a headline wording that is a predetermined character string from character strings recognized by the character string recognition process;

determining a table structure existing in the form image, on the basis of each of the headline wordings extracted by the character string extraction process entirely from the form and arrangement of each of the headline wordings in the form image, when the character string extraction process extracted plurality of the headline wording;

specifying a correspondence relationship between the headline wording and a character string other than the headline wording, recognized by the character string recognition process, using a determination result of the table structure by the table structure determination process; and storing a database in which headline wordings that may appear in a unit table structure being a unit for entering one or more pieces of related data in the form are defined in a hierarchical structure for each unit table structure, wherein the entire table structure existing in the form image is determined referring to the database.

23. A form recognition method for recognizing a character string existing in an arbitrary table structure in a form, comprising:

obtaining a digitized form image of the form;

recognizing a character string existing in the form image obtained by the image acquisition process;

extracting a headline wording that is a predetermined character string from character strings recognized by the character string recognition process;

specifying a position in the form image, in which a headline wording not recognized by the character string recognition process, on the basis of a result extracted by the character string extraction process;

creating a headline wording to existing a position specified by the position specification process; and specifying a correspondence relationship between the headline wording, including a headline wording created by the phrase creation process and a character string other than the headline wording, recognized by the character string recognition process.

24. A form recognition method for recognizing a character string existing in an arbitrary table structure in a form, comprising:

obtaining a digitized form image of the form;

recognizing a character string existing in the form image obtained by the image acquisition process;

extracting a headline wording that is a predetermined character string from character strings recognized by the character string recognition process, referring to a database in which headline wordings that may appear in the unit table structure, for each unit structure being a table structure being a unit for entering one or more pieces of related data in the form;

extracting a range of the unit table structure existing in the form image, on the basis of an extraction result by the character string extraction process and adding a headline wording corresponding to data, focusing on at least one of the headline wordings recognized in the extracted range and a character string recognized as data in the unit table structure; and specifying a correspondence relationship between the headline wording, including a headline wording added by the headline addition process and a character string other than the headline wording recognized by the character string recognition process.

25. A non-transitory computer readable storage medium on which is recorded a program for enabling a computer used as a form recognition apparatus for recognizing a character string existing in an arbitrary table structure in a form to realize functions, said functions comprising:

obtaining a digitized form image of the form;

recognizing a character string existing in the form image obtained by the obtaining;

extracting a headline wording that is a predetermined character string from character strings recognized by the recognizing;

determining a table structure existing in the form image, on the basis each of the headline wordings extracted by the character string extraction function entirely from the form image and arrangement of each of the headline wordings in the form image, when the extracting has extracted a plurality of the headline wordings;

specifying a correspondence relationship between the headline wording and a character string other than the headline wording recognized by the recognizing, using a determination result of the table structure by the determining; and storing a database in which headline wordings that may appear in a unit table structure being a unit for entering one or more pieces of related data in the form are defined in a hierarchical structure for each unit table structure, wherein the entire table structure existing in the form image is determined referring to the database.

26. A non-transitory computer readable storage medium on which is recorded a program for enabling a computer used as a form recognition apparatus for recognizing a character string existing in an arbitrary table structure in a form to realize functions, said functions comprising:

obtaining a digitized form image of the form;

recognizing a character string existing in the form image obtained by the obtaining;

extracting a headline wording that is a predetermined character string from character strings recognized by the recognizing;

specifying a position in the form image existing in a headline wording not recognized by the-recognizing, on the basis of a result extracted by the extracting;

creating a headline wording to exist in the position specified by the specifying; and specifying a correspondence relationship between the headline wording, including the headline wording created by the creating, and a character string other than the headline wording recognized by the-recognizing.

27. A non-transitory computer readable storage medium on which is recorded a program for enabling a computer used as a form recognition apparatus for recognizing a character string existing in an arbitrary table structure in a form to realize functions, said functions comprising:

obtaining a digitized form image of the form;

recognizing a character string existing in the form image obtained by the obtaining;

extracting a headline wording that is a predetermined character string from character strings recognized by the-recognizing;

extracting a range of the unit table structure existing in the form image, on the basis of an extraction result of the headline wording and adding a headline wording corresponding to data, focusing on at least one of the headline wordings recognized in the extracted range and a character string recognized as the data in the unit table structure; and specifying a correspondence relationship between the headline wording, including a headline wording added by the adding and a character string other than the headline wording recognized by the-recognizing.

* * * * *